United States Patent
Wang et al.

(10) Patent No.: US 11,968,369 B2
(45) Date of Patent: Apr. 23, 2024

(54) USE RESTRICTIONS FOR CROSS-COMPONENT PREDICTION

(71) Applicants: Beijing Bytedance Network Technology Co., Ltd., Beijing (CN); Bytedance Inc., Los Angeles, CA (US)

(72) Inventors: Yang Wang, Beijing (CN); Li Zhang, San Diego, CA (US); Kai Zhang, San Diego, CA (US); Hongbin Liu, Beijing (CN); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/968,553

(22) Filed: Oct. 18, 2022

(65) Prior Publication Data

US 2023/0063736 A1    Mar. 2, 2023

Related U.S. Application Data

(63) Continuation of application No. PCT/CN2021/088000, filed on Apr. 19, 2021.

(30) Foreign Application Priority Data

Apr. 18, 2020 (WO) ................ PCT/CN2020/085484

(51) Int. Cl.
*H04N 19/132* (2014.01)
*H04N 19/105* (2014.01)
(Continued)

(52) U.S. Cl.
CPC ......... *H04N 19/132* (2014.11); *H04N 19/105* (2014.11); *H04N 19/11* (2014.11);
(Continued)

(58) Field of Classification Search
CPC .. H04N 19/105; H04N 19/132; H04N 19/186; H04N 19/70; H04N 19/593; H04N 19/11; H04N 19/136
See application file for complete search history.

(56) References Cited

U.S. PATENT DOCUMENTS

2016/0269730 A1   9/2016   Jeon et al.
2016/0277762 A1   9/2016   Zhang et al.
(Continued)

FOREIGN PATENT DOCUMENTS

CN   103096057 A   5/2013
CN   109196867 A   1/2019
(Continued)

OTHER PUBLICATIONS

"Video Codec Using Flexible Block Partitioning and Advanced Prediction, Transform and Loop Filtering Technologies"—Choi et al., IEEE Transactions on Circuits and Systems for Video Technology, vol. 30, No. 5, May 2020 (Year: 2020).*

(Continued)

*Primary Examiner* — Mainul Hasan
(74) *Attorney, Agent, or Firm* — ARENTFOX SCHIFF LLP

(57) ABSTRACT

A method of video processing is provided. The method includes determining, for a conversion between a video comprising a video unit and a bitstream of the video, whether a first coding tool is enabled for the video unit according to a rule. The rule specifies that the first coding tool and a second coding tool are mutually exclusively enabled. The first coding tool or the second coding tool comprises a sign data hiding tool. The method also includes performing the conversion according to the determining.

15 Claims, 24 Drawing Sheets

(51) Int. Cl.
*H04N 19/11* (2014.01)
*H04N 19/124* (2014.01)
*H04N 19/136* (2014.01)
*H04N 19/176* (2014.01)
*H04N 19/186* (2014.01)
*H04N 19/593* (2014.01)
*H04N 19/70* (2014.01)
*H04N 19/80* (2014.01)

(52) U.S. Cl.
CPC ......... *H04N 19/124* (2014.11); *H04N 19/136* (2014.11); *H04N 19/176* (2014.11); *H04N 19/186* (2014.11); *H04N 19/593* (2014.11); *H04N 19/70* (2014.11); *H04N 19/80* (2014.11)

(56) References Cited

U.S. PATENT DOCUMENTS

| | | | |
|---|---|---|---|
| 2017/0171555 | A1 | 6/2017 | Chujoh et al. |
| 2017/0353730 | A1 | 12/2017 | Liu et al. |
| 2018/0205949 | A1 | 7/2018 | Hsiang |
| 2019/0082194 | A1 | 3/2019 | Chang |
| 2020/0154115 | A1 | 5/2020 | Ramasubramonian et al. |
| 2020/0213619 | A1 | 7/2020 | Aono et al. |
| 2020/0413049 | A1* | 12/2020 | Biatek .................. H04N 19/11 |
| 2020/0413069 | A1* | 12/2020 | Lim ..................... H04N 19/186 |
| 2021/0306673 | A1* | 9/2021 | Sarwer ................ H04N 19/182 |
| 2021/0314625 | A1 | 10/2021 | Nalci et al. |
| 2021/0385440 | A1* | 12/2021 | Filippov .............. H04N 19/105 |
| 2022/0078484 | A1* | 3/2022 | Filippov ................ H04N 19/96 |
| 2022/0337847 | A1* | 10/2022 | Chen ................... H04N 19/182 |
| 2022/0345711 | A1* | 10/2022 | Filippov ............. H04N 19/132 |

FOREIGN PATENT DOCUMENTS

| | | |
|---|---|---|
| CN | 110896478 A | 3/2020 |
| KR | 20190062302 A | 6/2019 |
| TW | 201937927 A | 9/2019 |
| WO | 2017088093 A1 | 6/2017 |
| WO | 2018171751 A1 | 9/2018 |
| WO | 2019072595 A1 | 4/2019 |
| WO | 2019172799 A1 | 9/2019 |
| WO | 2020009357 A1 | 1/2020 |
| WO | 2020014563 A1 | 1/2020 |
| WO | 2020015433 A1 | 1/2020 |
| WO | 2020035837 A1 | 2/2020 |
| WO | 2020050685 A1 | 3/2020 |
| WO | 2020053804 A1 | 3/2020 |
| WO | 2020056356 A1 | 3/2020 |
| WO | 2020071616 A1 | 4/2020 |
| WO | 2020073904 A1 | 4/2020 |

OTHER PUBLICATIONS

Document: JVET-P2001-v9, Bross, B., et al., "Versatile Video Coding (Draft 7)," Joint Video Experts Team (JVET) of ITU-T SG 16 WP 3 and ISO/IEC JTC 1/SC 29/WG 11 16th Meeting: Geneva, CH, Oct. 1-11, 2019, 495 pages.
Bossen, F., Retrieved from the Internet: https://vcgit.hhi.fraunhofer.de/jvet/VVCSoftware_VTM/-/tags/VTM-6.0, VTM version 6.0, Nov. 23, 2022, 2 pages.
Document: JVET-M0057, Abdoli, M., et al., "CE8: BDPCM with horizontal/vertical predictor and independently decodable areas (test 8.3.1b)," Joint Video Experts Team (JVET) of ITU-T SG 16 WP 3 and ISO/IEC JTC 1/SC 29/WG 11 13th Meeting: Marrakech, MA, Jan. 9-18, 2019, 7 pages.
Document: JVET-N0413, Karczewicz, M., et al., "CE8-related: Quantized residual BDPCM," Joint Video Experts Team (JVET) of ITU-T SG 16 WP 3 and ISO/IEC JTC 1/SC 29/WG 11 14th Meeting: Geneva, CH, Mar. 19-27, 2019, 6 pages.
Document: JVET-Q2001-vE, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 512 pages.
Document: JVET-N0229, Choi, J., et al., "Non-CE3: CCLM prediction for 4:2:2 and 4:4:4 color format," Joint Video Experts Team (JVET) of ITU-T SG 16 WP 3 and ISO/IEC JTC 1/SC 29/WG 11 14th Meeting: Geneva, CH, Mar. 19-27, 2019, 10 pages.
Document: JVET-P0486-v3, Sarwer, M., et al., "CE8-related: Alignment of maximum transform-skip size with maximum transform block size," Joint Video Experts Team (JVET) of ITU-T SG 16 WP 3 and ISO/IEC JTC 1/SC 29/WG 11 16th Meeting: Geneva, CH, Oct. 1-11, 2019, 10 pages.
Document: JVET-R0314, Wang, Y., et al., "AHG2/AHG16: Fixes on CCLM," Joint Video Experts Team (JVET) of ITU-T SG 16 WP 3 and ISO/IEC JTC 1/SC 29/WG 11 18th Meeting: by teleconference, Apr. 15-24, 2020, 6 pages.
Document: JVET-N0271-v3, Huo, J., et al., "CE3-1.5: CCLM derived with four neighbouring samples," Joint Video Experts Team (JVET) of ITU-T SG 16 WP 3 and ISO/IEC JTC 1/SC 29/WG 11 14th Meeting: Geneva, CH, Mar. 19-27, 2019, 3 pages.
Document: JVET-O0095-v2, Filippov, A., et al., "CE3-3.2: Simplified and robust CCLM parameter derivation," Joint Video Experts Team (JVET) of ITU-T SG 16 WP 3 and ISO/IEC JTC 1/SC 29/WG 11 15th Meeting: Gothenburg, SE, Jul. 3-12, 2019, 6 pages.
Document: JVET-Q0500, Chen, Y-W., et al., "AHG16: On derivation of CCLM predictors," Joint Video Experts Team (JVET) of ITU-T SG 16 WP 3 and ISO/IEC JTC 1/SC 29/WG 11 17th Meeting: Brussels, BE, Jan. 7-17, 2020, 8 pages.
Document: JVET-N0228, Choi, J., et al., "CE3: Reduced No. of reference samples for CCLM parameter calculation (CE3-1.4.1 and CE3-1.4.2)," Joint Video Experts Team (JVET) of ITU-T SG 16 WP 3 and ISO/IEC JTC 1/SC 29/WG 11 14th Meeting: Geneva, CH, Mar. 19-27, 2019, 20 pages.
Document: JVET-P0297-v2, Ikeda, M., et al., "Non-CE3: On CCLM neighboring sample," Joint Video Experts Team (JVET) of ITU-T SG 16 WP 3 and ISO/IEC JTC 1/SC 29/WG 11 16th Meeting: Geneva, CH, Oct. 1-11, 2019, 16 pages.
Document: JVET-R0116-v3, Sarwer, M., et al., "AHG11/AHG14: On sign data hiding of transform skip block," Joint Video Experts Team (JVET) of ITU-T SG 16 WP 3 and ISO/IEC JTC 1/SC 29/WG 11 18th Meeting: by teleconference, Apr. 15-24, 2020, 7 pages.
Document: JVET-R0154_v2, Yoo, S., et al., "AHG9/16 : On sign data hiding for BDPCM blocks," Joint Video Experts Team (JVET) of ITU-T SG 16 WP 3 and ISO/IEC JTC 1/SC 29/WG 11 18th Meeting: by teleconference, Apr. 15-24, 2020, 3 pages.
Foreign Communication From a related Counterpart Application, Indian Application No. 202227025608, Indian Office Action dated Jul. 9, 2022, 6 pages.
Notice of Allowance dated Aug. 9, 2022, 34 pages, U.S. Appl. No. 17/732,813, filed Apr. 29, 2022.
Foreign Communication From a related Counterpart Application, PCT Application No. PCT/CN2020/125796, English Translation of International Search Report dated Jan. 27, 2021, 9 pages.
Foreign Communication From a related Counterpart Application, PCT Application No. PCT/CN2020/125798, English Translation of International Search Report dated Jan. 13, 2021, 10 pages.
Foreign Communication From a related Counterpart Application, PCT Application No. PCT/CN2021/087998, English Translation of International Search Report dated Jul. 15, 2021, 9 pages.
Foreign Communication From a related Counterpart Application, PCT Application No. PCT/CN2021/087999, English Translation of International Search Report dated Jul. 15, 2021, 8 pages.
Foreign Communication From a related Counterpart Application, PCT Application No. PCT/CN2021/088000, English Translation of International Search Report dated Jul. 15, 2021, 12 pages.
Foreign Communication From a related Counterpart Application, PCT Application No. PCT/CN2021/082045, English Translation of International Search Report dated Jun. 18, 2021, 13 pages.
Hanhart et al., "CE3: Modified CCLM downsampling filter for "type-2" content (Test 2.4)," Joint Video Experts Team (JVET) of ITU-T SG 16 WP 3 and ISO/IEC JTC 1/SC 29/WG 11, 13th Meeting: Marrakech, MA, Jan. 9-18, 2019, Document: JVET-M0142-v3, 5 pages.
Lin et al., "Non-CE3: Multiple reference sample set for CCLM," Joint Video Experts Team (JVET) of ITU-T SG 16 WP 3 and

(56) References Cited

OTHER PUBLICATIONS

ISO/IEC JTC 1/SC 29/WG 11, 16th Meeting: Geneva, CH, Oct. 1-11, 2019, Document: JVET-P0500, 3 pages.
Partial Supplementary European Search Report in EP20881100.0, dated Mar. 15, 2023, 14 pages.
Tsai et al., "Cleanup for checking CTU row boundary location in CCLM," Joint Video Experts Team (JVET) of ITU-T SG 16 WP 3 and ISO/IEC JTC 1/SC 29/WG 11, 17th Meeting: Brussels, BE, Jan. 7-17, 2020, Document: JVET-20194-v1, 4 pages.
Van Der Auwera et al., "Description of Core Experiment 3 (CE3): Intra Prediction and Mode Coding," Joint Video Experts Team (JVET) of ITU-T SG 16 WP 3 and ISO/IEC JTC 1/SC 29/WG 11, 12th Meeting: Macau, CN, Oct. 3-12, 2018, Document: JVET-L1023-v3, 24 pages.
Zhang et al., "CE3: CCLM prediction with single-line neighbouring luma samples (Test 2.6.1 and Test 2.6.2)," Joint Video Experts Team (JVET) of ITU-T SG 16 WP 3 and ISO/IEC JTC 1/SC 29/WG 11, 13th Meeting: Marrakech, MA, Jan. 9-18, 2019, Document: JVET-M0263, 3 pages.
Bross et al., "Versatile Video Coding (Draft 7)," Joint Video Experts Team (JVET) of ITU-T SG 16 WP 3 and ISO/IEC JTC 1/SC 29/WG 11, 16th Meeting: Geneva, CH, Oct. 1-11, 2019, JVET-P2001-vB, 7 pages.
Chen et al., "Algorithm description for Versatile Video Coding and Test Model 6 (VTM 6)," Joint Video Experts Team (JVET) of ITU-T SG 16 WP 3 and ISO/IEC JTC 1/SC 29/WG 11, 15th Meeting: Gothenburg, SE, Jul. 3-12, 2019, JVET-O2002-v2, 5 pages.
Zhao et al., "CE2: Subset 4.4: Test Results on Harmonization of JCTVC-G283, JCTVC-G442 and JCTVC-G980," Joint Collaborative Team on Video Coding (JCT-VC) of ITU-T SG16 WP3 and ISO/IEC JTC1/SC29/WG11, 8th Meeting: San Jose, CA, USA, Feb. 1-11, 2012, JCTVC-H0308, 6 pages.
Kim, Jungsun, "AHG5: Seperate chroma transform depth for non 4:2:0 format," Joint Collaborative Team on Video Coding (JCT-VC) of ITU-T SG 16 WP 3 and ISO/IEC JTC 1/SC 29/WG 11, 13th Meeting: Incheon, KR, Apr. 18-26, 2013, JCTVC-M0098, 4 pages.
Guo et al., "Limiting Chroma Transform Depth in Residue Quad Tree (RQT)," Joint Collaborative Team on Video Coding (JCT-VC) of ITU-T SG16 WP3 and ISO/IEC JTC1/SC29/WG11, 5th Meeting: Geneva, Mar. 16-23, 2011, JCTVC-E377, 4 pages.
Li et al., "Simplification on CCLM," Joint Video Experts Team (JVET) of ITU-T SG 16 WP 3 and ISO/IEC JTC 1/SC 29/ WG 11, 18th Meeting: by teleconference, Apr. 15-24, 2020, JVET-R0391-v4, 7 pages.
Extended European Search Report in EP20881100.0, mailed Jun. 20, 2023, 17 pages.
Extended European Search Report in EP21787550.9, mailed Jul. 19, 2023, 10 pages.
Extended European Search Report mailed Jan. 15, 2024, in EP21787549.1, 10 pages.
Bross et al., "Versatile Video Coding (Draft 8)," Joint Video Experts Team (JVET) of ITU-T SG 16 WP 3 and ISO/IEC JTC 1/SC 29/WG 11, 18th Meeting; Apr. 15-24, 2020, JVET-R0471-v1, 3 pages.

\* cited by examiner

1710

1712 — Performing a conversion between a video and a bitstream of the video according to a rule, and wherein the format rule specifies that a field indicating whether chroma samples positions are vertically shifted relative to corresponding luma sample positions is set to a default value due to the video having 4:2:2 or 4:4:4 color format.

Performing a conversion between a video comprising one or more pictures comprising one or more slices and a bitstream of the video according to a rule, and wherein the rule specifies that a slice type of a slice depends on reference picture entries of a reference picture list for the slice.

Performing a conversion between a video comprising one or more pictures comprising one or more slices and a bitstream of the video according to a rule, and wherein the rule specifies that a number of allowed filters in adaptation parameter sets (APSs) or a number of APSs depends on coded information of the video.

USE RESTRICTIONS FOR CROSS-COMPONENT PREDICTION

CROSS REFERENCE TO RELATED APPLICATIONS

This application is a continuation of International Patent Application No. PCT/CN2021/088000 filed on Apr. 19, 2021, which claims the priority to and benefits of International Patent Application No. PCT/CN2020/085484 filed on Apr. 18, 2020. All the aforementioned patent applications are hereby incorporated by reference in their entireties.

TECHNICAL FIELD

This disclosure is related to video and image coding technologies.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed techniques may be used by video or image decoder or encoder embodiments for performing encoding or decoding using cross-component linear model prediction.

In one example aspect, a method of processing video is disclosed. The method includes deriving, for a conversion between a chroma block of a video and a coded representation of the video, parameters of a cross-component linear model by using downsampled collocated neighboring top luma samples that are generated from N above neighboring lines of a collocated luma block using a downsampling filter, where N is a positive integer; and performing the conversion using a predicted chroma block generated using the cross-component linear model.

In another example aspect, a method of processing video is disclosed. The method includes determining, for a conversion between a video block of a video having a 4:2:2 color format and a bitstream of the video, a parameter of a cross-component linear model for the video block according to a rule; and performing the conversion based on the determining, and wherein a syntax element indicates whether chroma samples of the video are vertically shifted relative to luma samples of the video, and wherein the rule specifies that the parameter is determined independent of a value of the syntax element.

In another example aspect, a method of processing video is disclosed. The method includes performing a conversion between a video and a bitstream of the video according to a rule, and wherein the format rule specifies that a field indicating whether chroma samples positions are vertically shifted relative to corresponding luma sample positions is set to a default value due to the video having 4:2:2 or 4:4:4 color format.

In another example aspect, a method of processing video is disclosed. The method includes determining, for a conversion between a video block of a video and a bitstream of the video, a parameter of a cross-component linear model (CCLM) for the video block according to a rule; and performing the conversion based on the determining, and wherein the rule specifies to use a variable representing a neighbouring luma sample in the determining of the parameter of the CCLM only in case that the variable has a certain value.

In another example aspect, a method of processing video is disclosed. The method includes determining, for a conversion between a video comprising a video unit and a bitstream of the video, whether a first coding tool is enabled for the video unit according to a rule, wherein the rule specifies that the first coding tool and a second coding tool are mutually exclusively enabled, and wherein the first coding tool or the second coding tool comprises a sign data hiding tool; and performing the conversion according to the determining.

In another example aspect, a method of processing video is disclosed. The method includes determining, for a conversion between a video comprising a video unit and a bitstream of the video, whether a first coding tool is enabled for the video unit according to a rule, wherein the rule specifies that the first coding tool and a second coding tool are mutually exclusively enabled, and wherein the first coding tool or the second coding tool comprises a dependent quantization tool; and performing the conversion according to the determining.

In another example aspect, a method of processing video is disclosed. The method includes performing a conversion between a video comprising one or more pictures comprising one or more slices and a bitstream of the video according to a rule, and wherein the rule specifies that a slice type of a slice depends on reference picture entries of a reference picture list for the slice.

In another example aspect, a method of processing video is disclosed. The method includes performing a conversion between a video comprising one or more pictures comprising one or more slices and a bitstream of the video according to a rule, and wherein the rule specifies that a number of allowed filters in adaptation parameter sets (APSs) or a number of APSs depends on coded information of the video.

In another example aspect, the above-described method may be implemented by a video encoder apparatus that comprises a processor.

In yet another example aspect, these methods may be embodied in the form of processor-executable instructions and stored on a computer-readable program medium.

These, and other, aspects are further described in the present disclosure.

DETAILED DESCRIPTION

Figure 1A:
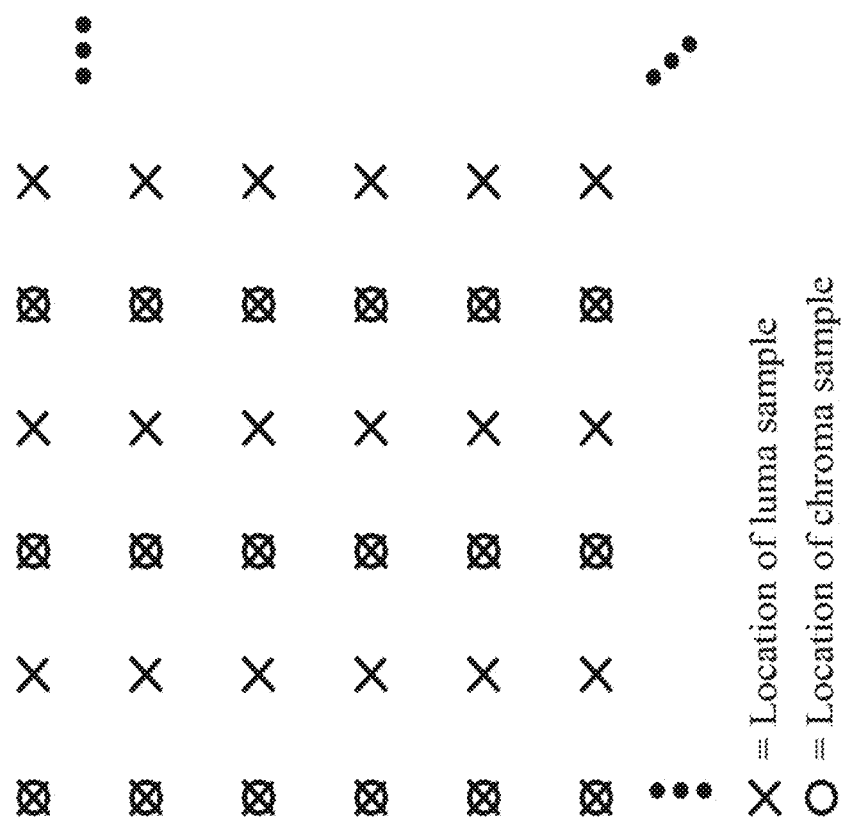
FIG. 1A shows Nominal vertical and horizontal locations of 4:2:2 luma and chroma samples in a picture.

The present disclosure provides various techniques that can be used by a decoder of image or video bitstreams to improve the quality of decompressed or decoded digital video or images. For brevity, the term "video" is used herein to include both a sequence of pictures (traditionally called video) and individual images. Furthermore, a video encoder may also implement these techniques during the process of encoding in order to reconstruct decoded frames used for further encoding.

Section headings are used in the present disclosure for ease of understanding and do not limit the embodiments and techniques to the corresponding sections. As such, embodiments from one section can be combined with embodiments from other sections.

1. Brief Summary

This disclosure is related to video coding technologies. Specifically, it is related cross-component linear model prediction and other coding tools in image/video coding. It may be applied to the existing video coding standard like High Efficiency Video Coding (HEVC), or the standard Versatile Video Coding (VVC) to be finalized. It may be also applicable to future video coding standards or video codec.

2. Background

Video coding standards have evolved primarily through the development of the well-known International Telecommunication Union-Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by Video Coding Experts Group (VCEG) and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

The latest version of VVC draft, i.e., Versatile Video Coding (Draft 7) could be found at:
http://phenix.it-sudparis.euhvet/doc_end_useridocuments/
16_Geneva/wgVivET-P2001-v9.zip The latest reference software of VVC, named VTM, could be found at:
https://vcgit.hhi.fraunhofer.dehvet/VVCSoftware_VTM/-/
tags/VTM-6.0

2.1. Color Space and Chroma Subsampling

Color space, also known as the color model (or color system), is an abstract mathematical model which simply describes the range of colors as tuples of numbers, typically as 3 or 4 values or color components (e.g., red green blue (RGB)). Basically speaking, color space is an elaboration of the coordinate system and sub-space.

For video compression, the most frequently used color spaces are YCbCr and RGB.

YCbCr, Y'CbCr, or Y Pb/Cb Pr/Cr, also written as YCBCR or Y'CBCR, is a family of color spaces used as a part of the color image pipeline in video and digital photography systems. Y' is the luma component and CB and CR are the blue-difference and red-difference chroma components. Y' (with prime) is distinguished from Y, which is luminance, meaning that light intensity is nonlinearly encoded based on gamma corrected RGB primaries.

Chroma subsampling is the practice of encoding images by implementing less resolution for chroma information than for luma information, taking advantage of the human visual system's lower acuity for color differences than for luminance.

2.1.1. 4:4:4

Each of the three Y'CbCr components have the same sample rate, thus there is no chroma subsampling. This scheme is sometimes used in high-end film scanners and cinematic post production.

2.1.2. 4:2:2

The two chroma components are sampled at half the sample rate of luma: the horizontal chroma resolution is halved while the vertical chroma resolution is unchanged. This reduces the bandwidth of an uncompressed video signal by one-third with little to no visual difference. An example of nominal vertical and horizontal locations of 4:2:2 color format is depicted in FIG. 1A in VVC working draft.

2.1.3. 4:2:0

In 4:2:0, the horizontal sampling is doubled compared to 4:1:1, but as the Cb and Cr channels are only sampled on each alternate line in this scheme, the vertical resolution is halved. The data rate is thus the same. Cb and Cr are each subsampled at a factor of 2 both horizontally and vertically. There are three variants of 4:2:0 schemes, having different horizontal and vertical siting.

In MPEG-2, Cb and Cr are cosited horizontally. Cb and Cr are sited between pixels in the vertical direction (sited interstitially), In Joint Photographic Experts Group (JPEG)/JPEG File interchange Format (JFIF), H.261, and MPEG-1, Cb and Cr are sited interstitially, halfway between alternate luma samples.

In 4:2:0 DV, Cb and Cr are co-sited in the horizontal direction. In the vertical direction, they are co-sited on alternating lines.

TABLE 2-1

SubWidthC and SubHeightC values derived from chroma_format_idc and separate_colour_plane_flag

| chroma_format_idc | separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

2.2. Coding Flow of a Typical Video Codec

Figure 1B:
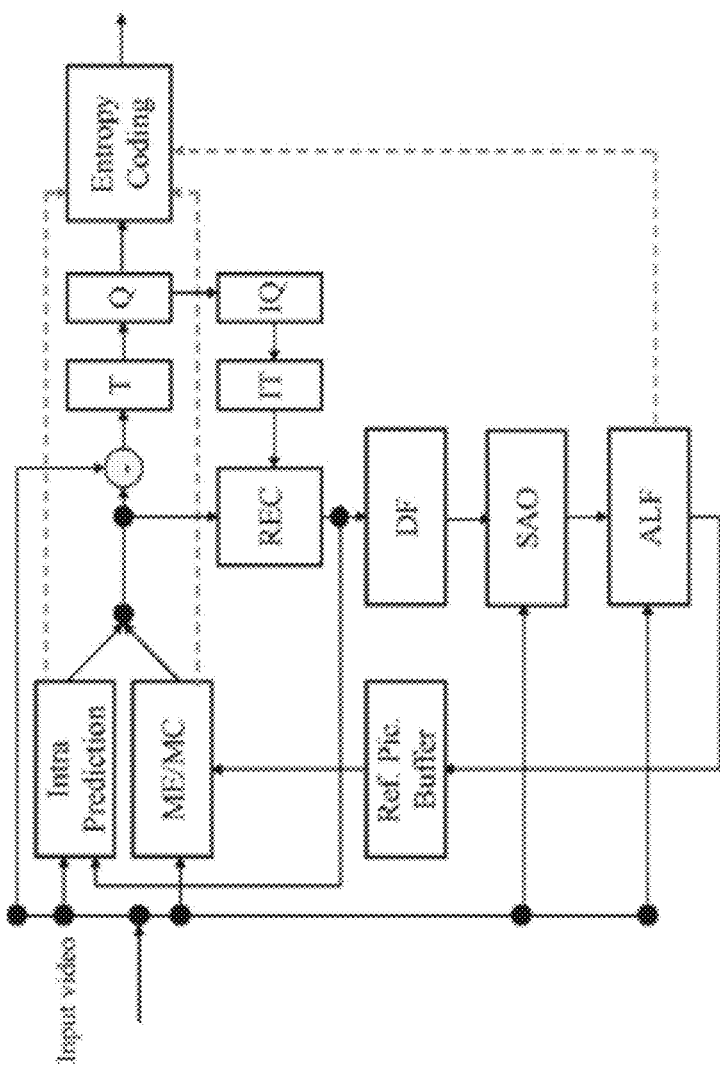
FIG. 1B shows an example of a video encoder.

FIG. 1B shows an example of encoder block diagram of VVC, which contains three in-loop filtering blocks: deblocking filter (DF), sample adaptive offset (SAO) and adaptive loop filter (ALF). Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signalling the offsets and filter coefficients. ALF is located at the last processing stage of each picture and can be regarded as a tool trying to catch and fix artifacts created by the previous stages.

2.3. Intra Mode Coding with 67 Intra Prediction Modes

To capture the arbitrary edge directions presented in natural video, the number of directional intra modes is extended from 33, as used in HEVC, to 65. The additional directional modes are depicted as red dotted arrows in FIG. 2, and the planar and direct current (DC) modes remain the same. These denser directional intra prediction modes apply for all block sizes and for both luma and chroma intra predictions.

Figure 2:
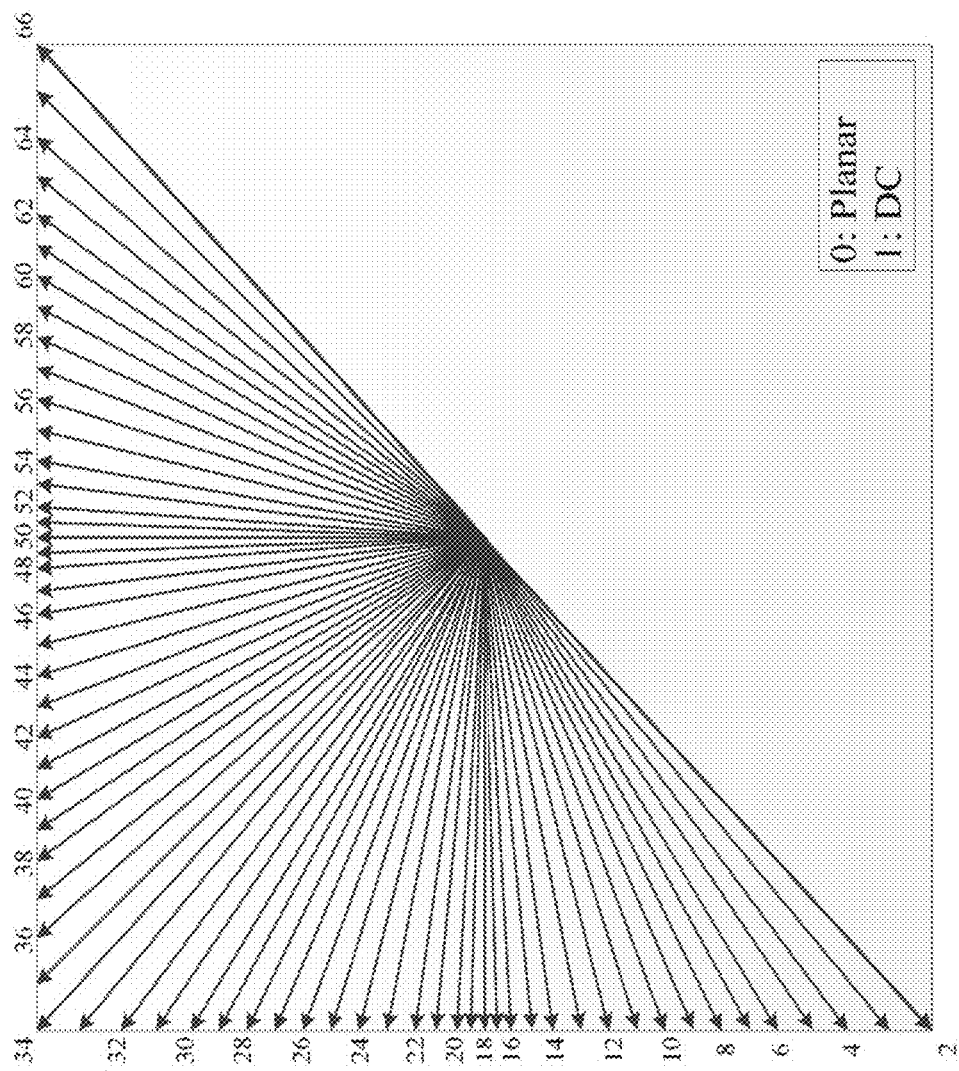
FIG. 2 shows examples of 67 intra prediction modes.

Conventional angular intra prediction directions are defined from 45 degrees to −135 degrees in clockwise direction as shown in FIG. 2. In VTM, several conventional angular intra prediction modes are adaptively replaced with wide-angle intra prediction modes for the non-square blocks. The replaced modes are signalled using the original method and remapped to the indexes of wide angular modes after parsing. The total number of intra prediction modes is unchanged, i.e., 67, and the intra mode coding is unchanged.

In the HEVC, every intra-coded block has a square shape and the length of each of its side is a power of 2. Thus, no division operations are required to generate an intra-predictor using DC mode. In VVC, blocks can have a rectangular shape that necessitates the use of a division operation per block in the general case. To avoid division operations for DC prediction, only the longer side is used to compute the average for non-square blocks.

FIG. 2 shows examples of 67 intra prediction modes.

2.4. Inter Prediction

For each inter-predicted coding unit (CU), motion parameters consisting of motion vectors, reference picture indices and reference picture list usage index, and additional information needed for the new coding feature of VVC to be used for inter-predicted sample generation. The motion parameter can be signalled in an explicit or implicit manner. When a CU is coded with skip mode, the CU is associated with one prediction unit (PU) and has no significant residual coefficients, no coded motion vector delta or reference picture index. A merge mode is specified whereby the motion parameters for the current CU are obtained from neighbouring CUs, including spatial and temporal candidates, and additional schedules introduced in VVC. The merge mode can be applied to any inter-predicted CU, not only for skip mode. The alternative to merge mode is the explicit transmission of motion parameters, where motion vector, corresponding reference picture index for each reference picture list and reference picture list usage flag and other needed information are signalled explicitly per each CU.

2.5. Intra Block Copy (IBC)

Intra block copy (IBC) is a tool adopted in HEVC extensions on screen content coding (SCC). It is well known that it significantly improves the coding efficiency of screen content materials. Since IBC mode is implemented as a block level coding mode, block matching (BM) is performed at the encoder to find the optimal block vector (or motion vector) for each CU. Here, a block vector is used to indicate the displacement from the current block to a reference block, which is already reconstructed inside the current picture. The luma block vector of an IBC-coded CU is in integer precision. The chroma block vector rounds to integer precision as well. When combined with adaptive motion vector resolution (AMVR), the IBC mode can switch between 1-pel and 4-pel motion vector precisions. An IBC-coded CU is treated as the third prediction mode other than intra or inter prediction modes. The IBC mode is applicable to the CUs with both width and height smaller than or equal to 64 luma samples.

At the encoder side, hash-based motion estimation is performed for IBC. The encoder performs rate distortion (RD) check for blocks with either width or height no larger than 16 luma samples. For non-merge mode, the block vector search is performed using hash-based search first. If hash search does not return valid candidate, block matching based local search will be performed.

In the hash-based search, hash key matching (32-bit cyclic redundancy check (CRC)) between the current block and a reference block is extended to all allowed block sizes. The hash key calculation for every position in the current picture is based on 4×4 sub-blocks. For the current block of a larger size, a hash key is determined to match that of the reference block when all the hash keys of all 4×4 sub-blocks match the hash keys in the corresponding reference locations. If hash keys of multiple reference blocks are found to match that of the current block, the block vector costs of each matched reference are calculated and the one with the minimum cost is selected.

In block matching search, the search range is set to cover both the previous and current coding tree units (CTUs).

At CU level, IBC mode is signalled with a flag and it can be signalled as IBC AMVP mode or IBC skip/merge mode as follows:

IBC skip/merge mode: a merge candidate index is used to indicate which of the block vectors in the list from neighbouring candidate IBC coded blocks is used to predict the current block. The merge list consists of spatial, history-based motion vector prediction (HMVP), and pairwise candidates.

IBC AMVP mode: block vector difference is coded in the same way as a motion vector difference. The block vector prediction method uses two candidates as predictors, one from left neighbour and one from above neighbour (if IBC coded). When either neighbour is not available, a default block vector will be used as a predictor. A flag is signalled to indicate the block vector predictor index.

2.6. Palette Mode

For palette mode signalling, the palette mode is coded as a prediction mode for a coding unit, i.e., the prediction modes for a coding unit can be MODE_INTRA, MODE_INTER, MODE_IBC and MODE_PLT. If the palette mode is utilized, the pixels values in the CU are represented by a small set of representative colour values. The set is referred to as the palette. For pixels with values close to the palette colors, the palette indices are signalled. For pixels with values outside the palette, the pixel is denoted with an escape symbol and the quantized pixel values are signalled directly.

To decode a palette encoded block, the decoder needs to decode palette colors and indices. Palette colors are described by a palette table and encoded by palette table coding tools. An escape flag is signalled for each CU to indicate if escape symbols are present in the current CU. If escape symbols are present, the palette table is augmented by one and the last index is assigned to the escape mode. Palette indices of all pixels in a CU form a palette index map and are encoded by palette index map coding tools.

For coding of the palette table, a palette predictor is maintained. The predictor is initialized at the beginning of each slice where predictor is reset to 0. For each entry in the palette predictor, a reuse flag is signalled to indicate whether it is part of the current palette. The reuse flags are sent using run-length coding of zeros. After this, the number of new palette entries are signalled using exponential Golomb code of order 0. Finally, the component values for the new palette entries are signalled. After encoding the current CU, the palette predictor will be updated using the current palette, and entries from the previous palette predictor which are not reused in the current palette will be added at the end of new palette predictor until the maximum size allowed is reached (palette stuffing).

Figure 3:
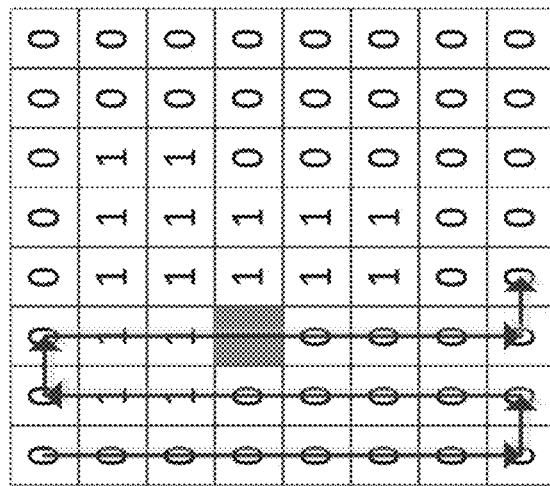
FIG. 3 shows examples of horizontal and vertical traverse scans.
Figure 3:
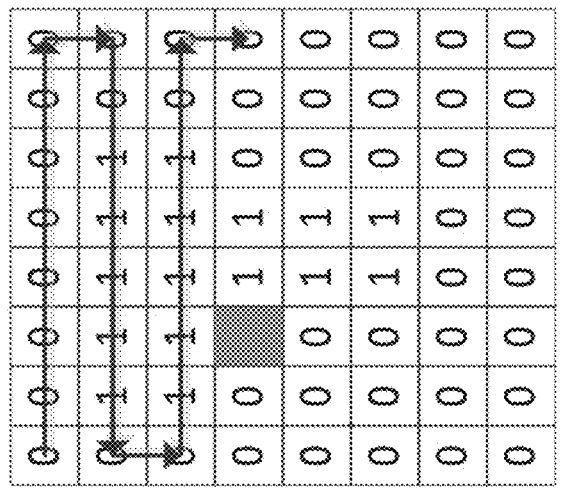

For coding the palette index map, the indices are coded using horizontal and vertical traverse scans as shown in FIG. 3. The scan order is explicitly signalled in the bitstream using the palette transpose flag.

FIG. 3 shows examples of horizontal and vertical traverse scans.

The palette indices are coded using two main palette sample modes: 'INDEX' and 'COPY_ABOVE'. The mode is signalled using a flag except for the top row when horizontal scan is used, the first column when the vertical scan is used, or when the previous mode was 'COPY_ABOVE'. In the 'COPY_ABOVE' mode, the palette index of the sample in the row above is copied. In the 'INDEX' mode, the palette index is explicitly signalled. For both 'INDEX' and 'COPY_ABOVE' modes, a run value is signalled which specifies the number pixels that are coded using the same mode.

The encoding order for index map is as follows. First, the number of index values for the CU is signalled. This is followed by signalling of the actual index values for the entire CU using truncated binary coding. Both the number of indices as well as the index values are coded in bypass mode.

This groups the index-related bypass bins together. Then the palette mode (INDEX or COPY_ABOVE) and run are signalled in an interleaved manner. Finally, the component escape values corresponding to the escape samples for the entire CU are grouped together and coded in bypass mode. An additional syntax element, last_run_type_flag, is signalled after signalling the index values. This syntax element, in conjunction with the number of indices, eliminates the need to signal the run value corresponding to the last run in the block.

In VTM, dual tree is enabled for I slice which separate the coding unit partitioning for Luma and Chroma. Hence, in this proposal, palette is applied on Luma (Y component) and Chroma (Cb and Cr components) separately. If dual tree is disabled, palette will be applied on Y, Cb, Cr components jointly, same as in HEVC palette.

2.7. Cross-Component Linear Model Prediction

A cross-component linear model (CCLM) prediction mode is used in the VVC, for which the chroma samples are predicted based on the reconstructed luma samples of the same CU by using a linear model as follows:

$$\text{pred}_C(i,j)=\alpha \cdot \text{rec}_L'(i,j)+\beta \quad (2\text{-}1)$$

where $\text{pred}_C(i,j)$ represents the predicted chroma samples in a CU and $\text{rec}_L(i,j)$ represents the downsampled reconstructed luma samples of the same CU.

Figure 4:
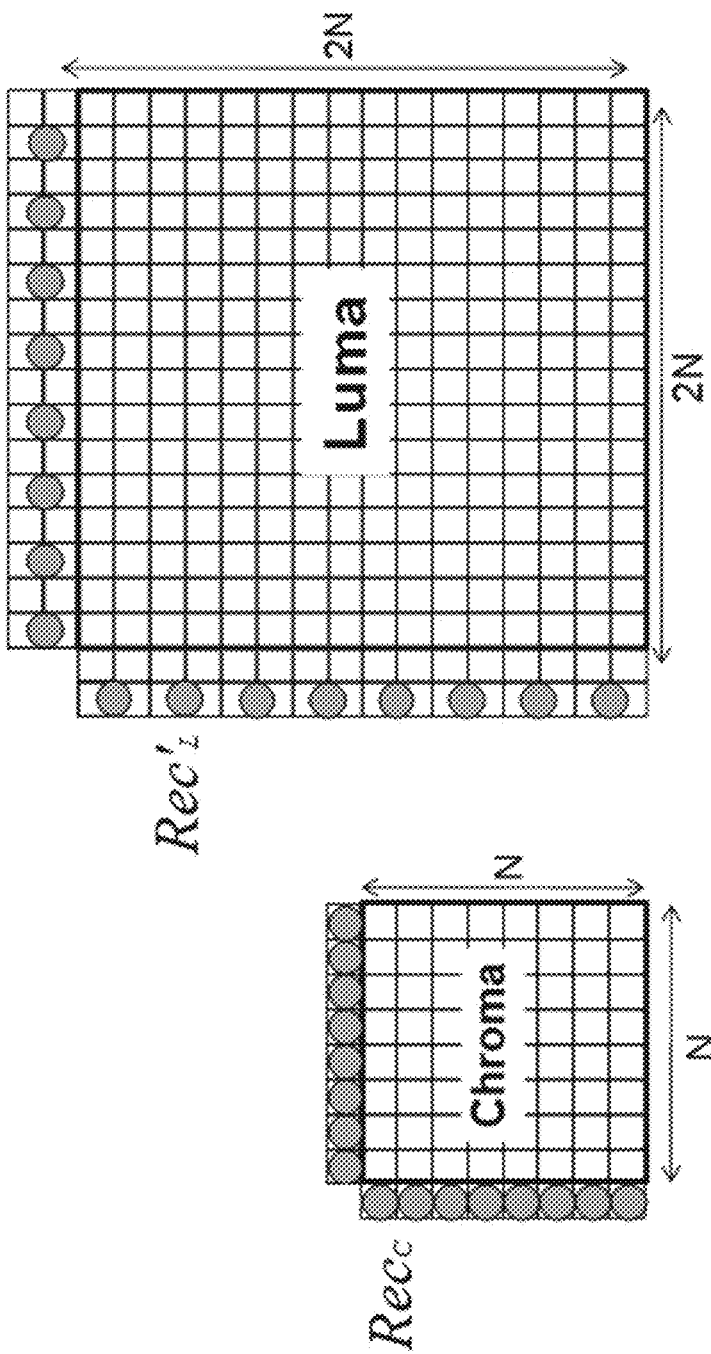
FIG. 4 shows examples of locations of the samples used for the derivation of $\alpha$ and $\beta$.

FIG. 4 shows an example of the location of the left and above samples and the sample of the current block involved in the LM mode.

FIG. 4 shows examples of locations of the samples used for the derivation of $\alpha$ and $\beta$.

Besides the above template and left template can be used to calculate the linear model coefficients together in linear model (LM) mode, they also can be used alternatively in the other 2 LM modes, called LM_A, and LM_L modes. In LM_A mode, only the above template is used to calculate the linear model coefficients. To get more samples, the above template is extended to (W+H). In LM_L mode, only left template is used to calculate the linear model coefficients. To get more samples, the left template is extended to (H+W). For a non-square block, the above template is extended to W+W, the left template is extended to H+H.

The CCLM parameters ($\alpha$ and $\beta$) are derived with at most four neighbouring chroma samples and their corresponding down-sampled luma samples. Suppose the current chroma block dimensions are W×H, then W' and H' are set as W'=W, H'=H when LM mode is applied;

W'=W+H when LM-A mode is applied;

H'=H+W when LM-L mode is applied;

The above neighbouring positions are denoted as S[0, −1] . . . S[W'−1, −1] and the left neighbouring positions are denoted as S[−1, 0] . . . S[−1, H'−1]. Then the four samples are selected as S[W'/4, −1], S[3 W'/4, −1], S[−1, H'/4], S[−1, 3H'/4] when LM mode is applied and both above and left neighbouring samples are available;

S[W'/8, −1], S[3 W'/8, −1], S[5 W'/8, −1], S[7 W'/8, −1] when LM-A mode is applied or only the above neighbouring samples are available;

S[−1, H'/8], S[−1, 3H'/8], S[−1, 5H'/8], S[−1, 7H'/8] when LM-L mode is applied or only the left neighbouring samples are available;

The four neighbouring luma samples at the selected positions are down-sampled and compared four times to find two smaller values: $x^0_A$ and $x^1_A$, and two larger values: $x^0_B$ and $x^1_B$. Their corresponding chroma sample values are denoted as $y^0_A$, $y^1_A$, $y^0_B$ and $y^1_B$. Then $x_A$, $x_B$, $y_A$ and $y_B$ are derived as:

$$X_a=(x^0_A+x^1_A+1)>>1; X_b=(x^0_B+x^1_B+1)>>1; Y_a=(y^0_A+y^1_A+1)>>1; Y_b=(y^0_B+y^1_B+1)>>1 \quad (2\text{-}2)$$

Finally, the linear model parameters α and β are obtained according to the following equations.

$$\alpha = \frac{Y_a - Y_b}{X_a - X_b} \quad (2\text{-}3)$$

$$\beta = Y_b - \alpha \cdot X_b \quad (2\text{-}4)$$

The division operation to calculate parameter α is implemented with a look-up table. To reduce the memory required for storing the table, the diff value (difference between maximum and minimum values) and the parameter α are expressed by an exponential notation. For example, diff is approximated with a 4-bit significant part and an exponent. Consequently, the table for 1/cliff is reduced into 16 elements for 16 values of the significand as follows:

$$\text{DivTable[ ]}=\{0,7,6,5,5,4,4,3,3,2,2,1,1,1,1,0\} \quad (2\text{-}5)$$

This would have a benefit of both reducing the complexity of the calculation as well as the memory size required for storing the needed tables.

To match the chroma sample locations for 4:2:0 video sequences, two types of downsampling filter are applied to luma samples to achieve 2 to 1 downsampling ratio in both horizontal and vertical directions. The selection of downsampling filter is specified by a sequence parameter set (SPS) level flag. The two downsampling filters are as follows, which are corresponding to "type-0" and "type-2" content, respectively.

$$rec'_L(i,j) = \begin{bmatrix} rec_L(2i-1,2j-1) + 2\cdot rec_L(2i-1,2j-1) + rec_L(2i+1,2j-1) + \\ rec_L(2i-1,2j) + 2\cdot rec_L(2i,2j) + rec_L(2i+1,2j) + 4 \end{bmatrix} >> 3 \quad (2\text{-}6)$$

$$rec'_L(i,j) = \begin{bmatrix} rec_L(2i,2j-1) + rec_L(2i-1,2j) + 4\cdot rec_L(2i,2j) + \\ rec_L(2i+1,2j) + rec_L(2i,2j+1) + 4 \end{bmatrix} >> 3 \quad (2\text{-}7)$$

Note that only one luma line (general line buffer in intra prediction) is used to make the downsampled luma samples when the upper reference line is at the CTU boundary.

This parameter computation is performed as part of the decoding process, and not just as an encoder search operation. As a result, no syntax is used to convey the α and β values to the decoder.

For chroma intra mode coding, a total of 8 intra modes are allowed for chroma intra mode coding. Those modes include five traditional intra modes and three cross-component linear model modes (LM, LM_A, and LM_L). Chroma mode signalling and derivation process are shown in Table 2-2. Chroma mode coding directly depends on the intra prediction mode of the corresponding luma block. Since separate block partitioning structure for luma and chroma components is enabled in I slices, one chroma block may correspond to multiple luma blocks. Therefore, for Chroma derived mode (DM), the intra prediction mode of the corresponding luma block covering the center position of the current chroma block is directly inherited.

TABLE 2-2

Derivation of chroma prediction mode from luma mode when cclm_is enabled

| Chroma prediction mode | Corresponding luma intra prediction mode | | | | |
|---|---|---|---|---|---|
| | 0 | 50 | 18 | 1 | X ( 0 <= X <= 66 ) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 81 | 81 | 81 | 81 | 81 |
| 5 | 82 | 82 | 82 | 82 | 82 |
| 6 | 83 | 83 | 83 | 83 | 83 |
| 7 | 0 | 50 | 18 | 1 | X |

Specification of INTRA_LT_CCLM, INTRA_L_CCLM and INTRA_T_CCLM Intra Prediction Mode in JVET-Q2001-vE
8.4.5.2.13
Inputs to this process are:
  the intra prediction mode predModeIntra,
  a sample location (xTbC, yTbC) of the top-left sample of the current transform block relative to the top-left sample of the current picture,
  a variable nTbW specifying the transform block width,
  a variable nTbH specifying the transform block height,
  a variable cIdx specifying the colour component of the current block,
  chroma neighbouring samples p[x][y], with x=−1, y=0 . . . 2*nTbH−1 and x=0 . . . 2*nTbW−1, y=−1.
Output of this process are predicted samples predSamples [x][y], with x=0 . . . nTbW−1, y=0 . . . nTbH−1.
The current luma location (xTbY, yTbY) is derived as follows:

$$(xTbY,yTbY)=(xTbC<<(\text{SubWidth}C-1),yTbC<<(\text{Sub-Height}C-1)) \quad (351)$$

The variables availL, availT and availTL are derived as follows:
  The derivation process for neighbouring block availability as specified in clause 6.4.4 is invoked with the current luma location (xCurr, yCurr) set equal to (xTbY, yTbY), the neighbouring luma location (xTbY−1, yTbY), checkPredModeY set equal to FALSE, and cIdx as inputs, and the output is assigned to availL.
  The derivation process for neighbouring block availability as specified in clause 6.4.4 is invoked with the current luma location (xCurr, yCurr) set equal to (xTbY, yTbY), the neighbouring luma location (xTbY, yTbY−1), checkPredModeY set equal to FALSE, and cIdx as inputs, and the output is assigned to availT.
  The variable availTL is derived as follows:

$$\text{avail}TL=\text{avail}L\&\&\text{avail}T \quad (352)$$

The number of available top-right neighbouring chroma samples numTopRight is derived as follows:
  The variable numTopRight is set equal to 0 and availTR is set equal to TRUE.

When predModeIntra is equal to INTRA_T_CCLM, the following applies for x=nTbW . . . 2*nTbW−1 until availTR is equal to FALSE or x is equal to 2*nTbW−1:
- The derivation process for neighbouring block availability as specified in clause 6.4.4 is invoked with the current luma location (xCurr, yCurr) set equal to (xTbY, yTbY) the neighbouring luma location (xTbY+x, yTbY−1), checkPredModeY set equal to FALSE, and cIdx as inputs, and the output is assigned to availTR
- When availTR is equal to TRUE, numTopRight is incremented by one.

The number of available left-below neighbouring chroma samples numLeftBelow is derived as follows:
- The variable numLeftBelow is set equal to 0 and availLB is set equal to TRUE.
- When predModeIntra is equal to INTRA_L_CCLM, the following applies for y=nTbH . . . 2*nTbH−1 until availLB is equal to FALSE or y is equal to 2*nTbH−1:
  - The derivation process for neighbouring block availability as specified in clause 6.4.4 is invoked with the current luma location (xCurr, yCurr) set equal to (xTbY, yTbY), the neighbouring luma location (xTbY−1, yTbY+y), checkPredModeY set equal to FALSE, and cIdx as inputs, and the output is assigned to availLB
  - When availLB is equal to TRUE, numLeftBelow is incremented by one.

The number of available neighbouring chroma samples on the top and top-right numSampT and the number of available neighbouring chroma samples on the left and left-below numSampL are derived as follows:
- If predModeIntra is equal to INTRA_LT_CCLM, the following applies:

$$\text{numSamp}T=\text{avail}T?nTbW:0 \tag{353}$$

$$\text{numSamp}L=\text{avail}L?nTbH:0 \tag{354}$$

Otherwise, the following applies:

$$\text{numSamp}T= (\text{avail}T\&\&\text{predModeIntra}==\text{INTRA\_}T\_\text{CCLM})? (nTbW+\text{Min}(\text{numTopRight},nTbH)):0 \tag{355}$$

$$\text{numSamp}L= (\text{avail}L\&\&\text{predModeIntra}==\text{INTRA\_}L\_\text{CCLM})? (nTbH+\text{Min}(\text{numLeftBelow},nTbW)):0 \tag{356}$$

The variable bCTUboundary is derived as follows:

$$b\text{CTUboundary}=(yTbY\&(Ctb\text{Size}Y-1)==0)?\text{TRUE}: \text{FALSE}. \tag{357}$$

The variable cntN and array pickPosN with N being replaced by L and T, are derived as follows:
The variable numIs4N is derived as follows:

$$\text{numIs4}N= ((\text{avail}T\&\&\text{avail}L\&\&\text{predModeIntra}==\text{INTRA\_}LT\_\text{CCLM}) ?0:1) \tag{358}$$

The variable startPosN is set equal to numSampN>>(2+numIs4N).
The variable pickStepN is set equal to Max(1, numSampN>>(1+numIs4N)).
If availN is equal to TRUE and predModeIntra is equal to INTRA_LT_CCLM or INTRA_N_CCLM, the following assignments are made:
  cntN is set equal to Min(numSampN, (1+numIs4N)<<1).
  pickPosN[pos] is set equal to (startPosN+pos*pickStepN), with pos=0 . . . cntN−1.
Otherwise, cntN is set equal to 0.

The prediction samples predSamples[x][y] with x=0 . . . nTbW−1, y=0 . . . nTbH−1 are derived as follows:
If both numSampL and numSampT are equal to 0, the following applies:

$$\text{predSamples}[x][y]=1<<(\text{BitDepth}-1) \tag{359}$$

Otherwise, the following ordered steps apply:
1. The collocated luma samples pY[x][y] with x=0 . . . nTbW*SubWidthC−1, y=0 . . . nTbH*SubHeightC−1 are set equal to the reconstructed luma samples prior to the deblocking filter process at the locations (xTbY+x, yTbY+y).
2. The neighbouring luma samples pY[x][y] are derived as follows:
    When numSampL is greater than 0, the neighbouring left luma samples pY[x][y] with x=−1 . . . −3, y=0 . . . SubHeightC*numSampL−1, are set equal to the reconstructed luma samples prior to the deblocking filter process at the locations (xTbY+x, yTbY+y).
    When availT is equal to FALSE, the neighbouring top luma samples pY[x][y] with x=−1 . . . SubWidthC*numSampT−1, y=−1 . . . −2, are set equal to the luma samples pY[x][0].
    When availL is equal to FALSE, the neighbouring left luma samples pY[x][y] with x=−1 . . . −3, y=−1 . . . SubHeightC*numSampL−1, are set equal to the luma samples pY[0][y].
    When numSampT is greater than 0, the neighbouring top luma samples pY[x][y] with x=0 . . . SubWidthC*numSampT−1, y=−1, −2, are set equal to the reconstructed luma samples prior to the deblocking filter process at the locations (xTbY+x, yTbY+y).
    When availTL is equal to TRUE, the neighbouring top-left luma samples pY[x][y] with x=−1, y=−1, −2, are set equal to the reconstructed luma samples prior to the deblocking filter process at the locations (xTbY+x, yTbY+y).
3. The down-sampled collocated luma samples pDsY[x][y] with x=0 . . . nTbW−1, y=0 . . . nTbH−1 are derived as follows:
    If both SubWidthC and SubHeightC are equal to 1, the following applies:
      pDsY[x][y] with x=1 . . . nTbW−1, y=1 . . . nTbH−1 is derived as follows:

$$pDstY[x][y]=pY[x][y] \tag{360}$$

Otherwise, the following applies:
     The one-dimensional filter coefficients array F1 and F2, and the 2-dimensional filter coefficients arrays F3 and F4 are specified as follows.

$$F1[0]=2,F1[1]=0 \tag{361}$$

$$F2[0]=1,F2[1]=2,F2[2]=1 \tag{362}$$

$$F3[i][j]=F4[i][j]=0, \text{with } i=0 \ldots 2, j=0 \ldots 2 \tag{363}$$

If both SubWidthC and SubHeightC are equal to 2, the following applies:

$$F1[0]=1,F1[1]=1 \tag{364}$$

$$F3[0][1]=1,F3[1][1]=4,F3[2][1]=1,F3[1][0]=1,F3[1][2]=1 \tag{365}$$

$F4[0][1]=1, F4[1][1]=2, F4[2][1]=1$ (366)

$F4[0][2]=1, F4[1][2]=2, F4[2][2]=1$ (367)

Otherwise, the following applies:

$F3[1][1]=8$ (368)

$F4[0][1]=2, F4[1][1]=4, F4[2][1]=2,$ (369)

If sps_chroma_vertical_collocated_flag is equal to 1, the following applies:
pDsY[x][y] with x=0 . . . nTbW−1, y=0 . . . nTbH−1 is derived as follows:

$pDsY[x][y]=(F3[1][0]*pY[SubWidthC*x][SubHeightC*y-1]+F3[0][1]*pY[SubWidthC*x-1][SubHeightC*y]+F3[1][1]*pY[SubWidthC*x][SubHeightC*y]+F3[2][1]*pY[SubWidthC*x+1][SubHeightC*y]+F3[1][2]*pY[SubWidthC*x][SubHeightC*y+1]+4)>>3$ (370)

Otherwise (sps_chroma_vertical_collocated_flag is equal to 0), the following applies:
pDsY[x][y] with x=0 . . . nTbW−1, y=0 . . . nTbH−1 is derived as follows:

$pDsY[x][y]=(F4[0][1]*pY[SubWidthC*x-1][SubHeightC*y]+F4[0][2]*pY[SubWidthC*x-1][SubHeightC*y+1]+F4[1][1]*pY[SubWidthC*x][SubHeightC*y]+F4[1][2]*pY[SubWidthC*x][SubHeightC*y+1]+F4[2][1]*pY[SubWidthC*x+1][SubHeightC*y]+F4[2][2]*pY[SubWidthC*x+1][SubHeightC*y+1]+4)>>3$ (371)

4. When numSampL is greater than 0, the selected neighbouring left chroma samples pSelC[idx] are set equal to p[−1][pickPosL[idx]] with idx=0 . . . cntL−1, and the selected down-sampled neighbouring left luma samples pSelDsY[idx] with idx=0 . . . cntL−1 are derived as follows:
The variable y is set equal to pickPosL[idx].
If both SubWidthC and SubHeightC are equal to 1, the following applies:

$pSelDsY[idx]=pY[-1][y]$ (372)

Otherwise the following applies:
If sps_chroma_vertical_collocated_flag is equal to 1, the following applies:

$pSelDsY[idx]=(F3[1][0]*pY[-SubWidthC][SubHeightC*y-1]+F3[0][1]*pY[-1-SubWidthC][SubHeightC*y]+F3[1][1]*pY[-SubWidthC][SubHeightC*y]+F3[2][1]*pY[1-SubWidthC][SubHeightC*y]+F3[1][2]*pY[-SubWidthC][SubHeightC*y+1]+4)>>3$ (373)

Otherwise (sps_chroma_vertical_collocated_flag is equal to 0), the following applies:

$pSelDsY[idx]=(F4[0][1]*pY[-1-SubWidthC][SubHeightC*y]+F4[0][2]*pY[-1-SubWidthC][SubHeightC*y+1]+F4[1][1]*pY[-SubWidthC][SubHeightC*y]+F4[1][2]*pY[-SubWidthC][SubHeightC*y+1]+F4[2][1]*pY[1-SubWidthC][SubHeightC*y]+F4[2][2]*pY[1-SubWidthC][SubHeightC*y+1]+4)>>3$ (374)

5. When numSampT is greater than 0, the selected neighbouring top chroma samples pSelC[idx] are set equal to p[pickPosT[idx−cntL]][−1] with idx=cntL . . . cntL+cntT−1, and the down-sampled neighbouring top luma samples pSelDsY[idx] with idx=0 . . . cntL+cntT−1 are specified as follows:
The variable x is set equal to pickPosT[idx−cntL].
If both SubWidthC and SubHeightC are equal to 1, the following applies:

$pSelDsY[idx]=pY[x][-1]$ (375)

Otherwise, the following applies:
If sps_chroma_vertical_collocated_flag is equal to 1, the following applies:
If bCTUboundary is equal to FALSE, the following applies:

$pSelDsY[idx]=(F3[1][0]*pY[SubWidthC*x][-1-SubHeightC]+F3[0][1]*pY[SubWidthC*x-1][-SubHeightC]+F3[1][1]*pY[SubWidthC*x][-SubHeightC]+F3[2][1]*pY[SubWidthC*x+1][-SubHeightC]+F3[1][2]*pY[SubWidthC*x][1-SubHeightC]+4)>>3$ (376)

Otherwise (bCTUboundary is equal to TRUE), the following applies:

$pSelDsY[idx]=(F2[0]*pY[SubWidthC*x-1][-1]+F2[1]*pY[SubWidthC*x][-1]+F2[2]*pY[SubWidthC*x+1][-1]+2)>>2$ (377)

Otherwise (sps_chroma_vertical_collocated_flag is equal to 0), the following applies:
If bCTUboundary is equal to FALSE, the following applies:

$pSelDsY[idx]=(F4[0][1]*pY[SubWidthC x-1][-1]+F4[0][2]*pY[SubWidthC*x-1][-2]+F4[1][1]*pY[SubWidthC*x][-1]+F4[1][2]*pY[SubWidthC*x][-2]+F4[2][1]*pY[SubWidthC*x+1][-1]+F4[2][2]*pY[SubWidthC*x+1][-2]+4)>>3$ (378)

Otherwise (bCTUboundary is equal to TRUE), the following applies:

$pSelDsY[idx]=(F2[0]*pY[SubWidthC*x-1][-1]+F2[1]*pY[SubWidthC*x][-1]+F2[2]*pY[SubWidthC*x+1][-1]+2)>>2$ (379)

6. When cntT+cntL is not equal to 0, the variables minY, maxY, minC and maxC are derived as follows:
When cntT+cntL is equal to 2, pSelComp[3] is set equal to pSelComp[0], pSelComp[2] is set equal to pSelComp[1], pSelComp[0] is set equal to pSelComp[1], and pSelComp[1] is set equal to pSelComp[3], with Comp being replaced by DsY and C.
The arrays minGrpIdx and maxGrpIdx are derived as follows:

$minGrpIdx[0]=0$ (380)

$minGrpIdx[1]=2$ (381)

$maxGrpIdx[0]=1$ (382)

$maxGrpIdx[1]=3$ (383)

When pSelDsY[minGrpIdx[0]] is greater than pSelDsY[minGrpIdx[1]], minGrpIdx[0] and minGrpIdx[1] are swapped as follows:

(minGrpIdx[0],minGrpIdx[1])=Swap(minGrpIdx[0], minGrpIdx[1]) (384)

When pSelDsY[maxGrpIdx[0]] is greater than pSelDsY[maxGrpIdx[1]], maxGrpIdx[0] and maxGrpIdx[1] are swapped as follows:

(maxGrpIdx[0],maxGrpIdx[1])=Swap(maxGrpIdx[0], maxGrpIdx[1]) (385)

When pSelDsY[minGrpIdx[0]] is greater than pSelDsY[maxGrpIdx[1]], arrays minGrpIdx and maxGrpIdx are swapped as follows:

(minGrpIdx,maxGrpIdx)=Swap(minGrpIdx, maxGrpIdx) (386)

When pSelDsY[minGrpIdx[1]] is greater than pSelDsY[maxGrpIdx[0]], minGrpIdx[1] and maxGrpIdx[0] are swapped as follows:

(minGrpIdx[1],maxGrpIdx[0])=Swap(minGrpIdx[1], maxGrpIdx[0])   (387)

The variables maxY, maxC, minY and minC are derived as follows:

maxY=(pSelDsY[maxGrpIdx[0]]+pSelDsY[maxGrpIdx[1]]+1)>>1   (388)

maxC=(pSelC[maxGrpIdx[0]]+pSelC[maxGrpIdx[1]]+1)>>1   (389)

minY=(pSelDsY[minGrpIdx[0]]+pSelDsY[minGrpIdx[1]]+1)>>1   (390)

minC=(pSelC[minGrpIdx[0]]+pSelC[minGrpIdx[1]]+1)>>1   (391)

7. The variables a, b, and k are derived as follows:
   If numSampL is equal to 0, and numSampT is equal to 0, the following applies:

k=0   (392)

a=0   (393)

b=1<<(BitDepth−1)   (394)

Otherwise, the following applies:

diff=maxY−minY   (395)

If diff is not equal to 0, the following applies:

diffC=maxC−minC   (396)

x=Floor(Log 2(diff))   (397)

normDiff=((diff<<4)>>x)&15   (398)

x+=(normDiff!=0)?1:0   (399)

y=Abs(diffC)>0?Floor(Log 2(Abs(diffC)))+1:0   (400)

a=(diffC*(divSigTable[normDiff]|8)+2$^{y-1}$)>>y   (401)

k=((3+x−y)<1)?1:3+x−y   (402)

a=((3+x−y)<1)?Sign(a)*15:a   (403)

b=minC−((a*minY)>>k)   (404)

where divSigTable[ ] is specified as follows:

divSigTable[ ]={0,7,6,5,5,4,4,3,3,2,2,1,1,1,1,0}   (405)

Otherwise (diff is equal to 0), the following applies:

k=0   (406)

a=0   (407)

b=minC   (408)

8. The prediction samples predSamples[x][y] with x=0 ... nTbW−1, y=0 ... nTbH−1 are derived as follows:

predSamples[x][y]=Clip1(((pDsY[x][y]*a)>>k)+b)   (409)

NOTE—This process uses sps_chroma_vertical_collocated_flag. However, in order to simplify implementation, it does not use sps_chroma_horizontal_collocated_flag.

2.8. Block Differential Pulse-Code Modulation Coding (BDPCM)

BDPCM is proposed in WET-M0057. Due to the shape of the horizontal (resp. vertical) predictors, which use the left (A) (resp. top (B)) pixel for prediction of the current pixel, the most throughput-efficient way of processing the block is to process all the pixels of one column (resp. line) in parallel, and to process these columns (resp. lines) sequentially. In order to increase throughput, we introduce the following process: a block of width 4 is divided into two halves with a horizontal frontier when the predictor chosen on this block is vertical, and a block of height 4 is divided into two halves with a vertical frontier when the predictor chosen on this block is horizontal.

When a block is divided, samples from one area are not allowed to use pixels from another area to compute the prediction: if this situation occurs, the prediction pixel is replaced by the reference pixel in the prediction direction. This is shown in FIG. 5 for different positions of current pixel X in a 4×8 block predicted vertically.

Figure 5:
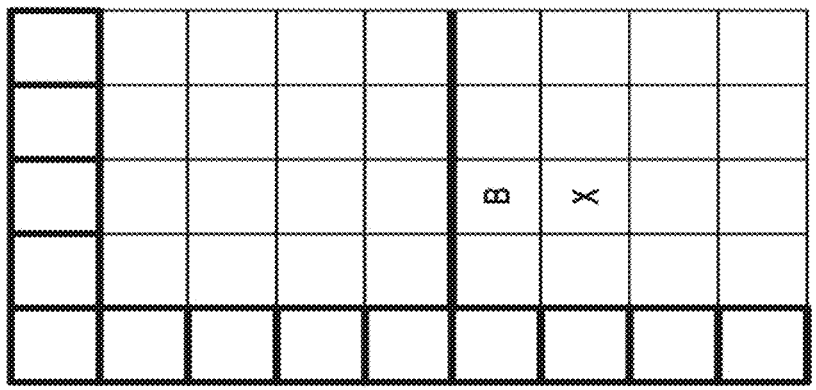
FIG. 5 shows example of dividing a block of 4×8 samples into two independently decodable areas.
Figure 5:
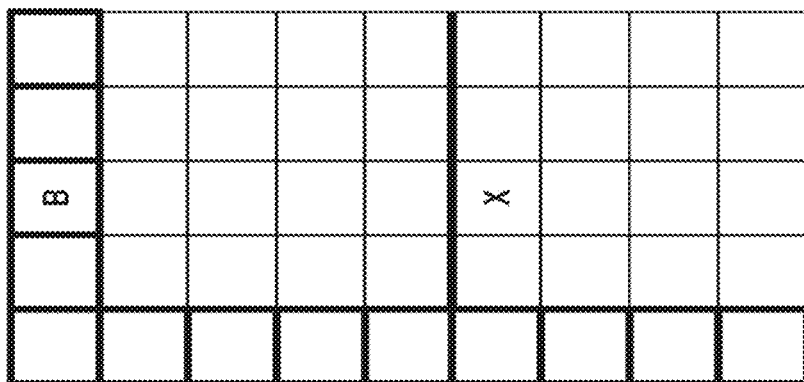
Figure 5:
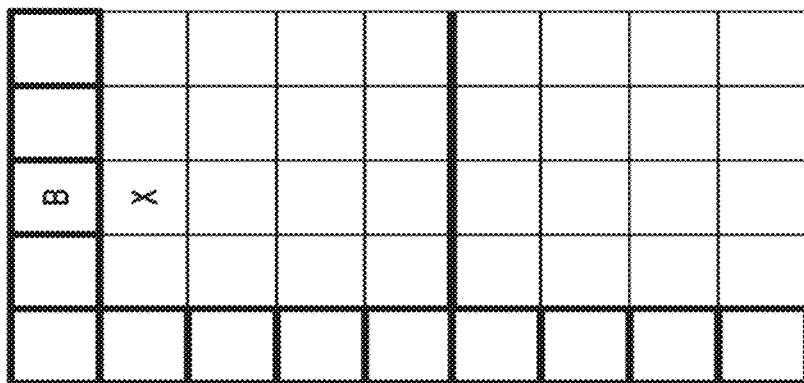

FIG. 5 shows example of dividing a block of 4×8 samples into two independently decodable areas.

Figure 6:
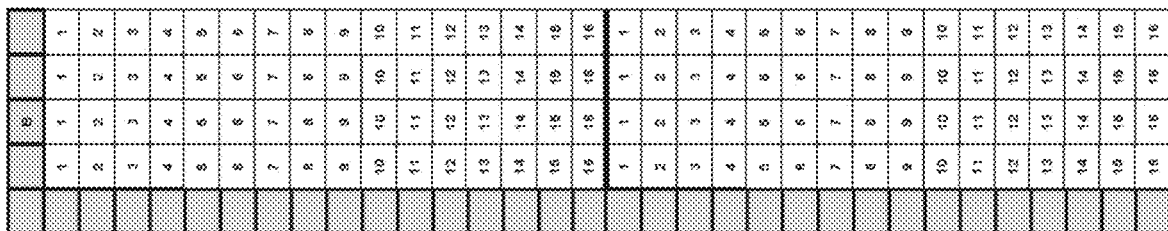
FIG. 6 shows an example order of processing of the rows of pixels to maximize throughput for 4×N blocks with vertical predictor.
Figure 6:
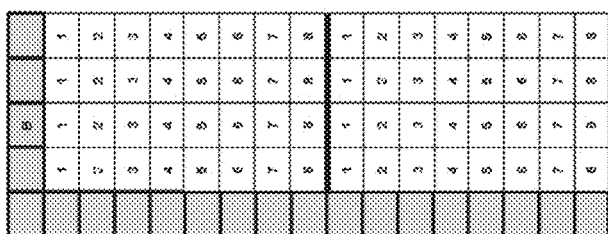
Figure 6:
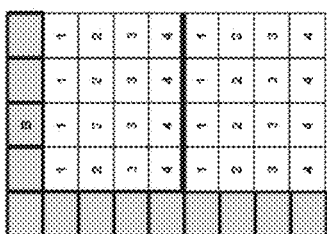
Figure 6:
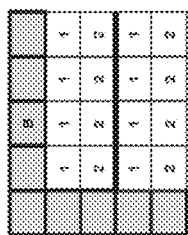

Thanks to this property, it becomes now possible to process a 4×4 block in 2 cycles, and a 4×8 or 8×4 block in 4 cycles, and so on, as shown on FIG. 6.

FIG. 6 shows an example order of processing of the rows of pixels to maximize throughput for 4×N blocks with vertical predictor.

Table 2-3 summarizes the number of cycles required to process the block, depending on the block size. It is trivial to show that any block which has both dimensions larger or equal to 8 can be processed in 8 pixels per cycle or more.

TABLE 2-3

| | Worst case throughput for blocks of size 4 × N, N × 4 | | | |
| --- | --- | --- | --- | --- |
| | Block size | | | |
| | 4 × 4 | 4 × 8, 8 × 4 | 4 × 16, 16 × 4 | 4 × 32, 32 × 4 |
| Cycles | 2 | 4 | 8 | 16 |
| Pixels | 16 | 32 | 64 | 128 |
| Throughput (pixels/cycle) | 8 | 8 | 8 | 8 |

2.9. Quantized Residual Domain BDPCM

In JVET-N0413, quantized residual domain BDPCM (denote as RBDPCM hereinafter) is proposed. The intra prediction is done on the entire block by sample copying in prediction direction (horizontal or vertical prediction) similar to intra prediction. The residual is quantized and the delta between the quantized residual and its predictor (horizontal or vertical) quantized value is coded.

For a block of size M (rows)×N (cols), let $r_{i,j}$, $0 \le i \le M-1$, $0 \le j \le N-1$ be the prediction residual after performing intra prediction horizontally (copying left neighbour pixel value across the predicted block line by line) or vertically (copying top neighbour line to each line in the predicted block) using unfiltered samples from above or left block boundary samples. Let $Q(r_{i,j})$, $0 \le i \le M-1$, $0 \le j \le N-1$ denote the quantized version of the residual $r_{i,j}$, where residual is difference between original block and the predicted block values. Then the block DPCM is applied to the quantized residual samples, resulting in modified M×N array R̃ with elements $\tilde{r}_{i,j}$. When vertical BDPCM is signalled:

$$\tilde{r}_{i,j} = \begin{cases} Q(r_{i,j}), & i = 0, 0 \le j \le (N-1) \\ Q(r_{i,j}) - Q(r_{(i-1),j}), & 1 \le i \le (M-1), 0 \le j \le (N-1) \end{cases} \quad (2\text{-}8)$$

For horizontal prediction, similar rules apply, and the residual quantized samples are obtained by $$\tilde{r}_{i,j} = \begin{cases} Q(r_{i,j}), & 0 \le i \le (M-1), j = 0 \\ Q(r_{i,j}) - Q(r_{i,(j-1)}), & 0 \le i \le (M-1), 1 \le j \le (N-1) \end{cases} \quad (2\text{-}9)$$

The residual quantized samples $\tilde{r}_{i,j}$ are sent to the decoder.

On the decoder side, the above calculations are reversed to produce $Q(r_{i,j})$, $0 \le i \le M-1$, $0 \le j \le N-1$. For vertical prediction case, $$Q(r_{i,j}) = \Sigma_{k=0}^{i} \tilde{r}_{k,j}, 0 \le i \le (M-1), 0 \le j \le (N-1). \quad (2\text{-}10)$$

For horizontal case, $$Q(r_{i,j}) = \Sigma_{k=0}^{j} \tilde{r}_{i,k}, 0 \le i \le (M-1), 0 \le j \le (N-1). \quad (2\text{-}11)$$

The inverse quantized residuals, $Q^{-1}(Q(r_{i,j}))$, are added to the intra block prediction values to produce the reconstructed sample values.

The main benefit of this scheme is that the invert DPCM can be done on the fly during coefficient parsing simply adding the predictor as the coefficients are parsed or it can be performed after parsing.

Transform skip is always used in quantized residual domain BDPCM.

2.10. Multiple Transform Set (MTS) in VVC

In VTM, large block-size transforms, up to 64×64 in size, are enabled, which is primarily useful for higher resolution video, e.g., 1080p and 4K sequences. High frequency transform coefficients are zeroed out for the transform blocks with size (width or height, or both width and height) equal to 64, so that only the lower-frequency coefficients are retained. For example, for an M×N transform block, with M as the block width and N as the block height, when M is equal to 64, only the left 32 columns of transform coefficients are kept. Similarly, when N is equal to 64, only the top 32 rows of transform coefficients are kept. When transform skip mode is used for a large block, the entire block is used without zeroing out any values. The VTM also supports configurable max transform size in SPS, such that encoder has the flexibility to choose up to 16-length, 32-length or 64-length transform size depending on the need of specific implementation.

In addition to Discrete Cosine Transform (DCT)-II which has been employed in HEVC, a Multiple Transform Selection (MTS) scheme is used for residual coding both inter and intra coded blocks. It uses multiple selected transforms from the DCT8/Discrete Sine Transform (DST)7. The newly introduced transform matrices are DST-VII and DCT-VIII. Table 2-4 shows the basis functions of the selected DST/DCT.

TABLE 2-4

Transform basis functions of DCT-II/ VIII and DSTVII for N-point input

| Transform Type | Basis function $T_i(j)$, i, j = 0, 1, ..., N-1 |
|---|---|
| DCT-II | $T_i(j) = \omega_0 \cdot \sqrt{\frac{2}{N}} \cdot \cos\left(\frac{\pi \cdot i \cdot (2j+1)}{2N}\right)$ |

TABLE 2-4-continued

Transform basis functions of DCT-II/ VIII and DSTVII for N-point input

| Transform Type | Basis function $T_i(j)$, i, j = 0, 1, ..., N-1 |
|---|---|
| | where, $\omega_0 = \begin{cases} \sqrt{\frac{2}{N}} & i = 0 \\ 1 & i \ne 0 \end{cases}$ |
| DCT-VIII | $T_i(j) = \sqrt{\frac{4}{2N+1}} \cdot \cos\left(\frac{\pi \cdot (2i+1) \cdot (2j+1)}{4N+2}\right)$ |
| DST-VII | $T_i(j) = \sqrt{\frac{4}{2N+1}} \cdot \sin\left(\frac{\pi \cdot (2i+1) \cdot (j+1)}{2N+1}\right)$ |

In order to keep the orthogonality of the transform matrix, the transform matrices are quantized more accurately than the transform matrices in HEVC. To keep the intermediate values of the transformed coefficients within the 16-bit range, after horizontal and after vertical transform, all the coefficients are to have 10-bit.

In order to control multi transform selection (MT S) scheme, separate enabling flags are specified at SPS level for intra and inter, respectively. When MTS is enabled at SPS, a CU level flag is signalled to indicate whether MTS is applied or not. Here, MTS is applied only for luma. The MTS CU level flag is signalled when the following conditions are satisfied.

Both width and height smaller than or equal to 32

CBF flag is equal to one

If MTS CU flag is equal to zero, then DCT2 is applied in both directions. However, if MTS CU flag is equal to one, then two other flags are additionally signalled to indicate the transform type for the horizontal and vertical directions, respectively. Transform and signalling mapping table as shown in Table 2-5. Unified the transform selection for intra sub-partitions (ISP) and implicit MTS is used by removing the intra-mode and block-shape dependencies. If current block is ISP mode or if the current block is intra block and both intra and inter explicit MTS is on, then only DST7 is used for both horizontal and vertical transform cores. When it comes to transform matrix precision, 8-bit primary transform cores are used. Therefore, all the transform cores used in HEVC are kept as the same, including 4-point DCT-2 and DST-7, 8-point, 16-point and 32-point DCT-2. Also, other transform cores including 64-point DCT-2, 4-point DCT-8, 8-point, 16-point, 32-point DST-7 and DCT-8, use 8-bit primary transform cores.

TABLE 2-5

Transform and signalling mapping table

| MTS_CU_ flag | MTS_Hor_ flag | MTS_Ver_ flag | Intra/inter Horizontal | Vertical |
|---|---|---|---|---|
| 0 | | | DCT2 | |
| 1 | 0 | 0 | DST7 | DST7 |
| | 0 | 1 | DCT8 | DST7 |
| | 1 | 0 | DST7 | DCT8 |
| | 1 | 1 | DCT8 | DCT8 |

To reduce the complexity of large size DST-7 and DCT-8, High frequency transform coefficients are zeroed out for the DST-7 and DCT-8 blocks with size (width or height, or both width and height) equal to 32. Only the coefficients within the 16×16 lower-frequency region are retained.

As in HEVC, the residual of a block can be coded with transform skip mode. To avoid the redundancy of syntax coding, the transform skip flag is not signalled when the CU level MTS_CU_flag is not equal to zero. The block size limitation for transform skip is the same to that for MTS in JEM4, which indicate that transform skip is applicable for a CU when both block width and height are equal to or less than 32. Note that implicit MTS transform is set to DCT2 when LFNST or Matrix-Based Intra-Picture Prediction (MIP) is activated for the current CU. Also, the implicit MTS can be still enabled when MTS is enabled for inter coded blocks.

2.11. Low-Frequency Non-Separable Transform (LFNST)

Figure 7:
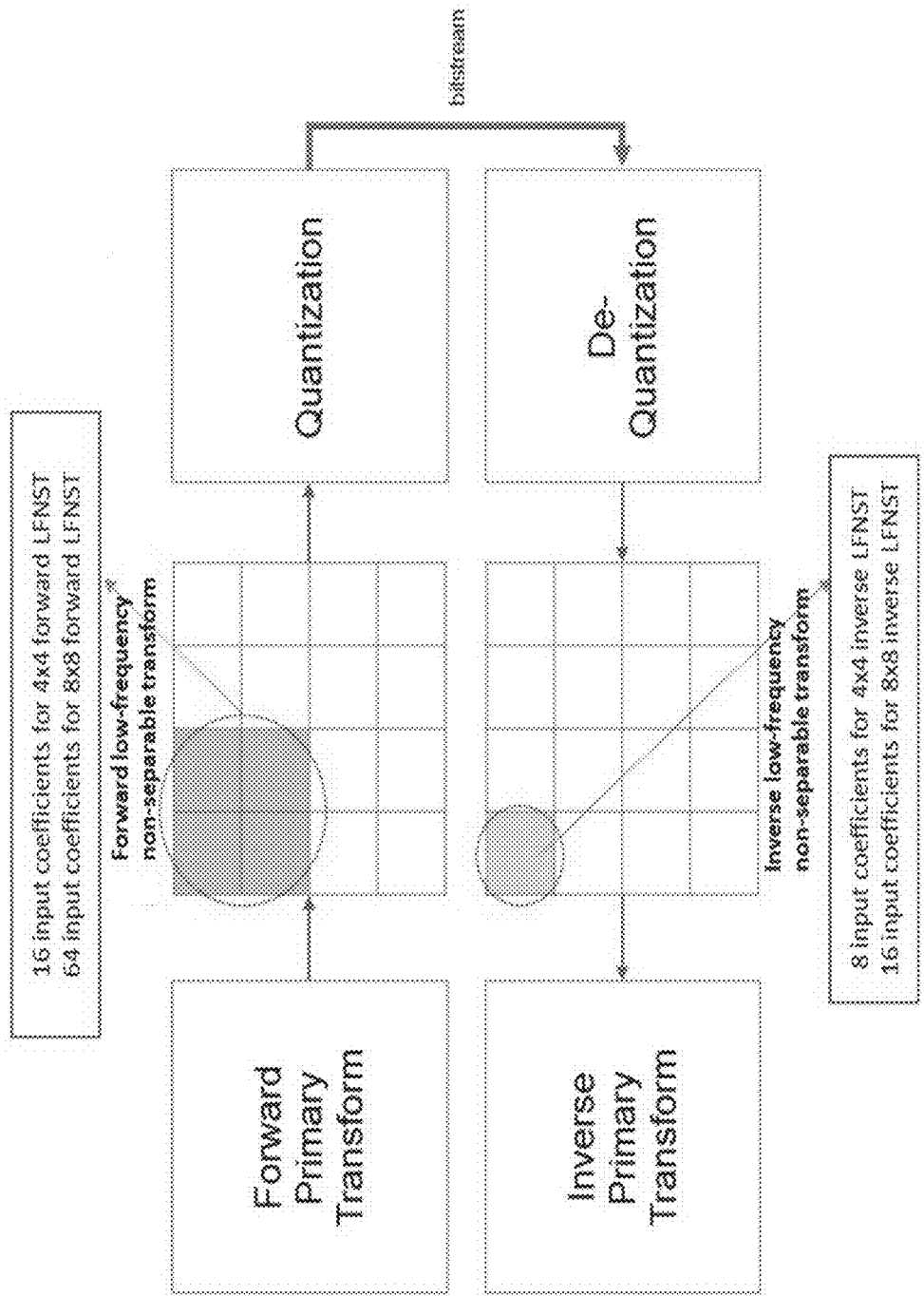
FIG. 7 shows an example of a Low-Frequency Non-Separable Transform (LFNST) process.

In VVC, LFNST (low-frequency non-separable transform), which is known as reduced secondary transform, is applied between forward primary transform and quantization (at encoder) and between de-quantization and inverse primary transform (at decoder side) as shown in FIG. 7. In LFNST, 4×4 non-separable transform or 8×8 non-separable transform is applied according to block size. For example, 4×4 LFNST is applied for small blocks (i.e., min (width, height)<8) and 8×8 LFNST is applied for larger blocks (i.e., min (width, height)>4).

FIG. 7 shows an example of a low-Frequency Non-Separable Transform (LFNST) process.

Application of a non-separable transform, which is being used in LFNST, is described as follows using input as an example. To apply 4×4 LFNST, the 4×4 input block X $$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix} \quad (2\text{-}12)$$

is first represented as a vector $\vec{X}$:

$$\vec{X} = [X_{00}X_{01}X_{02}X_{03}X_{10}X_{11}X_{12}X_{13}X_{20}X_{21}X_{22}X_{23}X_{30}X_{31}X_{32}X_{33}]^T \quad (2\text{-}13)$$

The non-separable transform is calculated as $\vec{F} = T \cdot \vec{X}$, where $\vec{F}$ indicates the transform coefficient vector, and T is a 16×16 transform matrix. The 16×1 coefficient vector $\vec{F}$ is subsequently re-organized as 4×4 block using the scanning order for that block (horizontal, vertical or diagonal). The coefficients with smaller index will be placed with the smaller scanning index in the 4×4 coefficient block.

2.11.1. Reduced Non-Separable Transform

LFNST (low-frequency non-separable transform) is based on direct matrix multiplication approach to apply non-separable transform so that it is implemented in a single pass without multiple iterations. However, the non-separable transform matrix dimension needs to be reduced to minimize computational complexity and memory space to store the transform coefficients. Hence, reduced non-separable transform (or RST) method is used in LFNST. The main idea of the reduced non-separable transform is to map an N (N is commonly equal to 64 for 8×8 NSST) dimensional vector to an R dimensional vector in a different space, where N/R (R<N) is the reduction factor. Hence, instead of N×N matrix, RST matrix becomes an R×N matrix as follows:

$$T_{R \times N} = \begin{bmatrix} t_{11} & t_{12} & t_{13} & \cdots & t_{1N} \\ t_{21} & t_{22} & t_{23} & & t_{2N} \\ \vdots & & & \ddots & \vdots \\ t_{R1} & t_{R2} & t_{R3} & \cdots & t_{RN} \end{bmatrix} \quad (2\text{-}14)$$

where the R rows of the transform are R bases of the N dimensional space. The inverse transform matrix for RT is the transpose of its forward transform. For 8×8 LFNST, a reduction factor of 4 is applied, and 64×64 direct matrix, which is conventional 8×8 non-separable transform matrix size, is reduced to 16×48 direct matrix. Hence, the 48×16 inverse RST matrix is used at the decoder side to generate core (primary) transform coefficients in 8×8 top-left regions. When 16×48 matrices are applied instead of 16×64 with the same transform set configuration, each of which takes 48 input data from three 4×4 blocks in a top-left 8×8 block excluding right-bottom 4×4 block. With the help of the reduced dimension, memory usage for storing all LFNST matrices is reduced from 10 KB to 8 KB with reasonable performance drop. In order to reduce complexity LFNST is restricted to be applicable only if all coefficients outside the first coefficient sub-group are non-significant. Hence, all primary-only transform coefficients have to be zero when LFNST is applied. This allows a conditioning of the LFNST index signalling on the last-significant position, and hence avoids the extra coefficient scanning in the current LFNST design, which is needed for checking for significant coefficients at specific positions only. The worst-case handling of LFNST (in terms of multiplications per pixel) restricts the non-separable transforms for 4×4 and 8×8 blocks to 8×16 and 8×48 transforms, respectively. In those cases, the last-significant scan position has to be less than 8 when LFNST is applied, for other sizes less than 16. For blocks with a shape of 4×N and N×4 and N>8, the proposed restriction implies that the LFNST is now applied only once, and that to the top-left 4×4 region only. As all primary-only coefficients are zero when LFNST is applied, the number of operations needed for the primary transforms is reduced in such cases. From encoder perspective, the quantization of coefficients is remarkably simplified when LFNST transforms are tested. A rate-distortion optimized quantization has to be done at maximum for the first 16 coefficients (in scan order), the remaining coefficients are enforced to be zero.

2.11.2. LFNST Transform Selection

There are totally 4 transform sets and 2 non-separable transform matrices (kernels) per transform set are used in LFNST. The mapping from the intra prediction mode to the transform set is pre-defined as shown in Table 2-6. If one of three CCLM modes (INTRA_LT_CCLM, INTRA_T_CCLM or INTRA_L_CCLM) is used for the current block (81<=predModeIntra<=83), transform set 0 is selected for the current chroma block. For each transform set, the selected non-separable secondary transform candidate is further specified by the explicitly signalled LFNST index. The index is signalled in a bit-stream once per Intra CU after transform coefficients.

TABLE 2-6

Transform selection table

| IntraPredMode | Tr. set index |
|---|---|
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |
| 24 <= IntraPredMode <= 44 | 3 |
| 45 <= IntraPredMode <= 55 | 2 |
| 56 <= IntraPredMode <= 80 | 1 |
| 81 <= IntraPredMode <= 83 | 0 |

2.11.3. LFNST Index Signalling and Interaction with Other Tools

Since LFNST is restricted to be applicable only if all coefficients outside the first coefficient sub-group are non-significant, LFNST index coding depends on the position of the last significant coefficient. In addition, the LFNST index is context coded but does not depend on intra prediction mode, and only the first bin is context coded. Furthermore, LFNST is applied for intra CU in both intra and inter slices, and for both Luma and Chroma. If a dual tree is enabled, LFNST indices for Luma and Chroma are signalled separately. For inter slice (the dual tree is disabled), a single LFNST index is signalled and used for both Luma and Chroma.

When ISP mode is selected, LFNST is disabled and RST index is not signalled, because performance improvement was marginal even if RST is applied to every feasible partition block. Furthermore, disabling RST for ISP-predicted residual could reduce encoding complexity. LFNST is also disabled and the index is not signalled when MIP mode is selected.

Considering that a large CU greater than 64×64 is implicitly split (TU tiling) due to the existing maximum transform size restriction (64×64), an LFNST index search could increase data buffering by four times for a certain number of decode pipeline stages. Therefore, the maximum size that LFNST is allowed is restricted to 64×64. Note that LFNST is enabled with DCT2 only.

2.12. Transform Skip for Chroma

Chroma transform skip (TS) is introduced in VVC. The motivation is to unify TS and MTS signalling between luma and chroma by relocating transform_skip_flag and mts_idx into residual_coding part. One context model is added for chroma TS. No context model and no binarization are changed for the mts_idx. In addition, TS residual coding is also applied when chroma TS is used.

Semantics transform_skip_flag[x0][y0][cIdx] specifies whether a transform is applied to the associated transform block or not. The array indices x0, y0 specify the location (x0, y0) of the top-left luma sample of the considered transform block relative to the top-left luma sample of the picture. transform_skip_flag[x0][y0][cIdx] equal to 1 specifies that no transform is applied to the current transform block. The array index cIdx specifies an indicator for the colour component; it is equal to 0 for luma, equal to 1 for Cb and equal to 2 for Cr. transform_skip_flag[x0][y0][cIdx] equal to 0 specifies that the decision whether transform is applied to the current transform block or not depends on other syntax elements. When transform_skip_flag[x0][y0][cIdx] is not present, it is inferred to be equal to 0.

2.13. BDPCM for Chroma

In addition to chroma TS support, BDPCM is added to chroma components. If sps_bdpcm_enable_flag is 1, a further syntax element sps_bdpcm_chroma_enable_flag is added to the SPS. The flags have the following behaviour, as indicated in Table 2-7.

TABLE 2-7 sps flags for luma and chroma BDPCM

| sps_bdpcm_enable_flag | sps_bdpcm_chroma_enable_flag | behaviour |
|---|---|---|
| 0 | not written | BPDCM is not used in the sequence |
| 1 | 0 | BDPCM is available for luma only |
| 1 | 1 | BDPCM is available for luma and chroma |

When BDPCM is available for luma only, the current behaviour is unchanged. When BDPCM is also available for chroma, a bdpcm_chroma_flag is sent for each chroma block. This indicates whether BDPCM is used on the chroma blocks. When it is on, BDPCM is used for both chroma components, and an additional bdpcm_dir_chroma flag is coded, indicating the prediction direction used for both chroma components.

The deblocking filter is de-activated on a border between two Block-DPCM blocks, since neither of the blocks uses the transform stage usually responsible for blocking artifacts. This deactivation happens independently for luma and chroma components.

3. Examples of Technical Problems Solved by the Disclosed Solutions

Figure 8:
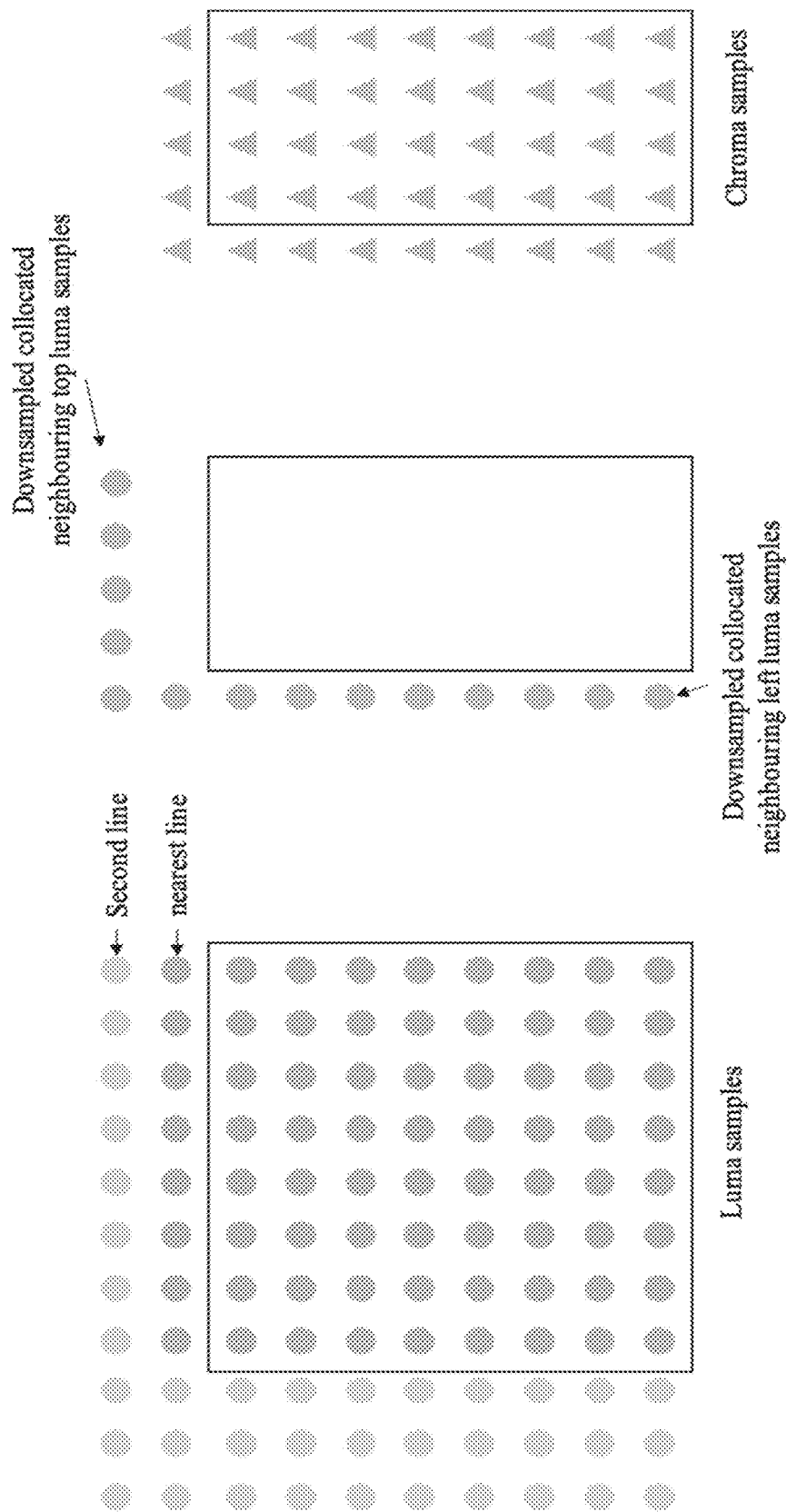
FIG. 8 shows an example of neighbouring chroma samples and downsampled collocated neighbouring luma samples used in the derivation of CCLM parameters for 4:2:2 videos.

The current design of derivation of linear parameters in CCLM and TS has the following problems:

1. For the non-4:4:4 color format, the derivation of linear parameters in CCLM involves neighbouring chroma samples and down-sampled collocated neighbouring luma samples. As shown in FIG. 8, in current VVC, when the nearest line is not at the CTU boundary, the downsampled collocated neighbouring top luma samples are derived using the second line above current block for 4:2:2 videos. However, for the 4:2:2 videos, the vertical resolution is unchanged. Therefore, there is phase shift between the downsampled collocated neighbouring top luma samples and the neighbouring chroma samples.

FIG. 8 shows an example of neighbouring chroma samples and downsampled collocated neighbouring luma samples used in the derivation of CCLM parameters for 4:2:2 videos.

2. In current VVC, the same maximum block size is used in the condition check for signalling of luma transform skip flag and signalling of chroma transform skip flag. Such a design doesn't take the color format into consideration which is not desirable.
   a. similar problem also exists for signalling of luma BDPCM flag and signalling of chroma BDPCM flag wherein the same maximum block size is used in the condition check.

3. In VVC as specified in JVET-Q2001-vE, left neighboring samples are put into the selected neighbouring sample list before the above neighboring samples. However, put the above neighboring samples before the left neighboring samples may be better.

4. In VVC as specified in JVET-Q2001-vE, two rows of neighbouring luma samples are assigned. However, when sps_chroma_vertical_collocated_flag is equal to 1, three rows of neighbouring luma samples are required.

5. In VVC as specified in NET-Q2001-vE, when the left neighbouring luma samples are unavailable, the left neighbouring luma samples are padded using the leftmost samples of current block and the top-left neighbouring luma samples are padded using the top neighbouring luma samples. However, the top neighbouring luma samples have not been derived. For example in JVET-Q2001-vE.

"When availL is equal to FALSE, the neighbouring left luma samples pY[x][y] with x=−1 . . . −3, y=−1 . . . SubHeightC*numSampL−1, are set equal to the luma samples pY[0][y].

When numSampT is greater than 0, the neighbouring top luma samples pY[x][y] with x=0 . . . SubWidthC*numSampT−1, y=−1, −2, are set equal to the reconstructed luma samples prior to the deblocking filter process at the locations (xTbY+x, yTbY+y)."

6. In VVC as specified in JVET-Q2001-vE, the top (or/and left) neighbouring luma samples are wrongly derived when they are unavailable. For example, in NET-Q2001-vE, "When availT is equal to FALSE, the neighbouring top luma samples pY[x][y] with x=−1 . . . SubWidthC*numSampT−1, y=−1 . . . −2, are set equal to the luma samples pY[x][0]." is used to derive the top neighbouring luma samples when they are unavailable. However, numSampT has been set equal to 0 when the top neighbouring luma samples are unavailable.

7. In current VVC, the top-left neighbouring luma samples are used in the derivation of CCLM parameters when the top and left neighbouring luma samples are available, but the top-left neighbouring luma samples are unavailable when they are in a different slice, e.g. in raster-slice case.

4. A Listing of Embodiments and Techniques

The listing below should be considered as examples to explain general concepts. These items should not be interpreted in a narrow way. Furthermore, these items can be combined in any manner.

In this disclosure, the term 'CCLM' represents a coding tool that utilizes cross-color component information to predict samples/residuals for current color component or to derive reconstruction of samples in current color component. It is not limited to the CCLM technologies described in VVC.

Derivation of Linear Parameters in CCLM

1. When deriving the CCLM parameters for a chroma block, one or multiple above neighboring lines of its collocated luma block may be used to derive its downsampled collocated neighbouring top luma samples.
   a. In one example, when the current chroma block is not at the top CTU boundary, the nearest above line of the collocated luma block, instead of the second line above, may be used for derivation of the downsampled collocated neighbouring top luma samples.
      i. In one example, one same downsampling filter may be used for deriving the downsampled collocated neighbouring top luma samples and the downsampled collocated neighbouring left luma samples.
         1) For example, [1 2 1] filter may be used. More specifically, pDsY[x]=(pY[2*x−1][−1]+2*pY[2*x][−1]+pY[2*x+1][−1]+2)>>2, wherein pY[2*x][−1], pY[2*x−1][−1], pY[2*x+1][−1] are luma samples from the nearest above neighbouring line and pDstY[x] represents the downsampled collocated neighbouring top luma samples.
      ii. In one example, different downsampling filters (e.g., different filter taps/different filter coefficients) may be used for deriving the downsampled collocated neighbouring top luma samples and the downsampled collocated neighbouring left luma samples.
      iii. In one example, one same downsampling filter may be used for deriving the downsampled collocated neighbouring top luma samples regardless of the position of the chroma block (e.g., the chroma block may be or may not be at a top CTU boundary).
      iv. In one example, the above methods may be only applied to images/videos in 4:2:2 format.
   b. In one example, when the current chroma block is not at the top CTU boundary, above neighbouring luma samples, including the nearest above line of the collocated luma block, but excluding the second line above, may be used for derivation of the downsampled collocated neighbouring top luma samples.
   c. In one example, the derivation of the downsampled collocated neighbouring top luma samples may depend on samples located at multiple lines.
      i. In one example, it may depend on both the second nearest line and the nearest line above the collocated luma block.
      ii. In one example, the downsampled collocated neighbouring top luma samples may be derived using one same downsampling filter for different colour formats (e.g. 4:2:0 and 4:2:2).
         1) In one example, 6-tap filter (e.g., [1 2 1; 1 2 1]) may be utilized.
            a) In one example, the downsampled collocated neighbouring top luma samples may be derived as: pDsY[x]=(pY[2*x−1][−2]+2*pY[2*x][−2]+pY[2*x+1][−2]+pY[2*x−1][−1]+2*pY[2*x][−1]+pY[2*x+1][−1]+4)>>3 wherein pY are corresponding luma samples and pDstY[x] represents the downsampled collocated neighbouring top luma samples.
            b) Alternatively, furthermore, the above method may be applied when sps_cclm_colocated_chroma_flag is equal to 0.
         2) In one example, 5-tap filter (e.g., [0 1 0; 1 4 1; 0 1 0]) may be utilized.
            a) In one example, the downsampled collocated neighbouring top luma samples may be derived as: pDsY[x]=(pY[2*x][−2]+pY[2*x−1][−1]+4*pY[2*x][−1]+pY[2*x+1][−1]+pY[2*x][0]+4)>>3 wherein pY are corresponding luma samples and pDstY[x] represents the downsampled collocated neighbouring top luma samples.
            b) Alternatively, furthermore, the above method may be applied when sps_cclm_colocated_chroma_flag is equal to 1.
      iii. In one example, the above methods may be only applied to images/videos in 4:2:2 format.

Maximum block sizes of transform skip coded blocks (e.g., with transform_skip_flag equal to 1, or BDPCM or other modes that bypass transform process/use identity transform)

2. Maximum block size of transform skip coded blocks may be dependent on the colour component. Denote the maximum block size of transform skip coded blocks for luma and chroma by MaxTsSizeY and MaxTsSizeC, respectively.
  a. In one example, maximum block sizes for luma and chroma components may be different.
  b. In one example, maximum block sizes for two chroma components may be different.
  c. In one example, maximum block sizes for luma and chroma components or for each colour component may be signalled separately.
    i. In one example, MaxTsSizeC/MaxTsSizeY may be signalled at sequence level/picture level/slice level/tile group level, such as in sequence header/picture header/SPS/video parameter set (VPS)/dependency parameter set (DPS)/picture parameter set (PPS)/adaptation parameter set (APS)/slice header/tile group header.
    ii. In one example, the MaxTsSizeY may be conditionally signalled, such as according to transform skip is enabled or not/BDPCM is enabled or not.
    iii. In one example, the MaxTsSizeC may be conditionally signalled, such as according to colour format/transform skip is enabled or not/BDPCM is enabled or not.
    iv. Alternatively, predictive coding between maximum block sizes for luma and chroma components may be utilized.
  d. In one example, MaxTsSizeC may depend on MaxTsSizeY.
    i. In one example, MaxTsSizeC may be set equal to MaxTsSizeY.
    ii. In one example, MaxTsSizeC may be set equal to MaxTsSizeY/N (N is an integer). For example, N=2.
  e. In one example, MaxTsSizeC may be set according to the chroma subsampling ratios.
    i. In one example, MaxTsSizeC is set equal to MaxTsSizeY>>SubWidthC, wherein SubWidthC is defined in Table 2-1.
    ii. In one example, MaxTsSizeC is set equal to MaxTsSizeY>>SubHeightC, wherein SubHeightC is defined in Table 2-1.
    iii. In one example, MaxTsSizeC is set equal to MaxTsSizeY>>max (SubWidthC, SubHeightC).
    iv. In one example, MaxTsSizeC is set equal to MaxTsSizeY>>min (SubWidthC, SubHeightC).
3. Maximum allowed block size width and height for a transform coded block may be defined differently.
  a. In one example, the maximum allowed block size width and height may be signalled separately.
  b. In one example, the maximum allowed block size width and height for a chroma transform coded block may be denoted as MaxTsSizeWC and MaxTsSizeHC, respectively. MaxTsSizeWC may be set equal to MaxTsSizeY>>SubWidthC and MaxTsSizeHC may be set equal to MaxTsSizeY>>SubHeightC.
    i. In one example, the MaxTsSizeY is the one defined in bullet 2.
4. Whether to signal a transform skip flag for a chroma block (e.g., transform_skip_flag[x0][y0][1] and/or transform_skip_flag[x0][y0][2]) may depend on the maximum allowed size for chroma transform skip coded blocks.
  a. In one example, the chroma transform skip flag may be conditionally signalled according to the following conditions:
    i. In one example, the conditions are: tbW is less than or equal to MaxTsSizeC and tbH is less than or equal to MaxTsSizeC, wherein tbW and tbH are the width and height of the current chroma block.
      1) In one example, MaxTsSizeC may be defined as that in bullets 2-3.
    ii. In one example, the conditions are: tbW is less than or equal to MaxTsSizeWC and tbH is less than or equal to MaxTsSizeHC, wherein tbW and tbH are the width and height of the current chroma block, MaxTsSizeWC and MaxTsSizeHC represent the maximum allowed block size width and height, respectively, for chroma transform skip coded blocks.
      1) In one example, MaxTsSizeWC and/or MaxTsSizeHC may be defined as that in bullet 3.
  b. In one example, the above methods may be applicable to the coding of chroma BDPCM flags (e.g., intra_bdpcm_chroma_flag) by replacing 'transform skip' by 'BDPCM'.
5. Instead of coding two TS flags for two chroma color component, it is proposed to use one syntax to indicate the usage of TS for the two chroma color components.
  a. In one example, instead of coding transform_skip_flag[x0][y0][1] and/or transform_skip_flag[x0][y0][2]), a single syntax element (e.g., TS_chroma_flag) may be coded.
    i. In one example, the value of the single syntax element is a binary value.
      1) Alternatively, furthermore, the two chroma component blocks share the same on/off control of TS mode according to the single syntax element.
        a) In one example, the value of the single syntax element equal to 0 indicates TS is disabled for both.
        b) In one example, the value of the single syntax element equal to 0 indicates TS is enabled for both.
      2) Alternatively, furthermore, a second syntax element may be further singled based on whether the value of the single syntax element is equal to K (e.g., K=1).
        a) In one example, the value of the single syntax element equal to 0 indicates TS is disabled for both; the value of the single syntax element equal to 0 indicates TS is enabled for at least one of the two chroma component.
        b) The second syntax element may be used to indicate TS is applied to which one of the two chroma components and/or TS is applied to both of them.
    ii. In one example, the value of the single syntax element is a non-binary value.
      1) In one example, the value of the single syntax element equal to K0 indicates TS is disabled for both
      2) In one example, the value of the single syntax element equal to K1 indicates TS is enabled for the first chroma color component and disabled for the second color component.
      3) In one example, the value of the single syntax element equal to K2 indicates TS is disabled for the first chroma color component and enabled for the second color component.

4) In one example, the value of the single syntax element equal to K3 indicates TS is enabled for both.
5) In one example, the single syntax element may be coded with fixed length, unary, truncated unary, k-th order EG binarization methods.
  iii. In one example, the single syntax element and/or second syntax element may be context coded or bypass coded.

General Claims

6. Whether to and/or how to apply the disclosed methods above may be signalled at sequence level/picture level/slice level/tile group level, such as in sequence header/picture header/SPS/VPS/DPS/PPS/APS/slice header/tile group header.
7. Whether to and/or how to apply the disclosed methods above may be dependent on coded information, such as color format, single/dual tree partitioning.

Additional Claims on CCLM

Figure 13:
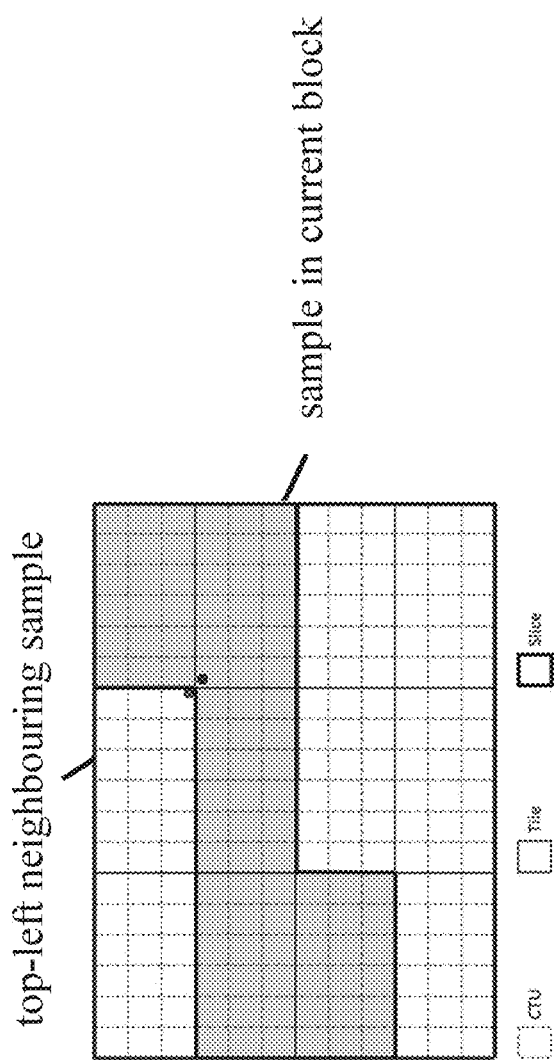
FIG. 13 shows an example of samples in current block and top-left samples to be used.

8. In the CCLM parameter derivation process, the above neighboring samples are put into the selected neighbouring sample list before the left neighboring samples and the selected neighbouring sample list is used to derive the CCLM parameters (e.g., using the 4-point derivation method wherein two larger are averaged and two smaller values are averaged, and the two average values are used to derive the linear parameter). An example is demonstrated in Embodiment 5.
9. In the CCLM parameter derivation process, when getting the down-sampled above neighboring luma samples denoted pSelDsY[idx], the index value idx should be in the range of cntL to cntL+cntT−1, wherein cntL and cntT represent the number of the left neighbouring chroma samples and above neighbouring chroma samples used to derive the CCLM parameters, respectively.
   a. An example is demonstrated in Embodiment 5.
   b. Alternatively, furthermore, the left neighboring samples are put into the selected neighbouring sample list before the above neighboring samples.
10. In the CCLM parameter derivation process, three rows of above neighbouring luma samples are assigned. An example is demonstrated in Embodiment 6.
11. In the CCLM parameter derivation process, $T_1$ rows and $T_2$ columns of top-left neighbouring luma samples are assigned.
   a. In one example, $T_1=2$ and $T_2=2$. An example is demonstrated in Embodiment 12.
   b. In one example, $T_1=3$ and $T_2=3$.
12. In the CCLM parameter derivation process, the number of rows of above luma neighbouring samples to be assigned may depend on a variable or a syntax element indicating whether chroma sample positions that are not vertically shifted relative to corresponding luma sample positions, such as sps_chroma_vertical_collocated_flag in JVET-Q2001-vE.
   a. In one example, three rows of above neighbouring luma samples are assigned when sps_chroma_vertical_collocated_flag is equal to 1. Otherwise, two rows of above neighbouring luma samples are assigned. The example is demonstrated in Embodiment 7.
13. In above examples, the neighboring luma samples could be those before down-sampling or after down-sampling.
14. In the CCLM parameter derivation process, whether to and/or how to pad the top-left neighbouring samples may depend on the availability of at least one of the top-left neighbouring samples, instead of the availability of the left neighbouring samples and/or the above neighbouring samples.
   a. In one example, the availability of at least one of the top-left neighbouring samples may depend on whether the at least one of the top-left neighbouring samples and samples in the current block are in the same slice or in different slices.
     i. Furthermore, a slice mentioned above may be a rectangular slice or a non-rectangular slice.
   b. In one example, the top-left neighbouring samples are padded if the at least one of the top-left neighbouring samples and samples in the current block are in different slices.
   c. In one example, the top-left neighbouring samples are padded if the availability of the at least one top-left neighbouring samples is false.
15. In the CCLM parameter derivation process, the top-left neighbouring luma samples may be not used when they are "unavailable".
   a. In one example, a neighbouring sample is "unavailable" if it is out of the current picture, or current sub-picture, or current tile, or current slice, or current brick, or current CTU, or current processing unit, or any other current video unit.
     i. In one example, for non-rectangular slice case shown in FIG. 13, the top-left neighbouring luma samples are "unavailable" which are in a different slice from current block.
   b. In one example, whether to use the top-left neighbouring luma samples in the process of CCLM may depend on whether they are in the same picture/sub-picture/tile/slice/brick/CTU/processing unit/other video unit as current block.
     i. In one example, the top-left neighbouring luma samples may not be used in the process of CCLM when they are in a different raster-slice from current block.
       1) An example is demonstrated in Embodiment 10.
     ii. In one example, the top-left neighbouring luma samples may not be used in the process of CCLM although they are in the same picture/sub-picture/tile/slice/brick/CTU/processing unit/other video unit as current block.
   c. In the CCLM parameter derivation process, when the top-left neighbouring luma samples are "unavailable", repetitive padding may be used to generate the top-left neighbouring luma samples. Denote the top-left sample location of the current block by (x, y). Denote the reconstructed luma samples prior to the deblocking filter process by pY[i][j]. Denote the padded top-left luma samples by pD[m][n] with m=x−1 . . . x−M, n=y−1 . . . y−N, wherein M and N are integers such as 1.
     i. In one example, the repetitive padding method may be used when the left or/and top neighbouring luma samples are available.

ii. In one example, the top-left neighbouring luma samples may be padded from the top neighbouring luma samples when the top neighbouring luma samples are available.
   2) In one example, pD[m][n]=pY[x][n].
iii. In one example, the top-left neighbouring luma samples may be padded from the left neighbouring luma samples when the left neighbouring luma samples are available.
   3) In one example, pD[m][n]=pY[m][y].
iv. In one example, the top-left neighbouring luma samples may be padded from the top neighbouring luma samples when the top neighbouring luma samples are available and the left neighbouring luma samples are available.
   4) In one example, pD[m][n]=pY[x][n].
v. Alternatively, the top-left neighbouring luma samples may be padded from the left neighbouring luma samples when the top neighbouring luma samples are available and the left neighbouring luma samples are available.
   5) In one example, pD[m][n]=pY[m][y].
vi. In one example, M=2, N=2, or M=3, N=3.
d. Alternatively, when the top-left neighbouring luma samples are "unavailable", they may be replaced by the predefined values.
   i. In one example, the predefined values may be equal to a constant value, e.g., 128.
   ii. In one example, the predefined values may derived using left or/and top neighbouring luma samples.
      6) In one example, the predefined values may equal to the average value of left or/and top neighbouring luma samples.
   iii. In one example, the predefined values may depend on the bit-depth of samples. For example, the predefined values may be equal to 1<(BD−1), where BD represents the bit-depth of samples.
e. Alternatively, even though the top-left neighbouring luma samples are "available", the above padding method in bullet 14.c and predefined values in bullet 14.d may be used to replace the available top-left neighbouring luma samples.
   i. An example is demonstrated in Embodiment 11.
f. In one example, whether to check the availability of top-left neighbouring luma samples may depend on whether left neighbouring luma samples are available or/and top neighbouring luma samples are available.
   i. In one example, check the availability of top-left neighbouring luma samples only if both left and top neighbouring luma samples are available. An example is shown in Embodiment 17.
g. In one example, whether to and/or how to use or/and pad the top-left neighbouring luma samples may depend on the availability of top-left, or/and left, or/and top neighbouring luma samples.
   i. In one example, the top-left neighbouring luma samples may be used only if the top-left neighbouring luma samples are available.
   ii. In one example, the top-left neighbouring luma samples may be used only if the top-left, left, and top neighbouring luma samples are available. An example is shown in Embodiment 18.
   iii. In one example, the top-left neighbouring luma samples may be padded when the left and/or top neighbouring luma samples are available.
      1) In one example, the top-left neighbouring luma samples may be padded only if the left or top neighbouring luma samples are available, and the top-left neighbouring luma samples are not available.
      2) In one example, the top-left neighbouring luma samples may be padded only if the left and top neighbouring luma samples are available, and the top-left neighbouring luma samples are not available.
      3) In one example, the top-left neighbouring luma samples may be padded using the top neighbouring luma samples. The neighbouring top-left luma samples pY[x][y] with x=−1, −2, y=−1, −2, are set equal to the luma samples pY[0][y]. An example is shown in Embodiment 18.
      4) In one example, the top-left neighbouring luma samples may be padded using the top neighbouring luma samples. The neighbouring top-left luma samples pY[x][y] with x=−1, −2, y=−1, −2, are set equal to the luma samples pY[x][0]. An example is shown in Embodiment 19.
      5) In one example, the top-left neighbouring luma samples may be padded using the top and left neighbouring luma samples.
h. In one example, whether to check the availability of top-left neighbouring luma samples, or/and use the top-left neighbouring luma samples, or/and pad the top-left neighbouring luma samples may depend on the chroma colour format.
   i. In one example, there is no need to check the availability of top-left neighbouring luma samples, or/and use the top-left neighbouring luma samples, or/and pad the top-left neighbouring luma samples when 4:4:4 colour format is used. An example is shown in Embodiment 20.
i. In one example, whether to pad the top-left neighbouring luma samples and/or which samples need to be padded may depend on a variable or a syntax element indicating whether chroma sample positions that are not vertically shifted relative to corresponding luma sample positions, such as sps_chromavertical_collocated_flag in JVET-Q2001-vE.
   i. In one example, the top-left neighbouring samples are padded when sps_chroma_vertical_collocated_flag is equal to 1. Otherwise, the top-left neighbouring samples are not padded. The example is demonstrated in Embodiment 14.
16. During the process of CCLM, it is proposed to derive the top (or/and left) neighbouring luma samples using the top-most (or/and left-most) samples of current block when the top (or/and left) neighbouring luma samples are unavailable. And the top-left neighbouring samples may be derived using the left (or/and top) available neighbouring luma samples.
a. In one example, when the top neighbouring luma samples are unavailable, the top and top-left neighbouring luma samples may be derived using the top-most samples of current block and the left neighbouring luma samples.
   i. In one example, the top neighbouring luma samples pY[x][y] with x=0 . . . SubWidthC*nTbW−1, y=−1 . . . −2, are set equal to the luma samples pY[x][0]. And the top-left neighbouring luma samples pY[x][y] with x=−1, y=−1 . . . −2, are set equal to the luma samples pY[x][0], where pY[0][0] denotes the top-left sample of current block, nTbW denotes the width of current block, and SubWidthC is defined in 2.1.
ii. In one example, the top neighbouring samples pY[x][y] with x=0 . . . SubWidthC*nTbW−1, y=−1 . . . −N, are set equal to the luma samples pY[x][0]. And the top-left neighbouring luma samples pY[x][y] with x=−M . . . −1, y=−1 . . . −N, are set equal to the luma samples pY[x][0], where pY[0][0] denotes the top-left sample of current block, nTbW denotes the width of current block, and SubWidthC is defined in 2.1. An example is demonstrated in Embodiment 13.
1) In one example, M and N are integers such as M=2 and N=3.
2) In one example, M may depends on the chroma color format, such as M=SubWidthC, which is defined in 2.1.
3) In one example, at most T top-left neighbouring luma samples may be padded, wherein T is an integer such as 1.
a) In one example, pY[−M][−1]=pY[−M][0], wherein M=1 or M=SubWidthC.
b. In one example, when the left neighbouring luma samples are unavailable, the left and top-left neighbouring luma samples may be derived using the left-most samples of current block and the top neighbouring luma samples.
i. In one example, the left neighbouring luma samples pY[x][y] with x=0 . . . −3, y=−1 . . . SubHeightC*nTbH−1, are set equal to the luma samples pY[0][y]. And the top-left neighbouring luma samples pY[x][y] with x=0 . . . −3, y=−1, are set equal to the luma samples pY[0][y], where pY[0][0] denotes the top-left sample of current block, nTbH denotes the height of current block, and SubHeightC is defined in 2.1.
ii. In one example, the left neighbouring luma samples pY[x][y] with x=−1 . . . −M, y=0 . . . SubHeightC*nTbH−1, are set equal to the luma samples pY[0][y]. And the top-left neighbouring luma samples pY[x][y] with x=−1 . . . −M, y=−1 . . . −N, are set equal to the luma samples pY[0][y], where pY[0][0] denotes the top-left sample of current block, nTbH denotes the height of current block, and SubHeightC is defined in 2.1. The example is demonstrated in Embodiment 15.
1) In one example, M and N are integers such as M=1, N=3.
2) In one example, N may depends on the chroma colour format, such as N=SubHeightC, which is defined in 2.1.
3) In one example, at most T top-left neighbouring luma samples may be padded, wherein T is an integer such as 1.
a) In one example, pY[−1][−N]=pY[0][−N], wherein N=1 or N=SubHeightC.
b) Alternatively, T is equal to 2. pY[−1][−1]=pY[0][−1], pY[−1][−2]=pY[0][−2].
iii. In one example, the top-left luma neighbouring samples may be padded after the derivation of top neighbouring luma samples. An example is demonstrated in Embodiment 16.
c. In one example, the top-left neighbouring luma samples derived in bullet 13 may be used during the process of padding the top (or/and left) neighbouring luma samples.
d. In one example, whether to pad the top (or/and left) neighbouring luma (or chroma) samples and/or which neighbouring samples need to be padded may depend on the chroma colour format.
i. In one example, there is no need to pad the top (or/and left) neighbouring luma samples when 4:4:4 colour format is used. An example is shown in Embodiment 21.
e. In one example, when padding the top (or/and left) neighbouring luma samples, the top-left neighbouring luma samples are padded using the method in 15, such as 15.c. An example is shown in Embodiment 22.
17. In the CCLM prediction process, padding of the top neighbouring samples, left neighbouring samples and top-left neighbouring samples may be conducted in a fixed order. The neighbouring samples may be luma samples or chroma samples.
a. For example, the order maybe top neighbouring samples padding, left neighbouring padding, and top-left neighbouring samples padding.
b. For example, the order maybe left neighbouring padding, top neighbouring samples padding, and top-left neighbouring samples padding.
c. For example, the order maybe top-left neighbouring padding, top neighbouring samples padding, and left neighbouring samples padding.
d. For example, the order maybe top-left neighbouring padding, left neighbouring samples padding, and top neighbouring samples padding.
18. The process of down-sampling in CCLM for 4:2:2 colour format video may be decoupled from a syntax element or a variable (such as sps_chroma_vertical_collocated_flag in JVET-Q2001-vE) that indicates whether chroma sample positions are vertically shifted relative to corresponding luma sample positions or not.
a. In one example, the process of down-sampling may refer to down-sampling the neighbouring above luma samples, or/and down-sampling the neighbouring left luma samples, or/and down-sampling samples in the current luma block.
b. In one example, regardless of sps_chroma_vertical_collocated_flag is equal to 1 or 0, a fixed filter (such as a 3-tap horizontal filter with coefficients[1/4, 2/4, 1/4] or [2/8, 4/8, 2/8]) may be used in the process of down-sampling in CCLM for 4:2:2 colour format video. An example is shown in Embodiment 27 and Embodiment 28.
19. In one example, a variable or a syntax element indicating whether chroma sample positions are vertically shifted relative to corresponding luma sample positions or not (e.g., sps_chroma_vertical_collocated_flag in JVET-Q2001-vE) may be set to be a default value such as 0 or 1 for 4:2:2 and/or 4:4:4 colour formats.
a. In one example, when sps_chroma_vertical_collocated_flag is not present, it may be inferred to be equal to 1.
b. In one example, when sps_chroma_vertical_collocated_flag is not present, it may be inferred to be equal to 0.
20. A variable representing a neighbouring luma sample can be used in the process of CCLM only when it is has been set equal to a valid value. An example is shown in Embodiment 29 and Embodiment 30.
  a. In one example, variables representing the neighbouring above luma samples may be set equal to the reconstructed luma samples prior to the deblocking filter process.
    i. In one example, when the neighbouring above luma samples are available (e.g., availT is equal to true in JVET-Q2001-vE), variables representing the neighbouring above luma samples denoted as pY [x][y] are set equal to the reconstructed luma samples prior to the deblocking filter process at the locations (xTbY+x, yTbY+y), where (xTbY, yTbY) represents the top-left position of the current block.
      1) In one example, x and y may be in the range of x=0 . . . SubWidthC*max(numSampT, nTbW)−1, y=−1, −2, wherein nTbW denotes the width of current block, and SubWidthC is defined in 2.1, and numSampT indicates the number of available neighbouring chroma samples on the top and top-right and is defined in JVET-Q2001-vE.
  b. In one example, variables representing the neighbouring left luma samples may be set equal to the reconstructed luma samples prior to the deblocking filter process.
    i. In one example, when the neighbouring left luma samples are available (e.g., availL is equal to true in JVET-Q2001-vE), variables representing the neighbouring left luma samples denoted as pY[x][y] are set equal to the reconstructed luma samples prior to the deblocking filter process at the locations (xTbY+x, yTbY+y), where (xTbY, yTbY) represents the top-left position of the current block.
      1) In one example, x and y may be in the range of x=−1 . . . −3, y=0 . . . SubHeightC*max(numSampL, nTbH)−1, where nTbH denotes the width of current block, and SubHeightC is defined in 2.1, and numSampL indicates the number of available neighbouring chroma samples on the left and left-below and is defined in JVET-Q2001-vE.
21. The slice type of a slice may depend on the reference picture entries for the slice.
  a. In one example, the slice type must be I-slice if the number of reference picture entries for list 0 is equal to 0 and the number of reference picture entries for list 1 is equal to 0.
    i. In one example, the slice type is not signaled in this case.
  b. In one example, the slice type must be P-slice if the number of reference picture entries for list 0 is larger than 0 and the number of reference picture entries for list 1 is equal to 0.
    i. Alternatively, the slice type cannot be B-slice if the number of reference picture entries for list 0 is larger than 0 and the number of reference picture entries for list 1 is equal to 0.
    ii. In one example, the slice type is not signaled in this case.
  c. The reference picture entries for the slice may be signaled or inferred before the slice type is signaled or inferred.
    i. The reference picture entries for the slice may be signaled in a picture header associated with the picture.
22. The total number of allowed filters in APSs or the total number of APSs may be restricted according to coded information, such as number of subpictures.
  a. The total number of allowed filters in APSs may include total number of luma/chroma ALF and CC-ALF) in ALF APSs in all APS network abstraction layer (NAL) units with a PU.
  b. The total number of allowed filters in APSs may include the total number of adaptive loop filter classes for luma component (or luma ALF filters), the total number of alternative filters for chroma components (chroma ALF filters), and/or the total number of cross-component filters in all APS NAL units with a PU.
  c. The APS is an ALF APS/scaling list APS/luma mapping with chroma scaling (LMCS) APS.
  d. how to signal the APS identifier (ID), and/or number of APSs to be used by a video unit is dependent on the restricted number.
23. A conformance bitstream shall follow the rule that if BDPCM is enabled for a video unit (e.g., sequence/picture/slice/tile/brick/subpicture), sign data hiding is disabled.
  a. Alternatively, a conformance bitstream shall follow the rule that if sign data hiding is enabled for a video unit (e.g., sequence/picture/slice/tile/brick/subpicture), BDPCM is disabled.
24. A conformance bitstream shall follow the rule that if transform skip/a coding tool which only applies identity transform is enabled for a video unit (e.g., sequence/picture/slice/tile/brick/subpicture), sign data hiding is disabled.
  a. Alternatively, a conformance bitstream shall follow the rule that if sign data hiding is enabled for a video unit (e.g., sequence/picture/slice/tile/brick/subpicture), transform skip/a coding tool which only applies identity transform is disabled.
25. A conformance bitstream shall follow the rule that if BDPCM is enabled for a video unit (e.g., sequence/picture/slice/tile/brick/subpicture), DQ (dependent quantization) is disabled.
  a. Alternatively, a conformance bitstream shall follow the rule that if DQ is enabled for a video unit (e.g., sequence/picture/slice/tile/brick/subpicture), BDPCM is disabled.
26. A conformance bitstream shall follow the rule that if transform skip/a coding tool which only applies identity transform is enabled for a video unit (e.g., sequence/picture/slice/tile/brick/subpicture), DQ (dependent quantization) is disabled.
  a. Alternatively, a conformance bitstream shall follow the rule that if DQ is enabled for a video unit (e.g., sequence/picture/slice/tile/brick/subpicture), transform skip/a coding tool which only applies identity transform is disabled.

5. Embodiments

This section shows example embodiments and ways to modify the current VVC standard to describe these embodiments. The changes to the VVC specification are highlighted in bold and Italic. Deleted texts are marked with double brackets (e.g., [[a]] denotes the deletion of the character "a").

5.1. Embodiment 1

The working draft specified in WET-P2001-v9 may be changed as below.
8.4.5.2.13 Specification of INTRA_LT_CCLM, INTRA_L_CCLM and INTRA_T_CCLM Intra Prediction Mode
. . .
3. The down-sampled collocated luma samples pDsY[x][y] with x=0 . . . nTbW−1, y=0 . . . nTbH−1 are derived as follows:
  If both SubWidthC and SubHeightC are equal to 1, the following applies:
    pDsY[x][y] with x=1 . . . nTbW−1, y=1 . . . nTbH−1 is derived as follows:

$pDstY[x][y]=pY[x][y]$ (8-159)

Otherwise, the following applies:
    The one-dimensional filter coefficients array F1 and F2, and the 2-dimensional filter coefficients arrays F3 and F4 are specified as follows.

$F1[i]=1$, with $i=0 \ldots 1$ (8-160)

$F2[0]=1, F2[1]=2, F2[2]=1$ (8-161)

$F3[i][j]=F4[i][j]=0$, with $i=0 \ldots 2, j=0 \ldots 2$ (8-162)

If both SubWidthC and SubHeightC are equal to 2, the following applies:

$F1[0]=1, F1[1]=1$ (8-163)

$F3[0][1]=1, F3[1][1]=4, F3[2][1]=1, F3[1][0]=1, F3[1][2]=1$ (8-164)

$F4[0][1]=1, F4[1][1]=2, F4[2][1]=1$ (8-165)

$F4[0][2]=1, F4[1][2]=2, F4[2][2]=1$ (8-166)

Otherwise, the following applies:

$F1[0]=2, F1[1]=0$ (8-167)

$F3[1][1]=8$ (8-168)

$F4[0][1]=2, F4[1][1]=4, F4[2][1]=2,$ (8-169)

. . .
5. When numSampT is greater than 0, the selected neighbouring top chroma samples pSelC[idx] are set equal to p[pickPosT[idx−cntL]][−1] with idx=cntL . . . cntL+cntT−1, and the down-sampled neighbouring top luma samples pSelDsY[idx] with idx=0 . . . cntL+cntT−1 are specified as follows:
. . .
  Otherwise (sps_cclm_colocated_chroma_flag is equal to 0), the following applies:
    If x is greater than 0, the following applies:
      If bCTUboundary is equal to FALSE, the following applies:

$pSelDsY[idx]=(F4[0][1]*pY[SubWidthC*x-1][[[-2]]-1]+F4[0][2]*pY[SubWidthC*x-1][[[-1]]-2]+F4[1][1]*pY[SubWidthC*x][[[-2]]-1]+F4[1][2]*pY[SubWidthC*x][[[-1]]-2]+F4[2][1]*pY[SubWidthC*x+1][[[-2]]-1]+F4[2][2]*pY[SubWidthC*x+1][[[-1]]-2]+4)>>3$ (8-193)

Otherwise (bCTUboundary is equal to TRUE), the following applies:

$pSelDsY[idx]=(F2[0]*pY[SubWidthC*x-1][-1]+F2[1]*pY[SubWidthC*x][-1]+F2[2]*pY[SubWidthC*x+1][-1]+2)>>2$ (8-194)

Otherwise (x is equal to 0), the following applies:
      If availTL is equal to TRUE and bCTUboundary is equal to FALSE, the following applies:

$pSelDsY[idx]=(F4[0][1]*pY[-1][[[-2]]-1]+F4[0][2]*pY[-1][[[-1]]-2]+F4[1][1]*pY[0][[[-2]]-1]+F4[1][2]*pY[0][[[-1]]-2]+F4[2][1]*pY[1][[[-2]]-1]+F4[2][2]*pY[1][[[-1]]-2]+4)>>3$ (8-195)

Otherwise, if availTL is equal to TRUE and bCTUboundary is equal to TRUE, the following applies:

$pSelDsY[idx]=(F2[0]*pY[-1][-1]+F2[1]*pY[0][-1]+F2[2]*pY[1][-1]+2)>>2$ (8-196)

Otherwise, if availTL is equal to FALSE and bCTUboundary is equal to FALSE, the following applies:

$pSelDsY[idx]=(F1[1]*pY[0][-2]+F1[0]*pY[0][-1]+1)>>1$ (8-197)

Otherwise (availTL is equal to FALSE and bCTUboundary is equal to TRUE), the following applies:

$pSelDsY[idx]=pY[0][-1]$ (8-198)

. . .

5.2. Embodiment 2

This embodiment shows an example on chroma transform skip flag coding according to maximum allowed transform skip coded block sizes. The working draft specified in JVET-P2001-v9 may be changed as below.
7.3.9.10 Transform Unit Syntax
. . .

```
if( tu_cbf_luma[ x0 ][ y0 ] && treeType != DUAL_TREE_CHROMA ) {
  if( sps_transform_skip_enabled_flag && !BdpcmFlag[ x0 ][ y0 ][ 0 ] &&..
    tbWidth <= MaxTsSize && tbHeight <= MaxTsSize &&
    ( IntraSubPartitionsSplit[ x0 ] [ y0 ] = = ISP_NO_SPLIT ) &&
  !cu_sbt_flag )
    transform_skip_flag[ x0 ][ y0 ][ 0 ]                              ae(v)
  if( !transform_skip_flag[ x0 ][ y0 ][0] )
    residual_coding( x0, y0, Log2( tbWidth ), Log2( tbHeight ), 0 )
  else
    residual_ts_coding( x0, y0, Log2( tbWidth ), Log2( tbHeight ), 0 )
}
if( tu_cbf_cb[ x0 ][ y0 ] && treeType != DUAL_TREE_LUMA )
  if( sps_transform_skip_enabled_flag && !BdpcmFlag[ x0 ][ y0 ][ 1 ] &&
    wC <= (MaxTsSize >> subWidthC) && hC <= (MaxTsSize >>
```

```
subHeightC) && !cu_sbt_flag )
    transform_skip_flag[ x0 ][ y0 ][ 1 ]                                    ae(v)
  if( !transform_skip_flag[ x0 ][ y0 ][ 1 ] )
    residual_coding( xC, yC, Log2( wC ), Log2( hC ), 1 )
  else
    residual_ts_coding( xC, yC, Log2( wC ), Log2( hC ), 1 )
if( tu_cbf_cr[ x0 ][ y0 ] && treeType != DUAL_TREE_LUMA &&
    !( tu_cbf_cb[ x0 ][ y0 ] && tu_joint_cbcr_residual_flag[ x0 ][ y0 ] )) {
  if( sps_transform_skip_enabled_flag && !BdpcmFlag[ x0 ][ y0 ][ 2 ] &&
    wC <= (MaxTsSize >> subWidthC) && hC <= (MaxTsSize >>
subHeightC) && !cu_sbt_flag )
    transform_skip_flag [ x0 ][ y0 ][ 2 ]                                   ae(v)
  if( !transform_skip_flag[ x0 ][ y0 ][ 2 ] )
    residual_coding( xC, yC, Log2( wC ), Log2( hC ), 2 )
  else
    residual_ts_coding( xC, yC, Log2( wC ), Log2( hC), 2 )
}
```

5.3. Embodiment 3

This embodiment shows an example on chroma BDPCM flag coding according to maximum allowed chroma transform skip coded block sizes. The working draft specified in JVET-P2001-v9 may be changed as below.
7.3.9.5 Coding Unit Syntax
. . .

```
if( ( treeType = = SINGLE_TREE | | treeType = = DUAL_TREE_CHROMA )
&&
    ChromaArrayType != 0 ) {
  if( pred_mode_plt_flag && treeType = = DUAL_TREE_CHROMA )
    palette_coding( x0, y0, cbWidth / SubWidthC,
cbHeight / SubHeightC, 1, 2 )
  else {
    if( !cu_act_enabled_flag ) {
      if( cbWidth <= (MaxTsSize >> subWidthC) &&
cbHeight <= (MaxTsSize >> subHeightC) &&
        sps_bdpcm_chroma_enabled_flag ) {
        intra_bdpcm_chroma_flag                                             ae(v)
        if( intra bdpcm chroma flag )
          intra_bdpcm_chroma_dir_flag                                       ae(v)
      } else {
        if( CclmEnabled )
          cclm_mode_flag                                                    ae(v)
        if( cclm_mode_flag )
          cclm_mode_idx                                                     ae(v)
        else
          intra_chroma_pred_mode                                            ae(v)
      }
    }
  }
}
```

5.4. Embodiment 4

The working draft specified in JVET-Q2001-vE may be changed as below.
8.4.5.2.13
Inputs to this process are:
  the intra prediction mode predModeIntra,
  a sample location (xTbC, yTbC) of the top-left sample of the current transform block relative to the top-left sample of the current picture,
  a variable nTbW specifying the transform block width,
  a variable nTbH specifying the transform block height,
  a variable cIdx specifying the colour component of the current block,
  chroma neighbouring samples p[x][y], with x=−1, y=0 . . . 2*nTbH−1 and x=0 . . . 2*nTbW−1, y=−1.
Output of this process are predicted samples predSamples[x][y], with x=0 . . . nTbW−1, y=0 . . . nTbH−1.

The current luma location (xTbY, yTbY) is derived as follows:

$$(xTbY, yTbY) = (xTbC << (SubWidthC-1), yTbC << (SubHeightC-1)) \qquad (351)$$

The variables availL, availT and availTL are derived as follows:
  The derivation process for neighbouring block availability as specified in clause 6.4.4 is invoked with the current luma location (xCurr, yCurr) set equal to (xTbY, yTbY), the neighbouring luma location (xTbY−1, yTbY), checkPredModeY set equal to FALSE, and cIdx as inputs, and the output is assigned to availL.
  The derivation process for neighbouring block availability as specified in clause 6.4.4 is invoked with the current luma location (xCurr, yCurr) set equal to (xTbY, yTbY), the neighbouring luma location (xTbY, yTbY−1), checkPredModeY set equal to FALSE, and cIdx as inputs, and the output is assigned to availT.
The variable availTL is derived as follows:

$$availTL = availL \&\& availT \qquad (352)$$

The number of available top-right neighbouring chroma samples numTopRight is derived as follows:
  The variable numTopRight is set equal to 0 and availTR is set equal to TRUE.

When predModeIntra is equal to INTRA_T_CCLM, the following applies for x=nTbW ... 2*nTbW−1 until availTR is equal to FALSE or x is equal to 2*nTbW−1:
- The derivation process for neighbouring block availability as specified in clause 6.4.4 is invoked with the current luma location (xCurr, yCurr) set equal to (xTbY, yTbY) the neighbouring luma location (xTbY+x, yTbY−1), checkPredModeY set equal to FALSE, and cIdx as inputs, and the output is assigned to availTR
- When availTR is equal to TRUE, numTopRight is incremented by one.

The number of available left-below neighbouring chroma samples numLeftBelow is derived as follows:
- The variable numLeftBelow is set equal to 0 and availLB is set equal to TRUE.
- When predModeIntra is equal to INTRA_L_CCLM, the following applies for y=nTbH ... 2*nTbH−1 until availLB is equal to FALSE or y is equal to 2*nTbH−1:
  - The derivation process for neighbouring block availability as specified in clause 6.4.4 is invoked with the current luma location (xCurr, yCurr) set equal to (xTbY, yTbY), the neighbouring luma location (xTbY−1, yTbY+y), checkPredModeY set equal to FALSE, and cIdx as inputs, and the output is assigned to availLB
  - When availLB is equal to TRUE, numLeftBelow is incremented by one.

The number of available neighbouring chroma samples on the top and top-right numSampT and the number of available neighbouring chroma samples on the left and left-below numSampL are derived as follows:
- If predModeIntra is equal to INTRA_LT_CCLM, the following applies:

numSamp*T*=avail*T?nTbW*:0          (353)

numSamp*L*=avail*L?nTbH*:0          (354)

Otherwise, the following applies:

numSamp*T*= (avail*T*&&predModeIntra==INTRA_*T*_CCLM)? (*nTbW*+Min(numTopRight,*nTbH*)):0          (355)

numSamp*L*= (avail*L*&&predModeIntra==INTRA_*L*_CCLM)? (*nTbH*+Min(numLeftBelow,*nTbW*)):0          (356)

The variable bCTUboundary is derived as follows:

*b*CTUboundary=(*yTbY*&(*Ctb*Size*Y*−1)==0)?TRUE: FALSE.          (357)

The variable cntN and array pickPosN with N being replaced by L and T, are derived as follows:
The variable numIs4N is derived as follows:

numIs4*N*= ((avail*T*&&avail*L*&&predModeIntra==INTRA_*LT*_CCLM) ?0:1)          (358)

The variable startPosN is set equal to numSampN>>(2+numIs4N).
The variable pickStepN is set equal to Max(1, numSampN>>(1+numIs4N)).
If availN is equal to TRUE and predModeIntra is equal to INTRA_LT_CCLM or INTRA_N_CCLM, the following assignments are made:
cntN is set equal to Min(numSampN, (1+numIs4N)<<1).

pickPosN[pos] is set equal to (startPosN+pos*pickStepN), with pos=0 ... cntN−1.
Otherwise, cntN is set equal to 0.
The prediction samples predSamples[x][y] with x=0 ... nTbW−1, y=0 ... nTbH−1 are derived as follows:
If both numSampL and numSampT are equal to 0, the following applies:

predSamples[*x*][*y*]=1<<(BitDepth−1)          (359)

Otherwise, the following ordered steps apply:
1. The collocated luma samples pY[x][y] with x=0 ... nTbW*SubWidthC−1, y=0 ... nTbH*SubHeightC−1 are set equal to the reconstructed luma samples prior to the deblocking filter process at the locations (xTbY+x, yTbY+y).
2. The neighbouring luma samples pY[x][y] are derived as follows:
    When numSampL is greater than 0, the neighbouring left luma samples pY[x][y] with x=−1 ... −3, y=0 ... SubHeightC*numSampL−1, are set equal to the reconstructed luma samples prior to the deblocking filter process at the locations (xTbY+x, yTbY+y).
    When availT is equal to FALSE, the neighbouring top luma samples pY[x][y] with x=−1 ... SubWidthC*numSampT−1, y=−1 ... −2, are set equal to the luma samples pY[x][0].
    When availL is equal to FALSE, the neighbouring left luma samples pY[x][y] with x=−1 ... −3, y=−1 ... SubHeightC*numSampL−1, are set equal to the luma samples pY[0][y].
    When numSampT is greater than 0, the neighbouring top luma samples pY[x][y] with x=0 ... SubWidthC*numSampT−1, y=−1, −2, are set equal to the reconstructed luma samples prior to the deblocking filter process at the locations (xTbY+x, yTbY+y).
    When availTL is equal to TRUE, the neighbouring top-left luma samples pY[x][y] with x=−1, y=−1, −2, are set equal to the reconstructed luma samples prior to the deblocking filter process at the locations (xTbY+x, yTbY+y).
3. The down-sampled collocated luma samples pDsY[x][y] with x=0 ... nTbW−1, y=0 ... nTbH−1 are derived as follows:
    If both SubWidthC and SubHeightC are equal to 1, the following applies:
    pDsY[x][y] with x=1 ... nTbW−1, y=1 ... nTbH−1 is derived as follows:

*pDstY*[*x*][*y*]=*pY*[*x*][*y*]          (360)

Otherwise, the following applies:
The one-dimensional filter coefficients array F1 and F2, and the 2-dimensional filter coefficients arrays F3 and F4 are specified as follows.

*F*1[0]=2,*F*1[1]=0          (361)

*F*2[0]=1,*F*2[1]=2,*F*2[2]=1          (362)

*F*3[*i*][*j*]=*F*4[*i*][*j*]=0,with *i*=0 ... 2,*j*=0 ... 2          (363)

If both SubWidthC and SubHeightC are equal to 2, the following applies:

*F*1[0]=1,*F*1[1]=1          (364)

*F*3[0][1]=1,*F*3[1][1]=4,*F*3[2][1]=1,*F*3[1][0]=1,*F*3[1][2]=1          (365)

$F4[0][1]=1, F4[1][1]=2, F4[2][1]=1$ (366)

$F4[0][2]=1, F4[1][2]=2, F4[2][2]=1$ (367)

Otherwise, the following applies:

$F3[1][1]=8$ (368)

$F4[0][1]=2, F4[1][1]=4, F4[2][1]=2,$ (369)

If sps_chroma_vertical_collocated_flag is equal to 1, the following applies:
pDsY[x][y] with x=0 . . . nTbW−1, y=0 . . . nTbH−1 is derived as follows:

$pDsY[x][y]=(F3[1][0]*pY[SubWidthC*x]$
$[SubHeightC*y-1]+F3[0][1]*pY[SubWidthC*x-1][SubHeightC*y]+F3[1][1]*pY[SubWidthC*x][SubHeightC*y]+F3[2][1]*pY[SubWidthC*x+1][SubHeightC*y]+F3[1][2]*pY[SubWidthC*x][SubHeightC*y+1]+4)>>3$ (370)

Otherwise (sps_chroma_vertical_collocated_flag is equal to 0), the following applies:
pDsY[x][y] with x=0 . . . nTbW−1, y=0 . . . nTbH−1 is derived as follows:

$pDsY[x][y]=(F4[0][1]*pY[SubWidthC*x-1]$
$[SubHeightC*y]+F4[0][2]*pY[SubWidthC*x-1][SubHeightC*y+1]+F4[1][1]*pY[SubWidthC*x][SubHeightC*y]+F4[1][2]*pY[SubWidthC*x][SubHeightC*y+1]+F4[2][1]*pY[SubWidthC*x+1][SubHeightC*y]+F4[2][2]*pY[SubWidthC*x+1][SubHeightC*y+1]+4)>>3$ (371)

4.  4. When numSampT is greater than 0, , the selected neighboring top chroma samples pSelC [ idx ] are set equal to p[ pickPosT[ idx ] ][ −1 ] with idx = 0.. cntT−1 , and the down-sampled neighbouring top luma samples pSelDsY[ idx ] with idx = 0.. cntT−1 are specified as follows:
- The variable x is set equal to pickPosT[ idx ] .
- If both SubWidthC and SubHeightC are equal to 1, , the following applies:
  pSelDsY[ idx ] = pY[ x ][−1] (375)
- Otherwise, the following applies:
  - If sps_chroma_vertical_ collocated_flag is equal to 1, the following applies:
    - If bCTUboundary is equal to FALSE , the following applies:
      pSelDsY[ idx ] = ( F3[ 1 ][ 0 ]
       * pY[ SubWidthC * x ][ −1−SubHeightC] +
       F3[ 0 ][ 1 ] * pY[ SubWidthC * x − 1
       ][ −SubHeightC] +
       F3[ 1 ][ 1 ] * pY[ SubWidthC * x ][
       −SubHeightC] +(376)
       F3[ 2 ][ 1 ] * pY [ SubWidthC * x + 1
       ][ −SubHeightC] +
       F3[ 1 ][ 2 ] * pY [ SubWidthC * x
       ][ 1 − SubHeightC ] + 4 ) >> 3
    - Otherwise (bCTUboundary is equal to TRUE , the following applies:
      pSelDsY[ idx ] = ( F2[ 0 ] * pY[ SubWidth
       C * x − 1 ][ −1 ] +
       ( F2[ 1 ] * pY[ SubWidthC * x ][ −1 ] + (377)
       F2[ 2 ] * pY[ SubWidth
       C * x + 1 ][ −1 ] + 2 ) >> 2

- Otherwise (sps_chroma_ vertical_collocated_flag is equal to 0), , the following applies:
  - If bCTUboundary is equal to FALSE, , the following applies:
    pSelDsY[ idx ] = ( F4[ 0 ][ 1 ] * pY[ SubWidth
     C x −1 ][−1 ] +
     F4[ 0 ][ 2 ] * pY[ SubWidth C * x −1 ][ −2 ] +
     F4[ 1 ][ 1 ] * pY[ SubWidth
     C * x ][ −1 ] + (378)
     F4[ 1 ][ 2 ] * pY[ SubWidth C * x ][ 2 ] +
     F4[ 2 ][ 1 ] * pY[ SubWidth C * x + 1 ][ −1 ] +
     F4[ 2 ][ 2 ] * pY[ SubWidth
     C * x + 1 ][ −2 ] + 4 ) >> 3
  - Otherwise (bCTUboundary is equal to TRUE) , the following applies:
    pSelDsY[ idx ] = ( F2[ 0 ] * pY
     [ SubWidthC * x − 1 ][ −1 ] +
     F2[ 1 ] * pY[ SubWidth C * x ][ −1 ] + (379)
     F2[ 2 ] * pY[ SubWidth
     C * x + 1][ −1 ] + 2 ) >> 2

5. When numSampL is greater than 0, , the selected neighbouring left chroma samples pSelC[ idx ] are set equal to p[ −1 ][ pickPosL[ idx −cntT] ] with idx = cntT..cntT + cntL−1, , and the selected down-sampled neighbouring left luma samples pSelDsY[ idx ] with idx = cntT.. cntT + cnt1, , −1 are derived as follows:
- The variable y is set equal to pickPosL[ idx − cntT] .
- If both SubWidthC and SubHeightC are equal to 1, , the following applies:
  pSelDsY[ idx ] = pY[ −1 ][ y ] (372)
- Otherwise the following applies:
  - If sps_chroma_vertical_collocated_ flag is equal to 1, , the following applies:
    pSelDsY[ idx ] = ( F3[ 1 ][ 0 ] *
     pY[−SubWidthC ][ SubHeight C * y −1 ] +
     F3[ 0 ][ 1 ] * pY[−1−SubWidthC ][
     SubHeightC * y ] +
     F3[ 1 ][ 1 ] * pY[−SubWidth
     C ][ SubHeightC * y ] + (373)
     F3[ 2 ][ 1 ] * pY[ 1− SubWidthC ][
     SubHeightC * y ] +
     F3[ 1 ][ 2 ] * pY[− SubWidthC ][ SubHeight
     C * y + 1 ] + 4 ) >> 3
  - Otherwise (sps_chroma_vertical_ collocated_flag is equal to 0) , the following applies:
    pSelDsY[ idx ] = ( F4[ 0 ][ 1 ] * p
     SubWidthC ][ SubHeight C * y ]+
     F4[ 0 ][ 2 ] * pY[ −1 −
     SubWidthC ][ SubHeight C * y + 1 ] +
     F4[ 1 ][ 1 ] * pY[SubWidthC ][ SubHeight
     C * y ] +                 (374)
     F4[ 1 ][ 1 ] * pY[ SubWidthC ][ SubHeight
     C * y + 1] +
     F4[ 2 ][ 1 ] * pY[ 1− SubWidthC ][ SubHeight
     C * y ] +
     F4[ 2 ][ 2 ] * pY[ 1− SubWidthC ][ SubHeight
     C * y + 1 ] + 4 ) >> 3

6. When cntT+cntL is not equal to 0, the variables minY, maxY, minC and maxC are derived as follows:

When cntT+cntL is equal to 2, pSelComp[3] is set equal to pSelComp[0], pSelComp[2] is set equal to pSelComp[1], pSelComp[0] is set equal to pSelComp[1], and pSelComp[1] is set equal to pSelComp[3], with Comp being replaced by DsY and C.

The arrays minGrpIdx and maxGrpIdx are derived as follows:

$$minGrpIdx[0]=0 \quad (380)$$

$$minGrpIdx[1]=2 \quad (381)$$

$$maxGrpIdx[0]=1 \quad (382)$$

$$maxGrpIdx[1]=3 \quad (383)$$

When pSelDsY[minGrpIdx[0]] is greater than pSelDsY[minGrpIdx[1]], minGrpIdx[0] and minGrpIdx[1] are swapped as follows:

$$(minGrpIdx[0],minGrpIdx[1])=Swap(minGrpIdx[0],minGrpIdx[1]) \quad (384)$$

When pSelDsY[maxGrpIdx[0]] is greater than pSelDsY[maxGrpIdx[1]], maxGrpIdx[0] and maxGrpIdx[1] are swapped as follows:

$$(maxGrpIdx[0],maxGrpIdx[1])=Swap(maxGrpIdx[0],maxGrpIdx[1]) \quad (385)$$

When pSelDsY[minGrpIdx[0]] is greater than pSelDsY[maxGrpIdx[1]], arrays minGrpIdx and maxGrpIdx are swapped as follows:

$$(minGrpIdx,maxGrpIdx)=Swap(minGrpIdx,maxGrpIdx) \quad (386)$$

When pSelDsY[minGrpIdx[1]] is greater than pSelDsY[maxGrpIdx[0]], minGrpIdx[1] and maxGrpIdx[0] are swapped as follows:

$$(minGrpIdx[1],maxGrpIdx[0])=Swap(minGrpIdx[1],maxGrpIdx[0]) \quad (387)$$

The variables maxY, maxC, minY and minC are derived as follows:

$$maxY=(pSelDsY[maxGrpIdx[0]]+pSelDsY[maxGrpIdx[1]]+1)>>1 \quad (388)$$

$$maxC=(pSelC[maxGrpIdx[0]]+pSelC[maxGrpIdx[1]]+1)>>1 \quad (389)$$

$$minY=(pSelDsY[minGrpIdx[0]]+pSelDsY[minGrpIdx[1]]+1)>>1 \quad (390)$$

$$minC=(pSelC[minGrpIdx[0]]+pSelC[minGrpIdx[1]]+1)>>1 \quad (391)$$

7. The variables a, b, and k are derived as follows:
If numSampL is equal to 0, and numSampT is equal to 0, the following applies:

$$k=0 \quad (392)$$

$$a=0 \quad (393)$$

$$b=1<<(BitDepth-1) \quad (394)$$

Otherwise, the following applies:

$$diff=maxY-minY \quad (395)$$

If diff is not equal to 0, the following applies:

$$diffC=maxC-minC \quad (396)$$

$$x=Floor(Log\ 2(diff)) \quad (397)$$

$$normDiff=((diff<<4)>>x)\&15 \quad (398)$$

$$x+=(normDiff!=0)?1:0 \quad (399)$$

$$y=Abs(diffC)>0?Floor(Log\ 2(Abs(diffC)))+1:0 \quad (400)$$

$$a=(diffC*(divSigTable[normDiff]|8)+2^{y-1})>>y \quad (401)$$

$$k=((3+x-y)<1)?1:3+x-y \quad (402)$$

$$a=((3+x-y)<1)?Sign(a)*15:a \quad (403)$$

$$b=minC-((a*minY)>>k) \quad (404)$$

where divSigTable[ ] is specified as follows:

$$divSigTable[\ ]=\{0,7,6,5,5,4,4,3,3,2,2,1,1,1,1,0\} \quad (405)$$

Otherwise (diff is equal to 0), the following applies:

$$k=0 \quad (406)$$

$$a=0 \quad (407)$$

$$b=minC \quad (408)$$

8. The prediction samples predSamples[x][y] with x=0 . . . nTbW−1, y=0 . . . nTbH−1 are derived as follows:

$$predSamples[x][y]=Clip1(((pDsY[x][y]*a)>>k)+b) \quad (409)$$

NOTE—This process uses sps_chroma_vertical_collocated_flag. However, in order to simplify implementation, it does not use sps_chroma_horizontal_collocated_flag.

5.5. Embodiment 5

The working draft specified in JVET-Q2001-vE may be changed as below.

8.4.5.2.13
Inputs to this process are:
the intra prediction mode predModeIntra,
a sample location (xTbC, yTbC) of the top-left sample of the current transform block relative to the top-left sample of the current picture,
a variable nTbW specifying the transform block width,
a variable nTbH specifying the transform block height,
a variable cIdx specifying the colour component of the current block,
chroma neighbouring samples p[x][y], with x=−1, y=0 . . . 2*nTbH−1 and x=0 . . . 2*nTbW−1, y=−1.

Output of this process are predicted samples predSamples[x][y], with x=0 . . . nTbW−1, y=0 . . . nTbH−1.

The current luma location (xTbY, yTbY) is derived as follows:

$$(xTbY,yTbY)=(xTbC<<(SubWidthC-1),yTbC<<(SubHeightC-1)) \quad (351)$$

The variables availL, availT and availTL are derived as follows:
The derivation process for neighbouring block availability as specified in clause 6.4.4 is invoked with the current luma location (xCurr, yCurr) set equal to (xTbY, yTbY), the neighbouring luma location (xTbY−1, yTbY), checkPredModeY set equal to FALSE, and cIdx as inputs, and the output is assigned to availL.
The derivation process for neighbouring block availability as specified in clause 6.4.4 is invoked with the current luma location (xCurr, yCurr) set equal to (xTbY, yTbY), the neighbouring luma location (xTbY, yTbY−1), checkPredModeY set equal to FALSE, and cIdx as inputs, and the output is assigned to availT.

The variable availTL is derived as follows:

availTL=availL&&availT (352)

The number of available top-right neighbouring chroma samples numTopRight is derived as follows:
  The variable numTopRight is set equal to 0 and availTR is set equal to TRUE.
  When predModeIntra is equal to INTRA_T_CCLM, the following applies for x=nTbW . . . 2*nTbW−1 until availTR is equal to FALSE or x is equal to 2*nTbW−1:
    The derivation process for neighbouring block availability as specified in clause 6.4.4 is invoked with the current luma location (xCurr, yCurr) set equal to (xTbY, yTbY) the neighbouring luma location (xTbY+x, yTbY−1), checkPredModeY set equal to FALSE, and cIdx as inputs, and the output is assigned to availTR
    When availTR is equal to TRUE, numTopRight is incremented by one.

The number of available left-below neighbouring chroma samples numLeftBelow is derived as follows:
  The variable numLeftBelow is set equal to 0 and availLB is set equal to TRUE.
  When predModeIntra is equal to INTRA_L_CCLM, the following applies for y=nTbH . . . 2*nTbH−1 until availLB is equal to FALSE or y is equal to 2*nTbH−1:
    The derivation process for neighbouring block availability as specified in clause 6.4.4 is invoked with the current luma location (xCurr, yCurr) set equal to (xTbY, yTbY), the neighbouring luma location (xTbY−1, yTbY+y), checkPredModeY set equal to FALSE, and cIdx as inputs, and the output is assigned to availLB
    When availLB is equal to TRUE, numLeftBelow is incremented by one.

The number of available neighbouring chroma samples on the top and top-right numSampT and the number of available neighbouring chroma samples on the left and left-below numSampL are derived as follows:
  If predModeIntra is equal to INTRA_LT_CCLM, the following applies:

numSampT=availT?nTbW:0 (353)

numSampL=availL?nTbH:0 (354)

Otherwise, the following applies:

numSampT=
  (availT&&predModeIntra==INTRA_T_CCLM)?
  (nTbW+Min(numTopRight,nTbH)):0 (355)

numSampL=
  (availL&&predModeIntra==INTRA_L_CCLM)?
  (nTbH+Min(numLeftBelow,nTbW)):0 (356)

The variable bCTUboundary is derived as follows:

bCTUboundary=(yTbY&(CtbSizeY−1)==0)?TRUE:
  FALSE. (357)

The variable cntN and array pickPosN with N being replaced by L and T, are derived as follows:
  The variable numIs4N is derived as follows:

numIs4N=
  ((availT&&availL&&predModeIntra==INTRA_LT_CCLM)
  ?0:1) (358)

The variable startPosN is set equal to numSampN>>(2+numIs4N).

The variable pickStepN is set equal to Max(1, numSampN>>(1+numIs4N)).
If availN is equal to TRUE and predModeIntra is equal to INTRA_LT_CCLM or INTRA_N_CCLM, the following assignments are made:
  cntN is set equal to Min(numSampN, (1+numIs4N)<<1).
  pickPosN[pos] is set equal to (startPosN+ pos*pickStepN), with pos=0 . . . cntN−1.
Otherwise, cntN is set equal to 0.
The prediction samples predSamples[x][y] with x=0 . . . nTbW−1, y=0 . . . nTbH−1 are derived as follows:
  If both numSampL and numSampT are equal to 0, the following applies:

predSamples[x][y]=1<<(BitDepth−1) (359)

Otherwise, the following ordered steps apply:
    1. The collocated luma samples pY[x][y] with x=0 . . . nTbW*SubWidthC−1, y=0 . . . nTbH*SubHeightC−1 are set equal to the reconstructed luma samples prior to the deblocking filter process at the locations (xTbY+x, yTbY+y).
    2. The neighbouring luma samples pY[x][y] are derived as follows:
      When numSampL is greater than 0, the neighbouring left luma samples pY[x][y] with x=−1 . . . −3, y=0 . . . SubHeightC*numSampL−1, are set equal to the reconstructed luma samples prior to the deblocking filter process at the locations (xTbY+x, yTbY+y).
      When availT is equal to FALSE, the neighbouring top luma samples pY[x][y] with x=−1 . . . SubWidthC*numSampT−1, y=−1 . . . −2, are set equal to the luma samples pY[x][0].
      When availL is equal to FALSE, the neighbouring left luma samples pY[x][y] with x=−1 . . . −3, y=−1 . . . SubHeightC*numSampL−1, are set equal to the luma samples pY[0][y].
      When numSampT is greater than 0, the neighbouring top luma samples pY[x][y] with x=0 . . . SubWidthC*numSampT−1, y=−1, −2, are set equal to the reconstructed luma samples prior to the deblocking filter process at the locations (xTbY+x, yTbY+y).
      When availTL is equal to TRUE, the neighbouring top-left luma samples pY[x][y] with x=−1, y=−1, −2, are set equal to the reconstructed luma samples prior to the deblocking filter process at the locations (xTbY+x, yTbY+y).
    3. The down-sampled collocated luma samples pDsY[x][y] with x=0 . . . nTbW−1, y=0 . . . nTbH−1 are derived as follows:
      If both SubWidthC and SubHeightC are equal to 1, the following applies:
        pDsY[x][y] with x=1 . . . nTbW−1, y=1 . . . nTbH−1 is derived as follows:

pDstY[x][y]=pY[x][y] (360)

Otherwise, the following applies:
        The one-dimensional filter coefficients array F1 and F2, and the 2-dimensional filter coefficients arrays F3 and F4 are specified as follows.

F1[0]=2,F1[1]=0 (361)

F2[0]=1,F2[1]=2,F2[2]=1 (362)

F3[i][j]=F4[i][j]=0,with i=0 . . . 2,j=0 . . . 2 (363)

If both SubWidthC and SubHeightC are equal to 2, the following applies:

$$F1[0]=1, F1[1]=1 \tag{364}$$

$$F3[0][1]=1, F3[1][1]=4, F3[2][1]=1, F3[1][0]=1, F3[1][2]=1 \tag{365}$$

$$F4[0][1]=1, F4[1][1]=2, F4[2][1]=1 \tag{366}$$

$$F4[0][2]=1, F4[1][2]=2, F4[2][2]=1 \tag{367}$$

Otherwise, the following applies:

$$F3[1][1]=8 \tag{368}$$

$$F4[0][1]=2, F4[1][1]=4, F4[2][1]=2, \tag{369}$$

If sps_chromavertical_collocated_flag is equal to 1, the following applies:
pDsY[x][y] with x=0 ... nTbW−1, y=0 ... nTbH−1 is derived as follows:

$$pDsY[x][y]=(F3[1][0]*pY[\text{SubWidth}C*x][\text{SubHeight}C*y−1]+F3[0][1]*pY[\text{SubWidth}C*x−1][\text{SubHeight}C*y]+F3[1][1]*pY[\text{SubWidth}C*x][\text{SubHeight}C*y]+F3[2][1]*pY[\text{SubWidth}C*x+1][\text{SubHeight}C*y]+F3[1][2]*pY[\text{SubWidth}C*x][\text{SubHeight}C*y+1]+4)>>3 \tag{370}$$

Otherwise (sps_chromavertical_collocated_flag is equal to 0), the following applies:
pDsY[x][y] with x=0 ... nTbW−1, y=0 ... nTbH−1 is derived as follows:

$$pDsY[x][y]=(F4[0][1]*pY[\text{SubWidth}C*x−1][\text{SubHeight}C*y]+F4[0][2]*pY[\text{SubWidth}C*x−1][\text{SubHeight}C*y+1]+F4[1][1]*pY[\text{SubWidth}C*x][\text{SubHeight}C*y]+F4[1][2]*pY[\text{SubWidth}C*x][\text{SubHeight}C*y+1]+F4[2][1]*pY[\text{SubWidth}C*x+1][\text{SubHeight}C*y]+F4[2][2]*pY[\text{SubWidth}C*x+1][\text{SubHeight}C*y+1]+4)>>3 \tag{371}$$

4. When numSampL is greater than 0, the selected neighbouring left chroma samples pSelC[idx] are set equal to p[−1][pickPosL[idx]] with idx=0 ... cntL−1, and the selected down-sampled neighbouring left luma samples pSelDsY[idx] with idx=0 ... cntL−1 are derived as follows:
The variable y is set equal to pickPosL[idx].
If both SubWidthC and SubHeightC are equal to 1, the following applies:

$$pSelDsY[idx]=pY[−1][y] \tag{372}$$

Otherwise the following applies:
If sps_chroma_vertical_collocated_flag is equal to 1, the following applies:

$$pSelDsY[idx]=(F3[1][0]*pY[−\text{SubWidth}C][\text{SubHeight}C*y−1]+F3[0][1]*pY[−1−\text{SubWidth}C][\text{SubHeight}C*y]+F3[1][1]*pY[−\text{SubWidth}C][\text{SubHeight}C*y]+F3[2][1]*pY[1−\text{SubWidth}C][\text{SubHeight}C*y]+F3[1][2]*pY[−\text{SubWidth}C][\text{SubHeight}C*y+1]+4)>>3 \tag{373}$$

Otherwise (sps_chroma_vertical_collocated_flag is equal to 0), the following applies:

$$pSelDsY[idx]=(F4[0][1]*pY[−1−\text{SubWidth}C][\text{SubHeight}C*y]+F4[0][2]*pY[−1−\text{SubWidth}C][\text{SubHeight}C*y+1]+F4[1][1]*pY[−\text{SubWidth}C][\text{SubHeight}C*y]+F4[1][2]*pY[−\text{SubWidth}C][\text{SubHeight}C*y+1]+F4[2][1]*pY[1−\text{SubWidth}C][\text{SubHeight}C*y]+F4[2][2]*pY[1−\text{SubWidth}C][\text{SubHeight}C*y+1]+4)>>3 \tag{374}$$

5. When numSampT is greater than 0, the selected neighbouring top chroma samples pSelC[idx] are set equal to p[pickPosT[idx−cntL]][−1] with idx= cntL ... cntL+cntT−1, and the down-sampled neighbouring top luma samples pSelDsY[idx] with idx= [[0]]cntL ... cntL+cntT−1 are specified as follows:
The variable x is set equal to pickPosT[idx−cntL].
If both SubWidthC and SubHeightC are equal to 1, the following applies:

$$pSelDsY[idx]=pY[x][−1] \tag{375}$$

Otherwise, the following applies:
If sps_chroma_vertical_collocated_flag is equal to 1, the following applies:
If bCTUboundary is equal to FALSE, the following applies:

$$pSelDsY[idx]=(F3[1][0]*pY[\text{SubWidth}C*x][−1−\text{SubHeight}C]+F3[0][1]*pY[\text{SubWidth}C*x−1][−\text{SubHeight}C]+F3[1][1]*pY[\text{SubWidth}C*x][−\text{SubHeight}C]+F3[2][1]*pY[\text{SubWidth}C*x+1][−\text{SubHeight}C]+F3[1][2]*pY[\text{SubWidth}C*x][1−\text{SubHeight}C]+4)>>3 \tag{376}$$

Otherwise (bCTUboundary is equal to TRUE), the following applies:

$$pSelDsY[idx]=(F2[0]*pY[\text{SubWidth}C*x−1][−1]+F2[1]*pY[\text{SubWidth}C*x][−1]+F2[2]*pY[\text{SubWidth}C*x+1][−1]+2)>>2 \tag{377}$$

Otherwise (sps_chroma_vertical_collocated_flag is equal to 0), the following applies:
If bCTUboundary is equal to FALSE, the following applies:

$$pSelDsY[idx]=(F4[0][1]*pY[\text{SubWidth}C x−1][−1]+F4[0][2]*pY[\text{SubWidth}C*x−1][−2]+F4[1][1]*pY[\text{SubWidth}C*x][−1]+F4[1][2]*pY[\text{SubWidth}C*x][−2]+F4[2][1]*pY[\text{SubWidth}C*x+1][−1]+F4[2][2]*pY[\text{SubWidth}C*x+1][−2]+4)>>3 \tag{378}$$

Otherwise (bCTUboundary is equal to TRUE), the following applies:

$$pSelDsY[idx]=(F2[0]*pY[\text{SubWidth}C*x−1][−1]+F2[1]*pY[\text{SubWidth}C*x][−1]+F2[2]*pY[\text{SubWidth}C*x+1][−1]+2)>>2 \tag{379}$$

6. When cntT+cntL is not equal to 0, the variables minY, maxY, minC and maxC are derived as follows:
When cntT+cntL is equal to 2, pSelComp[3] is set equal to pSelComp[0], pSelComp[2] is set equal to pSelComp[1], pSelComp[0] is set equal to pSelComp[1], and pSelComp[1] is set equal to pSelComp[3], with Comp being replaced by DsY and C.
The arrays minGrpIdx and maxGrpIdx are derived as follows:

$$minGrpIdx[0]=0 \tag{380}$$

$$minGrpIdx[1]=2 \tag{381}$$

$$maxGrpIdx[0]=1 \tag{382}$$

$$maxGrpIdx[1]=3 \tag{383}$$

When pSelDsY[minGrpIdx[0]] is greater than pSelDsY[minGrpIdx[1]], minGrpIdx[0] and minGrpIdx[1] are swapped as follows:

$$(minGrpIdx[0],minGrpIdx[1])=Swap(minGrpIdx[0],minGrpIdx[1]) \tag{384}$$

When pSelDsY[maxGrpIdx[0]] is greater than pSelDsY[maxGrpIdx[1]], maxGrpIdx[0] and maxGrpIdx[1] are swapped as follows:

$$(maxGrpIdx[0],maxGrpIdx[1])=Swap(maxGrpIdx[0],maxGrpIdx[1]) \tag{385}$$

When pSelDsY[minGrpIdx[0]] is greater than pSelDsY[maxGrpIdx[1]], arrays minGrpIdx and maxGrpIdx are swapped as follows:

(minGrpIdx,maxGrpIdx)=Swap(minGrpIdx, maxGrpIdx) (386)

When pSelDsY[minGrpIdx[1]] is greater than pSelDsY[maxGrpIdx[0]], minGrpIdx[1] and maxGrpIdx[0] are swapped as follows:

(minGrpIdx[1],maxGrpIdx[0])=Swap(minGrpIdx[1], maxGrpIdx[0]) (387)

The variables maxY, maxC, minY and minC are derived as follows:

$maxY=(pSelDsY[maxGrpIdx[0]]+pSelDsY[maxGrpIdx[1]]+1)>>1$ (388)

$maxC=(pSelC[maxGrpIdx[0]]+pSelC[maxGrpIdx[1]]+1)>>1$ (389)

$minY=(pSelDsY[minGrpIdx[0]]+pSelDsY[minGrpIdx[1]]+1)>>1$ (390)

$minC=(pSelC[minGrpIdx[0]]+pSelC[minGrpIdx[1]]+1)>>1$ (391)

7. The variables a, b, and k are derived as follows:
   If numSampL is equal to 0, and numSampT is equal to 0, the following applies:

$k=0$ (392)

$a=0$ (393)

$b=1<<(BitDepth-1)$ (394)

Otherwise, the following applies:

$diff=maxY-minY$ (395)

If diff is not equal to 0, the following applies:

$diffC=maxC-minC$ (396)

$x=Floor(Log\ 2(diff))$ (397)

$normDiff=((diff<<4)>>x)\&15$ (398)

$x+=(normDiff!=0)?1:0$ (399)

$y=Abs(diffC)>0?Floor(Log\ 2(Abs(diffC)))+1:0$ (400)

$a=(diffC*(divSigTable[normDiff]|8)+2^{y-1})>>y$ (401)

$k=((3+x-y)<1)?1:3+x-y$ (402)

$a=((3+x-y)<1)?Sign(a)*15:a$ (403)

$b=minC-((a*minY)>>k)$ (404)

where divSigTable[ ] is specified as follows:

divSigTable[ ]={0,7,6,5,5,4,4,3,3,2,2,1,1,1,1,0} (405)

Otherwise (diff is equal to 0), the following applies:

$k=0$ (406)

$a=0$ (407)

$b=minC$ (408)

8. The prediction samples predSamples[x][y] with x=0 . . . nTbW−1, y=0 . . . nTbH−1 are derived as follows:

$predSamples[x][y]=Clip1(((pDsY[x][y]*a)>>k)+b)$ (409)

NOTE—This process uses sps_chroma_vertical_collocated_flag. However, in order to simplify implementation, it does not use sps_chroma_horizontal_collocated_flag.

5.6. Embodiment 6

The working draft specified in JVET-Q2001-vE may be changed as below.
8.4.5.2.13
Inputs to this process are:
  the intra prediction mode predModeIntra,
  a sample location (xTbC, yTbC) of the top-left sample of the current transform block relative to the top-left sample of the current picture,
  a variable nTbW specifying the transform block width,
  a variable nTbH specifying the transform block height,
  a variable cIdx specifying the colour component of the current block,
  chroma neighbouring samples p[x][y], with x=−1, y=0 . . . 2*nTbH−1 and x=0 . . . 2*nTbW−1, y=−1.
Output of this process are predicted samples predSamples[x][y], with x=0 . . . nTbW−1, y=0 . . . nTbH−1.
The current luma location (xTbY, yTbY) is derived as follows:

$(xTbY,yTbY)=(xTbC<<(SubWidthC-1),yTbC<<(SubHeightC-1))$ (351)

The variables availL, availT and availTL are derived as follows:
  The derivation process for neighbouring block availability as specified in clause 6.4.4 is invoked with the current luma location (xCurr, yCurr) set equal to (xTbY, yTbY), the neighbouring luma location (xTbY−1, yTbY), checkPredModeY set equal to FALSE, and cIdx as inputs, and the output is assigned to availL.
  The derivation process for neighbouring block availability as specified in clause 6.4.4 is invoked with the current luma location (xCurr, yCurr) set equal to (xTbY, yTbY), the neighbouring luma location (xTbY, yTbY−1), checkPredModeY set equal to FALSE, and cIdx as inputs, and the output is assigned to availT.
The variable availTL is derived as follows:

$availTL=availL\&\&availT$ (352)

The number of available top-right neighbouring chroma samples numTopRight is derived as follows:
  The variable numTopRight is set equal to 0 and availTR is set equal to TRUE.
  When predModeIntra is equal to INTRA_T_CCLM, the following applies for x=nTbW . . . 2*nTbW−1 until availTR is equal to FALSE or x is equal to 2*nTbW−1:
    The derivation process for neighbouring block availability as specified in clause 6.4.4 is invoked with the current luma location (xCurr, yCurr) set equal to (xTbY, yTbY) the neighbouring luma location (xTbY+x, yTbY−1), checkPredModeY set equal to FALSE, and cIdx as inputs, and the output is assigned to availTR
    When availTR is equal to TRUE, numTopRight is incremented by one.
The number of available left-below neighbouring chroma samples numLeftBelow is derived as follows:
  The variable numLeftBelow is set equal to 0 and availLB is set equal to TRUE.

When predModeIntra is equal to INTRA_L_CCLM, the following applies for y=nTbH . . . 2*nTbH−1 until availLB is equal to FALSE or y is equal to 2*nTbH−1:
  The derivation process for neighbouring block availability as specified in clause 6.4.4 is invoked with the current luma location (xCurr, yCurr) set equal to (xTbY, yTbY), the neighbouring luma location (xTbY−1, yTbY+y), checkPredModeY set equal to FALSE, and cIdx as inputs, and the output is assigned to availLB
  When availLB is equal to TRUE, numLeftBelow is incremented by one.

The number of available neighbouring chroma samples on the top and top-right numSampT and the number of available neighbouring chroma samples on the left and left-below numSampL are derived as follows:

If predModeIntra is equal to INTRA_LT_CCLM, the following applies:

$$\text{numSamp}T=\text{avail}T?nTbW:0 \quad (353)$$

$$\text{numSamp}L=\text{avail}L?nTbH:0 \quad (354)$$

Otherwise, the following applies:

$$\text{numSamp}T= (\text{avail}T\&\&\text{predModeIntra}==\text{INTRA\_}T\_\text{CCLM})? \\ (nTbW+\text{Min}(\text{numTopRight},nTbH)):0 \quad (355)$$

$$\text{numSamp}L= (\text{avail}L\&\&\text{predModeIntra}==\text{INTRA\_}L\_\text{CCLM})? \\ (nTbH+\text{Min}(\text{numLeftBelow},nTbW)):0 \quad (356)$$

The variable bCTUboundary is derived as follows:

$$b\text{CTUboundary}=(yTbY\&(CtbSizeY-1)==0)?\text{TRUE}: \\ \text{FALSE}. \quad (357)$$

The variable cntN and array pickPosN with N being replaced by L and T, are derived as follows:
  The variable numIs4N is derived as follows:

$$\text{numIs4}N= \\ ((\text{avail}T\&\&\text{avail}L\&\&\text{predModeIntra}==\text{INTRA\_}LT\_\text{CCLM}) \\ ?0:1) \quad (358)$$

The variable startPosN is set equal to numSampN>>(2+numIs4N).
  The variable pickStepN is set equal to Max(1, numSampN>>(1+numIs4N)).
  If availN is equal to TRUE and predModeIntra is equal to INTRA_LT_CCLM or INTRA_N_CCLM, the following assignments are made:
    cntN is set equal to Min(numSampN, (1+numIs4N)<<1).
    pickPosN[pos] is set equal to (startPosN+pos*pickStepN), with pos=0 . . . cntN−1.
  Otherwise, cntN is set equal to 0.

The prediction samples predSamples[x][y] with x=0 . . . nTbW−1, y=0 . . . nTbH−1 are derived as follows:
  If both numSampL and numSampT are equal to 0, the following applies:

$$\text{predSamples}[x][y]=1<<(\text{BitDepth}-1) \quad (359)$$

Otherwise, the following ordered steps apply:
    1. The collocated luma samples pY[x][y] with x=0 . . . nTbW*SubWidthC−1, y=0 . . . nTbH*SubHeightC−1 are set equal to the reconstructed luma samples prior to the deblocking filter process at the locations (xTbY+x, yTbY+y).
    2. The neighbouring luma samples pY[x][y] are derived as follows:
      When numSampL is greater than 0, the neighbouring left luma samples pY[x][y] with x=−1 . . . −3, y=0 . . . SubHeightC*numSampL−1, are set equal to the reconstructed luma samples prior to the deblocking filter process at the locations (xTbY+x, yTbY+y).
      When availT is equal to FALSE, the neighbouring top luma samples pY[x][y] with x=−1 . . . SubWidthC*numSampT−1, y=−1 . . . −2, are set equal to the luma samples pY[x][0].
      When availL is equal to FALSE, the neighbouring left luma samples pY[x][y] with x=−1 . . . −3, y=−1 . . . SubHeightC*numSampL−1, are set equal to the luma samples pY[0][y].
      When numSampT is greater than 0, the neighbouring top luma samples pY[x][y] with x=0 . . . SubWidthC*numSampT−1, y=−1, 1[2]13, are set equal to the reconstructed luma samples prior to the deblocking filter process at the locations (xTbY+x, yTbY+y).
      When availTL is equal to TRUE, the neighbouring top-left luma samples pY[x][y] with x=−1, y=−1, −2, −3 are set equal to the reconstructed luma samples prior to the deblocking filter process at the locations (xTbY+x, yTbY+y).
    3. The down-sampled collocated luma samples pDsY[x][y] with x=0 . . . nTbW−1, y=0 . . . nTbH−1 are derived as follows:
      If both SubWidthC and SubHeightC are equal to 1, the following applies:
        pDsY[x][y] with x=1 . . . nTbW−1, y=1 . . . nTbH−1 is derived as follows:

$$pDstY[x][y]=pY[x][y] \quad (360)$$

Otherwise, the following applies:
        The one-dimensional filter coefficients array F1 and F2, and the 2-dimensional filter coefficients arrays F3 and F4 are specified as follows.

$$F1[0]=2,F1[1]=0 \quad (361)$$

$$F2[0]=1,F2[1]=2,F2[2]=1 \quad (362)$$

$$F3[i][j]=F4[i][j]=0, \text{with } i=0 \ldots 2, j=0 \ldots 2 \quad (363)$$

If both SubWidthC and SubHeightC are equal to 2, the following applies:

$$F1[0]=1,F1[1]=1 \quad (364)$$

$$F3[0][1]=1,F3[1][1]=4,F3[2][1]=1,F3[1][0]=1,F3[1][2]=1 \quad (365)$$

$$F4[0][1]=1,F4[1][1]=2,F4[2][1]=1 \quad (366)$$

$$F4[0][2]=1,F4[1][2]=2,F4[2][2]=1 \quad (367)$$

Otherwise, the following applies:

$$F3[1][1]=8 \quad (368)$$

$$F4[0][1]=2,F4[1][1]=4,F4[2][1]=2, \quad (369)$$

If sps_chromavertical_collocated_flag is equal to 1, the following applies:
          pDsY[x][y] with x=0 . . . nTbW−1, y=0 . . . nTbH−1 is derived as follows:

$$pDsY[x][y]=(F3[1][0]*pY[\text{SubWidth}C*x] \\ [\text{SubHeight}C*y-1]+F3[0][1]*pY[\text{SubWidth}C*x-1][\text{SubHeight}C*y]+F3[1][1]*pY[\text{SubWidth}C*x] \\ [\text{SubHeight}C*y]+F3[2][1]*pY[\text{SubWidth}C*x+1]$$

[SubHeight*C*\*y]+F3[1][2]\*pY[SubWidth*C*\*x]
[SubHeight*C*\*y+1]+4)>>3    (370)

Otherwise (sps_chroma_vertical_collocated_flag is equal to 0), the following applies:
  pDsY[x][y] with x=0 . . . nTbW−1, y=0 . . . nTbH−1 is derived as follows:

pDsY[x][y]=(F4[0][1]\*pY[SubWidth*C*\*x−1]
[SubHeight*C*\*y]+F4[0][2]\*pY[SubWidth*C*\*x−1]
[SubHeight*C*\*y+1]+F4[1][1]\*pY[SubWidth*C*\*x]
[SubHeight*C*\*y]+F4[1][2]\*pY[SubWidth*C*\*x]
[SubHeight*C*\*y+1]+F4[2][1]\*pY[SubWidth*C*\*x+
1][SubHeight*C*\*y]+F4[2][2]\*pY[SubWidth*C*\*x+
1][SubHeight*C*\*y+1]+4)>>3    (371)

4. When numSampL is greater than 0, the selected neighbouring left chroma samples pSelC[idx] are set equal to p[−1][pickPosL[idx]] with idx=0 . . . cntL−1, and the selected down-sampled neighbouring left luma samples pSelDsY[idx] with idx=0 . . . cntL−1 are derived as follows:
  The variable y is set equal to pickPosL[idx].
  If both SubWidthC and SubHeightC are equal to 1, the following applies:

pSelDsY[idx]=pY[−1][y]    (372)

Otherwise the following applies:
    If sps_chroma_vertical_collocated_flag is equal to 1, the following applies:

pSelDsY[idx]=(F3[1][0]\*pY[−SubWidthC]
[SubHeight*C*\*y−1]+F3[0][1]\*pY[−1−Sub-
WidthC][SubHeight*C*\*y]+F3[1][1]\*pY[−Sub-
WidthC][SubHeight*C*\*y]+F3[2][1]\*pY[1−
SubWidthC][SubHeight*C*\*y]+F3[1][2]\*pY[−
SubWidthC][SubHeight*C*\*y+1]+4)>>3    (373)

Otherwise (sps_chroma_vertical_collocated_flag is equal to 0), the following applies:

pSelDsY[idx]=(F4[0][1]\*pY[−1−SubWidthC]
[SubHeight*C*\*y]+F4[0][2]\*pY[−1−SubWidthC]
[SubHeight*C*\*y+1]+F4[1][1]\*pY[−SubWidthC]
[SubHeight*C*\*y]+F4[1][2]\*pY[−SubWidthC]
[SubHeight*C*\*y+1]+F4[2][1]\*pY[1−SubWidthC]
[SubHeight*C*\*y]+F4[2][2]\*pY[1−SubWidthC]
[SubHeight*C*\*y+1]+4)>>3    (374)

5. When numSampT is greater than 0, the selected neighbouring top chroma samples pSelC[idx] are set equal to p[pickPosT[idx−cntL]][−1] with idx=cntL . . . cntL+cntT−1, and the down-sampled neighbouring top luma samples pSelDsY[idx] with idx=0 . . . cntL+cntT−1 are specified as follows:
  The variable x is set equal to pickPosT[idx−cntL].
  If both SubWidthC and SubHeightC are equal to 1, the following applies:

pSelDsY[idx]=pY[x][−1]    (375)

Otherwise, the following applies:
    If sps_chroma_vertical_collocated_flag is equal to 1, the following applies:
      If bCTUboundary is equal to FALSE, the following applies:

pSelDsY[idx]=(F3[1][0]\*pY[SubWidth*C*\*x][−1−Sub-
HeightC]+F3[0][1]\*pY[SubWidth*C*\*x−1][−Sub-
HeightC]+F3[1][1]\*pY[SubWidth*C*\*x][−Sub-
HeightC]+F3[2][1]\*pY[SubWidth*C*\*x+1][−
SubHeightC]+F3[1][2]\*pY[SubWidth*C*\*x][1−
SubHeightC]+4)>>3    (376)

Otherwise (bCTUboundary is equal to TRUE), the following applies:

pSelDsY[idx]=(F2[0]\*pY[SubWidth*C*\*x−1][−1]+F2
[1]\*pY[SubWidth*C*\*x][−1]+F2[2]\*pY
[SubWidth*C*\*x+1][−1]+2)>>2    (377)

Otherwise (sps_chroma_vertical_collocated_flag is equal to 0), the following applies:
      If bCTUboundary is equal to FALSE, the following applies:

pSelDsY[idx]=(F4[0][1]\*pY[SubWidth*C* x−1][−1]+F4
[0][2]\*pY[SubWidth*C*\*x−1][−2]+F4[1][1]\*pY
[SubWidth*C*\*x][−1]+F4[1][2]\*pY[SubWidth*C*\*x]
[−2]+F4[2][1]\*pY[SubWidth*C*\*x+1][−1]+F4[2]
[2]\*pY[SubWidth*C*\*x+1][−2]+4)>>3    (378)

Otherwise (bCTUboundary is equal to TRUE), the following applies:

pSelDsY[idx]=(F2[0]\*pY[SubWidth*C*\*x−1][−1]+F2
[1]\*pY[SubWidth*C*\*x][−1]+F2[2]\*pY
[SubWidth*C*\*x+1][−1]+2)>>2    (379)

6. When cntT+cntL is not equal to 0, the variables minY, maxY, minC and maxC are derived as follows:
  When cntT+cntL is equal to 2, pSelComp[3] is set equal to pSelComp[0], pSelComp[2] is set equal to pSelComp[1], pSelComp[0] is set equal to pSelComp[1], and pSelComp[1] is set equal to pSelComp[3], with Comp being replaced by DsY and C.
  The arrays minGrpIdx and maxGrpIdx are derived as follows:

minGrpIdx[0]=0    (380)

minGrpIdx[1]=2    (381)

maxGrpIdx[0]=1    (382)

maxGrpIdx[1]=3    (383)

When pSelDsY[minGrpIdx[0]] is greater than pSelDsY[minGrpIdx[1]], minGrpIdx[0] and minGrpIdx[1] are swapped as follows:

(minGrpIdx[0],minGrpIdx[1])=Swap(minGrpIdx[0],
  minGrpIdx[1])    (384)

When pSelDsY[maxGrpIdx[0]] is greater than pSelDsY[maxGrpIdx[1]], maxGrpIdx[0] and maxGrpIdx[1] are swapped as follows:

(maxGrpIdx[0],maxGrpIdx[1])=Swap(maxGrpIdx[0],
  maxGrpIdx[1])    (385)

When pSelDsY[minGrpIdx[0]] is greater than pSelDsY[maxGrpIdx[1]], arrays minGrpIdx and maxGrpIdx are swapped as follows:

(minGrpIdx,maxGrpIdx)=Swap(minGrpIdx,
  maxGrpIdx)    (386)

When pSelDsY[minGrpIdx[1]] is greater than pSelDsY[maxGrpIdx[0]], minGrpIdx[1] and maxGrpIdx[0] are swapped as follows:

(minGrpIdx[1],maxGrpIdx[0])=Swap(minGrpIdx[1],
  maxGrpIdx[0])    (387)

The variables maxY, maxC, minY and minC are derived as follows:

maxY=(pSelDsY[maxGrpIdx[0]]+pSelDsY
  [maxGrpIdx[1]]+1)>>1    (388)

maxC=(pSelC[maxGrpIdx[0]]+pSelC[maxGrpIdx
  [1]]+1)>>1    (389)

minY=(pSelDsY[minGrpIdx[0]]+pSelDsY[minGrpIdx
  [1]]+1)>>1    (390)

$minC = (pSelC[minGrpIdx[0]] + pSelC[minGrpIdx[1]] + 1) >> 1$ (391)

7. The variables a, b, and k are derived as follows:
   If numSampL is equal to 0, and numSampT is equal to 0, the following applies:

$k = 0$ (392)

$a = 0$ (393)

$b = 1 << (BitDepth - 1)$ (394)

Otherwise, the following applies:

$diff = maxY - minY$ (395)

If diff is not equal to 0, the following applies:

$diffC = maxC - minC$ (396)

$x = Floor(Log\,2(diff))$ (397)

$normDiff = ((diff << 4) >> x) \& 15$ (398)

$x += (normDiff\,!= 0)?1:0$ (399)

$y = Abs(diffC) > 0?Floor(Log\,2(Abs(diffC))) + 1:0$ (400)

$a = (diffC*(divSigTable[normDiff]|8) + 2^{y-1}) >> y$ (401)

$k = ((3 + x - y) < 1)?1:3 + x - y$ (402)

$a = ((3 + x - y) < 1)?Sign(a)*15:a$ (403)

$b = minC - ((a*minY) >> k)$ (404)

where divSigTable[ ] is specified as follows:

$divSigTable[\,] = \{0,7,6,5,5,4,4,3,3,2,2,1,1,1,1,0\}$ (405)

Otherwise (diff is equal to 0), the following applies:

$k = 0$ (406)

$a = 0$ (407)

$b = minC$ (408)

8. The prediction samples predSamples[x][y] with x=0 . . . nTbW−1, y=0 . . . nTbH−1 are derived as follows:

$predSamples[x][y] = Clip1(((pDsY[x][y]*a) >> k) + b)$ (409)

NOTE—This process uses sps_chroma_vertical_collocated_flag. However, in order to simplify implementation, it does not use sps_chroma_horizontal_collocated_flag.

5.7. Embodiment 7

The working draft specified in JVET-Q2001-vE may be changed as below.
8.4.5.2.13
Inputs to this process are:
 the intra prediction mode predModeIntra,
 a sample location (xTbC, yTbC) of the top-left sample of the current transform block relative to the top-left sample of the current picture,
 a variable nTbW specifying the transform block width,
 a variable nTbH specifying the transform block height,
 a variable cIdx specifying the colour component of the current block,
 chroma neighbouring samples p[x][y], with x=−1, y=0 . . . 2*nTbH−1 and x=0 . . . 2*nTbW−1, y=−1.

Output of this process are predicted samples predSamples[x][y], with x=0 . . . nTbW−1, y=0 . . . nTbH−1.
The current luma location (xTbY, yTbY) is derived as follows:

$(xTbY, yTbY) = (xTbC << (SubWidthC-1), yTbC << (SubHeightC-1))$ (351)

The variables availL, availT and availTL are derived as follows:
  The derivation process for neighbouring block availability as specified in clause 6.4.4 is invoked with the current luma location (xCurr, yCurr) set equal to (xTbY, yTbY), the neighbouring luma location (xTbY−1, yTbY), checkPredModeY set equal to FALSE, and cIdx as inputs, and the output is assigned to availL.
  The derivation process for neighbouring block availability as specified in clause 6.4.4 is invoked with the current luma location (xCurr, yCurr) set equal to (xTbY, yTbY), the neighbouring luma location (xTbY, yTbY−1), checkPredModeY set equal to FALSE, and cIdx as inputs, and the output is assigned to availT.
  The variable availTL is derived as follows:

$availTL = availL\,\&\&\,availT$ (352)

The number of available top-right neighbouring chroma samples numTopRight is derived as follows:
  The variable numTopRight is set equal to 0 and availTR is set equal to TRUE.
  When predModeIntra is equal to INTRA_T_CCLM, the following applies for x=nTbW . . . 2*nTbW−1 until availTR is equal to FALSE or x is equal to 2*nTbW−1:
    The derivation process for neighbouring block availability as specified in clause 6.4.4 is invoked with the current luma location (xCurr, yCurr) set equal to (xTbY, yTbY) the neighbouring luma location (xTbY+x, yTbY−1), checkPredModeY set equal to FALSE, and cIdx as inputs, and the output is assigned to availTR
    When availTR is equal to TRUE, numTopRight is incremented by one.
The number of available left-below neighbouring chroma samples numLeftBelow is derived as follows:
  The variable numLeftBelow is set equal to 0 and availLB is set equal to TRUE.
  When predModeIntra is equal to INTRA_L_CCLM, the following applies for y=nTbH . . . 2*nTbH−1 until availLB is equal to FALSE or y is equal to 2*nTbH−1:
    The derivation process for neighbouring block availability as specified in clause 6.4.4 is invoked with the current luma location (xCurr, yCurr) set equal to (xTbY, yTbY), the neighbouring luma location (xTbY−1, yTbY+y), checkPredModeY set equal to FALSE, and cIdx as inputs, and the output is assigned to availLB
    When availLB is equal to TRUE, numLeftBelow is incremented by one.
The number of available neighbouring chroma samples on the top and top-right numSampT and the number of available neighbouring chroma samples on the left and left-below numSampL are derived as follows:
  If predModeIntra is equal to INTRA_LT_CCLM, the following applies:

$numSampT = availT?nTbW:0$ (353)

$numSampL = availL?nTbH:0$ (354)

Otherwise, the following applies:

numSamp*T*=
(avail*T*&&predModeIntra==INTRA_*T*_CCLM)?
(*nTbW*+Min(numTopRight,*nTbH*)):0     (355)

numSamp*L*=
(avail*L*&&predModeIntra==INTRA_*L*_CCLM)?
(*nTbH*+Min(numLeftBelow,*nTbW*)):0     (356)

The variable bCTUboundary is derived as follows:

*b*CTUboundary=(*yTbY*&(*CtbSizeY*−1)==0)?TRUE:
FALSE.     (357)

The variable cntN and array pickPosN with N being replaced by L and T, are derived as follows:
The variable numIs4N is derived as follows:

numIs4*N*=
((avail*T*&&avail*L*&&predModeIntra==INTRA_*LT*_CCLM)
?0:1)     (358)

The variable startPosN is set equal to numSampN>>(2+numIs4N).
The variable pickStepN is set equal to Max(1, numSampN>>(1+numIs4N)).
If availN is equal to TRUE and predModeIntra is equal to INTRA_LT_CCLM or INTRA_N_CCLM, the following assignments are made:
  cntN is set equal to Min(numSampN, (1+numIs4N)<<1).
  pickPosN[pos] is set equal to (startPosN+pos*pickStepN), with pos=0 . . . cntN−1.
Otherwise, cntN is set equal to 0.
The prediction samples predSamples[x][y] with x=0 . . . nTbW−1, y=0 . . . nTbH−1 are derived as follows:
If both numSampL and numSampT are equal to 0, the following applies:

predSamples[*x*][*y*]=1<<(BitDepth−1)     (359)

Otherwise, the following ordered steps apply:
1. The collocated luma samples pY[x][y] with x=0 . . . nTbW*SubWidthC−1, y=0 . . . nTbH*SubHeightC−1 are set equal to the reconstructed luma samples prior to the deblocking filter process at the locations (xTbY+x, yTbY+y).
2. The neighbouring luma samples pY[x][y] are derived as follows:
   When numSampL is greater than 0, the neighbouring left luma samples pY[x][y] with x=−1 . . . −3, y=0 . . . SubHeightC*numSampL−1, are set equal to the reconstructed luma samples prior to the deblocking filter process at the locations (xTbY+x, yTbY+y).
   When availT is equal to FALSE, the neighbouring top luma samples pY[x][y] with x=−1 . . . SubWidthC*numSampT−1, y=−1 . . . [[−2]]−*(2+ sps_chroma_vertical_collocated_flag)*, are set equal to the luma samples pY[x][0].
   When availL is equal to FALSE, the neighbouring left luma samples pY[x][y] with x=−1 . . . −3, y=−1 . . . SubHeightC*numSampL−1, are set equal to the luma samples pY[0][y].
   When numSampT is greater than 0, the neighbouring top luma samples pY[x][y] with x=0 . . . SubWidthC*numSampT−1, y=−1 . . . −*(2+ sps_chroma_vertical_collocated_flag)* [[−2]], are set equal to the reconstructed luma samples prior to the deblocking filter process at the locations (xTbY+x, yTbY+y).

When availTL is equal to TRUE, the neighbouring top-left luma samples pY[x][y] with x=−1, y=−1, −2, are set equal to the reconstructed luma samples prior to the deblocking filter process at the locations (xTbY+x, yTbY+y).
3. The down-sampled collocated luma samples pDsY[x][y] with x=0 . . . nTbW−1, y=0 . . . nTbH−1 are derived as follows:
If both SubWidthC and SubHeightC are equal to 1, the following applies:
pDsY[x][y] with x=1 . . . nTbW−1, y=1 . . . nTbH−1 is derived as follows:

*pDstY*[*x*][*y*]=*pY*[*x*][*y*]     (360)

Otherwise, the following applies:
The one-dimensional filter coefficients array F1 and F2, and the 2-dimensional filter coefficients arrays F3 and F4 are specified as follows.

*F*1[0]=2,*F*1[1]=0     (361)

*F*2[0]=1,*F*2[1]=2,*F*2[2]=1     (362)

*F*3[*i*][*j*]=*F*4[*i*][*j*]=0,with *i*=0 . . . 2,*j*=0 . . . 2     (363)

If both SubWidthC and SubHeightC are equal to 2, the following applies:

*F*1[0]=1,*F*1[1]=1     (364)

*F*3[0][1]=1,*F*3[1][1]=4,*F*3[2][1]=1,*F*3[1][0]=1,*F*3[1][2]=1     (365)

*F*4[0][1]=1,*F*4[1][1]=2,*F*4[2][1]=1     (366)

*F*4[0][2]=1,*F*4[1][2]=2,*F*4[2][2]=1     (367)

Otherwise, the following applies:

*F*3[1][1]=8     (368)

*F*4[0][1]=2,*F*4[1][1]=4,*F*4[2][1]=2,     (369)

If sps_chromavertical_collocated_flag is equal to 1, the following applies:
pDsY[x][y] with x=0 . . . nTbW−1, y=0 . . . nTbH−1 is derived as follows:

*pDsY*[*x*][*y*]=(*F*3[1][0]\**pY*[SubWidth*C*\**x*]
[SubHeight*C*\**y*−1]+*F*3[0][1]\**pY*[SubWidth*C*\**x*−1][SubHeight*C*\**y*]+*F*3[1][1]\**pY*[SubWidth*C*\**x*]
[SubHeight*C*\**y*]+*F*3[2][1]\**pY*[SubWidth*C*\**x*+1]
[SubHeight*C*\**y*]+*F*3[1][2]\**pY*[SubWidth*C*\**x*]
[SubHeight*C*\**y*+1]+4)>>3     (370)

Otherwise (sps_chroma_vertical_collocated_flag is equal to 0), the following applies:
pDsY[x][y] with x=0 . . . nTbW−1, y=0 . . . nTbH−1 is derived as follows:

*pDsY*[*x*][*y*]=(*F*4[0][1]\**pY*[SubWidth*C*\**x*−1]
[SubHeight*C*\**y*]+*F*4[0][2]\**pY*[SubWidth*C*\**x*−1]
[SubHeight*C*\**y*+1]+*F*4[1][1]\**pY*[SubWidth*C*\**x*]
[SubHeight*C*\**y*]+*F*4[1][2]\**pY*[SubWidth*C*\**x*]
[SubHeight*C*\**y*+1]+*F*4[2][1]\**pY*[SubWidth*C*\**x*+1][SubHeight*C*\**y*]+*F*4[2][2]\**pY*[SubWidth*C*\**x*+1][SubHeight*C*\**y*+1]+4)>>3     (371)

4. When numSampL is greater than 0, the selected neighbouring left chroma samples pSelC[idx] are set equal to p[−1][pickPosL[idx]] with idx=0 . . . cntL−1, and the selected down-sampled neighbouring left luma samples pSelDsY[idx] with idx=0 . . . cntL−1 are derived as follows:

The variable y is set equal to pickPosL[idx].
If both SubWidthC and SubHeightC are equal to 1, the following applies:

$$pSelDsY[idx]=pY[-1][y] \quad (372)$$

Otherwise the following applies:
If sps_chroma_vertical_collocated_flag is equal to 1, the following applies:

$$pSelDsY[idx]=(F3[1][0]*pY[-SubWidthC][SubHeightC*y-1]+F3[0][1]*pY[-1-SubWidthC][SubHeightC*y]+F3[1][1]*pY[-SubWidthC][SubHeightC*y]+F3[2][1]*pY[1-SubWidthC][SubHeightC*y]+F3[1][2]*pY[-SubWidthC][SubHeightC*y+1]+4)>>3 \quad (373)$$

Otherwise (sps_chroma_vertical_collocated_flag is equal to 0), the following applies:

$$pSelDsY[idx]=(F4[0][1]*pY[-1-SubWidthC][SubHeightC*y]+F4[0][2]*pY[-1-SubWidthC][SubHeightC*y]+1+F4[1][1]*pY[-SubWidthC][SubHeightC*y]+F4[1][2]*pY[-SubWidthC][SubHeightC*y+1]+F4[2][1]*pY[1-SubWidthC][SubHeightC*y]+F4[2][2]*pY[1-SubWidthC][SubHeightC*y+1]+4)>>3 \quad (374)$$

5. When numSampT is greater than 0, the selected neighbouring top chroma samples pSelC[idx] are set equal to p[pickPosT[idx−cntL]][−1] with idx=cntL . . . cntL+cntT−1, and the down-sampled neighbouring top luma samples pSelDsY[idx] with idx=0 . . . cntL+cntT−1 are specified as follows:
The variable x is set equal to pickPosT[idx−cntL].
If both SubWidthC and SubHeightC are equal to 1, the following applies:

$$pSelDsY[idx]=pY[x][-1] \quad (375)$$

Otherwise, the following applies:
If sps_chroma_vertical_collocated_flag is equal to 1, the following applies:
If bCTUboundary is equal to FALSE, the following applies:

$$pSelDsY[idx]=(F3[1][0]*pY[SubWidthC*x][-1-SubHeightC]+F3[0][1]*pY[SubWidthC*x-1][-SubHeightC]+F3[1][1]*pY[SubWidthC*x][-SubHeightC]+F3[2][1]*pY[SubWidthC*x+1][-SubHeightC]+F3[1][2]*pY[SubWidthC*x][1-SubHeightC]+4)>>3 \quad (376)$$

Otherwise (bCTUboundary is equal to TRUE), the following applies:

$$pSelDsY[idx]=(F2[0]*pY[SubWidthC*x-1][-1]+F2[1]*pY[SubWidthC*x][-1]+F2[2]*pY[SubWidthC*x+1][-1]+2)>>2 \quad (377)$$

Otherwise (sps_chroma_vertical_collocated_flag is equal to 0), the following applies:
If bCTUboundary is equal to FALSE, the following applies:

$$pSelDsY[idx]=(F4[0][1]*pY[SubWidthC\,x-1][-1]+F4[0][2]*pY[SubWidthC*x-1][-2]+F4[1][1]*pY[SubWidthC*x][-1]+F4[1][2]*pY[SubWidthC*x][-2]+F4[2][1]*pY[SubWidthC*x+1][-1]+F4[2][2]*pY[SubWidthC*x+1][-2]+4)>>3 \quad (378)$$

Otherwise (bCTUboundary is equal to TRUE), the following applies:

$$pSelDsY[idx]=(F2[0]*pY[SubWidthC*x-1][-1]+F2[1]*pY[SubWidthC*x][-1]+F2[2]*pY[SubWidthC*x+1][-1]+2)>>2 \quad (379)$$

6. When cntT+cntL is not equal to 0, the variables minY, maxY, minC and maxC are derived as follows:
When cntT+cntL is equal to 2, pSelComp[3] is set equal to pSelComp[0], pSelComp[2] is set equal to pSelComp[1], pSelComp[0] is set equal to pSelComp[1], and pSelComp[1] is set equal to pSelComp[3], with Comp being replaced by DsY and C.
The arrays minGrpIdx and maxGrpIdx are derived as follows:

$$minGrpIdx[0]=0 \quad (380)$$

$$minGrpIdx[1]=2 \quad (381)$$

$$maxGrpIdx[0]=1 \quad (382)$$

$$maxGrpIdx[1]=3 \quad (383)$$

When pSelDsY[minGrpIdx[0]] is greater than pSelDsY[minGrpIdx[1]], minGrpIdx[0] and minGrpIdx[1] are swapped as follows:

$$(minGrpIdx[0],minGrpIdx[1])=Swap(minGrpIdx[0],minGrpIdx[1]) \quad (384)$$

When pSelDsY[maxGrpIdx[0]] is greater than pSelDsY[maxGrpIdx[1]], maxGrpIdx[0] and maxGrpIdx[1] are swapped as follows:

$$(maxGrpIdx[0],maxGrpIdx[1])=Swap(maxGrpIdx[0],maxGrpIdx[1]) \quad (385)$$

When pSelDsY[minGrpIdx[0]] is greater than pSelDsY[maxGrpIdx[1]], arrays minGrpIdx and maxGrpIdx are swapped as follows:

$$(minGrpIdx,maxGrpIdx)=Swap(minGrpIdx,maxGrpIdx) \quad (386)$$

When pSelDsY[minGrpIdx[1]] is greater than pSelDsY[maxGrpIdx[0]], minGrpIdx[1] and maxGrpIdx[0] are swapped as follows:

$$(minGrpIdx[1],maxGrpIdx[0])=Swap(minGrpIdx[1],maxGrpIdx[0]) \quad (387)$$

The variables maxY, maxC, minY and minC are derived as follows:

$$maxY=(pSelDsY[maxGrpIdx[0]]+pSelDsY[maxGrpIdx[1]]+1)>>1 \quad (388)$$

$$maxC=(pSelC[maxGrpIdx[0]]+pSelC[maxGrpIdx[1]]+1)>>1 \quad (389)$$

$$minY=(pSelDsY[minGrpIdx[0]]+pSelDsY[minGrpIdx[1]]+1)>>1 \quad (390)$$

$$minC=(pSelC[minGrpIdx[0]]+pSelC[minGrpIdx[1]]+1)>>1 \quad (391)$$

7. The variables a, b, and k are derived as follows:
If numSampL is equal to 0, and numSampT is equal to 0, the following applies:

$$k=0 \quad (392)$$

$$a=0 \quad (393)$$

$$b=1<<(BitDepth-1) \quad (394)$$

Otherwise, the following applies:

$$diff=maxY-minY \quad (395)$$

If diff is not equal to 0, the following applies:

$$diffC=maxC-minC \quad (396)$$

$$x=Floor(Log\,2(diff)) \quad (397)$$

normDiff=((diff<<4)>>x)&15 (398)

x+=(normDiff!=0)?1:0 (399)

y=Abs(diffC)>0?Floor(Log 2(Abs(diffC)))+1:0 (400)

a=(diffC*(divSigTable[normDiff]|8)+2$^{y-1}$)>>y (401)

k=((3+x−y)<1)?1:3+x−y (402)

a=((3+x−y)<1)?Sign(a)*15:a (403)

b=minC−((a*minY)>>k) (404)

where divSigTable[ ] is specified as follows:

divSigTable[ ]={0,7,6,5,5,4,4,3,3,2,2,1,1,1,1,0} (405)

Otherwise (diff is equal to 0), the following applies:

k=0 (406)

a=0 (407)

b=minC (408)

8. The prediction samples predSamples[x][y] with x=0 . . . nTbW−1, y=0 . . . nTbH−1 are derived as follows:

predSamples[x][y]=Clip1(((pDsY[x][y]*a)>>k)+b) (409)

NOTE—This process uses sps_chroma_vertical_collocated_flag. However, in order to simplify implementation, it does not use sps_chroma_horizontal_collocated_flag.

5.8. Embodiment 8

The working draft specified in JVET-Q2001-vE may be changed as below.
8.4.5.2.13
Inputs to this process are:
the intra prediction mode predModeIntra,
a sample location (xTbC, yTbC) of the top-left sample of the current transform block relative to the top-left sample of the current picture,
a variable nTbW specifying the transform block width,
a variable nTbH specifying the transform block height,
a variable cIdx specifying the colour component of the current block,
chroma neighbouring samples p[x][y], with x=−1, y=0 . . . 2*nTbH−1 and x=0 . . . 2*nTbW−1, y=−1.
Output of this process are predicted samples predSamples[x][y], with x=0 . . . nTbW−1, y=0 . . . nTbH−1.
The current luma location (xTbY, yTbY) is derived as follows:

(xTbY,yTbY)=(xTbC<<(SubWidthC−1),yTbC<<(SubHeightC−1)) (351)

The variables availL, availT and availTL are derived as follows:
The derivation process for neighbouring block availability as specified in clause 6.4.4 is invoked with the current luma location (xCurr, yCurr) set equal to (xTbY, yTbY), the neighbouring luma location (xTbY−1, yTbY), checkPredModeY set equal to FALSE, and cIdx as inputs, and the output is assigned to availL.
The derivation process for neighbouring block availability as specified in clause 6.4.4 is invoked with the current luma location (xCurr, yCurr) set equal to (xTbY, yTbY), the neighbouring luma location (xTbY, yTbY−1), checkPredModeY set equal to FALSE, and cIdx as inputs, and the output is assigned to availT.
- *The derivation process for neighbouring block availability as specified in clause 6.4.4 is invoked with the current luma location (xCurr, yCurr ) set equal to ( xTbY, yTbY ) , the neighbouring luma location ( xTbY ‑ 1, yTbY ‑ 1 ) , checkPredModeY set equal to FALSE, and cIdx as inputs, , and the output is assigned to availTL. .*

The number of available top-right neighbouring chroma samples numTopRight is derived as follows:
The variable numTopRight is set equal to 0 and availTR is set equal to TRUE.
When predModeIntra is equal to INTRA_T_CCLM, the following applies for x=nTbW . . . 2*nTbW−1 until availTR is equal to FALSE or x is equal to 2*nTbW−1:
The derivation process for neighbouring block availability as specified in clause 6.4.4 is invoked with the current luma location (xCurr, yCurr) set equal to (xTbY, yTbY) the neighbouring luma location (xTbY+x, yTbY−1), checkPredModeY set equal to FALSE, and cIdx as inputs, and the output is assigned to availTR
When availTR is equal to TRUE, numTopRight is incremented by one.

The number of available left-below neighbouring chroma samples numLeftBelow is derived as follows:
The variable numLeftBelow is set equal to 0 and availLB is set equal to TRUE.
When predModeIntra is equal to INTRA_L_CCLM, the following applies for y=nTbH . . . 2*nTbH−1 until availLB is equal to FALSE or y is equal to 2*nTbH−1:
The derivation process for neighbouring block availability as specified in clause 6.4.4 is invoked with the current luma location (xCurr, yCurr) set equal to (xTbY, yTbY), the neighbouring luma location (xTbY−1, yTbY+y), checkPredModeY set equal to FALSE, and cIdx as inputs, and the output is assigned to availLB
When availLB is equal to TRUE, numLeftBelow is incremented by one.

The number of available neighbouring chroma samples on the top and top-right numSampT and the number of available neighbouring chroma samples on the left and left-below numSampL are derived as follows:
If predModeIntra is equal to INTRA_LT_CCLM, the following applies:

numSampT=availT?nTbW:0 (353)

numSampL=availL?nTbH:0 (354)

Otherwise, the following applies:

numSampT=
(availT&&predModeIntra==INTRA_T_CCLM)?
(nTbW+Min(numTopRight,nTbH)):0 (355)

numSampL=
(availL&&predModeIntra==INTRA_L_CCLM)?
(nTbH+Min(numLeftBelow,nTbW)):0 (356)

The variable bCTUboundary is derived as follows:

bCTUboundary=(yTbY&(CtbSizeY−1)==0)?TRUE:
FALSE. (357)

The variable cntN and array pickPosN with N being replaced by L and T, are derived as follows:

The variable numIs4N is derived as follows:

numIs4N=
((availT&&availL&&predModeIntra==INTRA_LT_CCLM)
?0:1) (358)

The variable startPosN is set equal to numSampN>>(2+numIs4N).
The variable pickStepN is set equal to Max(1, numSampN>>(1+numIs4N)).
If availN is equal to TRUE and predModeIntra is equal to INTRA_LT_CCLM or INTRA_N_CCLM, the following assignments are made:
    cntN is set equal to Min(numSampN, (1+numIs4N)<<1).
    pickPosN[pos] is set equal to (startPosN+pos*pickStepN), with pos=0 . . . cntN-1.
Otherwise, cntN is set equal to 0.
The prediction samples predSamples[x][y] with x=0 . . . nTbW-1, y=0 . . . nTbH-1 are derived as follows:
If both numSampL and numSampT are equal to 0, the following applies:

predSamples[x][y]=1<<(BitDepth-1) (359)

Otherwise, the following ordered steps apply:
1. The collocated luma samples pY[x][y] with x=0 . . . nTbW*SubWidthC-1, y=0 . . . nTbH*SubHeightC-1 are set equal to the reconstructed luma samples prior to the deblocking filter process at the locations (xTbY+x, yTbY+y).
2. The neighbouring luma samples pY[x][y] are derived as follows:
    When numSampL is greater than 0, the neighbouring left luma samples pY[x][y] with x=-1 . . . -3, y=0 . . . SubHeightC*numSampL-1, are set equal to the reconstructed luma samples prior to the deblocking filter process at the locations (xTbY+x, yTbY+y).
    When availT is equal to FALSE, the neighbouring top luma samples pY[x][y] with x=-1 . . . SubWidthC*numSampT-1, y=-1 . . . -2, are set equal to the luma samples pY[x][0].
    When availL is equal to FALSE, the neighbouring left luma samples pY[x][y] with x=-1 . . . -3, y=-1 . . . SubHeightC*numSampL-1, are set equal to the luma samples pY[0][y].
    When numSampT is greater than 0, the neighbouring top luma samples pY[x][y] with x=0 . . . SubWidthC*numSampT-1, y=-1, -2, are set equal to the reconstructed luma samples prior to the deblocking filter process at the locations (xTbY+x, yTbY+y).
    If availTL is equal to TRUE, the neighbouring top-left luma samples pY[x][y] with x=-1, -2, y=-1, -2 are set equal to the reconstructed luma samples prior to the deblocking filter process at the locations (xTbY+x, yTbY+y).
- Otherwise, ,      if availT is equal to true, theneighbouring top-left luma samples pY[ x ][ y ] with x =-1, ,      -2, , y = -1, ,      -2, ,      are set equal to the luma samples pY[0][y]. ,
- Otherwise, ,      if availL is equal to true, , the neighbouring top-left luma samples pY[ x ][ y ] with x =-1, ,      -2, , y = -1,      -2 ,      are set equal to the luma samples pY[x][0].

3. The down-sampled collocated luma samples pDsY[x][y] with x=0 . . . nTbW-1, y=0 . . . nTbH-1 are derived as follows:
If both SubWidthC and SubHeightC are equal to 1, the following applies:
    pDsY[x][y] with x=1 . . . nTbW-1, y=1 . . . nTbH-1 is derived as follows:

pDstY[x][y]=pY[x][y] (360)

Otherwise, the following applies:
    The one-dimensional filter coefficients array F1 and F2, and the 2-dimensional filter coefficients arrays F3 and F4 are specified as follows.

F1[0]=2,F1[1]=0 (361)

F2[0]=1,F2[1]=2,F2[2]=1 (362)

F3[i][j]=F4[i][j]=0,with i=0 . . . 2,j=0 . . . 2 (363)

If both SubWidthC and SubHeightC are equal to 2, the following applies:

F1[0]=1,F1[1]=1 (364)

F3[0][1]=1,F3[1][1]=4,F3[2][1]=1,F3[1][0]=1,F3[1][2]=1 (365)

F4[0][1]=1,F4[1][1]=2,F4[2][1]=1 (366)

F4[0][2]=1,F4[1][2]=2,F4[2][2]=1 (367)

Otherwise, the following applies:

F3[1][1]=8 (368)

F4[0][1]=2,F4[1][1]=4,F4[2][1]=2, (369)

If sps_chroma_vertical_collocated_flag is equal to 1, the following applies:
    pDsY[x][y] with x=0 . . . nTbW-1, y=0 . . . nTbH-1 is derived as follows:

pDsY[x][y]=(F3[1][0]*pY[SubWidthC*x]
    [SubHeightC*y-1]+F3[0][1]*pY[SubWidthC*x-1][SubHeightC*y]+F3[1][1]*pY[SubWidthC*x]
    [SubHeightC*y]+F3[2][1]*pY[SubWidthC*x+1]
    [SubHeightC*y]+F3[1][2]*pY[SubWidthC*x]
    [SubHeightC*y+1]+4)>>3 (370)

Otherwise (sps_chroma_vertical_collocated_flag is equal to 0), the following applies:
    pDsY[x][y] with x=0 . . . nTbW-1, y=0 . . . nTbH-1 is derived as follows:

pDsY[x][y]=(F4[0][1]*pY[SubWidthC*x-1]
    [SubHeightC*y+1]+F4[0][2]*pY[SubWidthC*x-1]
    [SubHeightC*y+1]+F4[1][1]*pY[SubWidthC*x]
    [SubHeightC*y]+F4[1][2]*pY[SubWidthC*x]
    [SubHeightC*y+1]+F4[2][1]*pY[SubWidthC*x+1][SubHeightC*y]+F4[2][2]*pY[SubWidthC*x+1][SubHeightC*y+1]+4)>>3 (371)

4. When numSampL is greater than 0, the selected neighbouring left chroma samples pSelC[idx] are set equal to p[-1][pickPosL[idx]] with idx=0 . . . cntL-1, and the selected down-sampled neighbouring left luma samples pSelDsY[idx] with idx=0 . . . cntL-1 are derived as follows:
The variable y is set equal to pickPosL[idx].
If both SubWidthC and SubHeightC are equal to 1, the following applies:

pSelDsY[idx]=pY[-1][y] (372)

Otherwise the following applies:
If sps_chroma_vertical_collocated_flag is equal to 1, the following applies:

$pSelDsY[idx]=(F3[1][0]*pY[-SubWidthC][SubHeightC*y-1]+F3[0][1]*pY[-1-SubWidthC][SubHeightC*y]+F3[1][1]*pY[-SubWidthC][SubHeightC*y]+F3[2][1]*pY[1-SubWidthC][SubHeightC*y]+F3[1][2]*pY[-SubWidthC][SubHeightC*y+1]+4)>>3$ (373)

Otherwise (sps_chroma_vertical_collocated_flag is equal to 0), the following applies:

$pSelDsY[idx]=(F4[0][1]*pY[-1-SubWidthC][SubHeightC*y]+F4[0][2]*pY[-1-SubWidthC][SubHeightC*y]+1+F4[1][1]*pY[-SubWidthC][SubHeightC*y]+F4[1][2]*pY[-SubWidthC][SubHeightC*y+1]+F4[2][1]*pY[1-SubWidthC][SubHeightC*y]+F4[2][2]*pY[1-SubWidthC][SubHeightC*y+1]+4)>>3$ (374)

5. When numSampT is greater than 0, the selected neighbouring top chroma samples pSelC[idx] are set equal to p[pickPosT[idx−cntL]][−1] with idx= cntL ... cntL+cntT−1, and the down-sampled neighbouring top luma samples pSelDsY[idx] with idx=0 ... cntL+cntT−1 are specified as follows:
The variable x is set equal to pickPosT[idx−cntL].
If both SubWidthC and SubHeightC are equal to 1, the following applies:

$pSelDsY[idx]=pY[x][-1]$ (375)

Otherwise, the following applies:
If sps_chroma_vertical_collocated_flag is equal to 1, the following applies:
If bCTUboundary is equal to FALSE, the following applies:

$pSelDsY[idx]=(F3[1][0]*pY[SubWidthC*x][-1-SubHeightC]+F3[0][1]*pY[SubWidthC*x-1][-SubHeightC]+F3[1][1]*pY[SubWidthC*x][-SubHeightC]+F3[2][1]*pY[SubWidthC*x+1][-SubHeightC]+F3[1][2]*pY[SubWidthC*x][1-SubHeightC]+4)>>3$ (376)

Otherwise (bCTUboundary is equal to TRUE), the following applies:

$pSelDsY[idx]=(F2[0]*pY[SubWidthC*x-1][-1]+F2[1]*pY[SubWidthC*x][-1]+F2[2]*pY[SubWidthC*x+1][-1]+2)>>2$ (377)

Otherwise (sps_chroma_vertical_collocated_flag is equal to 0), the following applies:
If bCTUboundary is equal to FALSE, the following applies:

$pSelDsY[idx]=(F4[0][1]*pY[SubWidthC\ x-1][-1]+F4[0][2]*pY[SubWidthC*x-1][-2]+F4[1][1]*pY[SubWidthC*x][-1]+F4[1][2]*pY[SubWidthC*x][-2]+F4[2][1]*pY[SubWidthC*x+1][-1]+F4[2][2]*pY[SubWidthC*x+1][-2]+4)>>3$ (378)

Otherwise (bCTUboundary is equal to TRUE), the following applies:

$pSelDsY[idx]=(F2[0]*pY[SubWidthC*x-1][-1]+F2[1]*pY[SubWidthC*x][-1]+F2[2]*pY[SubWidthC*x+-1]+2)>>2$ (379)

6. When cntT+cntL is not equal to 0, the variables minY, maxY, minC and maxC are derived as follows:
When cntT+cntL is equal to 2, pSelComp[3] is set equal to pSelComp[0], pSelComp[2] is set equal to pSelComp[1], pSelComp[0] is set equal to pSelComp[1], and pSelComp[1] is set equal to pSelComp[3], with Comp being replaced by DsY and C.

The arrays minGrpIdx and maxGrpIdx are derived as follows:

$minGrpIdx[0]=0$ (380)

$minGrpIdx[1]=2$ (381)

$maxGrpIdx[0]=1$ (382)

$maxGrpIdx[1]=3$ (383)

When pSelDsY[minGrpIdx[0]] is greater than pSelDsY[minGrpIdx[1]], minGrpIdx[0] and minGrpIdx[1] are swapped as follows:

$(minGrpIdx[0],minGrpIdx[1])=Swap(minGrpIdx[0],minGrpIdx[1])$ (384)

When pSelDsY[maxGrpIdx[0]] is greater than pSelDsY[maxGrpIdx[1]], maxGrpIdx[0] and maxGrpIdx[1] are swapped as follows:

$(maxGrpIdx[0],maxGrpIdx[1])=Swap(maxGrpIdx[0],maxGrpIdx[1])$ (385)

When pSelDsY[minGrpIdx[0]] is greater than pSelDsY[maxGrpIdx[1]], arrays minGrpIdx and maxGrpIdx are swapped as follows:

$(minGrpIdx,maxGrpIdx)=Swap(minGrpIdx,maxGrpIdx)$ (386)

When pSelDsY[minGrpIdx[1]] is greater than pSelDsY[maxGrpIdx[0]], minGrpIdx[1] and maxGrpIdx[0] are swapped as follows:

$(minGrpIdx[1],maxGrpIdx[0])=Swap(minGrpIdx[1],maxGrpIdx[0])$ (387)

The variables maxY, maxC, minY and minC are derived as follows:

$maxY=(pSelDsY[maxGrpIdx[0]]+pSelDsY[maxGrpIdx[1]]+1)>>1$ (388)

$maxC=(pSelC[maxGrpIdx[0]]+pSelC[maxGrpIdx[1]]+1)>>1$ (389)

$minY=(pSelDsY[minGrpIdx[0]]+pSelDsY[minGrpIdx[1]]+1)>>1$ (390)

$minC=(pSelC[minGrpIdx[0]]+pSelC[minGrpIdx[1]]+1)>>1$ (391)

7. The variables a, b, and k are derived as follows:
If numSampL is equal to 0, and numSampT is equal to 0, the following applies:

$k=0$ (392)

$a=0$ (393)

$b=1<<(BitDepth-1)$ (394)

Otherwise, the following applies:

$diff=maxY-minY$ (395)

If diff is not equal to 0, the following applies:

$diffC=maxC-minC$ (396)

$x=Floor(Log\ 2(diff))$ (397)

$normDiff=((diff<<4)>>x)\&15$ (398)

$x+=(normDiff!=0)?1:0$ (399)

$y=Abs(diffC)>0?Floor(Log\ 2(Abs(diffC)))+1:0$ (400)

$a=(diffC*(divSigTable[normDiff]|8)+2^{y-1})>>y$ (401)

$$k=((3+x-y)<1)?1:3+x-y \tag{402}$$

$$a=((3+x-y)<1)?\text{Sign}(a)*15:a \tag{403}$$

$$b=\text{min}C-((a*\text{min}Y)>>k) \tag{404}$$

where divSigTable[ ] is specified as follows:

$$\text{divSigTable}[\ ]=\{0,7,6,5,5,4,4,3,3,2,2,1,1,1,1,0\} \tag{405}$$

Otherwise (diff is equal to 0), the following applies:

$$k=0 \tag{406}$$

$$a=0 \tag{407}$$

$$b=\text{min}C \tag{408}$$

8. The prediction samples predSamples[x][y] with x=0 . . . nTbW−1, y=0 . . . nTbH−1 are derived as follows:

$$\text{predSamples}[x][y]=\text{Clip1}(((pDsY[x][y]*a)>>k)+b) \tag{409}$$

NOTE—This process uses sps_chroma_vertical_collocated_flag. However, in order to simplify implementation, it does not use sps_chroma_horizontal_collocated_flag.

5.9. Embodiment 9

The working draft specified in JVET-Q2001-vE may be changed as below.
8.4.5.2.13
Inputs to this process are:
the intra prediction mode predModeIntra,
a sample location (xTbC, yTbC) of the top-left sample of the current transform block relative to the top-left sample of the current picture,
a variable nTbW specifying the transform block width,
a variable nTbH specifying the transform block height,
a variable cIdx specifying the colour component of the current block,
chroma neighbouring samples p[x][y], with x=−1, y=0 . . . 2*nTbH−1 and x=0 . . . 2*nTbW−1, y=−1.
Output of this process are predicted samples predSamples [x][y], with x=0 . . . nTbW−1, y=0 . . . nTbH−1.
The current luma location (xTbY, yTbY) is derived as follows:

$$(xTbY,yTbY)=(xTbC<<(\text{SubWidth}C-1),yTbC<<(\text{Sub-Height}C-1)) \tag{351}$$

The variables availL, availT and availTL are derived as follows:
The derivation process for neighbouring block availability as specified in clause 6.4.4 is invoked with the current luma location (xCurr, yCurr) set equal to (xTbY, yTbY), the neighbouring luma location (xTbY−1, yTbY), checkPredModeY set equal to FALSE, and cIdx as inputs, and the output is assigned to availL.
The derivation process for neighbouring block availability as specified in clause 6.4.4 is invoked with the current luma location (xCurr, yCurr) set equal to (xTbY, yTbY), the neighbouring luma location (xTbY, yTbY−1), checkPredModeY set equal to FALSE, and cIdx as inputs, and the output is assigned to availT.
The variable availTL is derived as follows:

$$\text{avail}TL=\text{avail}L\&\&\text{avail}T \tag{352}$$

The number of available top-right neighbouring chroma samples numTopRight is derived as follows:
The variable numTopRight is set equal to 0 and availTR is set equal to TRUE.
When predModeIntra is equal to INTRA_T_CCLM, the following applies for x=nTbW . . . 2*nTbW−1 until availTR is equal to FALSE or x is equal to 2*nTbW−1:
The derivation process for neighbouring block availability as specified in clause 6.4.4 is invoked with the current luma location (xCurr, yCurr) set equal to (xTbY, yTbY) the neighbouring luma location (xTbY+x, yTbY−1), checkPredModeY set equal to FALSE, and cIdx as inputs, and the output is assigned to availTR
When availTR is equal to TRUE, numTopRight is incremented by one.
The number of available left-below neighbouring chroma samples numLeftBelow is derived as follows:
The variable numLeftBelow is set equal to 0 and availLB is set equal to TRUE.
When predModeIntra is equal to INTRA_L_CCLM, the following applies for y=nTbH . . . 2*nTbH−1 until availLB is equal to FALSE or y is equal to 2*nTbH−1:
The derivation process for neighbouring block availability as specified in clause 6.4.4 is invoked with the current luma location (xCurr, yCurr) set equal to (xTbY, yTbY), the neighbouring luma location (xTbY−1, yTbY+y), checkPredModeY set equal to FALSE, and cIdx as inputs, and the output is assigned to availLB
When availLB is equal to TRUE, numLeftBelow is incremented by one.
The number of available neighbouring chroma samples on the top and top-right numSampT and the number of available neighbouring chroma samples on the left and left-below numSampL are derived as follows:
If predModeIntra is equal to INTRA_LT_CCLM, the following applies:

$$\text{numSamp}T=\text{avail}T?nTbW:0 \tag{353}$$

$$\text{numSamp}L=\text{avail}L?nTbH:0 \tag{354}$$

Otherwise, the following applies:

$$\text{numSamp}T=(\text{avail}T\&\&\text{predModeIntra}==\text{INTRA}\_T\_\text{CCLM})?(nTbW+\text{Min}(\text{numTopRight},nTbH)):0 \tag{355}$$

$$\text{numSamp}L=(\text{avail}L\&\&\text{predModeIntra}==\text{INTRA}\_L\_\text{CCLM})?(nTbH+\text{Min}(\text{numLeftBelow},nTbW)):0 \tag{356}$$

The variable bCTUboundary is derived as follows:

$$b\text{CTUboundary}=(yTbY\&(Ctb\text{Size}Y-1)==0)?\text{TRUE}:\text{FALSE}. \tag{357}$$

The variable cntN and array pickPosN with N being replaced by L and T, are derived as follows:
The variable numIs4N is derived as follows:

$$\text{numIs4}N=((\text{avail}T\&\&\text{avail}L\&\&\text{predModeIntra}==\text{INTRA}\_LT\_\text{CCLM})?0:1) \tag{358}$$

The variable startPosN is set equal to numSampN>>(2+numIs4N).
The variable pickStepN is set equal to Max(1, numSampN>>(1+numIs4N)).
If availN is equal to TRUE and predModeIntra is equal to INTRA_LT_CCLM or INTRA_N_CCLM, the following assignments are made:

cntN is set equal to Min(numSampN, (1+numIs4N)<<1).

pickPosN[pos] is set equal to (startPosN+ pos*pickStepN), with pos=0 . . . cntN−1.

Otherwise, cntN is set equal to 0.

The prediction samples predSamples[x][y] with x=0 . . . nTbW−1, y=0 . . . nTbH−1 are derived as follows:

If both numSampL and numSampT are equal to 0, the following applies:

predSamples[x][y]=1<<(BitDepth−1)  (359)

Otherwise, the following ordered steps apply:
1. The collocated luma samples pY[x][y] with x=0 . . . nTbW*SubWidthC−1, y=0 . . . nTbH*SubHeightC−1 are set equal to the reconstructed luma samples prior to the deblocking filter process at the locations (xTbY+x, yTbY+y).
2. The neighbouring luma samples pY[x][y] are derived as follows:

When numSampL is greater than 0, the neighbouring left luma samples pY[x][y] with x=−1 . . . −3, y=0 . . . SubHeightC*numSampL−1, are set equal to the reconstructed luma samples prior to the deblocking filter process at the locations (xTbY+x, yTbY+y).

When availT is equal to FALSE, the neighbouring top luma samples pY[x][y] with x=−1 . . . SubWidthC*[[numSampT]]*nTbW* −1, y=−1 . . . −2, are set equal to the luma samples pY[x][0].

When numSampT is greater than 0, the neighbouring top luma samples pY[x][y] with x=0 . . . SubWidthC*numSampT−1, y=−1, −2, are set equal to the reconstructed luma samples prior to the deblocking filter process at the locations (xTbY+x, yTbY+y).

- *When availL is equal to FALSE, the neighbouring left luma samples pY[x ][y ] with*$x = -1..-3$*, y = -1..SubHeightC * nTbW -1, are set equal to the luma samples pY[ 0 ][ y ].*

When availTL is equal to TRUE, the neighbouring top-left luma samples pY[x][y] with x=−1, y=−1, −2 are set equal to the reconstructed luma samples prior to the deblocking filter process at the locations (xTbY+x, yTbY+y).

3. The down-sampled collocated luma samples pDsY[x][y] with x=0 . . . nTbW−1, y=0 . . . nTbH−1 are derived as follows:

If both SubWidthC and SubHeightC are equal to 1, the following applies:
pDsY[x][y] with x=1 . . . nTbW−1, y=1 . . . nTbH−1 is derived as follows:

pDstY[x][y]=pY[x][y]  (360)

Otherwise, the following applies:
The one-dimensional filter coefficients array F1 and F2, and the 2-dimensional filter coefficients arrays F3 and F4 are specified as follows.

F1[0]=2,F1[1]=0  (361)

F2[0]=1,F2[1]=2,F2[2]=1  (362)

F3[i][j]=F4[i][j]=0,with i=0 . . . 2,j=0 . . . 2  (363)

If both SubWidthC and SubHeightC are equal to 2, the following applies:

F1[0]=1,F1[1]=1  (364)

F3[0][1]=1,F3[1][1]=4,F3[2][1]=1,F3[1][0]=1,F3[1][2]=1  (365)

F4[0][1]=1,F4[1][1]=2,F4[2][1]=1  (366)

F4[0][2]=1,F4[1][2]=2,F4[2][2]=1  (367)

Otherwise, the following applies:

F3[1][1]=8  (368)

F4[0][1]=2,F4[1][1]=4,F4[2][1]=2,  (369)

If sps_chroma_vertical_collocated_flag is equal to 1, the following applies:
pDsY[x][y] with x=0 . . . nTbW−1, y=0 . . . nTbH−1 is derived as follows:

pDsY[x][y]=(F3[1][0]*pY[SubWidthC*x][SubHeightC*y−1]+F3[0][1]*pY[SubWidthC*x−1][SubHeightC*y]+F3[1][1]*pY[SubWidthC*x][SubHeightC*y]+F3[2][1]*pY[SubWidthC*x+1][SubHeightC*y]+F3[1][2]*pY[SubWidthC*x][SubHeightC*y+1]+4)>>3  (370)

Otherwise (sps_chroma_vertical_collocated_flag is equal to 0), the following applies:
pDsY[x][y] with x=0 . . . nTbW−1, y=0 . . . nTbH−1 is derived as follows:

pDsY[x][y]=(F4[0][1]*pY[SubWidthC*x−1][SubHeightC*y]+F4[0][2]*pY[SubWidthC*x−1][SubHeightC*y+1]+F4[1][1]*pY[SubWidthC*x][SubHeightC*y]+F4[1][2]*pY[SubWidthC*x][SubHeightC*y+1]+F4[2][1]*pY[SubWidthC*x+1][SubHeightC*y]+F4[2][2]*pY[SubWidthC*x+1][SubHeightC*y+1]+4)>>3  (371)

4. When numSampL is greater than 0, the selected neighbouring left chroma samples pSelC[idx] are set equal to p[−1][pickPosL[idx]] with idx=0 . . . cntL−1, and the selected down-sampled neighbouring left luma samples pSelDsY[idx] with idx=0 . . . cntL−1 are derived as follows:
The variable y is set equal to pickPosL[idx].
If both SubWidthC and SubHeightC are equal to 1, the following applies:

pSelDsY[idx]=pY[−1][y]  (372)

Otherwise the following applies:
If sps_chroma_vertical_collocated_flag is equal to 1, the following applies:

pSelDsY[idx]=(F3[1][0]*pY[−SubWidthC][SubHeightC*y−1]+F3[0][1]*pY[−1−SubWidthC][SubHeightC*y]+F3[1][1]*pY[−SubWidthC][SubHeightC*y]+F3[2][1]*pY[1−SubWidthC][SubHeightC*y]+F3[1][2]*pY[−SubWidthC][SubHeightC*y+1]+4)>>3  (373)

Otherwise (sps_chroma_vertical_collocated_flag is equal to 0), the following applies:

pSelDsY[idx]=(F4[0][1]*pY[−1−SubWidthC][SubHeightC*y]+F4[0][2]*pY[−1−SubWidthC][SubHeightC*y+1]+F4[1][1]*pY[−SubWidthC][SubHeightC*y]+F4[1][2]*pY[−SubWidthC][SubHeightC*y+1]+F4[2][1]*pY[1−SubWidthC][SubHeightC*y]+F4[2][2]*pY[1−SubWidthC][SubHeightC*y+1]+4)>>3  (374)

5. When numSampT is greater than 0, the selected neighbouring top chroma samples pSelC[idx] are set equal to p[pickPosT[idx−cntL]][−1] with idx=cntL . . . cntL+cntT−1, and the down-sampled neighbouring top luma samples pSelDsY[idx] with idx=0 . . . cntL+cntT−1 are specified as follows:

The variable x is set equal to pickPosT[idx−cntL].
If both SubWidthC and SubHeightC are equal to 1, the following applies:

$$pSelDsY[idx]=pY[x][-1] \qquad (375)$$

Otherwise, the following applies:
  If sps_chroma_vertical_collocated_flag is equal to 1, the following applies:
    If bCTUboundary is equal to FALSE, the following applies:

$$pSelDsY[idx]=(F3[1][0]*pY[SubWidthC*x][-1-SubHeightC]+F3[0][1]*pY[SubWidthC*x-1][-SubHeightC]+F3[1][1]*pY[SubWidthC*x][-SubHeightC]+F3[2][1]*pY[SubWidthC*x+1][-SubHeightC]+F3[1][2]*pY[SubWidthC*x][1-SubHeightC]+4)>>3 \qquad (376)$$

Otherwise (bCTUboundary is equal to TRUE), the following applies:

$$pSelDsY[idx]=(F2[0]*pY[SubWidthC*x-1][-1]+F2[1]*pY[SubWidthC*x][-1]+F2[2]*pY[SubWidthC*x+1][-1]+2)>>2 \qquad (377)$$

Otherwise (sps_chroma_vertical_collocated_flag is equal to 0), the following applies:
    If bCTUboundary is equal to FALSE, the following applies:

$$pSelDsY[idx]=(F4[0][1]*pY[SubWidthC\,x-1][-1]+F4[0][2]*pY[SubWidthC*x-1][-2]+F4[1][1]*pY[SubWidthC*x][-1]+F4[1][2]*pY[SubWidthC*x][-2]+F4[2][1]*pY[SubWidthC*x+1][-1]+F4[2][2]*pY[SubWidthC*x+1][-2]+4)>>3 \qquad (378)$$

Otherwise (bCTUboundary is equal to TRUE), the following applies:

$$pSelDsY[idx]=(F2[0]*pY[SubWidthC*x-1][-1]+F2[1]*pY[SubWidthC*x][-1]+F2[2]*pY[SubWidthC*x+1][-1]+2)>>2 \qquad (379)$$

6. When cntT+cntL is not equal to 0, the variables minY, maxY, minC and maxC are derived as follows:
  When cntT+cntL is equal to 2, pSelComp[3] is set equal to pSelComp[0], pSelComp[2] is set equal to pSelComp[1], pSelComp[0] is set equal to pSelComp[1], and pSelComp[1] is set equal to pSelComp[3], with Comp being replaced by DsY and C.
  The arrays minGrpIdx and maxGrpIdx are derived as follows:

$$minGrpIdx[0]=0 \qquad (380)$$

$$minGrpIdx[1]=2 \qquad (381)$$

$$maxGrpIdx[0]=1 \qquad (382)$$

$$maxGrpIdx[1]=3 \qquad (383)$$

When pSelDsY[minGrpIdx[0]] is greater than pSelDsY[minGrpIdx[1]], minGrpIdx[0] and minGrpIdx[1] are swapped as follows:

$$(minGrpIdx[0],minGrpIdx[1])=Swap(minGrpIdx[0],minGrpIdx[1]) \qquad (384)$$

When pSelDsY[maxGrpIdx[0]] is greater than pSelDsY[maxGrpIdx[1]], maxGrpIdx[0] and maxGrpIdx[1] are swapped as follows:

$$(maxGrpIdx[0],maxGrpIdx[1])=Swap(maxGrpIdx[0],maxGrpIdx[1]) \qquad (385)$$

When pSelDsY[minGrpIdx[0]] is greater than pSelDsY[maxGrpIdx[1]], arrays minGrpIdx and maxGrpIdx are swapped as follows:

$$(minGrpIdx,maxGrpIdx)=Swap(minGrpIdx,maxGrpIdx) \qquad (386)$$

When pSelDsY[minGrpIdx[1]] is greater than pSelDsY[maxGrpIdx[0]], minGrpIdx[1] and maxGrpIdx[0] are swapped as follows:

$$(minGrpIdx[1],maxGrpIdx[0])=Swap(minGrpIdx[1],maxGrpIdx[0]) \qquad (387)$$

The variables maxY, maxC, minY and minC are derived as follows:

$$maxY=(pSelDsY[maxGrpIdx[0]]+pSelDsY[maxGrpIdx[1]]+1)>>1 \qquad (388)$$

$$maxC=(pSelC[maxGrpIdx[0]]+pSelC[maxGrpIdx[1]]+1)>>1 \qquad (389)$$

$$minY=(pSelDsY[minGrpIdx[0]]+pSelDsY[minGrpIdx[1]]+1)>>1 \qquad (390)$$

$$minC=(pSelC[minGrpIdx[0]]+pSelC[minGrpIdx[1]]+1)>>1 \qquad (391)$$

7. The variables a, b, and k are derived as follows:
  If numSampL is equal to 0, and numSampT is equal to 0, the following applies:

$$k=0 \qquad (392)$$

$$a=0 \qquad (393)$$

$$b=1<<(BitDepth-1) \qquad (394)$$

Otherwise, the following applies:

$$diff=maxY-minY \qquad (395)$$

If diff is not equal to 0, the following applies:

$$diffC=maxC-minC \qquad (396)$$

$$x=Floor(Log\,2(diff)) \qquad (397)$$

$$normDiff=((diff<<4)>>x)\&15 \qquad (398)$$

$$x+=(normDiff!=0)?1:0 \qquad (399)$$

$$y=Abs(diffC)>0?Floor(Log\,2(Abs(diffC)))+1:0 \qquad (400)$$

$$a=(diffC*(divSigTable[normDiff]|8)+2^{y-1})>>y \qquad (401)$$

$$k=((3+x-y)<1)?1:3+x-y \qquad (402)$$

$$a=((3+x-y)<1)?Sign(a)*15:a \qquad (403)$$

$$b=minC-((a*minY)>>k) \qquad (404)$$

where divSigTable[ ] is specified as follows:

$$divSigTable[\,]=\{0,7,6,5,5,4,4,3,3,2,2,1,1,1,1,0\} \qquad (405)$$

Otherwise (diff is equal to 0), the following applies:

$$k=0 \qquad (406)$$

$$a=0 \qquad (407)$$

$$b=minC \qquad (408)$$

8. The prediction samples predSamples[x][y] with x=0 . . . nTbW−1, y=0 . . . nTbH−1 are derived as follows:

$$predSamples[x][y]=Clip1(((pDsY[x][y]*a)>>k)+b) \qquad (409)$$

NOTE—This process uses sps_chroma_vertical_collocated_flag. However, in order to simplify implementation, it does not use sps_chroma_horizontal_collocated_flag.

5.10. Embodiment 10

The working draft specified in JVET-Q2001-vE may be changed as below.
8.4.5.2.13
Inputs to this process are:
the intra prediction mode predModeIntra,
a sample location (xTbC, yTbC) of the top-left sample of the current transform block relative to the top-left sample of the current picture,
a variable nTbW specifying the transform block width,
a variable nTbH specifying the transform block height,
a variable cIdx specifying the colour component of the current block,
chroma neighbouring samples p[x][y], with x=−1, y=0 . . . 2*nTbH−1 and x=0 . . . 2*nTbW−1, y=−1.
Output of this process are predicted samples predSamples [x][y], with x=0 . . . nTbW−1, y=0 . . . nTbH−1.
The current luma location (xTbY, yTbY) is derived as follows:

$$(xTbY, yTbY) = (xTbC << (\text{SubWidth}C-1), yTbC << (\text{SubHeight}C-1)) \quad (351)$$

The variables availL, availT and availTL are derived as follows:
The derivation process for neighbouring block availability as specified in clause 6.4.4 is invoked with the current luma location (xCurr, yCurr) set equal to (xTbY, yTbY), the neighbouring luma location (xTbY−1, yTbY), checkPredModeY set equal to FALSE, and cIdx as inputs, and the output is assigned to availL.
The derivation process for neighbouring block availability as specified in clause 6.4.4 is invoked with the current luma location (xCurr, yCurr) set equal to (xTbY, yTbY), the neighbouring luma location (xTbY, yTbY−1), checkPredModeY set equal to FALSE, and cIdx as inputs, and the output is assigned to availT.
- *The derivation process for neighbouring block availability as specified in clause 6.4.4 is invoked with the current luma location (xCurr, yCurr) set equal to (xTbY, yTbY), the neighbouring luma location (xTbY−1, yTbY−1), checkPredModeY set equal to FALSE, and cIdx as inputs, and the output is assigned to availTL.*
The number of available top-right neighbouring chroma samples numTopRight is derived as follows:
The variable numTopRight is set equal to 0 and availTR is set equal to TRUE.
When predModeIntra is equal to INTRA_T_CCLM, the following applies for x=nTbW . . . 2*nTbW−1 until availTR is equal to FALSE or x is equal to 2*nTbW−1:
The derivation process for neighbouring block availability as specified in clause 6.4.4 is invoked with the current luma location (xCurr, yCurr) set equal to (xTbY, yTbY) the neighbouring luma location (xTbY+x, yTbY−1), checkPredModeY set equal to FALSE, and cIdx as inputs, and the output is assigned to availTR
When availTR is equal to TRUE, numTopRight is incremented by one.
The number of available left-below neighbouring chroma samples numLeftBelow is derived as follows:
The variable numLeftBelow is set equal to 0 and availLB is set equal to TRUE.
When predModeIntra is equal to INTRA_L_CCLM, the following applies for y=nTbH . . . 2*nTbH−1 until availLB is equal to FALSE or y is equal to 2*nTbH−1:
The derivation process for neighbouring block availability as specified in clause 6.4.4 is invoked with the current luma location (xCurr, yCurr) set equal to (xTbY, yTbY), the neighbouring luma location (xTbY−1, yTbY+y), checkPredModeY set equal to FALSE, and cIdx as inputs, and the output is assigned to availLB
When availLB is equal to TRUE, numLeftBelow is incremented by one.
The number of available neighbouring chroma samples on the top and top-right numSampT and the number of available neighbouring chroma samples on the left and left-below numSampL are derived as follows:
If predModeIntra is equal to INTRA_LT_CCLM, the following applies:

$$\text{numSamp}T = \text{avail}T\,?\,nTbW:0 \quad (353)$$

$$\text{numSamp}L = \text{avail}L\,?\,nTbH:0 \quad (354)$$

Otherwise, the following applies:

$$\text{numSamp}T = (\text{avail}T\,\&\&\,\text{predModeIntra}==\text{INTRA}\_T\_\text{CCLM})\,?\,(nTbW+\text{Min}(\text{numTopRight}, nTbH)):0 \quad (355)$$

$$\text{numSamp}L = (\text{avail}L\,\&\&\,\text{predModeIntra}==\text{INTRA}\_L\_\text{CCLM})\,?\,(nTbH+\text{Min}(\text{numLeftBelow}, nTbW)):0 \quad (356)$$

The variable bCTUboundary is derived as follows:

$$b\text{CTUboundary} = (yTbY\,\&\,(Ctb\text{Size}Y-1)==0)\,?\,\text{TRUE}:\text{FALSE}. \quad (357)$$

The variable cntN and array pickPosN with N being replaced by L and T, are derived as follows:
The variable numIs4N is derived as follows:

$$\text{numIs4}N = ((\text{avail}T\,\&\&\,\text{avail}L\,\&\&\,\text{predModeIntra}==\text{INTRA}\_LT\_\text{CCLM})\,?\,0:1) \quad (358)$$

The variable startPosN is set equal to numSampN>>(2+numIs4N).
The variable pickStepN is set equal to Max(1, numSampN>>(1+numIs4N)).
If availN is equal to TRUE and predModeIntra is equal to INTRA_LT_CCLM or INTRA_N_CCLM, the following assignments are made:
cntN is set equal to Min(numSampN, (1+numIs4N)<<1).
pickPosN[pos] is set equal to (startPosN+ pos*pickStepN), with pos=0 . . . cntN−1.
Otherwise, cntN is set equal to 0.
The prediction samples predSamples[x][y] with x=0 . . . nTbW−1, y=0 . . . nTbH−1 are derived as follows:
If both numSampL and numSampT are equal to 0, the following applies:

$$\text{predSamples}[x][y] = 1 << (\text{BitDepth}-1) \quad (359)$$

Otherwise, the following ordered steps apply:
1. The collocated luma samples pY[x][y] with x=0 . . . nTbW*SubWidthC−1, y=0 . . . nTbH*SubHeightC−1 are set equal to the reconstructed luma samples prior to the deblocking filter process at the locations (xTbY+x, yTbY+y).
2. The neighbouring luma samples pY[x][y] are derived as follows:
   When numSampL is greater than 0, the neighbouring left luma samples pY[x][y] with x=−1 . . . −3, y=0 . . . SubHeightC*numSampL−1, are set equal to the reconstructed luma samples prior to the deblocking filter process at the locations (xTbY+x, yTbY+y).
   When numSampT is greater than 0, the neighbouring top luma samples pY[x][y] with x=0 . . . SubWidthC*numSampT−1, y=−1, −2, are set equal to the reconstructed luma samples prior to the deblocking filter process at the locations (xTbY+x, yTbY+y).
   If availTL is equal to TRUE, the neighbouring top-left luma samples pY[x][y] with x=−1, −2, y=−1, −2 are set equal to the reconstructed luma samples prior to the deblocking filter process at the locations (xTbY+x, yTbY+y).
   – *Otherwise, , if availT is equal to true, , the neighbouring top-left luma samples pY[ x ][ y ] with x = -1, , -2, , y = -1, , -2, , are set equal to the luma samples pY[0][y]. .*
   – *Otherwise, , if availL is equal to true, , the neighbouring top-left luma samples pY[ x ][ y ] with x = -1, , -2, , y = -1, , -2, , are set equal to the luma samples pY[x][0]. .*
   – *When availT is equal to FALSE, the neighbouring top luma samples pY[ x ][ y ] with x = 0..SubWidthC * nTbW - 1, y = -1..-2, are set equal to the luma samples pY[ x ][ 0 ].*
   – *When availL is equal to FALSE, the neighbouring left luma samples pY[ x ][ y ] with x = 0..-3, , y = -1..SubHeightC * nTbH -1, , are set equal to the luma samples pY[ 0 ][ y ]. .*
3. The down-sampled collocated luma samples pDsY[x][y] with x=0 . . . nTbW−1, y=0 . . . nTbH−1 are derived as follows:
   If both SubWidthC and SubHeightC are equal to 1, the following applies:
   pDsY[x][y] with x=1 . . . nTbW−1, y=1 . . . nTbH−1 is derived as follows:

$$pDstY[x][y]=pY[x][y] \quad (360)$$

Otherwise, the following applies:
   The one-dimensional filter coefficients array F1 and F2, and the 2-dimensional filter coefficients arrays F3 and F4 are specified as follows.

$$F1[0]=2,F1[1]=0 \quad (361)$$

$$F2[0]=1,F2[1]=2,F2[2]=1 \quad (362)$$

$$F3[i][j]=F4[i][j]=0, \text{with } i=0 \ldots 2, j=0 \ldots 2 \quad (363)$$

If both SubWidthC and SubHeightC are equal to 2, the following applies:

$$F1[0]=1,F1[1]=1 \quad (364)$$

$$F3[0][1]=1,F3[1][1]=4,F3[2][1]=1,F3[1][0]=1,F3[1][2]=1 \quad (365)$$

$$F4[0][1]=1,F4[1][1]=2,F4[2][1]=1 \quad (366)$$

$$F4[0][2]=1,F4[1][2]=2,F4[2][2]=1 \quad (367)$$

Otherwise, the following applies:

$$F3[1][1]=8 \quad (368)$$

$$F4[0][1]=2,F4[1][1]=4,F4[2][1]=2, \quad (369)$$

If sps_chroma_vertical_collocated_flag is equal to 1, the following applies:
   pDsY[x][y] with x=0 . . . nTbW−1, y=0 . . . nTbH−1 is derived as follows:

$$\begin{aligned}pDsY[x][y]=&(F3[1][0]*pY[SubWidthC*x]\\&[SubHeightC*y-1]+F3[0][1]*pY[SubWidthC*x-1][SubHeightC*y]+F3[1][1]*pY[SubWidthC*x]\\&[SubHeightC*y]+F3[2][1]*pY[SubWidthC*x+1]\\&[SubHeightC*y]+F3[1][2]*pY[SubWidthC*x]\\&[SubHeightC*y+1]+4)>>3\end{aligned} \quad (370)$$

Otherwise (sps_chroma_vertical_collocated_flag is equal to 0), the following applies:
   pDsY[x][y] with x=0 . . . nTbW−1, y=0 . . . nTbH−1 is derived as follows:

$$\begin{aligned}pDsY[x][y]=&(F4[0][1]*pY[SubWidthC*x-1]\\&[SubHeightC*y]+F4[0][2]*pY[SubWidthC*x-1]\\&[SubHeightC*y+1]+F4[1][1]*pY[SubWidthC*x]\\&[SubHeightC*y]+F4[1][2]*pY[SubWidthC*x]\\&[SubHeightC*y+1]+F4[2][1]*pY[SubWidthC*x+1][SubHeightC*y]+F4[2][2]*pY[SubWidthC*x+1][SubHeightC*y+1]+4)>>3\end{aligned} \quad (371)$$

4. When numSampL is greater than 0, the selected neighbouring left chroma samples pSelC[idx] are set equal to p[−1][pickPosL[idx]] with idx=0 . . . cntL−1, and the selected down-sampled neighbouring left luma samples pSelDsY[idx] with idx=0 . . . cntL−1 are derived as follows:
   The variable y is set equal to pickPosL[idx].
   If both SubWidthC and SubHeightC are equal to 1, the following applies:

$$pSelDsY[idx]=pY[-1][y] \quad (372)$$

Otherwise the following applies:
   If sps_chroma_vertical_collocated_flag is equal to 1, the following applies:

$$\begin{aligned}pSelDsY[idx]=&(F3[1][0]*pY[-SubWidthC]\\&[SubHeightC*y-1]+F3[0][1]*pY[-1-SubWidthC][SubHeightC*y]+F3[1][1]*pY[-SubWidthC][SubHeightC*y]+F3[2][1]*pY[1-SubWidthC][SubHeightC*y]+F3[1][2]*pY[-SubWidthC][SubHeightC*y+1]+4)>>3\end{aligned} \quad (373)$$

Otherwise (sps_chroma_vertical_collocated_flag is equal to 0), the following applies:

$$\begin{aligned}pSelDsY[idx]=&(F4[0][1]*pY[-1-SubWidthC]\\&[SubHeightC*y]+F4[0][2]*pY[-1-SubWidthC]\\&[SubHeightC*y+1]+F4[1][1]*pY[-SubWidthC]\\&[SubHeightC*y]+F4[1][2]*pY[-SubWidthC]\\&[SubHeightC*y+1]+F4[2][1]*pY[1-SubWidthC]\\&[SubHeightC*y]+F4[2][2]*pY[1-SubWidthC]\\&[SubHeightC*y+1]+4)>>3\end{aligned} \quad (374)$$

5. When numSampT is greater than 0, the selected neighbouring top chroma samples pSelC[idx] are set equal to p[pickPosT[idx−cntL]][−1] with idx= cntL . . . cntL+cntT−1, and the down-sampled neighbouring top luma samples pSelDsY[idx] with idx=0 . . . cntL+cntT−1 are specified as follows:
The variable x is set equal to pickPosT[idx−cntL].
If both SubWidthC and SubHeightC are equal to 1, the following applies:

$$pSelDsY[idx]=pY[x][-1] \quad (375)$$

Otherwise, the following applies:
If sps_chroma_vertical_collocated_flag is equal to 1, the following applies:
If bCTUboundary is equal to FALSE, the following applies:

$$pSelDsY[idx]=(F3[1][0]*pY[SubWidthC*x][-1-SubHeightC]+F3[0][1]*pY[SubWidthC*x-1][-SubHeightC]+F3[1][1]*pY[SubWidthC*x][-SubHeightC]+F3[2][1]*pY[SubWidthC*x+1][-SubHeightC]+F3[1][2]*pY[SubWidthC*x][1-SubHeightC]+4)>>3 \quad (376)$$

Otherwise (bCTUboundary is equal to TRUE), the following applies:

$$pSelDsY[idx]=(F2[0]*pY[SubWidthC*x-1][-1]+F2[1]*pY[SubWidthC*x][-1]+F2[2]*pY[SubWidthC*x+1][-1]+2)>>2 \quad (377)$$

Otherwise (sps_chroma_vertical_collocated_flag is equal to 0), the following applies:
If bCTUboundary is equal to FALSE, the following applies:

$$pSelDsY[idx]=(F4[0][1]*pY[SubWidthC\ x-1][-1]+F4[0][2]*pY[SubWidthC*x-1][-2]+F4[1][1]*pY[SubWidthC*x][-1]+F4[1][2]*pY[SubWidthC*x][-2]+F4[2][1]*pY[SubWidthC*x+1][-1]+F4[2][2]*pY[SubWidthC*x+1][-2]+4)>>3 \quad (378)$$

Otherwise (bCTUboundary is equal to TRUE), the following applies:

$$pSelDsY[idx]=(F2[0]*pY[SubWidthC*x-1][-1]+F2[1]*pY[SubWidthC*x][-1]+F2[2]*pY[SubWidthC*x+1][-1]+2)>>2 \quad (379)$$

6. When cntT+cntL is not equal to 0, the variables minY, maxY, minC and maxC are derived as follows:
When cntT+cntL is equal to 2, pSelComp[3] is set equal to pSelComp[0], pSelComp[2] is set equal to pSelComp[1], pSelComp[0] is set equal to pSelComp[1], and pSelComp[1] is set equal to pSelComp[3], with Comp being replaced by DsY and C.
The arrays minGrpIdx and maxGrpIdx are derived as follows:

$$minGrpIdx[0]=0 \quad (380)$$

$$minGrpIdx[1]=2 \quad (381)$$

$$maxGrpIdx[0]=1 \quad (382)$$

$$maxGrpIdx[1]=3 \quad (383)$$

When pSelDsY[minGrpIdx[0]] is greater than pSelDsY[minGrpIdx[1]], minGrpIdx[0] and minGrpIdx[1] are swapped as follows:

$$(minGrpIdx[0],minGrpIdx[1])=Swap(minGrpIdx[0],minGrpIdx[1]) \quad (384)$$

When pSelDsY[maxGrpIdx[0]] is greater than pSelDsY[maxGrpIdx[1]], maxGrpIdx[0] and maxGrpIdx[1] are swapped as follows:

$$(maxGrpIdx[0],maxGrpIdx[1])=Swap(maxGrpIdx[0],maxGrpIdx[1]) \quad (385)$$

When pSelDsY[minGrpIdx[0]] is greater than pSelDsY[maxGrpIdx[1]], arrays minGrpIdx and maxGrpIdx are swapped as follows:

$$(minGrpIdx,maxGrpIdx)=Swap(minGrpIdx,maxGrpIdx) \quad (386)$$

When pSelDsY[minGrpIdx[1]] is greater than pSelDsY[maxGrpIdx[0]], minGrpIdx[1] and maxGrpIdx[0] are swapped as follows:

$$(minGrpIdx[1],maxGrpIdx[0])=Swap(minGrpIdx[1],maxGrpIdx[0]) \quad (387)$$

The variables maxY, maxC, minY and minC are derived as follows:

$$maxY=(pSelDsY[maxGrpIdx[0]]+pSelDsY[maxGrpIdx[1]]+1)>>1 \quad (388)$$

$$maxC=(pSelC[maxGrpIdx[0]]+pSelC[maxGrpIdx[1]]+1)>>1 \quad (389)$$

$$minY=(pSelDsY[minGrpIdx[0]]+pSelDsY[minGrpIdx[1]]+1)>>1 \quad (390)$$

$$minC=(pSelC[minGrpIdx[0]]+pSelC[minGrpIdx[1]]+1)>>1 \quad (391)$$

7. The variables a, b, and k are derived as follows:
If numSampL is equal to 0, and numSampT is equal to 0, the following applies:

$$k=0 \quad (392)$$

$$a=0 \quad (393)$$

$$b=1<<(BitDepth-1) \quad (394)$$

Otherwise, the following applies:

$$diff=maxY-minY \quad (395)$$

If diff is not equal to 0, the following applies:

$$diffC=maxC-minC \quad (396)$$

$$x=Floor(Log\ 2(diff)) \quad (397)$$

$$normDiff=((diff<<4)>>x)\&15 \quad (398)$$

$$x+=(normDiff\ !=0)?1:0 \quad (399)$$

$$y=Abs(diffC)>0?Floor(Log\ 2(Abs(diffC)))+1:0 \quad (400)$$

$$a=(diffC*(divSigTable[normDiff]|8)+2^{y-1})>>y \quad (401)$$

$$k=((3+x-y)<1)?1:3+x-y \quad (402)$$

$$a=((3+x-y)<1)?Sign(a)*15:a \quad (403)$$

$$b=minC-((a*minY)>>k) \quad (404)$$

where divSigTable[ ] is specified as follows:

$$divSigTable[\ ]=\{0,7,6,5,5,4,4,3,3,2,2,1,1,1,1,0\} \quad (405)$$

Otherwise (diff is equal to 0), the following applies:

$$k=0 \quad (406)$$

$$a=0 \quad (407)$$

$$b=minC \quad (408)$$

8. The prediction samples predSamples[x][y] with x=0 . . . nTbW−1, y=0 . . . nTbH−1 are derived as follows:

predSamples[x][y]=Clip1(((pDsY[x][y]*a)>>k)+b)  (409)

NOTE—This process uses sps_chroma_vertical_collocated_flag. However, in order to simplify implementation, it does not use sps_chroma_horizontal_collocated_flag.

5.11. Embodiment 11

The working draft specified in JVET-Q2001-vE may be changed as below.
8.4.5.2.13
Inputs to this process are:
  the intra prediction mode predModeIntra,
  a sample location (xTbC, yTbC) of the top-left sample of the current transform block relative to the top-left sample of the current picture,
  a variable nTbW specifying the transform block width,
  a variable nTbH specifying the transform block height,
  a variable cIdx specifying the colour component of the current block,
  chroma neighbouring samples p[x][y], with x=−1, y=0 . . . 2*nTbH−1 and x=0 . . . 2*nTbW−1, y=−1.
Output of this process are predicted samples predSamples [x][y], with x=0 . . . nTbW−1, y=0 . . . nTbH−1.
The current luma location (xTbY, yTbY) is derived as follows:

(xTbY,yTbY)=(xTbC<<(SubWidthC−1),yTbC<<(SubHeightC−1))  (351)

The variables availL, availT and availTL are derived as follows:
  The derivation process for neighbouring block availability as specified in clause 6.4.4 is invoked with the current luma location (xCurr, yCurr) set equal to (xTbY, yTbY), the neighbouring luma location (xTbY−1, yTbY), checkPredModeY set equal to FALSE, and cIdx as inputs, and the output is assigned to availL.
  The derivation process for neighbouring block availability as specified in clause 6.4.4 is invoked with the current luma location (xCurr, yCurr) set equal to (xTbY, yTbY), the neighbouring luma location (xTbY, yTbY−1), checkPredModeY set equal to FALSE, and cIdx as inputs, and the output is assigned to availT.
  The number of available top-right neighbouring chroma samples numTopRight is derived as follows:
    The variable numTopRight is set equal to 0 and availTR is set equal to TRUE.
    When predModeIntra is equal to INTRA_T_CCLM, the following applies for x=nTbW . . . 2*nTbW−1 until availTR is equal to FALSE or x is equal to 2*nTbW−1:
      The derivation process for neighbouring block availability as specified in clause 6.4.4 is invoked with the current luma location (xCurr, yCurr) set equal to (xTbY, yTbY) the neighbouring luma location (xTbY+x, yTbY−1), checkPredModeY set equal to FALSE, and cIdx as inputs, and the output is assigned to availTR
      When availTR is equal to TRUE, numTopRight is incremented by one.
  The number of available left-below neighbouring chroma samples numLeftBelow is derived as follows:
    The variable numLeftBelow is set equal to 0 and availLB is set equal to TRUE.
    When predModeIntra is equal to INTRA_L_CCLM, the following applies for y=nTbH . . . 2*nTbH−1 until availLB is equal to FALSE or y is equal to 2*nTbH−1:
      The derivation process for neighbouring block availability as specified in clause 6.4.4 is invoked with the current luma location (xCurr, yCurr) set equal to (xTbY, yTbY), the neighbouring luma location (xTbY−1, yTbY+y), checkPredModeY set equal to FALSE, and cIdx as inputs, and the output is assigned to availLB
      When availLB is equal to TRUE, numLeftBelow is incremented by one.
The number of available neighbouring chroma samples on the top and top-right numSampT and the number of available neighbouring chroma samples on the left and left-below numSampL are derived as follows:
  If predModeIntra is equal to INTRA_LT_CCLM, the following applies:

numSampT=availT?nTbW:0  (353)

numSampL=availL?nTbH:0  (354)

Otherwise, the following applies:

numSampT=
  (availT&&predModeIntra==INTRA_T_CCLM)?
  (nTbW+Min(numTopRight,nTbH)):0  (355)

numSampL=
  (availL&&predModeIntra==INTRA_L_CCLM)?
  (nTbH+Min(numLeftBelow,nTbW)):0  (356)

The variable bCTUboundary is derived as follows:

bCTUboundary=(yTbY&(CtbSizeY−1)==0)?TRUE:FALSE.  (357)

The variable cntN and array pickPosN with N being replaced by L and T, are derived as follows:
  The variable numIs4N is derived as follows:

numIs4N=
  ((availT&&availL&&predModeIntra==INTRA_LT_CCLM)
  ?0:1)  (358)

The variable startPosN is set equal to numSampN>>(2+numIs4N).
  The variable pickStepN is set equal to Max(1, numSampN>>(1+numIs4N)).
  If availN is equal to TRUE and predModeIntra is equal to INTRA_LT_CCLM or INTRA_N_CCLM, the following assignments are made:
    cntN is set equal to Min(numSampN, (1+numIs4N)<<1).
    pickPosN[pos] is set equal to (startPosN+pos*pickStepN), with pos=0 . . . cntN−1.
  Otherwise, cntN is set equal to 0.
The prediction samples predSamples[x][y] with x=0 . . . nTbW−1, y=0 . . . nTbH−1 are derived as follows:
  If both numSampL and numSampT are equal to 0, the following applies:

predSamples[x][y]=1<<(BitDepth−1)  (359)

Otherwise, the following ordered steps apply:
    1. The collocated luma samples pY[x][y] with x=0 . . . nTbW*SubWidthC−1, y=0 . . . nTbH*SubHeightC−1 are set equal to the reconstructed luma samples prior to the deblocking filter process at the locations (xTbY+x, yTbY+y).
    2. The neighbouring luma samples pY[x][y] are derived as follows:

When numSampL is greater than 0, the neighbouring left luma samples pY[x][y] with x=−1 . . . −3, y=0 . . . SubHeightC*numSampL−1, are set equal to the reconstructed luma samples prior to the deblocking filter process at the locations (xTbY+x, yTbY+y).

When availT is equal to FALSE, the neighbouring top luma samples pY[x][y] with x=−1 . . . SubWidthC*numSampT−1, y=−1 . . . −2, are set equal to the luma samples pY[x][0].

When availL is equal to FALSE, the neighbouring left luma samples pY[x][y] with x=−1 . . . −3, y=−1 . . . SubHeightC*numSampL−1, are set equal to the luma samples pY[0][y].

When numSampT is greater than 0, the neighbouring top luma samples pY[x][y] with x=0 . . . SubWidthC*numSampT−1, y=−1, −2, are set equal to the reconstructed luma samples prior to the deblocking filter process at the locations (xTbY+x, yTbY+y).

- *If availT is equal to true,,*
  *the neighbouring top-left*
  *luma samples pY[ x ][ y ] with x = -1,,     -2 ,*
  *y = -1,     -2 ,     are set equal to the*
  *luma samples pY[0][y]*
- *Otherwise,     if availL is equal to true ,*
  *the neighbouring top-left luma samples*
  *pY[ x ][ y ] with x = -1,    -2 ,    y = -1,    -2 ,*
  *are set equal to the luma samples pY[x][0]. .*

3. The down-sampled collocated luma samples pDsY[x][y] with x=0 . . . nTbW−1, y=0 . . . nTbH−1 are derived as follows:
   If both SubWidthC and SubHeightC are equal to 1, the following applies:
   pDsY[x][y] with x=1 . . . nTbW−1, y=1 . . . nTbH−1 is derived as follows:

*pDstY[x][y]=pY[x][y]*                                       (360)

Otherwise, the following applies:
The one-dimensional filter coefficients array F1 and F2, and the 2-dimensional filter coefficients arrays F3 and F4 are specified as follows.

*F1[0]=2,F1[1]=0*                                        (361)

*F2[0]=1,F2[1]=2,F2[2]=1*                               (362)

*F3[i][j]=F4[i][j]=0*,with *i=0 . . . 2,j=0 . . . 2*        (363)

If both SubWidthC and SubHeightC are equal to 2, the following applies:

*F1[0]=1,F1[1]=1*                                          (364)

*F3[0][1]=1,F3[1][1]=4,F3[2][1]=1,F3[1][0]=1,F3[1][2]=1*                                (365)

*F4[0][1]=1,F4[1][1]=2,F4[2][1]=1*                   (366)

*F4[0][2]=1,F4[1][2]=2,F4[2][2]=1*                   (367)

Otherwise, the following applies:

*F3[1][1]=8*                                                  (368)

*F4[0][1]=2,F4[1][1]=4,F4[2][1]=2,*                   (369)

If sps_chromavertical_collocated_flag is equal to 1, the following applies:
pDsY[x][y] with x=0 . . . nTbW−1, y=0 . . . nTbH−1 is derived as follows:

*pDsY[x][y]=(F3[1][0]*pY[SubWidthC*x]*
  *[SubHeightC*y−1]+F3[0][1]*pY[SubWidthC*x−1][SubHeightC*y]+F3[1][1]*pY[SubWidthC*x]*
  *[SubHeightC*y]+F3[2][1]*pY[SubWidthC*x+1]*
  *[SubHeightC*y]+F3[1][2]*pY[SubWidthC*x]*
  *[SubHeightC*y+1]+4)>>3*                   (370)

Otherwise (sps_chromavertical_collocated_flag is equal to 0), the following applies:
pDsY[x][y] with x=0 . . . nTbW−1, y=0 . . . nTbH−1 is derived as follows:

*pDsY[x][y]=(F4[0][1]*pY[SubWidthC*x−1]*
  *[SubHeightC*y]+F4[0][2]*pY[SubWidthC*x−1]*
  *[SubHeightC*y+1]+F4[1][1]*pY[SubWidthC*x]*
  *[SubHeightC*y]+F4[1][2]*pY[SubWidthC*x]*
  *[SubHeightC*y+1]+F4[2][1]*pY[SubWidthC*x+1][SubHeightC*y]+F4[2][2]*pY[SubWidthC*x+1][SubHeightC*y+1]+4)>>3*            (371)

4. When numSampL is greater than 0, the selected neighbouring left chroma samples pSelC[idx] are set equal to p[−1][pickPosL[idx]] with idx=0 . . . cntL−1, and the selected down-sampled neighbouring left luma samples pSelDsY[idx] with idx=0 . . . cntL−1 are derived as follows:
   The variable y is set equal to pickPosL[idx].
   If both SubWidthC and SubHeightC are equal to 1, the following applies:

*pSelDsY[idx]=pY[−1][y]*                                  (372)

Otherwise the following applies:
If sps_chroma_vertical_collocated_flag is equal to 1, the following applies:

*pSelDsY[idx]=(F3[1][0]*pY[−SubWidthC]*
  *[SubHeightC*y−1]+F3[0][1]*pY[−1−SubWidthC][SubHeightC*y]+F3[1][1]*pY[−SubWidthC][SubHeightC*y]+F3[2][1]*pY[1−SubWidthC][SubHeightC*y]+F3[1][2]*pY[−SubWidthC][SubHeightC*y+1]+4)>>3*       (373)

Otherwise (sps_chroma_vertical_collocated_flag is equal to 0), the following applies:

*pSelDsY[idx]=(F4[0][1]*pY[−1−SubWidthC]*
  *[SubHeightC*y]+F4[0][2]*pY[−1−SubWidthC][SubHeightC*y]+1+F4[1][1]*pY[−SubWidthC][SubHeightC*y]+F4[1][2]*pY[−SubWidthC][SubHeightC*y+1]+F4[2][1]*pY[1−SubWidthC][SubHeightC*y]+F4[2][2]*pY[1−SubWidthC][SubHeightC*y+1]+4)>>3*                      (374)

5. When numSampT is greater than 0, the selected neighbouring top chroma samples pSelC[idx] are set equal to p[pickPosT[idx−cntL]][−1] with idx=cntL . . . cntL+cntT−1, and the down-sampled neighbouring top luma samples pSelDsY[idx] with idx=0 . . . cntL+cntT−1 are specified as follows:
   The variable x is set equal to pickPosT[idx−cntL].
   If both SubWidthC and SubHeightC are equal to 1, the following applies:

*pSelDsY[idx]=pY[x][−1]*                                  (375)

Otherwise, the following applies:
If sps_chroma_vertical_collocated_flag is equal to 1, the following applies:
If bCTUboundary is equal to FALSE, the following applies:

*pSelDsY[idx]=(F3[1][0]*pY[SubWidthC*x][−1−SubHeightC]+F3[0][1]*pY[SubWidthC*x−1][−SubHeightC]+F3[1][1]*pY[SubWidthC*x][−SubHeightC]+F3[2][1]*pY[SubWidthC*x+1][−SubHeightC]+F3[1][2]*pY[SubWidthC*x][1−SubHeightC]+4)>>3*          (376)

Otherwise (bCTUboundary is equal to TRUE), the following applies:

$$pSelDsY[idx]=(F2[0]*pY[SubWidthC*x-1][-1]+F2[1]*pY[SubWidthC*x][-1]+F2[2]*pY[SubWidthC*x+1][-1]+2)>>2 \quad (377)$$

Otherwise (sps_chroma_vertical_collocated_flag is equal to 0), the following applies:
If bCTUboundary is equal to FALSE, the following applies:

$$pSelDsY[idx]=(F4[0][1]*pY[SubWidthC\ x-1][-1]+F4[0][2]*pY[SubWidthC*x-1][-2]+F4[1][1]*pY[SubWidthC*x][-1]+F4[1][2]*pY[SubWidthC*x][-2]+F4[2][1]*pY[SubWidthC*x+1][-1]+F4[2][2]*pY[SubWidthC*x+1][-2]+4)>>3 \quad (378)$$

Otherwise (bCTUboundary is equal to TRUE), the following applies:

$$pSelDsY[idx]=(F2[0]*pY[SubWidthC*x-1][-1]+F2[1]*pY[SubWidthC*x][-1]+F2[2]*pY[SubWidthC*x+1][-1]+2)>>2 \quad (379)$$

6. When cntT+cntL is not equal to 0, the variables minY, maxY, minC and maxC are derived as follows:
When cntT+cntL is equal to 2, pSelComp[3] is set equal to pSelComp[0], pSelComp[2] is set equal to pSelComp[1], pSelComp[0] is set equal to pSelComp[1], and pSelComp[1] is set equal to pSelComp[3], with Comp being replaced by DsY and C.
The arrays minGrpIdx and maxGrpIdx are derived as follows:

$$\text{minGrpIdx}[0]=0 \quad (380)$$

$$\text{minGrpIdx}[1]=2 \quad (381)$$

$$\text{maxGrpIdx}[0]=1 \quad (382)$$

$$\text{maxGrpIdx}[1]=3 \quad (383)$$

When pSelDsY[minGrpIdx[0]] is greater than pSelDsY[minGrpIdx[1]], minGrpIdx[0] and minGrpIdx[1] are swapped as follows:

$$(\text{minGrpIdx}[0],\text{minGrpIdx}[1])=\text{Swap}(\text{minGrpIdx}[0],\text{minGrpIdx}[1]) \quad (384)$$

When pSelDsY[maxGrpIdx[0]] is greater than pSelDsY[maxGrpIdx[1]], maxGrpIdx[0] and maxGrpIdx[1] are swapped as follows:

$$(\text{maxGrpIdx}[0],\text{maxGrpIdx}[1])=\text{Swap}(\text{maxGrpIdx}[0],\text{maxGrpIdx}[1]) \quad (385)$$

When pSelDsY[minGrpIdx[0]] is greater than pSelDsY[maxGrpIdx[1]], arrays minGrpIdx and maxGrpIdx are swapped as follows:

$$(\text{minGrpIdx},\text{maxGrpIdx})=\text{Swap}(\text{minGrpIdx},\text{maxGrpIdx}) \quad (386)$$

When pSelDsY[minGrpIdx[1]] is greater than pSelDsY[maxGrpIdx[0]], minGrpIdx[1] and maxGrpIdx[0] are swapped as follows:

$$(\text{minGrpIdx}[1],\text{maxGrpIdx}[0])=\text{Swap}(\text{minGrpIdx}[1],\text{maxGrpIdx}[0]) \quad (387)$$

The variables maxY, maxC, minY and minC are derived as follows:

$$maxY=(pSelDsY[\text{maxGrpIdx}[0]]+pSelDsY[\text{maxGrpIdx}[1]]+1)>>1 \quad (388)$$

$$maxC=(pSelC[\text{maxGrpIdx}[0]]+pSelC[\text{maxGrpIdx}[1]]+1)>>1 \quad (389)$$

$$minY=(pSelDsY[\text{minGrpIdx}[0]]+pSelDsY[\text{minGrpIdx}[1]]+1)>>1 \quad (390)$$

$$minC=(pSelC[\text{minGrpIdx}[0]]+pSelC[\text{minGrpIdx}[1]]+1)>>1 \quad (391)$$

7. The variables a, b, and k are derived as follows:
If numSampL is equal to 0, and numSampT is equal to 0, the following applies:

$$k=0 \quad (392)$$

$$a=0 \quad (393)$$

$$b=1<<(\text{BitDepth}-1) \quad (394)$$

Otherwise, the following applies:

$$\text{diff}=maxY-minY \quad (395)$$

If diff is not equal to 0, the following applies:

$$\text{diffC}=maxC-minC \quad (396)$$

$$x=\text{Floor}(\text{Log 2}(\text{diff})) \quad (397)$$

$$\text{normDiff}=((\text{diff}<<4)>>x)\&15 \quad (398)$$

$$x+=(\text{normDiff}\ !=0)?1:0 \quad (399)$$

$$y=\text{Abs}(\text{diffC})>0?\text{Floor}(\text{Log 2}(\text{Abs}(\text{diffC})))+1:0 \quad (400)$$

$$a=(\text{diffC}*(\text{divSigTable}[\text{normDiff}]|8)+2^{y-1})>>y \quad (401)$$

$$k=((3+x-y)<1)?1:3+x-y \quad (402)$$

$$a=((3+x-y)<1)?\text{Sign}(a)*15:a \quad (403)$$

$$b=minC-((a*minY)>>k) \quad (404)$$

where divSigTable[ ] is specified as follows:

$$\text{divSigTable}[\ ]=\{0,7,6,5,5,4,4,3,3,2,2,1,1,1,1,0\} \quad (405)$$

Otherwise (diff is equal to 0), the following applies:

$$k=0 \quad (406)$$

$$a=0 \quad (407)$$

$$b=minC \quad (408)$$

8. The prediction samples predSamples[x][y] with x=0 . . . nTbW−1, y=0 . . . nTbH−1 are derived as follows:

$$\text{predSamples}[x][y]=\text{Clip1}(((pDsY[x][y]*a)>>k)+b) \quad (409)$$

NOTE—This process uses sps_chroma_vertical_collocated_flag. However, in order to simplify implementation, it does not use sps_chroma_horizontal_collocated_flag.

5.12. Embodiment 12

The working draft specified in JVET-Q2001-vE may be changed as below.
8.4.5.2.13
Inputs to this process are:
the intra prediction mode predModeIntra,
a sample location (xTbC, yTbC) of the top-left sample of the current transform block relative to the top-left sample of the current picture,
a variable nTbW specifying the transform block width,
a variable nTbH specifying the transform block height,
a variable cIdx specifying the colour component of the current block, chroma neighbouring samples p[x][y], with x=−1, y=0 . . . 2*nTbH−1 and x=0 . . . 2*nTbW−1, y=−1.
Output of this process are predicted samples predSamples [x][y], with x=0 . . . nTbW−1, y=0 . . . nTbH−1.
The current luma location (xTbY, yTbY) is derived as follows:

$$(xTbY,yTbY)=(xTbC<<(\text{SubWidth}C-1),yTbC<<(\text{Sub-Height}C-1)) \quad (351)$$

The variables availL, availT and availTL are derived as follows:
  The derivation process for neighbouring block availability as specified in clause 6.4.4 is invoked with the current luma location (xCurr, yCurr) set equal to (xTbY, yTbY), the neighbouring luma location (xTbY−1, yTbY), checkPredModeY set equal to FALSE, and cIdx as inputs, and the output is assigned to availL.
  The derivation process for neighbouring block availability as specified in clause 6.4.4 is invoked with the current luma location (xCurr, yCurr) set equal to (xTbY, yTbY), the neighbouring luma location (xTbY, yTbY−1), checkPredModeY set equal to FALSE, and cIdx as inputs, and the output is assigned to availT.
The variable availTL is derived as follows:

$$\text{avail}TL=\text{avail}L\&\&\text{avail}T \quad (352)$$

The number of available top-right neighbouring chroma samples numTopRight is derived as follows:
  The variable numTopRight is set equal to 0 and availTR is set equal to TRUE.
  When predModeIntra is equal to INTRA_T_CCLM, the following applies for x=nTbW . . . 2*nTbW−1 until availTR is equal to FALSE or x is equal to 2*nTbW−1:
    The derivation process for neighbouring block availability as specified in clause 6.4.4 is invoked with the current luma location (xCurr, yCurr) set equal to (xTbY, yTbY) the neighbouring luma location (xTbY+x, yTbY−1), checkPredModeY set equal to FALSE, and cIdx as inputs, and the output is assigned to availTR
    When availTR is equal to TRUE, numTopRight is incremented by one.
The number of available left-below neighbouring chroma samples numLeftBelow is derived as follows:
  The variable numLeftBelow is set equal to 0 and availLB is set equal to TRUE.
  When predModeIntra is equal to INTRA_L_CCLM, the following applies for y=nTbH . . . 2*nTbH−1 until availLB is equal to FALSE or y is equal to 2*nTbH−1:
    The derivation process for neighbouring block availability as specified in clause 6.4.4 is invoked with the current luma location (xCurr, yCurr) set equal to (xTbY, yTbY), the neighbouring luma location (xTbY−1, yTbY+y), checkPredModeY set equal to FALSE, and cIdx as inputs, and the output is assigned to availLB
    When availLB is equal to TRUE, numLeftBelow is incremented by one.
The number of available neighbouring chroma samples on the top and top-right numSampT and the number of available neighbouring chroma samples on the left and left-below numSampL are derived as follows:
  If predModeIntra is equal to INTRA_LT_CCLM, the following applies:

$$\text{numSamp}T=\text{avail}T?nTbW:0 \quad (353)$$

$$\text{numSamp}L=\text{avail}L?nTbH:0 \quad (354)$$

Otherwise, the following applies:

$$\text{numSamp}T= \\ (\text{avail}T\&\&\text{predModeIntra}==\text{INTRA}\_T\_\text{CCLM})? \\ (nTbW+\text{Min}(\text{numTopRight},nTbH)):0 \quad (355)$$

$$\text{numSamp}L= \\ (\text{avail}L\&\&\text{predModeIntra}==\text{INTRA}\_L\_\text{CCLM})? \\ (nTbH+\text{Min}(\text{numLeftBelow},nTbW)):0 \quad (356)$$

The variable bCTUboundary is derived as follows:

$$b\text{CTUboundary}=(yTbY\&(Ctb\text{Size}Y-1)==0)?\text{TRUE}: \\ \text{FALSE}. \quad (357)$$

The variable cntN and array pickPosN with N being replaced by L and T, are derived as follows:
  The variable numIs4N is derived as follows:

$$\text{numIs}4N= \\ ((\text{avail}T\&\&\text{avail}L\&\&\text{predModeIntra}==\text{INTRA}\_LT\_\text{CCLM}) \\ ?0:1) \quad (358)$$

The variable startPosN is set equal to numSampN>>(2+numIs4N).
  The variable pickStepN is set equal to Max(1, numSampN>>(1+numIs4N)).
  If availN is equal to TRUE and predModeIntra is equal to INTRA_LT_CCLM or INTRA_N_CCLM, the following assignments are made:
    cntN is set equal to Min(numSampN, (1+numIs4N)<<1).
    pickPosN[pos] is set equal to (startPosN+pos*pickStepN), with pos=0 . . . cntN−1.
  Otherwise, cntN is set equal to 0.
The prediction samples predSamples[x][y] with x=0 . . . nTbW−1, y=0 . . . nTbH−1 are derived as follows:
  If both numSampL and numSampT are equal to 0, the following applies:

$$\text{predSamples}[x][y]=1<<(\text{BitDepth}-1) \quad (359)$$

Otherwise, the following ordered steps apply:
    1. The collocated luma samples pY[x][y] with x=0 . . . nTbW*SubWidthC−1, y=0 . . . nTbH*SubHeightC−1 are set equal to the reconstructed luma samples prior to the deblocking filter process at the locations (xTbY+x, yTbY+y).
    2. The neighbouring luma samples pY[x][y] are derived as follows:
      When numSampL is greater than 0, the neighbouring left luma samples pY[x][y] with x=−1 . . . −3, y=0 . . . SubHeightC*numSampL−1, are set equal to the reconstructed luma samples prior to the deblocking filter process at the locations (xTbY+x, yTbY+y).
      When availT is equal to FALSE, the neighbouring top luma samples pY[x][y] with x=−1 . . . SubWidthC*numSampT−1, y=−1 . . . −2, are set equal to the luma samples pY[x][0].
      When availL is equal to FALSE, the neighbouring left luma samples pY[x][y] with x=−1 . . . −3, y=−1 . . . SubHeightC*numSampL−1, are set equal to the luma samples pY[0][y].
      When numSampT is greater than 0, the neighbouring top luma samples pY[x][y] with x=0 . . . SubWidthC*numSampT−1, y=−1, −23 are set equal to the reconstructed luma samples prior to the deblocking filter process at the locations (xTbY+x, yTbY+y).

When availTL is equal to TRUE, the neighbouring top-left luma samples pY[x][y] with x=−1, −2, y=−1, −2 are set equal to the reconstructed luma samples prior to the deblocking filter process at the locations (xTbY+x, yTbY+y).

3. The down-sampled collocated luma samples pDsY[x][y] with x=0 . . . nTbW−1, y=0 . . . nTbH−1 are derived as follows:
If both SubWidthC and SubHeightC are equal to 1, the following applies:
pDsY[x][y] with x=1 . . . nTbW−1, y=1 . . . nTbH−1 is derived as follows:

$$pDstY[x][y]=pY[x][y] \quad (360)$$

Otherwise, the following applies:
The one-dimensional filter coefficients array F1 and F2, and the 2-dimensional filter coefficients arrays F3 and F4 are specified as follows.

$$F1[0]=2, F1[1]=0 \quad (361)$$

$$F2[0]=1, F2[1]=2, F2[2]=1 \quad (362)$$

$$F3[i][j]=F4[i][j]=0, \text{with } i=0\ldots 2, j=0\ldots 2 \quad (363)$$

If both SubWidthC and SubHeightC are equal to 2, the following applies:

$$F1[0]=1, F1[1]=1 \quad (364)$$

$$F3[0][1]=1, F3[1][1]=4, F3[2][1]=1, F3[1][0]=1, F3[1][2]=1 \quad (365)$$

$$F4[0][1]=1, F4[1][1]=2, F4[2][1]=1 \quad (366)$$

$$F4[0][2]=1, F4[1][2]=2, F4[2][2]=1 \quad (367)$$

Otherwise, the following applies:

$$F3[1][1]=8 \quad (368)$$

$$F4[0][1]=2, F4[1][1]=4, F4[2][1]=2, \quad (369)$$

If sps_chromavertical_collocated_flag is equal to 1, the following applies:
pDsY[x][y] with x=0 . . . nTbW−1, y=0 . . . nTbH−1 is derived as follows:

$$pDsY[x][y]=(F3[1][0]*pY[SubWidthC*x][SubHeightC*y-1]+F3[0][1]*pY[SubWidthC*x-1][SubHeightC*y]+F3[1][1]*pY[SubWidthC*x][SubHeightC*y]+F3[2][1]*pY[SubWidthC*x+1][SubHeightC*y]+F3[1][2]*pY[SubWidthC*x][SubHeightC*y+1]+4)>>3 \quad (370)$$

Otherwise (sps_chroma_vertical_collocated_flag is equal to 0), the following applies:
pDsY[x][y] with x=0 . . . nTbW−1, y=0 . . . nTbH−1 is derived as follows:

$$pDsY[x][y]=(F4[0][1]*pY[SubWidthC*x-1][SubHeightC*y]+F4[0][2]*pY[SubWidthC*x-1][SubHeightC*y+1]+F4[1][1]*pY[SubWidthC*x][SubHeightC*y]+F4[1][2]*pY[SubWidthC*x][SubHeightC*y+1]+F4[2][1]*pY[SubWidthC*x+1][SubHeightC*y]+F4[2][2]*pY[SubWidthC*x+1][SubHeightC*y+1]+4)>>3 \quad (371)$$

4. When numSampL is greater than 0, the selected neighbouring left chroma samples pSelC[idx] are set equal to p[−1][pickPosL[idx]] with idx=0 . . . cntL−1, and the selected down-sampled neighbouring left luma samples pSelDsY[idx] with idx=0 . . . cntL−1 are derived as follows:
The variable y is set equal to pickPosL[idx].
If both SubWidthC and SubHeightC are equal to 1, the following applies:

$$pSelDsY[idx]=pY[-1][y] \quad (372)$$

Otherwise the following applies:
If sps_chroma_vertical_collocated_flag is equal to 1, the following applies:

$$pSelDsY[idx]=(F3[1][0]*pY[-SubWidthC][SubHeightC*y-1]+F3[0][1]*pY[-1-SubWidthC][SubHeightC*y]+F3[1][1]*pY[-SubWidthC][SubHeightC*y]+F3[2][1]*pY[1-SubWidthC][SubHeightC*y]+F3[1][2]*pY[-SubWidthC][SubHeightC*y+1]+4)>>3 \quad (373)$$

Otherwise (sps_chroma_vertical_collocated_flag is equal to 0), the following applies:

$$pSelDsY[idx]=(F4[0][1]*pY[-1-SubWidthC][SubHeightC*y]+F4[0][2]*pY[-1-SubWidthC][SubHeightC*y+1]+F4[1][1]*pY[-SubWidthC][SubHeightC*y]+F4[1][2]*pY[-SubWidthC][SubHeightC*y+1]+F4[2][1]*pY[1-SubWidthC][SubHeightC*y]+F4[2][2]*pY[1-SubWidthC][SubHeightC*y+1]+4)>>3 \quad (374)$$

5. When numSampT is greater than 0, the selected neighbouring top chroma samples pSelC[idx] are set equal to p[pickPosT[idx−cntL]][−1] with idx=cntL . . . cntL+cntT−1, and the down-sampled neighbouring top luma samples pSelDsY[idx] with idx=0 . . . cntL+cntT−1 are specified as follows:
The variable x is set equal to pickPosT[idx−cntL].
If both SubWidthC and SubHeightC are equal to 1, the following applies:

$$pSelDsY[idx]=pY[x][-1] \quad (375)$$

Otherwise, the following applies:
If sps_chroma_vertical_collocated_flag is equal to 1, the following applies:
If bCTUboundary is equal to FALSE, the following applies:

$$pSelDsY[idx]=(F3[1][0]*pY[SubWidthC*x][-1-SubHeightC]+F3[0][1]*pY[SubWidthC*x-1][-SubHeightC]+F3[1][1]*pY[SubWidthC*x][-SubHeightC]+F3[2][1]*pY[SubWidthC*x+1][-SubHeightC]+F3[1][2]*pY[SubWidthC*x][1-SubHeightC]+4)>>3 \quad (376)$$

Otherwise (bCTUboundary is equal to TRUE), the following applies:

$$pSelDsY[idx]=(F2[0]*pY[SubWidthC*x-1][-1]+F2[1]*pY[SubWidthC*x][-1]+F2[2]*pY[SubWidthC*x+1][-1]+2)>>2 \quad (377)$$

Otherwise (sps_chroma_vertical_collocated_flag is equal to 0), the following applies:
If bCTUboundary is equal to FALSE, the following applies:

$$pSelDsY[idx]=(F4[0][1]*pY[SubWidthC\ x-1][-1]+F4[0][2]*pY[SubWidthC*x-1][-2]+F4[1][1]*pY[SubWidthC*x][-1]+F4[1][2]*pY[SubWidthC*x][-2]+F4[2][1]*pY[SubWidthC*x+1][-1]+F4[2][2]*pY[SubWidthC*x+1][-2]+4)>>3 \quad (378)$$

Otherwise (bCTUboundary is equal to TRUE), the following applies:

$$pSelDsY[idx]=(F2[0]*pY[SubWidthC*x-1][-1]+F2[1]*pY[SubWidthC*x][-1]+F2[2]*pY[SubWidthC*x+1][-1]+2)>>2 \quad (379)$$

6. When cntT+cntL is not equal to 0, the variables minY, maxY, minC and maxC are derived as follows:
When cntT+cntL is equal to 2, pSelComp[3] is set equal to pSelComp[0], pSelComp[2] is set equal to pSelComp[1], pSelComp[0] is set equal to pSelComp[1], and pSelComp[1] is set equal to pSelComp[3], with Comp being replaced by DsY and C.

The arrays minGrpIdx and maxGrpIdx are derived as follows:

$$minGrpIdx[0]=0 \quad (380)$$

$$minGrpIdx[1]=2 \quad (381)$$

$$maxGrpIdx[0]=1 \quad (382)$$

$$maxGrpIdx[1]=3 \quad (383)$$

When pSelDsY[minGrpIdx[0]] is greater than pSelDsY[minGrpIdx[1]], minGrpIdx[0] and minGrpIdx[1] are swapped as follows:

$$(minGrpIdx[0],minGrpIdx[1])=Swap(minGrpIdx[0],minGrpIdx[1]) \quad (384)$$

When pSelDsY[maxGrpIdx[0]] is greater than pSelDsY[maxGrpIdx[1]], maxGrpIdx[0] and maxGrpIdx[1] are swapped as follows:

$$(maxGrpIdx[0],maxGrpIdx[1])=Swap(maxGrpIdx[0],maxGrpIdx[1]) \quad (385)$$

When pSelDsY[minGrpIdx[0]] is greater than pSelDsY[maxGrpIdx[1]], arrays minGrpIdx and maxGrpIdx are swapped as follows:

$$(minGrpIdx,maxGrpIdx)=Swap(minGrpIdx,maxGrpIdx) \quad (386)$$

When pSelDsY[minGrpIdx[1]] is greater than pSelDsY[maxGrpIdx[0]], minGrpIdx[1] and maxGrpIdx[0] are swapped as follows:

$$(minGrpIdx[1],maxGrpIdx[0])=Swap(minGrpIdx[1],maxGrpIdx[0]) \quad (387)$$

The variables maxY, maxC, minY and minC are derived as follows:

$$maxY=(pSelDsY[maxGrpIdx[0]]+pSelDsY[maxGrpIdx[1]]+1)>>1 \quad (388)$$

$$maxC=(pSelC[maxGrpIdx[0]]+pSelC[maxGrpIdx[1]]+1)>>1 \quad (389)$$

$$minY=(pSelDsY[minGrpIdx[0]]+pSelDsY[minGrpIdx[1]]+1)>>1 \quad (390)$$

$$minC=(pSelC[minGrpIdx[0]]+pSelC[minGrpIdx[1]]+1)>>1 \quad (391)$$

7. The variables a, b, and k are derived as follows:
If numSampL is equal to 0, and numSampT is equal to 0, the following applies:

$$k=0 \quad (392)$$

$$a=0 \quad (393)$$

$$b=1<<(BitDepth-1) \quad (394)$$

Otherwise, the following applies:

$$diff=maxY-minY \quad (395)$$

If diff is not equal to 0, the following applies:

$$diffC=maxC-minC \quad (396)$$

$$x=Floor(Log\ 2(diff)) \quad (397)$$

$$normDiff=((diff<<4)>>x)\&15 \quad (398)$$

$$x+=(normDiff\ !=0)?1:0 \quad (399)$$

$$y=Abs(diffC)>0?Floor(Log\ 2(Abs(diffC)))+1:0 \quad (400)$$

$$a=(diffC*(divSigTable[normDiff]|8)+2^{y-1})>>y \quad (401)$$

$$k=((3+x-y)<1)?1:3+x-y \quad (402)$$

$$a=((3+x-y)<1)?Sign(a)*15:a \quad (403)$$

$$b=minC-((a*minY)>>k) \quad (404)$$

where divSigTable[ ] is specified as follows:

$$divSigTable[\ ]=\{0,7,6,5,5,4,4,4,3,3,2,2,1,1,1,0\} \quad (405)$$

Otherwise (diff is equal to 0), the following applies:

$$k=0 \quad (406)$$

$$a=0 \quad (407)$$

$$b=minC \quad (408)$$

8. The prediction samples predSamples[x][y] with x=0 . . . nTbW−1, y=0 . . . nTbH−1 are derived as follows:

$$predSamples[x][y]=Clip1(((pDsY[x][y]*a)>>k)+b) \quad (409)$$

NOTE—This process uses sps_chroma_vertical_collocated_flag. However, in order to simplify implementation, it does not use sps_chroma_horizontal_collocated_flag.

5.13. Embodiment 13

The working draft specified in JVET-Q2001-vE may be changed as below.
8.4.5.2.13 Specification of INTRA_LT_CCLM, INTRA_L_CCLM and INTRA_T_CCLM Intra Prediction Mode
The prediction samples predSamples[x][y] with x=0 . . . nTbW−1, y=0 . . . nTbH−1 are derived as follows:
If both numSampL and numSampT are equal to 0, the following applies:

$$predSamples[x][y]=1<<(BitDepth-1) \quad (359)$$

Otherwise, the following ordered steps apply:
1. The collocated luma samples pY[x][y] with x=0 . . . nTbW*SubWidthC−1, y=0 . . . nTbH*SubHeightC−1 are set equal to the reconstructed luma samples prior to the deblocking filter process at the locations (xTbY+x, yTbY+y).
2. The neighbouring luma samples pY[x][y] are derived as follows:
When numSampL is greater than 0, the neighbouring left luma samples pY[x][y] with x=−1 . . . −3, y=0 . . . SubHeightC*numSampL−1, are set equal to the reconstructed luma samples prior to the deblocking filter process at the locations (xTbY+x, yTbY+y).
When availT is equal to FALSE, the neighbouring top luma samples pY[x][y] with x=

−*SubWidthC*. . . SubWidthC*nTbW* −1, y=−1 . . . −2, are set equal to the luma samples pY[x][0].

When availL is equal to FALSE, the neighbouring left luma samples pY[x][y] with x=−1 . . . −3, y=−1 . . . SubHeightC*numSampL−1, are set equal to the luma samples pY[0][y].

When numSampT is greater than 0, the neighbouring top luma samples pY[x][y] with x=0 . . . SubWidthC*numSampT−1, y=−1, −2, are set equal to the reconstructed luma samples prior to the deblocking filter process at the locations (xTbY+x, yTbY+y).

When availTL is equal to TRUE, the neighbouring top-left luma samples pY[x][y] with x=−1, y=−1, −2 are set equal to the reconstructed luma samples prior to the deblocking filter process at the locations (xTbY+x, yTbY+y).

5.14. Embodiment 14

The working draft specified in JVET-Q2001-vE may be changed as below.
8.4.5.2.13 Specification of INTRA_LT_CCLM, INTRA_L_CCLM and INTRA_T_CCLM Intra Prediction Mode
The prediction samples predSamples[x][y] with x=0 . . . nTbW−1, y=0 . . . nTbH−1 are derived as follows:
If both numSampL and numSampT are equal to 0, the following applies:

predSamples[$x$][$y$]=1<<(BitDepth−1)    (359)

Otherwise, the following ordered steps apply:
1. The collocated luma samples pY[x][y] with x=0 . . . nTbW*SubWidthC−1, y=0 . . . nTbH*SubHeightC−1 are set equal to the reconstructed luma samples prior to the deblocking filter process at the locations (xTbY+x, yTbY+y).
2. The neighbouring luma samples pY[x][y] are derived as follows:
   When numSampL is greater than 0, the neighbouring left luma samples pY[x][y] with x=−1 . . . −3, y=0 . . . SubHeightC*numSampL−1, are set equal to the reconstructed luma samples prior to the deblocking filter process at the locations (xTbY+x, yTbY+y).
   When availT is equal to FALSE and sps_chroma_vertical_collocated_flag is equal to 0,, the neighbouring top luma samples pY[x][y] with x=− *SubWidthC*. . . SubWidthC*nTbW* −1, y=−1 . . . −2, are set equal to the luma samples pY[x][0].
   When availL is equal to FALSE, the neighbouring left luma samples pY[x][y] with x=−1 . . . −3, y=−1 . . . SubHeightC*numSampL−1, are set equal to the luma samples pY[0][y].
   When numSampT is greater than 0, the neighbouring top luma samples pY[x][y] with x=0 . . . SubWidthC*numSampT−1, y=−1, −2, are set equal to the reconstructed luma samples prior to the deblocking filter process at the locations (xTbY+x, yTbY+y).
   When availTL is equal to TRUE, the neighbouring top-left luma samples pY[x][y] with x=−1, y=−1, −2 are set equal to the reconstructed luma samples prior to the deblocking filter process at the locations (xTbY+x, yTbY+y).

5.15. Embodiment 15

The working draft specified in JVET-Q2001-vE may be changed as below.
8.4.5.2.13 Specification of INTRA_LT_CCLM, INTRA_L_CCLM and INTRA_T_CCLM Intra Prediction Mode
The prediction samples predSamples[x][y] with x=0 . . . nTbW−1, y=0 . . . nTbH−1 are derived as follows:
If both numSampL and numSampT are equal to 0, the following applies:

predSamples[$x$][$y$]=1<<(BitDepth−1)    (359)

Otherwise, the following ordered steps apply:
1. The collocated luma samples pY[x][y] with x=0 . . . nTbW*SubWidthC−1, y=0 . . . nTbH*SubHeightC−1 are set equal to the reconstructed luma samples prior to the deblocking filter process at the locations (xTbY+x, yTbY+y).
2. The neighbouring luma samples pY[x][y] are derived as follows:
   When numSampL is greater than 0, the neighbouring left luma samples pY[x][y] with x=−1 . . . −3, y=0 . . . SubHeightC*numSampL−1, are set equal to the reconstructed luma samples prior to the deblocking filter process at the locations (xTbY+x, yTbY+y).
   When availT is equal to FALSE, the neighbouring top luma samples pY[x][y] with x=−1 . . . SubWidthC*numSampT−1, y=−1 . . . −2, are set equal to the luma samples pY[x][0].
   When availL is equal to FALSE, the neighbouring left luma samples pY[x][y] with x=−1 . . . −3, y=− *SubHeightC*. . . SubHeightC*nTbH* − −1, are set equal to the luma samples pY[0][y].
   When numSampT is greater than 0, the neighbouring top luma samples pY[x][y] with x=0 . . . SubWidthC*numSampT−1, y=−1, −2, are set equal to the reconstructed luma samples prior to the deblocking filter process at the locations (xTbY+x, yTbY+y).
   When availTL is equal to TRUE, the neighbouring top-left luma samples pY[x][y] with x=−1, y=−1, −2 are set equal to the reconstructed luma samples prior to the deblocking filter process at the locations (xTbY+x, yTbY+y).

5.16. Embodiment 16

The working draft specified in JVET-Q2001-vE may be changed as below.
8.4.5.2.13 Specification of INTRA_LT_CCLM, INTRA_L_CCLM and INTRA_T_CCLM Intra Prediction Mode
The prediction samples predSamples[x][y] with x=0 . . . nTbW−1, y=0 . . . nTbH−1 are derived as follows:
If both numSampL and numSampT are equal to 0, the following applies:

predSamples[$x$][$y$]=1<<(BitDepth−1)    (359)

Otherwise, the following ordered steps apply:
1. The collocated luma samples pY[x][y] with x=0 . . . nTbW*SubWidthC−1, y=0 . . . nTbH*SubHeightC−1 are set equal to the reconstructed luma samples prior to the deblocking filter process at the locations (xTbY+x, yTbY+y).
2. The neighbouring luma samples pY[x][y] are derived as follows:
   When numSampL is greater than 0, the neighbouring left luma samples pY[x][y] with x=−1 . . . −3, y=0 . . . SubHeightC*numSampL−1, are set equal to the reconstructed luma samples prior to the deblocking filter process at the locations (xTbY+x, yTbY+y).

When availT is equal to FALSE, the neighbouring top luma samples pY[x][y] with x=−1 . . . SubWidthC*numSampT−1, y=−1 . . . −2, are set equal to the luma samples pY[x][0].

When numSampT is greater than 0, the neighbouring top luma samples pY[x][y] with x=0 . . . SubWidthC*numSampT−1, y=−1, −2, are set equal to the reconstructed luma samples prior to the deblocking filter process at the locations (xTbY+x, yTbY+y).

– *When availL is equal to FALSE,  ,
the neighbouring left luma samples
pY[ x ][ y ] with x = -1..-3,  ,
y = -SubHeightC..SubHeight C * nTbH - 1,  ,
are set equal to the luma samples pY[ 0 ][ y ]. .*

When availTL is equal to TRUE, the neighbouring top-left luma samples pY[x][y] with x=−1, y=−1, −2 are set equal to the reconstructed luma samples prior to the deblocking filter process at the locations (xTbY+x, yTbY+y).

5.17. Embodiment 17

The working draft specified in JVET-Q2001-vE may be changed as below.

8.4.5.2.13 Specification of INTRA_LT_CCLM, INTRA_L_CCLM and INTRA_T_CCLM Intra Prediction Mode Inputs to this process are:
  the intra prediction mode predModeIntra,
  a sample location (xTbC, yTbC) of the top-left sample of the current transform block relative to the top-left sample of the current picture,
  a variable nTbW specifying the transform block width,
  a variable nTbH specifying the transform block height,
  a variable cIdx specifying the colour component of the current block,
  chroma neighbouring samples p[x][y], with x=−1, y=0 . . . 2*nTbH−1 and x=0 . . . 2*nTbW−1, y=−1.

Output of this process are predicted samples predSamples [x][y], with x=0 . . . nTbW−1, y=0 . . . nTbH−1.

The current luma location (xTbY, yTbY) is derived as follows:

$$(xTbY,yTbY)=(xTbC<<(SubWidthC-1),yTbC<<(SubHeightC-1)) \quad (351)$$

The variables availL, availT and availTL are derived as follows:
  The derivation process for neighbouring block availability as specified in clause 6.4.4 is invoked with the current luma location (xCurr, yCurr) set equal to (xTbY, yTbY), the neighbouring luma location (xTbY−1, yTbY), checkPredModeY set equal to FALSE, and cIdx as inputs, and the output is assigned to availL.
  The derivation process for neighbouring block availability as specified in clause 6.4.4 is invoked with the current luma location (xCurr, yCurr) set equal to (xTbY, yTbY), the neighbouring luma location (xTbY, yTbY−1), checkPredModeY set equal to FALSE, and cIdx as inputs, and the output is assigned to availT.

– *If availL is equal to true and
availT is equal to true,  , the following applies:
– The derivation process for
neighbouring block availability
as specified in clause 6.4.4 is invoked with
the current luma location (xCurr,  ,
yCurr ) set equal to ( xTbY,  , yTbY),  ,
the neighbouring luma location ( xTbY-1,  ,
yTbY-1 ) ,                     checkPredModeY set
equal to FALSE,  , and cIdx as inputs,  , and the
output is assigned to availTL. .*

– *Otherwise,  , availTL is set equal to false. .*

5.18. Embodiment 18

The working draft specified in JVET-Q2001-vE may be changed as below.

8.4.5.2.13 Specification of INTRA_LT_CCLM, INTRA_L_CCLM and INTRA_T_CCLM Intra Prediction Mode The prediction samples predSamples[x][y] with x=0 . . . nTbW−1, y=0 . . . nTbH−1 are derived as follows:

If both numSampL and numSampT are equal to 0, the following applies:

$$predSamples[x][y]=1<<(BitDepth-1) \quad (359)$$

Otherwise, the following ordered steps apply:

1. The collocated luma samples pY[x][y] with x=0 . . . nTbW*SubWidthC−1, y=0 . . . nTbH*SubHeightC−1 are set equal to the reconstructed luma samples prior to the deblocking filter process at the locations (xTbY+x, yTbY+y).

2. The neighbouring luma samples pY[x][y] are derived as follows:

When numSampL is greater than 0, the neighbouring left luma samples pY[x][y] with x=−1 . . . −3, y=0 . . . SubHeightC*numSampL−1, are set equal to the reconstructed luma samples prior to the deblocking filter process at the locations (xTbY+x, yTbY+y).

When availT is equal to FALSE, the neighbouring top luma samples pY[x][y] with x=−1 . . . SubWidthC*numSampT−1, y=−1 . . . −2, are set equal to the luma samples pY[x][0].

When availL is equal to FALSE, the neighbouring left luma samples pY[x][y] with x=−1 . . . −3, y=−1 . . . SubHeightC*numSampL−1, are set equal to the luma samples pY[0][y].

When numSampT is greater than 0, the neighbouring top luma samples pY[x][y] with x=0 . . . SubWidthC*numSampT−1, y=−1, −2, are set equal to the reconstructed luma samples prior to the deblocking filter process at the locations (xTbY+x, yTbY+y).

– *If both availL and availT are equal to TURE,  ,
   the following applies:
   – If availTL is equal to TRUE,  ,
   the neighbouring top-left
   luma samples pY[ x ][ y ] with x = -1,  ,   -2,  ,
   y = -1,  ,                  - 2 are set equal to the
   reconstructed luma
   samples priot to the deblocking
   filter process at the locations ( xTbY+ x,  ,
   yTbY+ y ) .
   – Otherwise,  ,                 the neighbouring
   top-left luma samples
   pY[ x ][ y ] with x = -1,  ,   -2,  ,   y = -1,  ,   -2,  ,
   are set equal to the luma samples pY[0][y]. .*

5.19. Embodiment 19

The working draft specified in JVET-Q2001-vE may be changed as below.
8.4.5.2.13 Specification of INTRA_LT_CCLM, INTRA_L_CCLM and INTRA_T_CCLM Intra Prediction Mode
The prediction samples predSamples[x][y] with x=0 . . . nTbW−1, y=0 . . . nTbH−1 are derived as follows:
  If both numSampL and numSampT are equal to 0, the following applies:

predSamples[x][y]=1<<(BitDepth−1)                (359)

Otherwise, the following ordered steps apply:
  1. The collocated luma samples pY[x][y] with x=0 . . . nTbW*SubWidthC−1, y=0 . . . nTbH*SubHeightC−1 are set equal to the reconstructed luma samples prior to the deblocking filter process at the locations (xTbY+x, yTbY+y).
  2. The neighbouring luma samples pY[x][y] are derived as follows:
    When numSampL is greater than 0, the neighbouring left luma samples pY[x][y] with x=−1 . . . −3, y=0 . . . SubHeightC*numSampL−1, are set equal to the reconstructed luma samples prior to the deblocking filter process at the locations (xTbY+x, yTbY+y).
    When availT is equal to FALSE, the neighbouring top luma samples pY[x][y] with x=−1 . . . SubWidthC*numSampT−1, y=−1 . . . −2, are set equal to the luma samples pY[x][0].
    When availL is equal to FALSE, the neighbouring left luma samples pY[x][y] with x=−1 . . . −3, y=−1 . . . SubHeightC*numSampL−1, are set equal to the luma samples pY[0][y].
    When numSampT is greater than 0, the neighbouring top luma samples pY[x][y] with x=0 . . . SubWidthC*numSampT−1, y=−1, −2, are set equal to the reconstructed luma samples prior to the deblocking filter process at the locations (xTbY+x, yTbY+y).
  *If both availL and avail T are equal to TURE, ,*
    *the following applies:*
    – *If availTL is equal to TRUE, ,*
      *the neighbouring top-left*
      *luma samples pY[ x ][ y ] with x = -1, ,    -2, ,*
      *y = -1, ,                    -2 are set equal to the*
      *reconstructed luma samples prior to*
      *samples prior to filter process at the*
      *locations ( xTbY+ x , yTbY + y ) .*
    – *Otherwise ,      the neighbouring top-left*
      *luma samples pY[ x ][ y ] with x = -1,    -2 ,*
      *y = -1,     -2 ,    are set equal to the luma*
      *samples pY[x][0] .*

5.20. Embodiment 20

The working draft specified in JVET-Q2001-vE may be changed as below.
8.4.5.2.13 Specification of INTRA_LT_CCLM, INTRA_L_CCLM and INTRA_T_CCLM Intra Prediction Mode
Inputs to this process are:
  the intra prediction mode predModeIntra,
  a sample location (xTbC, yTbC) of the top-left sample of the current transform block relative to the top-left sample of the current picture,
  a variable nTbW specifying the transform block width,
  a variable nTbH specifying the transform block height,
  a variable cIdx specifying the colour component of the current block,
  chroma neighbouring samples p[x][y], with x=−1, y=0 . . . 2*nTbH−1 and x=0 . . . 2*nTbW−1, y=−1.
Output of this process are predicted samples predSamples [x][y], with x=0 . . . nTbW−1, y=0 . . . nTbH−1.
The current luma location (xTbY, yTbY) is derived as follows:

(xTbY,yTbY)=(xTbC<<(SubWidthC−1),yTbC<<(SubHeightC−1))                (351)

The variables availL, availT and availTL are derived as follows:
  The derivation process for neighbouring block availability as specified in clause 6.4.4 is invoked with the current luma location (xCurr, yCurr) set equal to (xTbY, yTbY), the neighbouring luma location (xTbY−1, yTbY), checkPredModeY set equal to FALSE, and cIdx as inputs, and the output is assigned to availL.
  The derivation process for neighbouring block availability as specified in clause 6.4.4 is invoked with the current luma location (xCurr, yCurr) set equal to (xTbY, yTbY), the neighbouring luma location (xTbY, yTbY−1), checkPredModeY set equal to FALSE, and cIdx as inputs, and the output is assigned to availT.
  - *If SubWidthC or SubHeight C is equal to 2 ,*
    *the following applies:*
    - *The derivation process for neighbouring block*
      *availability as specified in*
      *clause 6.4.4 is invoked with the current luma*
      *location| ( xCurr,    yCurr ) set equal o ( xTbY,*
      *yTbY ),            the neighbouring luma*
      *location ( xTbY-1,              yTbY - 1 ), ,*
      *checkPredModeY set equal to FALSE,*
      *and cIdx as inputs, ,    and the output is assigned*
      *to availTL. ·*
    - *Otherwise, , availTL is set equal to false. .*
. . .
The prediction samples predSamples[x][y] with x=0 . . . nTbW−1, y=0 . . . nTbH−1 are derived as follows:
  If both numSampL and numSampT are equal to 0, the following applies:

predSamples[x][y]=1<<(BitDepth−1)                (359)

Otherwise, the following ordered steps apply:
  1. The collocated luma samples pY[x][y] with x=0 . . . nTbW*SubWidthC−1, y=0 . . . nTbH*SubHeightC−1 are set equal to the reconstructed luma samples prior to the deblocking filter process at the locations (xTbY+x, yTbY+y).
  2. The neighbouring luma samples pY[x][y] are derived as follows:
    When numSampL is greater than 0, the neighbouring left luma samples pY[x][y] with x=−1 . . . −3, y=0 . . . SubHeightC*numSampL−1, are set equal to the reconstructed luma samples prior to the deblocking filter process at the locations (xTbY+x, yTbY+y).
    When availT is equal to FALSE, the neighbouring top luma samples pY[x][y] with x=−1 . . . SubWidthC*numSampT−1, y=−1 . . . −2, are set equal to the luma samples pY[x][0].
    When availL is equal to FALSE, the neighbouring left luma samples pY[x][y] with x=−1 . . . −3, y=−1 . . . SubHeightC*numSampL−1, are set equal to the luma samples pY[0][y].

When numSampT is greater than 0, the neighbouring top luma samples pY[x][y] with x=0 . . . SubWidthC*numSampT−1, y=−1, −2, are set equal to the reconstructed luma samples prior to the deblocking filter process at the locations (xTbY+x, yTbY+y).

When availTL is equal to TRUE and (SubWidthC or SubHeight C is equal to 2), the neighbouring top-left luma samples pY[x][y] with x=−1, y=−1, −2 are set equal to the reconstructed luma samples prior to the deblocking filter process at the locations (xTbY+x, yTbY+y).

5.21. Embodiment 21

The working draft specified in JVET-Q2001-vE may be changed as below.
8.4.5.2.13 Specification of INTRA_LT_CCLM, INTRA_L_CCLM and INTRA_T_CCLM Intra Prediction Mode
The prediction samples predSamples[x][y] with x=0 . . . nTbW−1, y=0 . . . nTbH−1 are derived as follows:

If both numSampL and numSampT are equal to 0, the following applies:

predSamples[x][y]=1<<(BitDepth−1)    (359)

Otherwise, the following ordered steps apply:
1. The collocated luma samples pY[x][y] with x=0 . . . nTbW*SubWidthC−1, y=0 . . . nTbH*SubHeightC−1 are set equal to the reconstructed luma samples prior to the deblocking filter process at the locations (xTbY+x, yTbY+y).
2. The neighbouring luma samples pY[x][y] are derived as follows:

When numSampL is greater than 0, the neighbouring left luma samples pY[x][y] with x=−1 . . . −3, y=0 . . . SubHeightC*numSampL−1, are set equal to the reconstructed luma samples prior to the deblocking filter process at the locations (xTbY+x, yTbY+y).

When availT is equal to FALSE and (SubWidthC or SubHeightC is equal to 2), the neighbouring top luma samples pY[x][y] with x=−1 . . . SubWidthC*numSampT−1, y=−1 . . . −2, are set equal to the luma samples pY[x][0].

When availL is equal to FALSE and (SubWidthC or SubHeightC is equal to 2), the neighbouring left luma samples pY[x][y] with x=−1 . . . −3, y=−1 . . . SubHeightC*numSampL−1, are set equal to the luma samples pY[0][y].

When numSampT is greater than 0, the neighbouring top luma samples pY[x][y] with x=0 . . . SubWidthC*numSampT−1, y=−1, −2, are set equal to the reconstructed luma samples prior to the deblocking filter process at the locations (xTbY+x, yTbY+y).

When availTL is equal to TRUE, the neighbouring top-left luma samples pY[x][y] with x=−1, y=−1, −2 are set equal to the reconstructed luma samples prior to the deblocking filter process at the locations (xTbY+x, yTbY+y).

5.22. Embodiment 22

The working draft specified in JVET-Q2001-vE may be changed as below.
8.4.5.2.13 Specification of INTRA_LT_CCLM, INTRA_L_CCLM and INTRA_T_CCLM Intra Prediction Mode
The prediction samples predSamples[x][y] with x=0 . . . nTbW−1, y=0 . . . nTbH−1 are derived as follows:

If both numSampL and numSampT are equal to 0, the following applies:

predSamples[x][y]=1<<(BitDepth−1)    (359)

Otherwise, the following ordered steps apply:
1. The collocated luma samples pY[x][y] with x=0 . . . nTbW*SubWidthC−1, y=0 . . . nTbH*SubHeightC−1 are set equal to the reconstructed luma samples prior to the deblocking filter process at the locations (xTbY+x, yTbY+y).
2. The neighbouring luma samples pY[x][y] are derived as follows:

When numSampL is greater than 0, the neighbouring left luma samples pY[x][y] with x=−1 . . . −3, y=0 . . . SubHeightC*numSampL−1, are set equal to the reconstructed luma samples prior to the deblocking filter process at the locations (xTbY+x, yTbY+y).

When availT is equal to FALSE, the neighbouring top luma samples pY[x][y] with x=0 . . . SubWidthC*numSampT−1, y=−1 . . . −2, are set equal to the luma samples pY[x][0].

When availL is equal to FALSE, the neighbouring left luma samples pY[x][y] with x=−1 . . . −3, y=0 . . . SubHeightC*numSampL−1, are set equal to the luma samples pY[0][y].

When numSampT is greater than 0, the neighbouring top luma samples pY[x][y] with x=0 . . . SubWidthC*numSampT−1, y=−1, −2, are set equal to the reconstructed luma samples prior to the deblocking filter process at the locations (xTbY+x, yTbY+y).

When availTL is equal to TRUE, the neighbouring top-left luma samples pY[x][y] with x=−1, y=−1, −2 are set equal to the reconstructed luma samples prior to the deblocking filter process at the locations (xTbY+x, yTbY+y).

- *if availT is equal to true ,*
  *the neighbouring top-left luma samples*
  *pY[ x ][ y ] with x = −1, , −2, , y = −1, , −2, ,*
  *are set equal to the luma samples pY[0][y]. .*
- *Otherwise, , if availL is equal to true, ,*
  *the neighbouring top-left luma samples*
  *pY[ x ][ y ] with x = −1, , −2, , y = −1, , −2, ,*
  *are set equal to the luma samples pY[x][0]. .*

5.23. Embodiment 23

The working draft specified in JVET-Q2001-vE may be changed as below.
8.4.5.2.13 Specification of INTRA_LT_CCLM, INTRA_L_CCLM and INTRA_T_CCLM Intra Prediction Mode
Inputs to this process are:
  the intra prediction mode predModeIntra,
  a sample location (xTbC, yTbC) of the top-left sample of the current transform block relative to the top-left sample of the current picture,
  a variable nTbW specifying the transform block width,
  a variable nTbH specifying the transform block height, a variable cIdx specifying the colour component of the
current block,
chroma neighbouring samples p[x][y], with x=−1,
y=0 . . . 2*nTbH−1 and x=0 . . . 2*nTbW−1, y=−1.

Output of this process are predicted samples predSamples
[x][y], with x=0 . . . nTbW−1, y=0 . . . nTbH−1.

The current luma location (xTbY, yTbY) is derived as
follows:

(xTbY,yTbY)=(xTbC<<(SubWidthC−1),yTbC<<(Sub-
HeightC−1)) (351)

The variables availL, availT and availTL are derived as
follows:
The derivation process for neighbouring block availability as specified in clause 6.4.4 is invoked with the current luma location (xCurr, yCurr) set equal to (xTbY, yTbY), the neighbouring luma location (xTbY−1, yTbY), checkPredModeY set equal to FALSE, and cIdx as inputs, and the output is assigned to availL.
The derivation process for neighbouring block availability as specified in clause 6.4.4 is invoked with the current luma location (xCurr, yCurr) set equal to (xTbY, yTbY), the neighbouring luma location (xTbY, yTbY−1), checkPredModeY set equal to FALSE, and cIdx as inputs, and the output is assigned to availT.
- *If availL is equal to true and availT is equal to true, ,*
 *the following applies:*
 - *The derivation process for neighbouring block availability as specified in clause 6.4.4 is invoked with the current luma location ( xCurr, , yCurr ) set equal to ( xTbY, , yTbY ), , the neighbouring luma location ( xTbY- 1, , yTbY- 1 ), , checkPredModeY set equal to FALSE, , and cIdx as inputs, , and the output is assigned to availTL. .*
 - *Otherwise, , availTL is set equal to false. .*
. . .

The prediction samples predSamples[x][y] with x=0 . . . nTbW−1, y=0 . . . nTbH−1 are derived as follows:
If both numSampL and numSampT are equal to 0, the following applies:

predSamples[x][y]=1<<(BitDepth−1) (359)

Otherwise, the following ordered steps apply:
1. The collocated luma samples pY[x][y] with x=0 . . . nTbW*SubWidthC−1, y=0 . . . nTbH*SubHeightC−1 are set equal to the reconstructed luma samples prior to the deblocking filter process at the locations (xTbY+x, yTbY+y).
2. The neighbouring luma samples pY[x][y] are derived as follows:
   When numSampL is greater than 0, the neighbouring left luma samples pY[x][y] with x=−1 . . . −3, y=0 . . . SubHeightC*numSampL−1, are set equal to the reconstructed luma samples prior to the deblocking filter process at the locations (xTbY+x, yTbY+y).
   When availT is equal to FALSE, the neighbouring top luma samples pY[x][y] with x=−1 . . . SubWidthC*numSampT−1, y=−1 . . . −2, are set equal to the luma samples pY[x][0].
   When availL is equal to FALSE, the neighbouring left luma samples pY[x][y] with x=−1 . . . −3, y=−1 . . . SubHeightC*numSampL−1, are set equal to the luma samples pY[0][y].
   When numSampT is greater than 0, the neighbouring top luma samples pY[x][y] with x=0 . . . SubWidthC*numSampT−1, y=−1, −2, are set equal to the reconstructed luma samples prior to the deblocking filter process at the locations (xTbY+x, yTbY+y).
   - *If both availL and availT are equal to TURE,*
     *the following applies:*
     - *If availTL is equal to TRUE,*
       *the neighbouring top-left luma samples pY[ x ][ y ] with x = -1, -2, y = -1, -2 are set equal to the reconstructed luma samples prior to the deblocking filter process at the locations ( xTbY+ x , yTbY+ y ) .*
     - *Otherwise, the neighbouring top-left luma samples pY[ x ][ y ] with x = -1, -2, y = -1, -2, are set equal to the luma samples pY[0][y] .*

5.24. Embodiment 24

The working draft specified in JVET-Q2001-vE may be changed as below.

8.4.5.2.13 Specification of INTRA_LT_CCLM, INTRA_L_CCLM and INTRA_T_CCLM Intra Prediction Mode Inputs to this process are:
the intra prediction mode predModeIntra,
a sample location (xTbC, yTbC) of the top-left sample of the current transform block relative to the top-left sample of the current picture,
a variable nTbW specifying the transform block width,
a variable nTbH specifying the transform block height,
a variable cIdx specifying the colour component of the current block,
chroma neighbouring samples p[x][y], with x=−1, y=0 . . . 2*nTbH−1 and x=0 . . . 2*nTbW−1, y=−1.

Output of this process are predicted samples predSamples [x][y], with x=0 . . . nTbW−1, y=0 . . . nTbH−1.

The current luma location (xTbY, yTbY) is derived as follows:

(xTbY,yTbY)=(xTbC<<(SubWidthC−1),yTbC<<(Sub-
HeightC−1)) (351)

The variables availL, availT and availTL are derived as follows:
The derivation process for neighbouring block availability as specified in clause 6.4.4 is invoked with the current luma location (xCurr, yCurr) set equal to (xTbY, yTbY), the neighbouring luma location (xTbY−1, yTbY), checkPredModeY set equal to FALSE, and cIdx as inputs, and the output is assigned to availL.
The derivation process for neighbouring block availability as specified in clause 6.4.4 is invoked with the current luma location (xCurr, yCurr) set equal to (xTbY, yTbY), the neighbouring luma location (xTbY, yTbY−1), checkPredModeY set equal to FALSE, and cIdx as inputs, and the output is assigned to availT.
- *If availL is equal to true and availT is equal to true ,*
  *the following applies:*
  - *The derivation process for neighbouring block availability as specified in
    clause 6.4.4 is invoked with the current luma
    location ( xCurr, yCurr ) set equal to ( xTbY ,
    yTbY ), the neighbouring luma
    location ( xTbY- 1 , yTbY- 1 ) ,
    checkPredModeY set equal to FALSE ,* and cIdx as inputs, and the output is assigned to availTL.
- Otherwise, availTL is set equal to false.
...
The prediction samples predSamples[x][y] with x=0 ... nTbW−1, y=0 ... nTbH−1 are derived as follows:
If both numSampL and numSampT are equal to 0, the following applies:

predSamples[x][y]=1<<(BitDepth−1) (359)

Otherwise, the following ordered steps apply:
1. The collocated luma samples pY[x][y] with x=0 ... nTbW*SubWidthC−1, y=0 ... nTbH*SubHeightC−1 are set equal to the reconstructed luma samples prior to the deblocking filter process at the locations (xTbY+x, yTbY+y).
2. The neighbouring luma samples pY[x][y] are derived as follows:
   When numSampL is greater than 0, the neighbouring left luma samples pY[x][y] with x=−1 ... −3, y=0 ... SubHeightC*numSampL−1, are set equal to the reconstructed luma samples prior to the deblocking filter process at the locations (xTbY+x, yTbY+y).
   When availT is equal to FALSE, the neighbouring top luma samples pY[x][y] with x=−1 ... SubWidthC*numSampT−1, y=−1 ... −2, are set equal to the luma samples pY[x][0].
   When availL is equal to FALSE, the neighbouring left luma samples pY[x][y] with x=−1 ... −3, y=−1 ... SubHeightC*numSampL−1, are set equal to the luma samples pY[0][y].
   When numSampT is greater than 0, the neighbouring top luma samples pY[x][y] with x=0 ... SubWidthC*numSampT−1, y=−1, −2, are set equal to the reconstructed luma samples prior to the deblocking filter process at the locations (xTbY+x, yTbY+y).
   *- If both availL and availT are equal to TURE, ,*
      *the following applies:*
      *- If availTL is equal to TRUE, ,*
         *the neighbouring top-left luma samples*
         *pY[ x ][ y ] with x = −1, , −2, , y = −1, ,*
         *−2 are set equal to the*
         *reconstructed luma samples*
         *prior to the deblocking filter process at the*
         *location ( xTbY+ x, , yTbY+ y ).*
      *- Otherwise, the neighbouring top-left*
         *luma samples pY[ x ][ y ] with x = −1, −2,*
         *y = −1, −2, are set equal to the*
         *luma samples pY[x][0] .*

5.25. Embodiment 25

The working draft specified in JVET-Q2001-vE may be changed as below.
8.4.5.2.13 Specification of INTRA_LT_CCLM, INTRA_L_CCLM and INTRA_T_CCLM Intra Prediction Mode
Inputs to this process are:
  the intra prediction mode predModeIntra,
  a sample location (xTbC, yTbC) of the top-left sample of the current transform block relative to the top-left sample of the current picture,
  a variable nTbW specifying the transform block width,
  a variable nTbH specifying the transform block height,
  a variable cIdx specifying the colour component of the current block,
  chroma neighbouring samples p[x][y], with x=−1, y=0 ... 2*nTbH−1 and x=0 ... 2*nTbW−1, y=−1.
Output of this process are predicted samples predSamples[x][y], with x=0 ... nTbW−1, y=0 ... nTbH−1.
The current luma location (xTbY, yTbY) is derived as follows:

(xTbY,yTbY)=(xTbC<<(SubWidthC−1),yTbC<<(SubHeightC−1)) (351)

The variables availL, availT and availTL are derived as follows:
  The derivation process for neighbouring block availability as specified in clause 6.4.4 is invoked with the current luma location (xCurr, yCurr) set equal to (xTbY, yTbY), the neighbouring luma location (xTbY−1, yTbY), checkPredModeY set equal to FALSE, and cIdx as inputs, and the output is assigned to availL.
  The derivation process for neighbouring block availability as specified in clause 6.4.4 is invoked with the current luma location (xCurr, yCurr) set equal to (xTbY, yTbY), the neighbouring luma location (xTbY, yTbY−1), checkPredModeY set equal to FALSE, and cIdx as inputs, and the output is assigned to availT.
  *- The derivation process for neighbouring block*
     *availability as specified in clause 6 4. .*
     *4 is invoked with the current luma location ( xCurr,*
     *yCurr ) set equal to ( xTbY, , yTbY), ,*
     *the neighbouring luma location ( xTbY−1, ,*
     *yTbY 1 ) , checkPredModeY set equal to FALSE, ,*
     *and cIdx as inputs, , and the output is assigned*
     *to availTL. .*
...
The prediction samples predSamples[x][y] with x=0 ... nTbW−1, y=0 ... nTbH−1 are derived as follows:
If both numSampL and numSampT are equal to 0, the following applies:

predSamples[x][y]=1<<(BitDepth−1) (359)

Otherwise, the following ordered steps apply:
1. The collocated luma samples pY[x][y] with x=0 ... nTbW*SubWidthC−1, y=0 ... nTbH*SubHeightC−1 are set equal to the reconstructed luma samples prior to the deblocking filter process at the locations (xTbY+x, yTbY+y).
2. The neighbouring luma samples pY[x][y] are derived as follows:
   When numSampL is greater than 0, the neighbouring left luma samples pY[x][y] with x=−1 ... −3, y=0 ... SubHeightC*numSampL−1, are set equal to the reconstructed luma samples prior to the deblocking filter process at the locations (xTbY+x, yTbY+y).
   When availT is equal to FALSE, the neighbouring top luma samples pY[x][y] with x=−1 ... SubWidthC*numSampT−1, y=−1 ... −2, are set equal to the luma samples pY[x][0].
   When availL is equal to FALSE, the neighbouring left luma samples pY[x][y] with x=−1 ... −3, y=−1 ... SubHeightC*numSampL−1, are set equal to the luma samples pY[0][y].
   When numSampT is greater than 0, the neighbouring top luma samples pY[x][y] with x=0 ... SubWidthC*numSampT−1, y=−1, −2, are set equal to the reconstructed luma samples prior to the deblocking filter process at the locations (xTbY+x, yTbY+y).
   *- If both availL and availT are equal to TURE ,*
      *the following applies:*

- *If availTL is equal to TRUE,
  the neighbouring top-left
  luma samples pY[ x ][ y ] with x = -1, -2,
  y = -1, -2 are set equal to the
  reconstructed luma samples
  prior to the deblocking
  filter process at the locations ( xTbY+ x,
  yTbY + y ).*
- *Otherwise, the neighbouring top-left
  luma samples pY[ x ][ y ] with x = -1, -2,
  y = -1, -2, are set equal to the
  luma samples pY[0][y] .*

5.26. Embodiment 26

The working draft specified in JVET-Q2001-vE may be changed as below.
8.4.5.2.13 Specification of INTRA_LT_CCLM, INTRA_L_CCLM and INTRA_T_CCLM Intra Prediction Mode
Inputs to this process are:
  the intra prediction mode predModeIntra,
  a sample location (xTbC, yTbC) of the top-left sample of the current transform block relative to the top-left sample of the current picture,
  a variable nTbW specifying the transform block width,
  a variable nTbH specifying the transform block height,
  a variable cIdx specifying the colour component of the current block,
  chroma neighbouring samples p[x][y], with x=-1, y=0 . . . 2*nTbH-1 and x=0 . . . 2*nTbW-1, y=-1.
Output of this process are predicted samples predSamples [x][y], with x=0 . . . nTbW-1, y=0 . . . nTbH-1.
The current luma location (xTbY, yTbY) is derived as follows:

(xTbY,yTbY)=(xTbC<<(SubWidthC-1),yTbC<<(SubHeightC-1))  (351)

The variables availL, availT and availTL are derived as follows:
  The derivation process for neighbouring block availability as specified in clause 6.4.4 is invoked with the current luma location (xCurr, yCurr) set equal to (xTbY, yTbY), the neighbouring luma location (xTbY-1, yTbY), checkPredModeY set equal to FALSE, and cIdx as inputs, and the output is assigned to availL.
  The derivation process for neighbouring block availability as specified in clause 6.4.4 is invoked with the current luma location (xCurr, yCurr) set equal to (xTbY, yTbY), the neighbouring luma location (xTbY, yTbY-1), checkPredModeY set equal to FALSE, and cIdx as inputs, and the output is assigned to availT.
- *The derivation process for
  neighbouring block availability
  as specified in clause 6.4.4 is invoked with the
  current luma location ( xCurr, yCurr) set equal
  to ( xTbY, yTbY), the neighbouring
  luma location ( xTbY- 1, yTbY- 1 ),,
  checkPredModeY set equal to FALSE,
  and cIdx as inputs, and the output is assigned
  to availTL .*
. . .
The prediction samples predSamples[x][y] with x=0 . . . nTbW-1, y=0 . . . nTbH-1 are derived as follows:
  If both numSampL and numSampT are equal to 0, the following applies:

predSamples[x][y]=1<<(BitDepth-1)  (359)

Otherwise, the following ordered steps apply:
  1. The collocated luma samples pY[x][y] with x=0 . . . nTbW*SubWidthC-1, y=0 . . . nTbH*SubHeightC-1 are set equal to the reconstructed luma samples prior to the deblocking filter process at the locations (xTbY+x, yTbY+y).
  2. The neighbouring luma samples pY[x][y] are derived as follows:
    When numSampL is greater than 0, the neighbouring left luma samples pY[x][y] with x=-1 . . . -3, y=0 . . . SubHeightC*numSampL-1, are set equal to the reconstructed luma samples prior to the deblocking filter process at the locations (xTbY+x, yTbY+y).
    When availT is equal to FALSE, the neighbouring top luma samples pY[x][y] with x=-1 . . . SubWidthC*numSampT-1, y=-1 . . . -2, are set equal to the luma samples pY[x][0].
    When availL is equal to FALSE, the neighbouring left luma samples pY[x][y] with x=-1 . . . -3, y=-1 . . . SubHeightC*numSampL-1, are set equal to the luma samples pY[0][y].
    When numSampT is greater than 0, the neighbouring top luma samples pY[x][y] with x=0 . . . SubWidthC*numSampT-1, y=-1, -2, are set equal to the reconstructed luma samples prior to the deblocking filter process at the locations (xTbY+x, yTbY+y).
  - *If both availL and availT are equal to TRUE,
    the following applies:
    - If availTL is equal to TRUE,
      the neighbouring top-left luma samples
      pY[ x ][ y ] with x = -1, -2, y = -1,
      -2 are set equal to the reconstructed luma
      samples prior to the deblocking
      filter process at the locations ( xTbY+ x,,
      yTbY+ y ). .
    - Otherwise,, the neighbouring top-left
      luma samples pY[ x ][ y ] with x = - 1,, -2,,
      y = -1,, -2,, are set equal to the luma
      samples pY[x][0]. .*

5.27. Embodiment 27

The working draft specified in JVET-Q2001-vE may be changed as below.
8.4.5.2.13 Specification of INTRA_LT_CCLM, INTRA_L_CCLM and INTRA_T_CCLM Intra Prediction Mode
The prediction samples predSamples[x][y] with x=0 . . . nTbW-1, y=0 . . . nTbH-1 are derived as follows:
  If both numSampL and numSampT are equal to 0, the following applies:

predSamples[x][y]=1<<(BitDepth-1)  (359)

Otherwise, the following ordered steps apply:
  1. The collocated luma samples pY[x][y] with x=0 . . . nTbW*SubWidthC-1, y=0 . . . nTbH*SubHeightC-1 are set equal to the reconstructed luma samples prior to the deblocking filter process at the locations (xTbY+x, yTbY+y).
  2. The neighbouring luma samples pY[x][y] are derived as follows:
    When numSampL is greater than 0, the neighbouring left luma samples pY[x][y] with x=-1 . . . -3, y=0 . . . SubHeightC*numSampL-1, are set equal to the reconstructed luma samples prior to the deblocking filter process at the locations (xTbY+x, yTbY+y).

When availT is equal to FALSE, the neighbouring top luma samples pY[x][y] with x=−1 . . . SubWidthC*numSampT−1, y=−1 . . . −2, are set equal to the luma samples pY[x][0].

When availL is equal to FALSE, the neighbouring left luma samples pY[x][y] with x=−1 . . . −3, y=−1 . . . SubHeightC*numSampL−1, are set equal to the luma samples pY[0][y].

When numSampT is greater than 0, the neighbouring top luma samples pY[x][y] with x=0 . . . SubWidthC*numSampT−1, y=−1, −2, are set equal to the reconstructed luma samples prior to the deblocking filter process at the locations (xTbY+x, yTbY+y).

When availTL is equal to TRUE, the neighbouring top-left luma samples pY[x][y] with x=−1, y=−1, −2 are set equal to the reconstructed luma samples prior to the deblocking filter process at the locations (xTbY+x, yTbY+y).

3. The down-sampled collocated luma samples pDsY[x][y] with x=0 . . . nTbW−1, y=0 . . . nTbH−1 are derived as follows:

If both SubWidthC and SubHeightC are equal to 1, the following applies:
pDsY[x][y] with x=1 . . . nTbW−1, y=1 . . . nTbH−1 is derived as follows:

$$pDstY[x][y]=pY[x][y] \quad (360)$$

Otherwise, the following applies:
The one-dimensional filter coefficients array F1 and F2, and the 2-dimensional filter coefficients arrays F3 and F4 are specified as follows.

$$F1[0]=2, F1[1]=0 \quad (361)$$

$$F2[0]=1, F2[1]=2, F2[2]=1 \quad (362)$$

$$F3[i][j]=F4[i][j]=0, \text{with } i=0 \ldots 2, j=0 \ldots 2 \quad (363)$$

If both SubWidthC and SubHeightC are equal to 2, the following applies:

$$F1[0]=1, F1[1]=1 \quad (364)$$

$$F3[0][1]=1, F3[1][1]=4, F3[2][1]=1, F3[1][0]=1, F3[1][2]=1 \quad (365)$$

$$F4[0][1]=1, F4[1][1]=2, F4[2][1]=1 \quad (366)$$

$$F4[0][2]=1, F4[1][2]=2, F4[2][2]=1 \quad (367)$$

Otherwise, the following applies:

$$\mathbf{\textit{F3[ 0 ][ 1 ] = 2}}, F3[1][1]=\mathbf{\textit{4}},$$
$$\mathbf{\textit{F3[ 2 ][ 1 ] = 2}}, \quad (368)$$

$$F4[0][1]=2, F4[1][1]=4, F4[2][1]=2, \quad (369)$$

If sps_chromavertical_collocated_flag is equal to 1, the following applies:
pDsY[x][y] with x=0 . . . nTbW−1, y=0 . . . nTbH−1 is derived as follows:

$$pDsY[x][y]=(F3[1][0]*pY[SubWidthC*x][SubHeightC*y-1]+F3[0][1]*pY[SubWidthC*x-1][SubHeightC*y]+F3[1][1]*pY[SubWidthC*x][SubHeightC*y]+F3[2][1]*pY[SubWidthC*x+1][SubHeightC*y]+F3[1][2]*pY[SubWidthC*x][SubHeightC*y+1]+4)>>3 \quad (370)$$

Otherwise (sps_chroma_vertical_collocated_flag is equal to 0), the following applies:
pDsY[x][y] with x=0 . . . nTbW−1, y=0 . . . nTbH−1 is derived as follows:

$$pDsY[x][y]=(F4[0][1]*pY[SubWidthC*x-1][SubHeightC*y]+F4[0][2]*pY[SubWidthC*x-1][SubHeightC*y+1]+F4[1][1]*pY[SubWidthC*x][SubHeightC*y]+F4[1][2]*pY[SubWidthC*x][SubHeightC*y+1]+F4[2][1]*pY[SubWidthC*x+1][SubHeightC*y]+F4[2][2]*pY[SubWidthC*x+1][SubHeightC*y+1]+4)>>3 \quad (371)$$

5.28. Embodiment 28

The working draft specified in JVET-Q2001-vE may be changed as below.

8.4.5.2.13 Specification of INTRA_LT_CCLM, INTRA_L_CCLM and INTRA_T_CCLM Intra Prediction Mode Inputs to this process are:
the intra prediction mode predModeIntra,
a sample location (xTbC, yTbC) of the top-left sample of the current transform block relative to the top-left sample of the current picture,
a variable nTbW specifying the transform block width,
a variable nTbH specifying the transform block height,
a variable cIdx specifying the colour component of the current block,
chroma neighbouring samples p[x][y], with x=−1, y=0 . . . 2*nTbH−1 and x=0 . . . 2*nTbW−1, y=−1.

Output of this process are predicted samples predSamples [x][y], with x=0 . . . nTbW−1, y=0 . . . nTbH−1.

The current luma location (xTbY, yTbY) is derived as follows:

$$(xTbY,yTbY)=(xTbC<<(SubWidthC-1),yTbC<<(SubHeightC-1)) \quad (351)$$

The variables availL, availT and availTL are derived as follows:

The derivation process for neighbouring block availability as specified in clause 6.4.4 is invoked with the current luma location (xCurr, yCurr) set equal to (xTbY, yTbY), the neighbouring luma location (xTbY−1, yTbY), checkPredModeY set equal to FALSE, and cIdx as inputs, and the output is assigned to availL.

The derivation process for neighbouring block availability as specified in clause 6.4.4 is invoked with the current luma location (xCurr, yCurr) set equal to (xTbY, yTbY), the neighbouring luma location (xTbY, yTbY−1), checkPredModeY set equal to FALSE, and cIdx as inputs, and the output is assigned to availT.

The variable availTL is derived as follows:

$$availTL=availL\&\&availT \quad (352)$$

The number of available top-right neighbouring chroma samples numTopRight is derived as follows:
The variable numTopRight is set equal to 0 and availTR is set equal to TRUE.

When predModeIntra is equal to INTRA_T_CCLM, the following applies for x=nTbW . . . 2*nTbW−1 until availTR is equal to FALSE or x is equal to 2*nTbW−1:

The derivation process for neighbouring block availability as specified in clause 6.4.4 is invoked with the current luma location (xCurr, yCurr) set equal to (xTbY, yTbY) the neighbouring luma location (xTbY+x, yTbY−1), checkPredModeY set equal to FALSE, and cIdx as inputs, and the output is assigned to availTR When availTR is equal to TRUE, numTopRight is incremented by one.

The number of available left-below neighbouring chroma samples numLeftBelow is derived as follows:
  The variable numLeftBelow is set equal to 0 and availLB is set equal to TRUE.
  When predModeIntra is equal to INTRA_L_CCLM, the following applies for y=nTbH . . . 2*nTbH−1 until availLB is equal to FALSE or y is equal to 2*nTbH−1:
    The derivation process for neighbouring block availability as specified in clause 6.4.4 is invoked with the current luma location (xCurr, yCurr) set equal to (xTbY, yTbY), the neighbouring luma location (xTbY−1, yTbY+y), checkPredModeY set equal to FALSE, and cIdx as inputs, and the output is assigned to availLB
    When availLB is equal to TRUE, numLeftBelow is incremented by one.

The number of available neighbouring chroma samples on the top and top-right numSampT and the number of available neighbouring chroma samples on the left and left-below numSampL are derived as follows:
  If predModeIntra is equal to INTRA_LT_CCLM, the following applies:

numSamp$T$=avail$T$?$nTbW$:0 (353)

numSamp$L$=avail$L$?$nTbH$:0 (354)

Otherwise, the following applies:

numSamp$T$=
  (avail$T$&&predModeIntra==INTRA_$T$_CCLM)?
  ($nTbW$+Min(numTopRight,$nTbH$)):0 (355)

numSamp$L$=
  (avail$L$&&predModeIntra==INTRA_$L$_CCLM)?
  ($nTbH$+Min(numLeftBelow,$nTbW$)):0 (356)

The variable bCTUboundary is derived as follows:

$bCTUboundary=(yTbY\&(CtbSizeY-1)==0)$?TRUE:
FALSE. (357)

The variable cntN and array pickPosN with N being replaced by L and T, are derived as follows:
  The variable numIs4N is derived as follows:

numIs4$N$=
  ((avail$T$&&avail$L$&&predModeIntra==INTRA_$LT$_CCLM)
  ?0:1) (358)

The variable startPosN is set equal to numSampN>>(2+numIs4N).
  The variable pickStepN is set equal to Max(1, numSampN>>(1+numIs4N)).
  If availN is equal to TRUE and predModeIntra is equal to INTRA_LT_CCLM or INTRA_N_CCLM, the following assignments are made:
    cntN is set equal to Min(numSampN, (1+numIs4N)<<1).
    pickPosN[pos] is set equal to (startPosN+pos*pickStepN), with pos=0 . . . cntN−1.
  Otherwise, cntN is set equal to 0.
The variable bVertical Collocated is set equal to 0..
The prediction samples predSamples[x][y] with x=0 . . . nTbW−1, y=0 . . . nTbH−1 are derived as follows:
  If both numSampL and numSampT are equal to 0, the following applies:

predSamples[$x$][$y$]=1<<(BitDepth−1) (359)

Otherwise, the following ordered steps apply:
    1. The collocated luma samples pY[x][y] with x=0 . . . nTbW*SubWidthC−1, y=0 . . . nTbH*SubHeightC−1 are set equal to the reconstructed luma samples prior to the deblocking filter process at the locations (xTbY+x, yTbY+y).
    2. The neighbouring luma samples pY[x][y] are derived as follows:
      When numSampL is greater than 0, the neighbouring left luma samples pY[x][y] with x=−1 . . . −3, y=0 . . . SubHeightC*numSampL−1, are set equal to the reconstructed luma samples prior to the deblocking filter process at the locations (xTbY+x, yTbY+y).
      When availT is equal to FALSE, the neighbouring top luma samples pY[x][y] with x=−1 . . . SubWidthC*numSampT−1, y=−1 . . . −2, are set equal to the luma samples pY[x][0].
      When availL is equal to FALSE, the neighbouring left luma samples pY[x][y] with x=−1 . . . −3, y=−1 . . . SubHeightC*numSampL−1, are set equal to the luma samples pY[0][y].
      When numSampT is greater than 0, the neighbouring top luma samples pY[x][y] with x=0 . . . SubWidthC*numSampT−1, y=−1, −2, are set equal to the reconstructed luma samples prior to the deblocking filter process at the locations (xTbY+x, yTbY+y).
      When availTL is equal to TRUE, the neighbouring top-left luma samples pY[x][y] with x=−1, y=−1, −2, are set equal to the reconstructed luma samples prior to the deblocking filter process at the locations (xTbY+x, yTbY+y).
    3. The down-sampled collocated luma samples pDsY[x][y] with x=0 . . . nTbW−1, y=0 . . . nTbH−1 are derived as follows:
      If both SubWidthC and SubHeightC are equal to 1, the following applies:
        pDsY[x][y] with x=1 . . . nTbW−1, y=1. nTbH−1 is derived as follows:

$pDstY[x][y]=pY[x][y]$ (360)

Otherwise, the following applies:
        The one-dimensional filter coefficients array F1 and F2, and the 2-dimensional filter coefficients arrays F3 and F4 are specified as follows.

$F1[0]=2,F1[1]=0$ (361)

$F2[0]=1,F2[1]=2,F2[2]=1$ (362)

$F3[i][j]=F4[i][j]=0$, with $i=0 \ldots 2, j=0 \ldots 2$ (363)

If both SubWidthC and SubHeightC are equal to 2, the following applies:

$F1[0]=1,F1[1]=1$ (364)

$F3[0][1]=1,F3[1][1]=4,F3[2][1]=1,F3[1][0]=1,F3[2]=1$ (365)

$F4[0][1]=1,F4[1][1]=2,F4[2][1]=1$ (366)

$F4[0][2]=1,F4[1][2]=2,F4[2][2]=1$ (367)

bVerticalCollocated = sps_chroma_vertical_collocated_flag
          Otherwise, the following applies:

$F3[1][1]=8$ (368)

$F4[0][1]=2,F4[1][1]=4,F4[2][1]=2,$ (369)

bVerticalCollocated = 0
If bVerticalCollocated is equal to 1, the following applies:
pDsY[x][y] with x=0 . . . nTbW−1, y=0 . . . nTbH−1 is derived as follows:

$pDsY[x][y]$=(F3[1][0]*pY[SubWidthC*x][SubHeightC*y−1]+F3[0][1]*pY[SubWidthC*x−1][SubHeightC*y]+F3[1][1]*pY[SubWidthC*x][SubHeightC*y]+F3[2][1]*pY[SubWidthC*x+1][SubHeightC*y]+F3[1][2]*pY[SubWidthC*x][SubHeightC*y+1]+4)>>3 (371)

Otherwise (bVerticalCollocated is equal to 0), the following applies:
pDsY[x][y] with x=0 . . . nTbW−1, y=0 . . . nTbH−1 is derived as follows:

$pDsY[x][y]$=(F4[0][1]*pY[SubWidthC*x−1][SubHeightC*y]+F4[0][2]*pY[SubWidthC*x−1][SubHeightC*y+1]+F4[1][1]*pY[SubWidthC*x][SubHeightC*y]+F4[1][2]*pY[SubWidthC*x][SubHeightC*y+1]+F4[2][1]*pY[SubWidthC*x+1][SubHeightC*y]+F4[2][2]*pY[SubWidthC*x+1][SubHeightC*y+1]+4)>>3 (371)

4. When numSampL is greater than 0, the selected neighbouring left chroma samples pSelC[idx] are set equal to p[−1][pickPosL[idx]] with idx=0 . . . cntL−1, and the selected down-sampled neighbouring left luma samples pSelDsY[idx] with idx=0 . . . cntL−1 are derived as follows:
The variable y is set equal to pickPosL[idx].
If both SubWidthC and SubHeightC are equal to 1, the following applies:

$pSelDsY[idx]$=pY[−1][y] (372)

Otherwise the following applies:
If bVerticalCollocated is equal to 1, the following applies:

$pSelDsY[idx]$=(F3[1][0]*pY[−SubWidthC][SubHeightC*y−1]+F3[0][1]*pY[−1−SubWidthC][SubHeightC*y]+F3[1][1]*pY[−SubWidthC][SubHeightC*y]+F3[2][1]*pY[1−SubWidthC][SubHeightC*y]+F3[1][2]*pY[−SubWidthC][SubHeightC*y+1]+4)>>3 (373)

Otherwise (bVerticalCollocated is equal to 0), the following applies:

$pSelDsY[idx]$=(F4[0][1]*pY[−1−SubWidthC][SubHeightC*y]+F4[0][2]*pY[−1−SubWidthC][SubHeightC*y]+1+F4[1][1]*pY[−SubWidthC][SubHeightC*y]+F4[1][2]*pY[−SubWidthC][SubHeightC*y+1]+F4[2][1]*pY[1−SubWidthC][SubHeightC*y]+F4[2][2]*pY[1−SubWidthC][SubHeightC*y+1]+4)>>3 (374)

5. When numSampT is greater than 0, the selected neighbouring top chroma samples pSelC[idx] are set equal to p[pickPosT[idx−cntL]][−1] with idx= cntL . . . cntL+cntT−1, and the down-sampled neighbouring top luma samples pSelDsY[idx] with idx= cntL . . . cntL+cntT−1 are specified as follows:
The variable x is set equal to pickPosT[idx−cntL].
If both SubWidthC and SubHeightC are equal to 1, the following applies:

$pSelDsY[idx]$=pY[x][−1] (375)

Otherwise, the following applies:
If bVerticalCollocated is equal to 1, the following applies:
If bCTUboundary is equal to FALSE, the following applies:

$pSelDsY[idx]$=(F3[1][0]*pY[SubWidthC*x][−1−SubHeightC]+F3[0][1]*pY[SubWidthC*x−1][−SubHeightC]+F3[1][1]*pY[SubWidthC*x][−SubHeightC]+F3[2][1]*pY[SubWidthC*x+1][−SubHeightC]+F3[1][2]*pY[SubWidthC*x][1−SubHeightC]+4)>>3 (376)

Otherwise (bCTUboundary is equal to TRUE), the following applies:

$pSelDsY[idx]$=(F2[0]*pY[SubWidthC*x−1][−1]+F2[1]*pY[SubWidthC*x][−1]+F2[2]*pY[SubWidthC*x+1][−1]+2)>>2 (377)

Otherwise (bVerticalCollocated is equal to 0), the following applies:
If bCTUboundary is equal to FALSE, the following applies:

$pSelDsY[idx]$=(F4[0][1]*pY[SubWidthC x−1][−1]+F4[0][2]*pY[SubWidthC*x−1][−2]+F4[1][1]*pY[SubWidthC*x][−1]+F4[1][2]*pY[SubWidthC*x][−2]+F4[2][1]*pY[SubWidthC*x+1][−1]+F4[2][2]*pY[SubWidthC*x+1][−2]+4)>>3 (378)

Otherwise (bCTUboundary is equal to TRUE), the following applies:

$pSelDsY[idx]$=(F2[0]*pY[SubWidthC*x−1][−1]+F2[1]*pY[SubWidthC*x][−1]+F2[2]*pY[SubWidthC*x+1][−1]+2)>>2 (379)

6. When cntT+cntL is not equal to 0, the variables minY, maxY, minC and maxC are derived as follows:
When cntT+cntL is equal to 2, pSelComp[3] is set equal to pSelComp[0], pSelComp[2] is set equal to pSelComp[1], pSelComp[0] is set equal to pSelComp[1], and pSelComp[1] is set equal to pSelComp[3], with Comp being replaced by DsY and C.
The arrays minGrpIdx and maxGrpIdx are derived as follows:

minGrpIdx[0]=0 (380)

minGrpIdx[1]=2 (381)

maxGrpIdx[0]=1 (382)

maxGrpIdx[1]=3 (383)

When pSelDsY[minGrpIdx[0]] is greater than pSelDsY[minGrpIdx[1]], minGrpIdx[0] and minGrpIdx[1] are swapped as follows:

(minGrpIdx[0],minGrpIdx[1])=Swap(minGrpIdx[0], minGrpIdx[1]) (384)

When pSelDsY[maxGrpIdx[0]] is greater than pSelDsY[maxGrpIdx[1]], maxGrpIdx[0] and maxGrpIdx[1] are swapped as follows:

(maxGrpIdx[0],maxGrpIdx[1])=Swap(maxGrpIdx[0], maxGrpIdx[1]) (385)

When pSelDsY[minGrpIdx[0]] is greater than pSelDsY[maxGrpIdx[1]], arrays minGrpIdx and maxGrpIdx are swapped as follows:

(minGrpIdx,maxGrpIdx)=Swap(minGrpIdx, maxGrpIdx) (386)

When pSelDsY[minGrpIdx[1]] is greater than pSelDsY[maxGrpIdx[0]], minGrpIdx[1] and maxGrpIdx[0] are swapped as follows:

(minGrpIdx[1],maxGrpIdx[0])=Swap(minGrpIdx[1], maxGrpIdx[0]) (387)

The variables maxY, maxC, minY and minC are derived as follows:

$$\mathrm{maxY} = (pSelDsY[\mathrm{maxGrpIdx}[0]] + pSelDsY[\mathrm{maxGrpIdx}[1]] + 1) \gg 1 \quad (388)$$

$$\mathrm{maxC} = (pSelC[\mathrm{maxGrpIdx}[0]] + pSelC[\mathrm{maxGrpIdx}[1]] + 1) \gg 1 \quad (389)$$

$$\mathrm{minY} = (pSelDsY[\mathrm{minGrpIdx}[0]] + pSelDsY[\mathrm{minGrpIdx}[1]] + 1) \gg 1 \quad (390)$$

$$\mathrm{minC} = (pSelC[\mathrm{minGrpIdx}[0]] + pSelC[\mathrm{minGrpIdx}[1]] + 1) \gg 1 \quad (391)$$

7. The variables a, b, and k are derived as follows:
    If numSampL is equal to 0, and numSampT is equal to 0, the following applies:

$$k = 0 \quad (392)$$

$$a = 0 \quad (393)$$

$$b = 1 \ll (\mathrm{BitDepth} - 1) \quad (394)$$

Otherwise, the following applies:

$$\mathrm{diff} = \mathrm{maxY} - \mathrm{minY} \quad (395)$$

If diff is not equal to 0, the following applies:

$$\mathrm{diffC} = \mathrm{maxC} - \mathrm{minC} \quad (396)$$

$$x = \mathrm{Floor}(\mathrm{Log}\,2(\mathrm{diff})) \quad (397)$$

$$\mathrm{normDiff} = ((\mathrm{diff} \ll 4) \gg x) \,\&\, 15 \quad (398)$$

$$x\mathrel{+}= (\mathrm{normDiff}\,!=0)?1:0 \quad (399)$$

$$y = \mathrm{Abs}(\mathrm{diffC}) > 0?\mathrm{Floor}(\mathrm{Log}\,2(\mathrm{Abs}(\mathrm{diffC}))) + 1:0 \quad (400)$$

$$a = (\mathrm{diffC}*(\mathrm{divSigTable}[\mathrm{normDiff}]|8) + 2^{y-1}) \gg y \quad (401)$$

$$k = ((3 + x - y) < 1)?1:3 + x - y \quad (402)$$

$$a = ((3 + x - y) < 1)?\mathrm{Sign}(a)*15:a \quad (403)$$

$$b = \mathrm{minC} - ((a*\mathrm{minY}) \gg k) \quad (404)$$

where divSigTable[ ] is specified as follows:

$$\mathrm{divSigTable}[\,] = \{0,7,6,5,5,4,4,3,3,2,2,1,1,1,1,0\} \quad (405)$$

Otherwise (diff is equal to 0), the following applies:

$$k = 0 \quad (406)$$

$$a = 0 \quad (407)$$

$$b = \mathrm{minC} \quad (408)$$

8. The prediction samples predSamples[x][y] with x=0 . . . nTbW−1, y=0 . . . nTbH−1 are derived as follows:

$$\mathrm{predSamples}[x][y] = \mathrm{Clip1}(((pDsY[x][y]*a) \gg k) + b) \quad (409)$$

NOTE—This process uses sps_chroma_vertical_collocated_flag. However, in order to simplify implementation, it does not use sps_chroma_horizontal_collocated_flag.

5.29. Embodiment 29

The working draft specified in JVET-Q2001-vE may be changed as below.
8.4.5.2.13 Specification of INTRA_LT_CCLM, INTRA_L_CCLM and INTRA_T_CCLM Intra Prediction Mode
The prediction samples predSamples[x][y] with x=0 . . . nTbW−1, y=0 . . . nTbH−1 are derived as follows:
  If both numSampL and numSampT are equal to 0, the following applies:

$$\mathrm{predSamples}[x][y] = 1 \ll (\mathrm{BitDepth} - 1) \quad (359)$$

Otherwise, the following ordered steps apply:
1. The collocated luma samples pY[x][y] with x=0 . . . nTbW*SubWidthC−1, y=0 . . . nTbH*SubHeightC−1 are set equal to the reconstructed luma samples prior to the deblocking filter process at the locations (xTbY+x, yTbY+y).
2. The neighbouring luma samples pY[x][y] are derived as follows:
    When availL is equal to TRUE, the neighbouring left luma samples pY[x][y] with x=−1 . . . −3, y=0 . . . SubHeightC*max(numSampL, nTbH) −1, are set equal to the reconstructed luma samples prior to the deblocking filter process at the locations (xTbY+x, yTbY+y).
    When availT is equal to FALSE, the neighbouring top luma samples pY[x][y] with x=−1 . . . SubWidthC*numSampT−1, y=−1 . . . −2, are set equal to the luma samples pY[x][0].
    When availL is equal to FALSE, the neighbouring left luma samples pY[x][y] with x=−1 . . . −3, y=−1 . . . SubHeightC*numSampL−1, are set equal to the luma samples pY[0][y].
    When availT is equal to TRUE, the neighbouring top luma samples pY[x][y] with x=0 . . . SubWidthC*max(numSampT, nTbW) −1, y=−1, −2, are set equal to the reconstructed luma samples prior to the deblocking filter process at the locations (xTbY+x, yTbY+y).
    When availTL is equal to TRUE, the neighbouring top-left luma samples pY[x][y] with x=−1, y=−1, −2 are set equal to the reconstructed luma samples prior to the deblocking filter process at the locations (xTbY+x, yTbY+y).

5.30. Embodiment 30

The working draft specified in JVET-Q2001-vE may be changed as below.
8.4.5.2.13 Specification of INTRA_LT_CCLM, INTRA_L_CCLM and INTRA_T_CCLM Intra Prediction Mode
The prediction samples predSamples[x][y] with x=0 . . . nTbW−1, y=0 . . . nTbH−1 are derived as follows:
  If both numSampL and numSampT are equal to 0, the following applies:

$$\mathrm{predSamples}[x][y] = 1 \ll (\mathrm{BitDepth} - 1) \quad (359)$$

Otherwise, the following ordered steps apply:
1. The collocated luma samples pY[x][y] with x=0 . . . nTbW*SubWidthC−1, y=0 . . . nTbH*SubHeightC−1 are set equal to the reconstructed luma samples prior to the deblocking filter process at the locations (xTbY+x, yTbY+y).
2. The neighbouring luma samples pY[x][y] are derived as follows:

When numSampL is greater than 0, the neighbouring left luma samples pY[x][y] with x=−1 ... −3, y=0 ... SubHeightC*numSampL−1, are set equal to the reconstructed luma samples prior to the deblocking filter process at the locations (xTbY+x, yTbY+y).
- *When numSampT is equal to 0 and availL is equal to TRUE , the neighbouring left luma samples pY[ x ][ y ] with x = -1, y = 0..SubHeightC * nTbH - 1 , are set equal to the reconstructed luma samples prior to the deblocking filter process at the locations ( xTbY+ x , yTbY+y ) .*

When availT is equal to FALSE, the neighbouring top luma samples pY[x][y] with x=−1 ... SubWidthC*numSampT−1, y=−1 ... −2, are set equal to the luma samples pY[x][0].

When availL is equal to FALSE, the neighbouring left luma samples pY[x][y] with x=−1 ... −3, y=−1 ... SubHeightC*numSampL−1, are set equal to the luma samples pY[0][y].

When numSampT is greater than 0, the neighbouring top luma samples pY[x][y] with x=0 ... SubWidthC*numSampT−1, y=−1, −2, are set equal to the reconstructed luma samples prior to the deblocking filter process at the locations (xTbY+x, yTbY+y).

- *When numSampT is equal to 0 and availT is equal to TRUE , the neighbouring top luma samples pY[ x ][ y ] with x = 0..SubWidthC * nTbW -1, y = -1, are set equal to the reconstructed luma samples prior to the deblocking filter process at the locations ( xTbY+ x , , yTbY+y ). .*

When availTL is equal to TRUE, the neighbouring top-left luma samples pY[x][y] with x=−1, y=−1, −2 are set equal to the reconstructed luma samples prior to the deblocking filter process at the locations (xTbY+x, yTbY+y).

5.31. Embodiment 31

The working draft specified in JVET-Q2001-vE may be changed as below.

8.4.5.2.13 Specification of INTRA_LT_CCLM, INTRA_L_CCLM and INTRA_T_CCLM Intra Prediction Mode Inputs to this process are:
  the intra prediction mode predModeIntra,
  a sample location (xTbC, yTbC) of the top-left sample of the current transform block relative to the top-left sample of the current picture,
  a variable nTbW specifying the transform block width,
  a variable nTbH specifying the transform block height,
  a variable cIdx specifying the colour component of the current block,
  chroma neighbouring samples p[x][y], with x=−1, y=0 ... 2*nTbH−1 and x=0 ... 2*nTbW−1, y=−1.

Output of this process are predicted samples predSamples[x][y], with x=0 ... nTbW−1, y=0 ... nTbH−1.

The current luma location (xTbY, yTbY) is derived as follows:

$$(xTbY, yTbY) = (xTbC<<(SubWidthC-1), yTbC<<(SubHeightC-1)) \quad (351)$$

The variables availL, availT and availTL are derived as follows:
  The derivation process for neighbouring block availability as specified in clause 6.4.4 is invoked with the current luma location (xCurr, yCurr) set equal to (xTbY, yTbY), the neighbouring luma location (xTbY−1, yTbY), checkPredModeY set equal to FALSE, and cIdx as inputs, and the output is assigned to availL.
  The derivation process for neighbouring block availability as specified in clause 6.4.4 is invoked with the current luma location (xCurr, yCurr) set equal to (xTbY, yTbY), the neighbouring luma location (xTbY, yTbY−1), checkPredModeY set equal to FALSE, and cIdx as inputs, and the output is assigned to availT.

The variable availTL is derived as follows:

$$availTL = availL \&\& availT \quad (352)$$

The number of available top-right neighbouring chroma samples numTopRight is derived as follows:
  The variable numTopRight is set equal to 0 and availTR is set equal to TRUE.
  When predModeIntra is equal to INTRA_T_CCLM, the following applies for x=nTbW ... 2*nTbW−1 until availTR is equal to FALSE or x is equal to 2*nTbW−1:
    The derivation process for neighbouring block availability as specified in clause 6.4.4 is invoked with the current luma location (xCurr, yCurr) set equal to (xTbY, yTbY) the neighbouring luma location (xTbY+x, yTbY−1), checkPredModeY set equal to FALSE, and cIdx as inputs, and the output is assigned to availTR
    When availTR is equal to TRUE, numTopRight is incremented by one.

The number of available left-below neighbouring chroma samples numLeftBelow is derived as follows:
  The variable numLeftBelow is set equal to 0 and availLB is set equal to TRUE.
  When predModeIntra is equal to INTRA_L_CCLM, the following applies for y=nTbH ... 2*nTbH−1 until availLB is equal to FALSE or y is equal to 2*nTbH−1:
    The derivation process for neighbouring block availability as specified in clause 6.4.4 is invoked with the current luma location (xCurr, yCurr) set equal to (xTbY, yTbY), the neighbouring luma location (xTbY−1, yTbY+y), checkPredModeY set equal to FALSE, and cIdx as inputs, and the output is assigned to availLB
    When availLB is equal to TRUE, numLeftBelow is incremented by one.

The number of available neighbouring chroma samples on the top and top-right numSampT and the number of available neighbouring chroma samples on the left and left-below numSampL are derived as follows:
  If predModeIntra is equal to INTRA_LT_CCLM, the following applies:

$$numSampT = availT ? nTbW : 0 \quad (353)$$

$$numSampL = availL ? nTbH : 0 \quad (354)$$

Otherwise, the following applies:

$$numSampT = (availT \&\& predModeIntra == INTRA\_T\_CCLM) ? (nTbW + Min(numTopRight, nTbH)) : 0 \quad (355)$$

numSampL=
(availL&&predModeIntra==INTRA_L_CCLM)?
(nTbH+Min(numLeftBelow,nTbW)):0     (356)

The variable bCTUboundary is derived as follows:

bCTUboundary=(yTbY&(CtbSizeY−1)==0)?TRUE:
FALSE.     (357)

The variable cntN and array pickPosN with N being replaced by L and T, are derived as follows:
The variable numIs4N is derived as follows:

numIs4N=
((availT&&availL&&predModeIntra==INTRA_LT_CCLM)
?0:1)     (358)

The variable startPosN is set equal to numSampN>>(2+numIs4N).
The variable pickStepN is set equal to Max(1, numSampN>>(1+numIs4N)).
If availN is equal to TRUE and predModeIntra is equal to INTRA_LT_CCLM or INTRA_N_CCLM, the following assignments are made:
  cntN is set equal to Min(numSampN, (1+numIs4N)<<1).
  pickPosN[pos] is set equal to (startPosN+ pos*pickStepN), with pos=0 . . . cntN−1.
Otherwise, cntN is set equal to 0.
The variable bVertical Collocated is set equal to 0..
The prediction samples predSamples[x][y] with x=0 . . . nTbW−1, y=0 . . . nTbH−1 are derived as follows:
If both numSampL and numSampT are equal to 0, the following applies:

predSamples[x][y]=1<<(BitDepth−1)     (359)

Otherwise, the following ordered steps apply:
1. The collocated luma samples pY[x][y] with x=0 . . . nTbW*SubWidthC−1, y=0 . . . nTbH*SubHeightC−1 are set equal to the reconstructed luma samples prior to the deblocking filter process at the locations (xTbY+x, yTbY+y).
2. The neighbouring luma samples pY[x][y] are derived as follows:
  When numSampL is greater than 0, the neighbouring left luma samples pY[x][y] with x=−1 . . . −3, y=0 . . . SubHeightC*numSampL−1, are set equal to the reconstructed luma samples prior to the deblocking filter process at the locations (xTbY+x, yTbY+y).
  When availT is equal to FALSE, the neighbouring top luma samples pY[x][y] with x=−1 . . . SubWidthC*numSampT−1, y=−1 . . . −2, are set equal to the luma samples pY[x][0].
  When availL is equal to FALSE, the neighbouring left luma samples pY[x][y] with x=−1 . . . −3, y=−1 . . . SubHeightC*numSampL−1, are set equal to the luma samples pY[0][y].
  When numSampT is greater than 0, the neighbouring top luma samples pY[x][y] with x=0 . . . SubWidthC*numSampT−1, y=−1, −2, are set equal to the reconstructed luma samples prior to the deblocking filter process at the locations (xTbY+x, yTbY+y).
  When availTL is equal to TRUE, the neighbouring top-left luma samples pY[x][y] with x=−1, y=−1, −2, are set equal to the reconstructed luma samples prior to the deblocking filter process at the locations (xTbY+x, yTbY+y).
3. The down-sampled collocated luma samples pDsY[x][y] with x=0 . . . nTbW−1, y=0 . . . nTbH−1 are derived as follows:

If both SubWidthC and SubHeightC are equal to 1, the following applies:
  pDsY[x][y] with x=1 . . . nTbW−1, y=1 . . . nTbH−1 is derived as follows:

pDstY[x][y]=pY[x][y]     (360)

Otherwise, the following applies:
The one-dimensional filter coefficients array F1 and F2, and the 2-dimensional filter coefficients arrays F3 and F4 are specified as follows.

F1[0]=2,F1[1]=0     (361)

F2[0]=1,F2[1]=2,F2[2]=1     (362)

F3[i][j]=F4[i][j]=0,with i=0 . . . 2,j=0 . . . 2     (363)

If both SubWidthC and SubHeightC are equal to 2, the following applies:

F1[0]=1,F1[1]=1     (364)

F3[0][1]=1,F3[1][1]=4,F3[2][1]=1,F3[1][0]=1,F3[1][2]=1     (365)

F4[0][1]=1,F4[1][1]=2,F4[2][1]=1     (366)

F4[0][2]=1,F4[1][2]=2,F4[2][2]=1     (367)

bVerticalCollocated = sps_chroma_vertical_ collocated_flag
Otherwise, the following applies:

F3[1][1]=8     (368)

F4[0][1]=2,F4[1][1]=4,F4[2][1]=2,     (369)

bVerticalCollocated = 0
If bVerticalCollocated is equal to 1, the following applies:
  pDsY[x][y] with x=0 . . . nTbW−1, y=0 . . . nTbH−1 is derived as follows:

pDsY[x][y]=(F3[1][0]*pY[SubWidthC*x]
[SubHeightC*y−1]+F3[0][1]*pY[SubWidthC*x−
1][SubHeightC*y]+F3[1][1]*pY[SubWidthC*x]
[SubHeightC*y]+F3[2][1]*pY[SubWidthC*x+1]
[SubHeightC*y]+F3[1][2]*pY[SubWidthC*x]
[SubHeightC*y+1]+4)>>3     (370)

Otherwise (bVerticalCollocated is equal to 0), the following applies:
  pDsY[x][y] with x=0 . . . nTbW−1, y=0 . . . nTbH−1 is derived as follows:

pDsY[x][y]=(F4[0][1]*pY[SubWidthC*x−1]
[SubHeightC*y]+F4[0][2]*pY[SubWidthC*x−1]
[SubHeightC*y+1]+F4[1][1]*pY[SubWidthC*x]
[SubHeightC*y]+F4[1][2]*pY[SubWidthC*x]
[SubHeightC*y+1]+F4[2][1]*pY[SubWidthC*x+
1][SubHeightC*y]+F4[2][2]*pY[SubWidthC*x+
1][SubHeightC*y+1]+4)>>3     (371)

4. When numSampL is greater than 0, the selected neighbouring left chroma samples pSelC[idx] are set equal to p[−1][pickPosL[idx]] with idx=0 . . . cntL−1, and the selected down-sampled neighbouring left luma samples pSelDsY[idx] with idx=0 . . . cntL−1 are derived as follows:
The variable y is set equal to pickPosL[idx].
If both SubWidthC and SubHeightC are equal to 1, the following applies:

pSelDsY[idx]=pY[−1][y]     (372)

Otherwise the following applies:
  If bVerticalCollocated is equal to 1, the following applies:

$pSelDsY[idx] = (F3[1][0]*pY[-SubWidthC][SubHeightC*y-1]+F3[0][1]*pY[-1-SubWidthC][SubHeightC*y]+F3[1][1]*pY[-SubWidthC][SubHeightC*y]+F3[2][1]*pY[1-SubWidthC][SubHeightC*y]+F3[1][2]*pY[-SubWidthC][SubHeightC*y+1]+4)>>3$ (373)

Otherwise (*bVerticalCollocated* equal to 0), the following applies:

$pSelDsY[idx] = (F4[0][1]*pY[-1-SubWidthC][SubHeightC*y]+F4[0][2]*pY[-1-SubWidthC][SubHeightC*y]+1+F4[1][1]*pY[-SubWidthC][SubHeightC*y]+F4[1][2]*pY[-SubWidthC][SubHeightC*y+1]+F4[2][1]*pY[1-SubWidthC][SubHeightC*y]+F4[2][2]*pY[1-SubWidthC][SubHeightC*y+1]+4)>>3$ (374)

5. When numSampT is greater than 0, the selected neighbouring top chroma samples pSelC[idx] are set equal to p[pickPosT[idx−cntL]][−1] with idx= cntL . . . cntL+cntT−1, and the down-sampled neighbouring top luma samples pSelDsY[idx] with idx=*cntL* . . . cntL+cntT−1 are specified as follows: The variable x is set equal to pickPosT[idx−cntL]. If both SubWidthC and SubHeightC are equal to 1, the following applies:

$pSelDsY[idx]=pY[x][-1]$ (375)

Otherwise, the following applies:
  If *bVerticalCollocated* is equal to 1, the following applies:
    If bCTUboundary is equal to FALSE, the following applies:

$pSelDsY[idx]=(F3[1][0]*pY[SubWidthC*x][-1-SubHeightC]+F3[0][1]*pY[SubWidthC*x-1][-SubHeightC]+F3[1][1]*pY[SubWidthC*x][-SubHeightC]+F3[2][1]*pY[SubWidthC*x+1][-SubHeightC]+F3[1][2]*pY[SubWidthC*x][1-SubHeightC]+4)>>3$ (376)

Otherwise (bCTUboundary is equal to TRUE), the following applies:

$pSelDsY[idx]=(F2[0]*pY[SubWidthC*x-1][-1]+F2[1]*pY[SubWidthC*x][-1]+F2[2]*pY[SubWidthC*x+1][-1]+2)>>2$ (377)

Otherwise (*bVerticalCollocated* is equal to 0), the following applies:
    If bCTUboundary is equal to FALSE, the following applies:

$pSelDsY[idx]=(F4[0][1]*pY[SubWidthC\,x-1][-1]+F4[0][2]*pY[SubWidthC*x-1][-2]+F4[1][1]*pY[SubWidthC*x][-1]+F4[1][2]*pY[SubWidthC*x][-2]+F4[2][1]*pY[SubWidthC*x+1][-1]+F4[2][2]*pY[SubWidthC*x+1][-2]+4)>>3$ (378)

Otherwise (bCTUboundary is equal to TRUE), the following applies:

$pSelDsY[idx]=(F2[0]*pY[SubWidthC*x-1][-1]+F2[1]*pY[SubWidthC*x][-1]+F2[2]*pY[SubWidthC*x+1][-1]+2)>>2$ (379)

6. When cntT+cntL is not equal to 0, the variables minY, maxY, minC and maxC are derived as follows:
When cntT+cntL is equal to 2, pSelComp[3] is set equal to pSelComp[0], pSelComp[2] is set equal to pSelComp[1], pSelComp[0] is set equal to pSelComp[1], and pSelComp[1] is set equal to pSelComp[3], with Comp being replaced by DsY and C.

The arrays minGrpIdx and maxGrpIdx are derived as follows:

$minGrpIdx[0]=0$ (380)

$minGrpIdx[1]=2$ (381)

$maxGrpIdx[0]=1$ (382)

$maxGrpIdx[1]=3$ (383)

When pSelDsY[minGrpIdx[0]] is greater than pSelDsY[minGrpIdx[1]], minGrpIdx[0] and minGrpIdx[1] are swapped as follows:

$(minGrpIdx[0],minGrpIdx[1])=Swap(minGrpIdx[0],minGrpIdx[1])$ (384)

When pSelDsY[maxGrpIdx[0]] is greater than pSelDsY[maxGrpIdx[1]], maxGrpIdx[0] and maxGrpIdx[1] are swapped as follows:

$(maxGrpIdx[0],maxGrpIdx[1])=Swap(maxGrpIdx[0],maxGrpIdx[1])$ (385)

When pSelDsY[minGrpIdx[0]] is greater than pSelDsY[maxGrpIdx[1]], arrays minGrpIdx and maxGrpIdx are swapped as follows:

$(minGrpIdx,maxGrpIdx)=Swap(minGrpIdx,maxGrpIdx)$ (386)

When pSelDsY[minGrpIdx[1]] is greater than pSelDsY[maxGrpIdx[0]], minGrpIdx[1] and maxGrpIdx[0] are swapped as follows:

$(minGrpIdx[1],maxGrpIdx[0])=Swap(minGrpIdx[1],maxGrpIdx[0])$ (387)

The variables maxY, maxC, minY and minC are derived as follows:

$maxY=(pSelDsY[maxGrpIdx[0]]+pSelDsY[maxGrpIdx[1]]+1)>>1$ (388)

$maxC=(pSelC[maxGrpIdx[0]]+pSelC[maxGrpIdx[1]]+1)>>1$ (389)

$minY=(pSelDsY[minGrpIdx[0]]+pSelDsY[minGrpIdx[1]]+1)>>1$ (390)

$minC=(pSelC[minGrpIdx[0]]+pSelC[minGrpIdx[1]]+1)>>1$ (391)

7. The variables a, b, and k are derived as follows:
If numSampL is equal to 0, and numSampT is equal to 0, the following applies:

$k=0$ (392)

$a=0$ (393)

$b=1<<(BitDepth-1)$ (394)

Otherwise, the following applies:

$diff=maxY-minY$ (395)

If diff is not equal to 0, the following applies:

$diffC=maxC-minC$ (396)

$x=Floor(Log\ 2(diff))$ (397)

$normDiff=((diff<<4)>>x)\&15$ (398)

$x+=(normDiff\ !=0)?1:0$ (399)

$y=Abs(diffC)>0?Floor(Log\ 2(Abs(diffC)))+1:0$ (400)

$a=(diffC*(divSigTable[normDiff]|8)+2^{y-1})>>y$ (401)

$$k=((3+x-y)<1)?1:3+x-y \quad (402)$$

$$a=((3+x-y)<1)?\text{Sign}(a)*15:a \quad (403)$$

$$b=\text{min}C-((a*\text{min}Y)>>k) \quad (404)$$

where divSigTable[ ] is specified as follows:

$$\text{divSigTable}[\ ]=0,7,6,5,5,4,4,3,3,2,2,1,1,1,1,0 \quad (405)$$

Otherwise (diff is equal to 0), the following applies:

$$k=0 \quad (406)$$

$$a=0 \quad (407)$$

$$b=\text{min}C \quad (408)$$

8. The prediction samples predSamples[x][y] with x=0 . . . nTbW−1, y=0 . . . nTbH−1 are derived as follows:

$$\text{predSamples}[x][y]=\text{Clip1}(((pDsY[x][y]*a)>>k)+b) \quad (409)$$

NOTE—This process uses sps_chroma_vertical_collocated_flag. However, in order to simplify implementation, it does not use sps_chroma_horizontal_collocated_flag.

Figure 9:
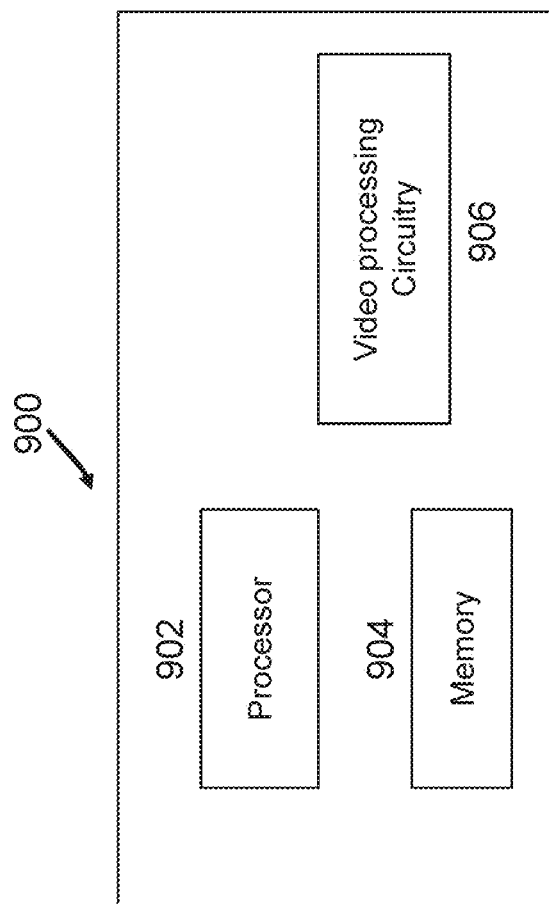
FIG. 9 shows an example of a video processing apparatus.

FIG. 9 is a block diagram of a video processing apparatus 900. The apparatus 900 may be used to implement one or more of the methods described herein. The apparatus 900 may be embodied in a smartphone, tablet, computer, Internet of Things (IoT) receiver, and so on. The apparatus 900 may include one or more processors 902, one or more memories 904 and video processing hardware 906. The processor(s) 902 may be configured to implement one or more methods described in the present disclosure. The memory (memories) 904 may be used for storing data and code used for implementing the methods and techniques described herein. The video processing hardware 906 may be used to implement, in hardware circuitry, some techniques described in the present disclosure (e.g., listed in the previous section).

Figure 10:
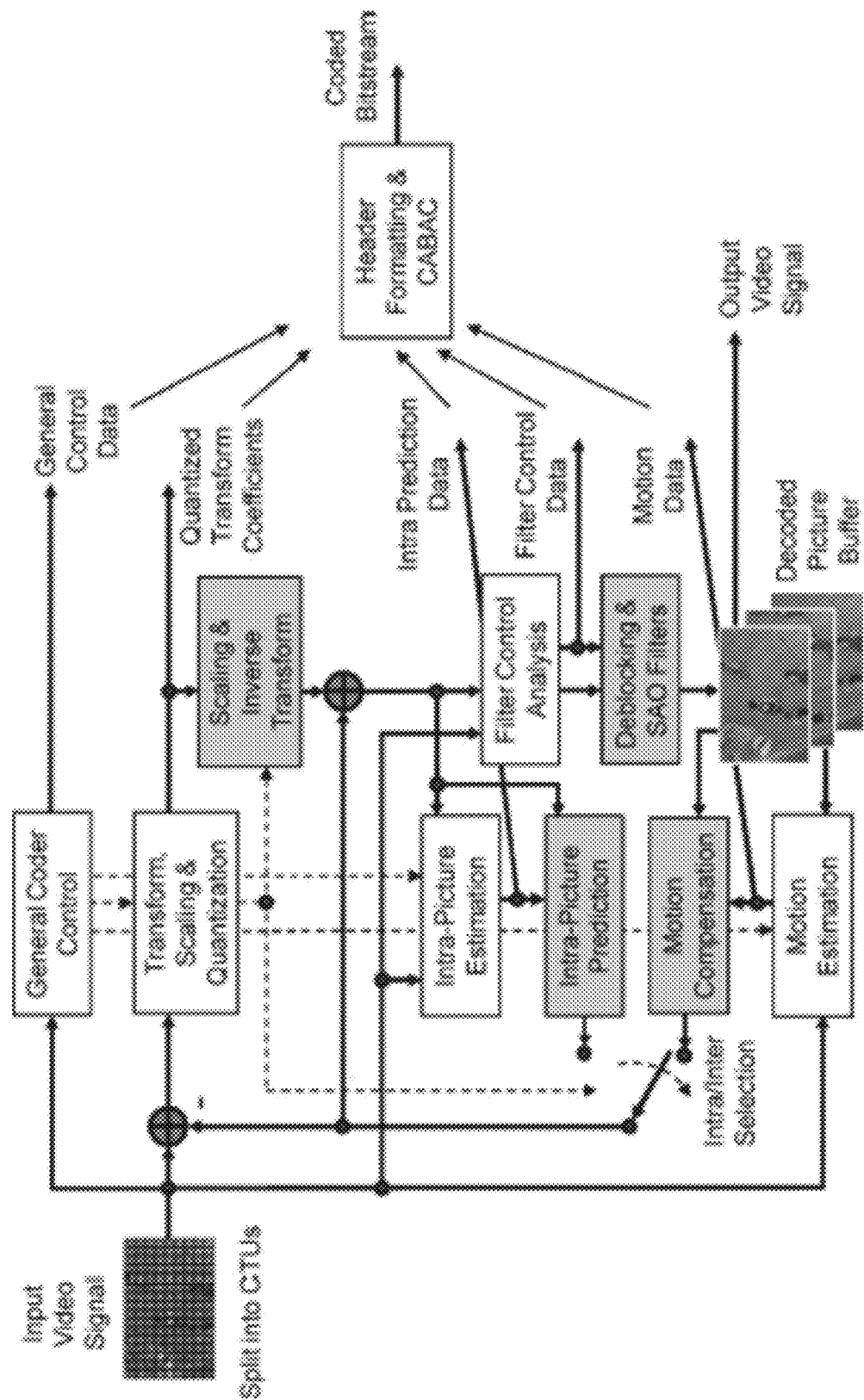
FIG. 10 shows a block diagram of a video encoder.

FIG. 10 shows block diagram of a video encoder.

Figure 11:
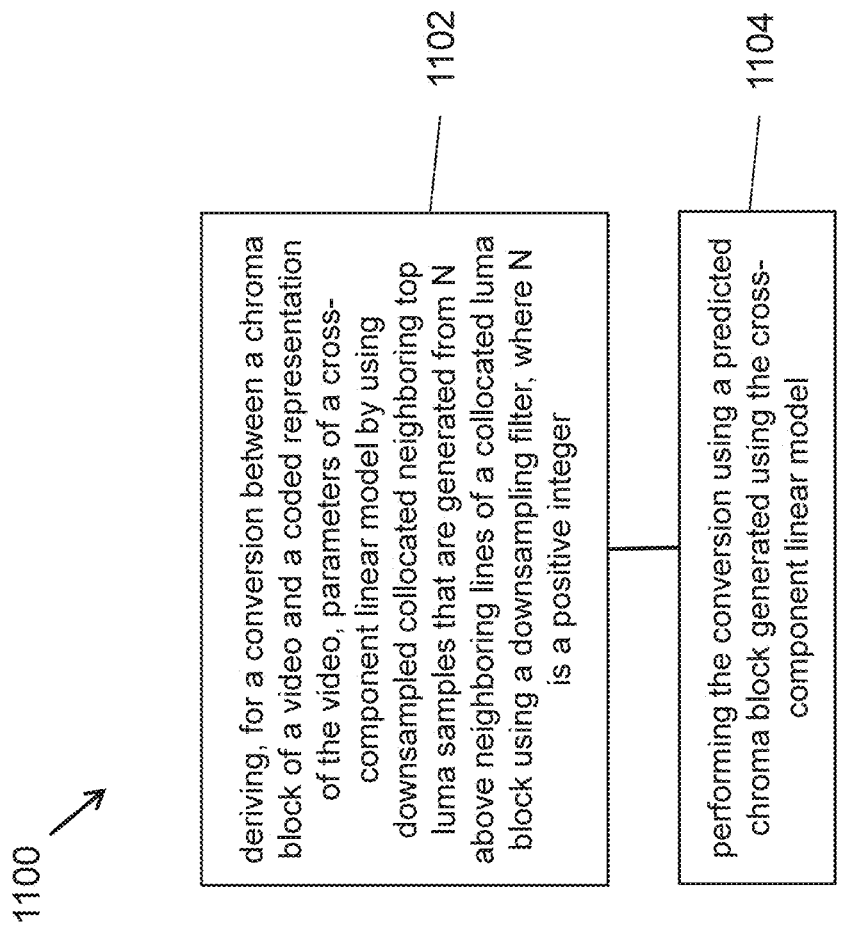
FIG. 11 is a flowchart for an example of a video processing method.

FIG. 11 is a flowchart for a method 1100 of processing a video. The method 1100 includes deriving (1102), for a conversion between a chroma block of a video and a coded representation of the video, parameters of a cross-component linear model by using downsampled collocated neighboring top luma samples that are generated from N above neighboring lines of a collocated luma block using a downsampling filter, where N is a positive integer, and performing (1104) the conversion using a predicted chroma block generated using the cross-component linear model.

Figure 12:
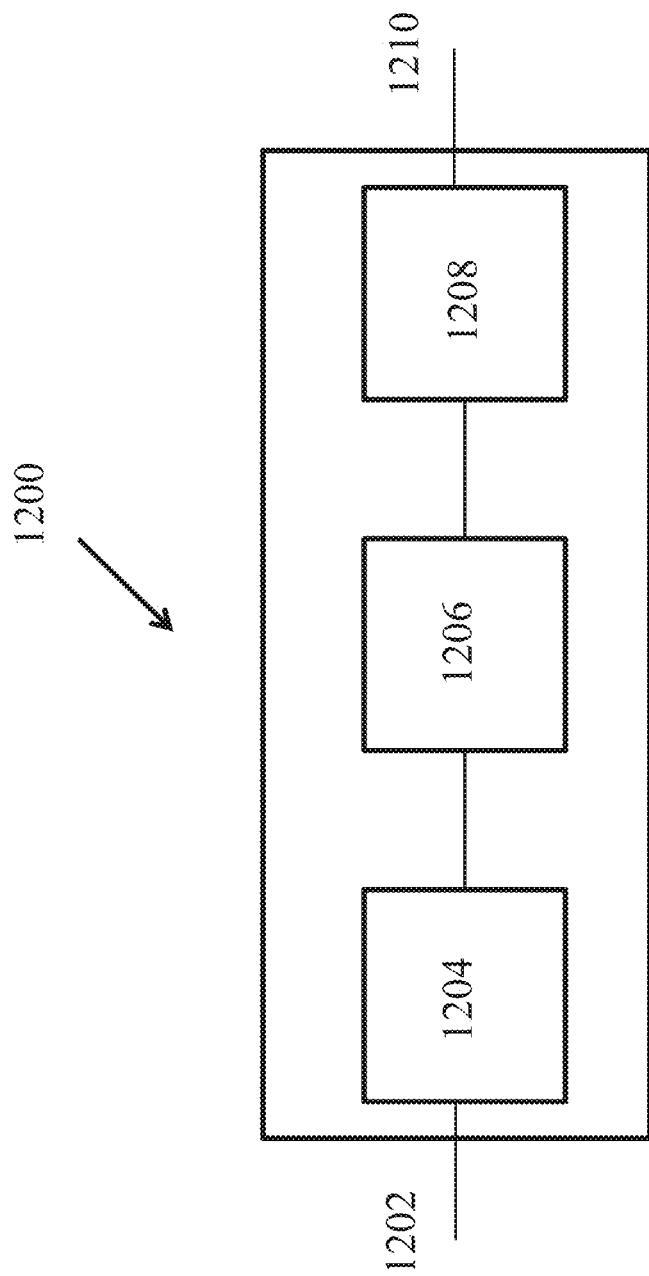
FIG. 12 is a block diagram for an example of a video processing system.

FIG. 12 is a block diagram showing an example video processing system 1200 in which various techniques disclosed herein may be implemented. Various implementations may include some or all of the components of the system 1200. The system 1200 may include input 1202 for receiving video content. The video content may be received in a raw or uncompressed format, e.g., 8 or 10 bit multi-component pixel values, or may be in a compressed or encoded format. The input 1202 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The system 1200 may include a coding component 1204 that may implement the various coding or encoding methods described in the present disclosure. The coding component 1204 may reduce the average bitrate of video from the input 1202 to the output of the coding component 1204 to produce a coded representation of the video. The coding techniques are therefore sometimes called video compression or video transcoding techniques. The output of the coding component 1204 may be either stored, or transmitted via a communication connected, as represented by the component 1206. The stored or communicated bitstream (or coded) representation of the video received at the input 1202 may be used by the component 1208 for generating pixel values or displayable video that is sent to a display interface 1210. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present disclosure may be embodied in various electronic devices such as mobile phones, laptops, smartphones or other devices that are capable of performing digital data processing and/or video display.

Figure 14:
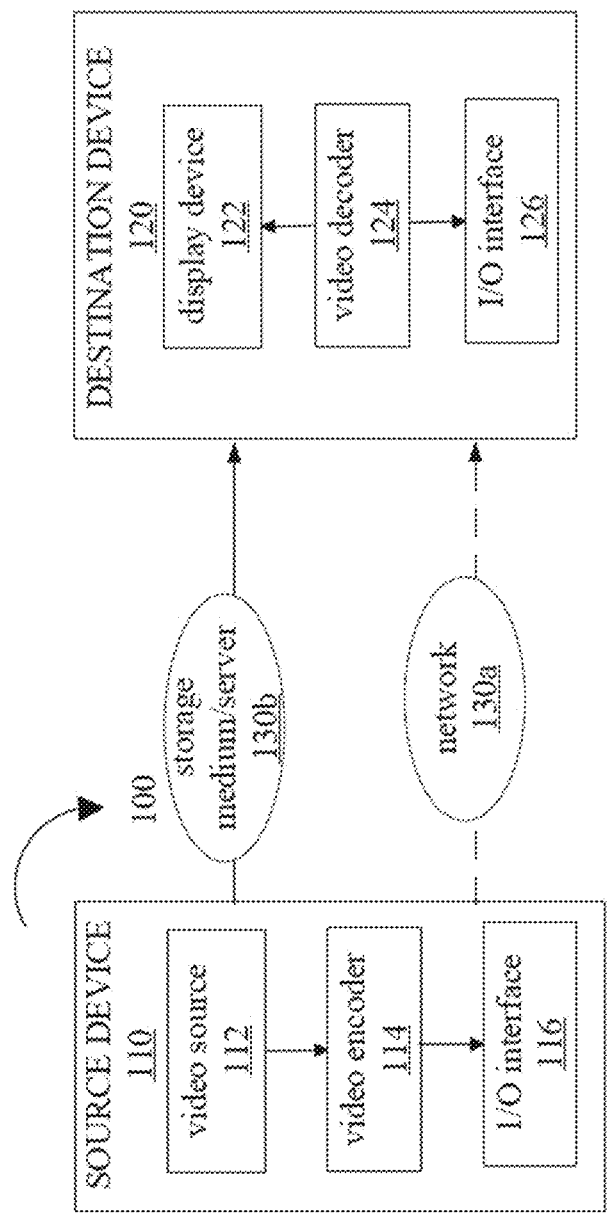
FIG. 14 is a block diagram that illustrates an example video coding system.

FIG. 14 is a block diagram that illustrates an example video coding system 100 that may utilize the techniques of this disclosure.

As shown in FIG. 14, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVC) standard and other current and/or further standards.

Figure 15:
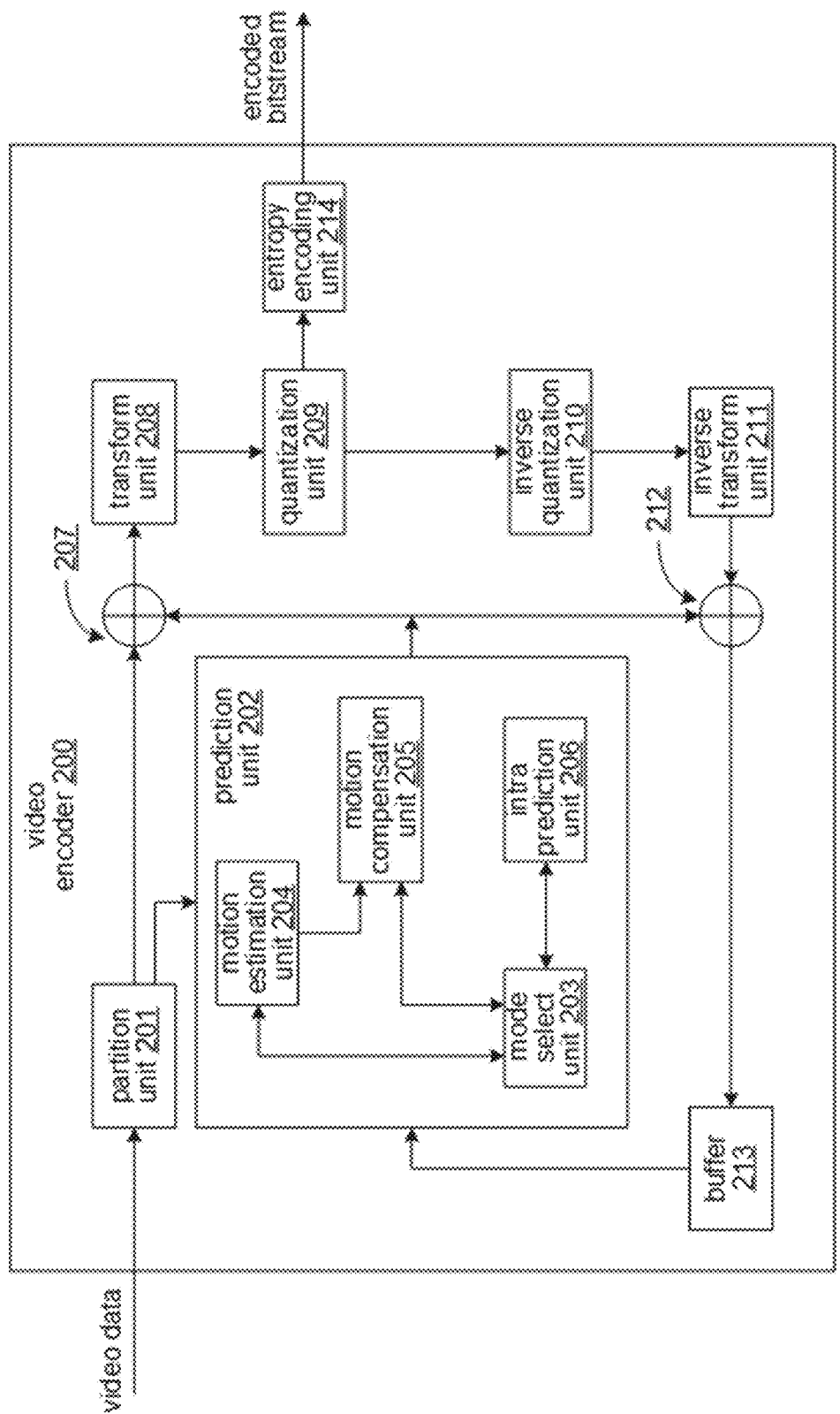
FIG. 15 is a block diagram that illustrates an encoder in accordance with some embodiments of the disclosed technology.

FIG. 15 is a block diagram illustrating an example of video encoder 200, which may be video encoder 114 in the system 100 illustrated in FIG. 14.

Video encoder 200 may be configured to perform any or all of the techniques of this disclosure. In the example of FIG. 15, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a prediction unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, prediction unit 202 may include an intra block copy (IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 15 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter prediction (CIIP) mode in which the prediction is based on an inter prediction signal and an intra prediction signal. Mode select unit 203 may also select a resolution for a motion vector (e.g., a sub-pixel or integer pixel precision) for the block in the case of inter-prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector prediction (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 16:
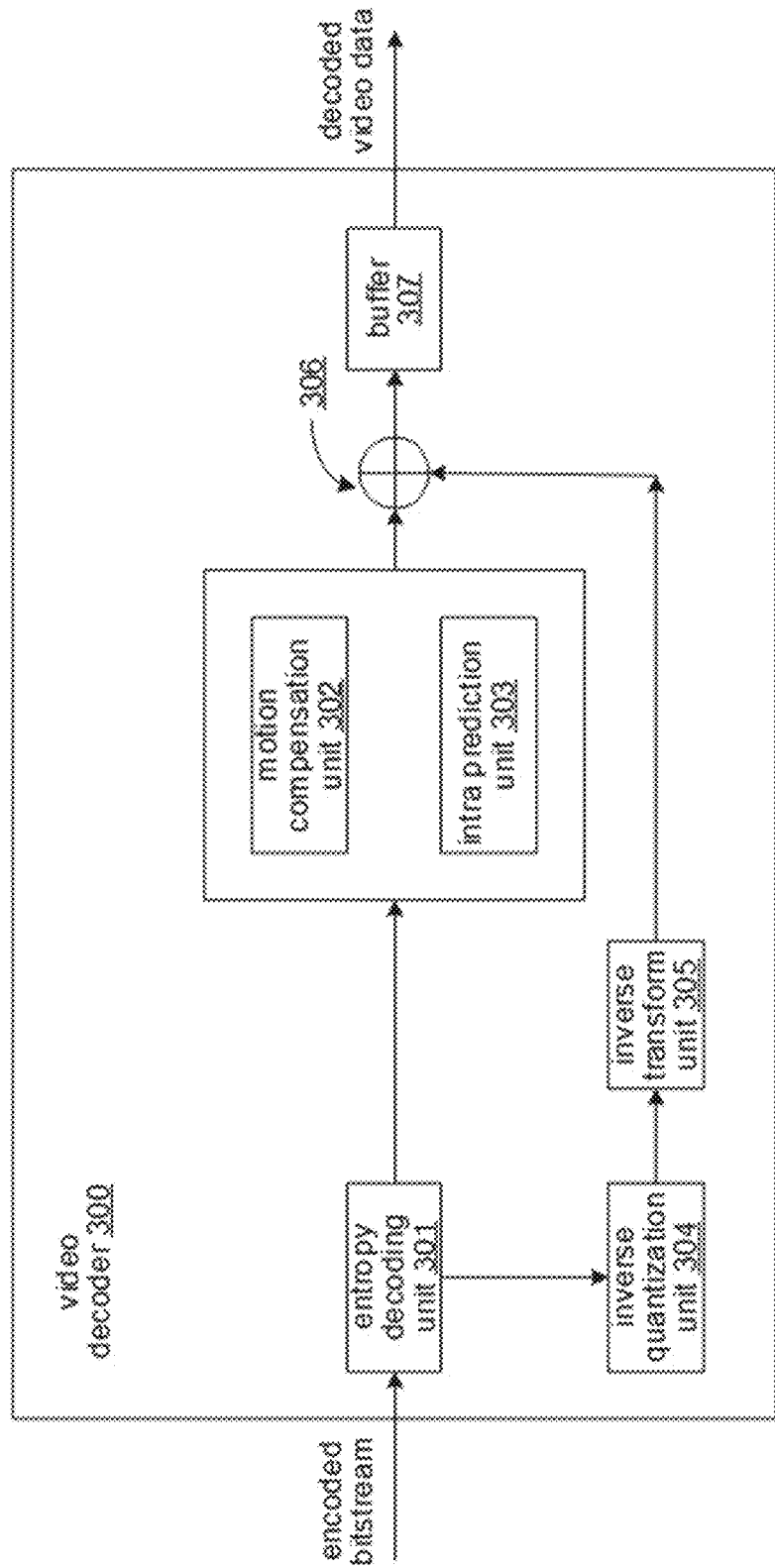
FIG. 16 is a block diagram that illustrates a decoder in accordance with some embodiments of the disclosed technology.

FIG. 16 is a block diagram illustrating an example of video decoder 300 which may be video decoder 124 in the system 100 illustrated in FIG. 14.

The video decoder 300 may be configured to perform any or all of the techniques of this disclosure. In the example of FIG. 16, the video decoder 300 includes a plurality of functional components. The techniques described in this disclosure may be shared among the various components of the video decoder 300. In some examples, a processor may be configured to perform any or all of the techniques described in this disclosure.

In the example of FIG. 16, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (e.g., FIG. 15).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 20 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 302 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation.

The following sets of clauses provide examples preferred by some embodiments is provided next.

The first set of clauses show example embodiments of techniques discussed in items 18 and 19 of the previous section.

Figure 17A:
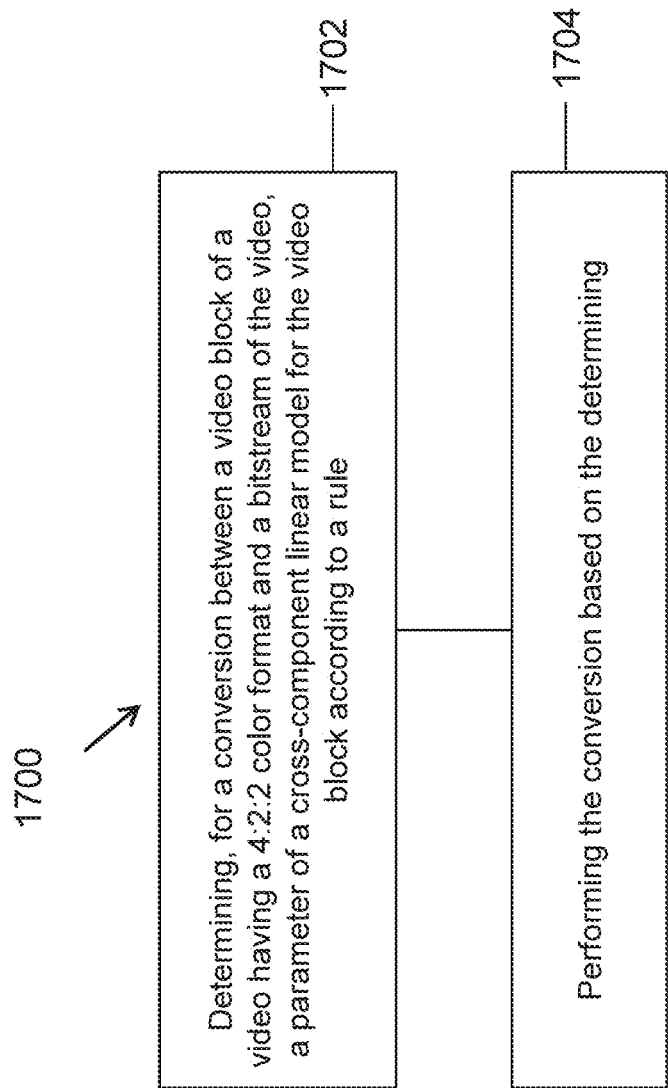
FIGS. 17A and 17B are flowcharts for example methods of video processing in accordance with some embodiments of the disclosed technology.

1. A method of video processing (e.g., method 1700 as shown in FIG. 17A), comprising: determining 1702, for a conversion between a video block of a video having a 4:2:2 color format and a bitstream of the video, a parameter of a cross-component linear model for the video block according to a rule; and performing 1704 the conversion based on the determining, and wherein a syntax element indicates whether chroma samples of the video are vertically shifted relative to luma samples of the video, and wherein the rule specifies that the parameter is determined independent of a value of the syntax element.

2. The method of clause 1, wherein the parameter of the cross-component linear model corresponds to a parameter of down-sampling filtering in the cross-component linear model.

3. The method of clause 2, wherein the down-sampling filtering includes downsampling neighboring above luma samples, and/or downsampling neighboring left luma samples, and/or downsampling samples in the video block that is a luma block.

4. The method of clause 2 or 3, wherein the down-sampling filtering is performed using a fixed filter regardless of a value of the syntax element.

5. The method of clause 4, wherein the fixed filter is a 3-tap horizontal filter with coefficients [1/4, 2/4, 1/4] or [2/8, 4/8, 2/8].

Figure 17B:

6. A method of video processing (e.g., method 1710 as shown in FIG. 17B), comprising: performing a conversion between a video and a bitstream of the video according to a rule, and wherein the format rule specifies that a field indicating whether chroma samples positions are vertically shifted relative to corresponding luma sample positions is set to a default value due to the video having 4:2:2 or 4:4:4 color format.

7. The method of clause 6, wherein the default value is 0 or 1.

8. The method of clause 6, wherein the rule further specifies, in case that the field is not present, a value of the field is inferred to be equal to 1.

9. The method of clause 6, wherein the rule further specifies, in case that the field is not present, a value of the field is inferred to be equal to 0.

10. The method of any of clauses 1 to 9, wherein the cross-component linear model uses a linear mode to derive prediction values of a chroma component from another component.

11. The method of any of clauses 1 to 9, wherein the conversion includes encoding the video into the bitstream.

12. The method of any of clauses 1 to 9, wherein the conversion includes decoding the video from the bitstream.

13. The method of any of clauses 1 to 12, wherein the conversion includes generating the bitstream from the video, and the method further comprises: storing the bitstream in a non-transitory computer-readable recording medium.

14. A video processing apparatus comprising a processor configured to implement a method recited in any one or more of clauses 1 to 12.

15. A method of storing a bitstream of a video, comprising, a method recited in any one of clauses 1 to 12, and further including storing the bitstream to a non-transitory computer-readable recording medium.

16. A computer readable medium storing program code that, when executed, causes a processor to implement a method recited in any one or more of clauses 1 to 12.

17. A computer readable medium that stores a bitstream generated according to any of the above described methods.

18. A video processing apparatus for storing a bitstream representation, wherein the video processing apparatus is configured to implement a method recited in any one or more of clauses 1 to 12.

The second set of clauses show example embodiments of techniques discussed in item 20 of the previous section.

Figure 18:
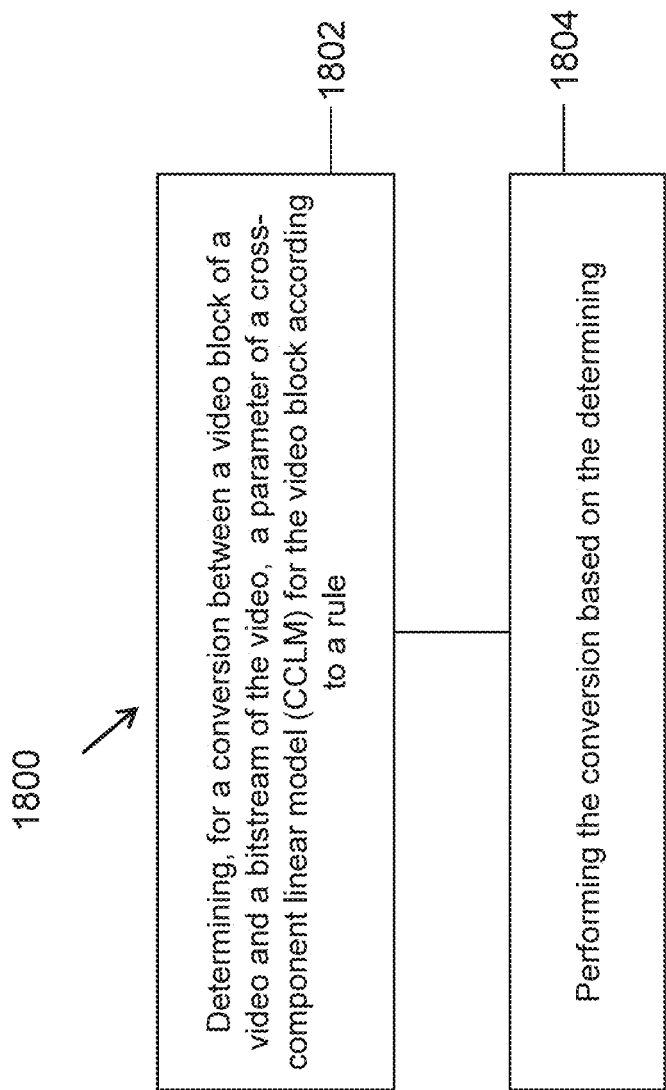
FIG. 18 is a flowchart for an example method of video processing in accordance with some embodiments of the disclosed technology.

1. A method of video processing (e.g., method 1800 as shown in FIG. 18), comprising: determining 1802, for a conversion between a video block of a video and a bitstream of the video, a parameter of a cross-component linear model (CCLM) for the video block according to a rule; and performing 1804 the conversion based on the determining, and wherein the rule specifies to use a variable representing a neighbouring luma sample in the determining of the parameter of the CCLM only in case that the variable has a certain value.

2. The method of clause 1, wherein the certain value of the variable representing a neighbouring above luma sample of the video block is equal to that of a reconstructed luma sample prior to a deblocking filter process.

3. The method of clause 2, wherein in case that the neighbouring above luma sample is available, the variable representing the neighbouring above luma sample denoted as pY [x][y] is set equal to the reconstructed luma sample prior to the deblocking filter process at a location (xTbY+x, yTbY+y), where (xTbY, yTbY) represents a top-left position of the video block and x and y are integers.

4. The method of clause 3, wherein x is in a range of 0 to SubWidthC*max(numSampT, nTbW)−1, whereby nTbW denotes a width of the video block, SubWidthC is a width scale factor of the video block and obtained from a table according to a chroma format of a picture including the video block, and numSampT indicates a number of available neighbouring chroma samples on a top and top-right of the video block.

5. The method of clause 3, wherein y is −1 or −2.

6. The method of clause 1, wherein a value of the variable representing a neighboring left luma sample of the video block is set equal to that of a reconstructed luma sample prior to a deblocking filter process.

7. The method of clause 6, wherein in case that the neighbouring left luma sample is available, the variable representing the neighbouring left luma sample denoted as pY [x][y] is set equal to the reconstructed luma sample prior to the deblocking filter process at a location (xTbY+x, yTbY+y), where (xTbY, yTbY) represents a top-left position of the video block and x and y are integers.

8. The method of clause 7, wherein x is in a range of −1 to −3.

9. The method of clause 7, wherein y is in a range of 0 to SubHeightC*max(numSampL, nTbH)−1, where nTbH denotes a height of the video block, and SubHeightC is a height scale factor of the video block and obtained from a table according to a chroma format of a picture including the video block, and numSampL indicates a number of available neighbouring chroma samples on a left and left-below of the video block.

10. The method of any of clauses 1 to 9, wherein the cross-component linear model uses a linear mode to derive prediction values of a chroma component from another component.

11. The method of any of clauses 1 to 9, wherein the conversion includes encoding the video into the bitstream.

12. The method of any of clauses 1 to 9, wherein the conversion includes decoding the video from the bitstream.

13. The method of any of clauses 1 to 12, wherein the conversion includes generating the bitstream from the video, and the method further comprises: storing the bitstream in a non-transitory computer-readable recording medium.

14. A video processing apparatus comprising a processor configured to implement a method recited in any one or more of clauses 1 to 12.

15. A method of storing a bitstream of a video, comprising, a method recited in any one of clauses 1 to 12, and further including storing the bitstream to a non-transitory computer-readable recording medium.

16. A computer readable medium storing program code that, when executed, causes a processor to implement a method recited in any one or more of clauses 1 to 12.

17. A computer readable medium that stores a bitstream generated according to any of the above described methods.

18. A video processing apparatus for storing a bitstream, wherein the video processing apparatus is configured to implement a method recited in any one or more of clauses 1 to 12.

The third set of clauses show example embodiments of techniques discussed in items 21-26 of the previous section.

Figure 19A:
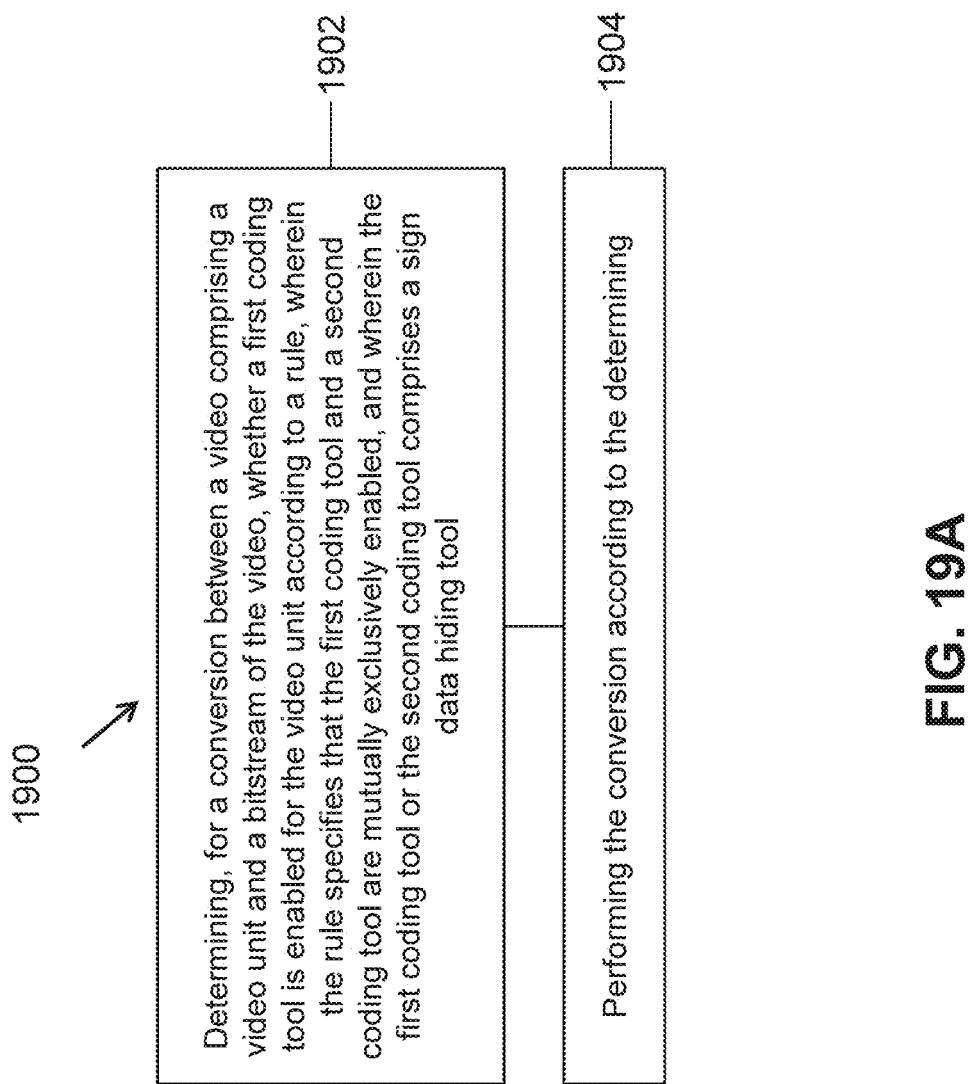
FIGS. 19A to 19D are flowcharts for example methods of video processing in accordance with some embodiments of the disclosed technology.

1. A method of video processing (e.g., method 1900 as shown in FIG. 19A), comprising: determining 1902, for a conversion between a video comprising a video unit and a bitstream of the video, whether a first coding tool is enabled for the video unit according to a rule, wherein the rule specifies that the first coding tool and a second coding tool are mutually exclusively enabled, and wherein the first coding tool or the second coding tool comprises a sign data hiding tool; and performing 1904 the conversion according to the determining.

2. The method of clause 1, wherein the video unit corresponds to a sequence, a picture, a slice, a tile, a brick, or a subpicture.

3. The method of clause 1 or 2, wherein the rule specifies to disable the first coding tool comprising the sign data hiding tool in case that the second coding tool comprising a block differential pulse-code modulation (BDPCM) tool is enabled for the video unit.

4. The method of clause 1 or 2, wherein the rule specifies to disable the first coding tool comprising a block differential pulse-code modulation (BDPCM) tool in case that the second coding tool comprising the sign data hiding tool is enabled for the video unit.

5. The method of clause 1 or 2, wherein rule specifies to disable the first coding tool comprising the sign data hiding tool in case that the second coding tool that only applies an identity transform is enabled for the video unit.

6. The method of clause 1 or 2, wherein the rule specifies to disable the first coding tool that only applies an identity transform in case that the second coding tool comprising the sign data hiding tool is enabled for the video unit.

7. The method of clause 5 or 6, wherein the second coding tool that only applies the identity transform or the first coding tool that only applies the identity transform comprises a transform skip mode tool or other coding tools.

Figure 19B:
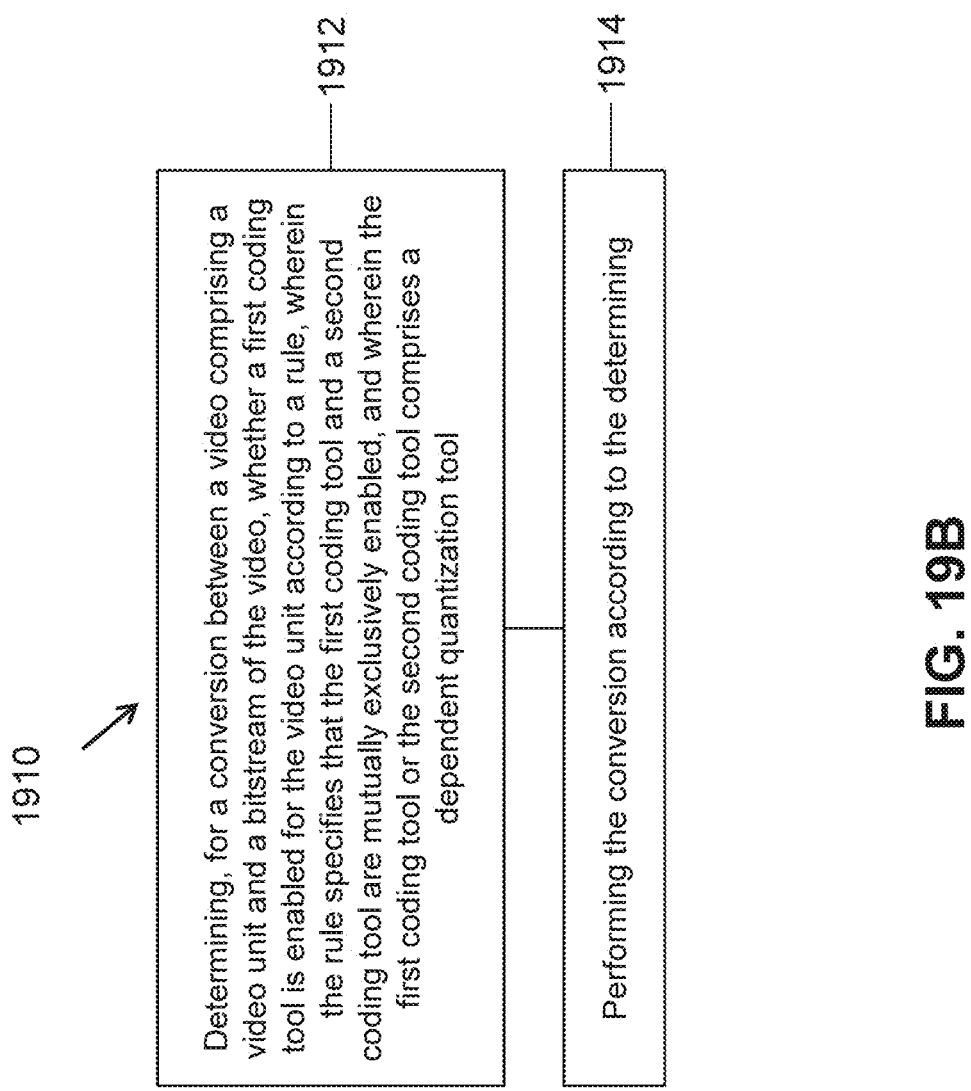

8. A method of video processing (e.g., method 1910 as shown in FIG. 19B), comprising: determining 1912, for a conversion between a video comprising a video unit and a bitstream of the video, whether a first coding tool is enabled for the video unit according to a rule, wherein the rule specifies that the first coding tool and a second coding tool are mutually exclusively enabled, and wherein the first coding tool or the second coding tool comprises a dependent quantization tool; and performing 1914 the conversion according to the determining.

9. The method of clause 8, wherein the video unit corresponds to a sequence, a picture, a slice, a tile, a brick, or a subpicture.

10. The method of clause 8 or 9, wherein the rule specifies to disable the first coding tool comprising the dependent quantization tool in case that the second coding tool comprising a block differential pulse-code modulation (BDPCM) tool is enabled for the video unit.

11. The method of clause 8 or 9, wherein the rule specifies to disable the first coding tool comprising a block differential pulse-code modulation (BDPCM) tool in case that the second coding tool comprising the dependent quantization tool is enabled for the video unit.

12. The method of clause 8 or 9, wherein the rule specifies to disable the first coding tool comprising the dependent quantization tool in case that the second coding tool that only applies an identity transform is enabled for the video unit.

13. The method of clause 8 or 9, wherein the rule specifies to disable the first coding tool that only applies an identity transform in case that the second coding tool comprising the dependent quantization is enabled for the video unit.

14. The method of clause 8 or 9, wherein the second coding tool that only applies the identity transform or the first coding tool that only applies the identity transform comprises a transform skip mode tool or other coding tools.

Figure 19C:

15. A method of video processing (e.g., method 1920 as shown in FIG. 19C), comprising: performing 1922 a conversion between a video comprising one or more pictures comprising one or more slices and a bitstream of the video according to a rule, and wherein the rule specifies that a slice type of a slice depends on reference picture entries of a reference picture list for the slice.

16. The method of clause 15, wherein the rule specifies that the slice type of the slice is I-slice in case that a number of the reference picture entries of a reference picture list 0 is equal to 0 and a number of reference picture entries for a reference picture list 1 is equal to 0.

17. The method of clause 15, wherein the rule specifies that the slice type of the slice is P-slice in case that a number of the reference picture entries of a reference picture list 0 is greater than 0 and a number of reference picture entries for a reference picture list 1 is equal to 0.

18. The method of clause 15, wherein the rule specifies that the slice type of the slice is not B-slice in case that a number of reference picture entries of a reference picture list 0 is greater than 0 and a number of reference picture entries for a reference picture list 1 is equal to 0.

19. The method of any of clauses 16 to 18, wherein the slice type is not included in the bitstream.

20. The method of clause 15, wherein the reference picture entries are signaled or inferred before the slice type is signaled or inferred.

21. The method of clause 15, wherein the reference picture entries are included in a picture header associated with a picture including the slice.

Figure 19D:

22. A method of video processing (e.g., method 1930 as shown in FIG. 19D), comprising: performing 1932 a conversion between a video comprising one or more pictures comprising one or more slices and a bitstream of the video according to a rule, and wherein the rule specifies that a number of allowed filters in adaptation parameter sets (APSs) or a number of APSs depends on coded information of the video.

23. The method of clause 22, wherein the coded information includes a number of subpictures of a picture.

24. The method of clause 22, wherein the number of the allowed filters in the APSs includes a number of luma adaptive loop filters (ALFs), chroma ALFs, and cross-component ALFs in ALF APSs in all adaptation parameter set (APS) network abstraction layer (NAL) units within a picture unit.

25. The method of clause 22, wherein the number of the allowed filters in APSs includes a number of adaptive loop filter (ALF) classes for luma component, a number of alternative filters for chroma components, and/or a number of cross-component filters in all adaptation parameter set (APS) network abstraction layer (NAL) units within a picture unit 26. The method of clause 22, wherein the APSs correspond to ALF APSs, scaling list APSs, and/or LMCS (luma mapping with chroma scaling) APSs.

27. The method of clause 22, wherein how to signal an APS identifier and/or the number of APSs to be used by a video unit is dependent on the number of the allowed filters in the APSs.

28. The method of any of clauses 1 to 27, wherein the conversion includes encoding the video into the bitstream.

29. The method of any of clauses 1 to 27, wherein the conversion includes decoding the video from the bitstream.

30. The method of any of clauses 1 to 27, wherein the conversion includes generating the bitstream from the video, and the method further comprises: storing the bitstream in a non-transitory computer-readable recording medium.

31. A video processing apparatus comprising a processor configured to implement a method recited in any one or more of clauses 1 to 30.

32. A method of storing a bitstream of a video, comprising, a method recited in any one of clauses 1 to 30, and further including storing the bitstream to a non-transitory computer-readable recording medium.

33. A computer readable medium storing program code that, when executed, causes a processor to implement a method recited in any one or more of clauses 1 to 30.

34. A computer readable medium that stores a bitstream generated according to any of the above described methods.

35. A video processing apparatus for storing a bitstream, wherein the video processing apparatus is configured to implement a method recited in any one or more of clauses 1 to 30.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was enabled based on the decision or determination.

The disclosed and other solutions, examples, embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc, read-only memory (CD ROM) and digital versatile disc read-only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of particular techniques. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

What is claimed is:

1. A method for processing video data, comprising:
determining, for a conversion between a chroma block of a video and a bitstream of the video, a parameter of a cross-component linear model for the chroma block according to a rule; and
performing the conversion based on the determining,
wherein the rule specifies that the parameter of the cross-component linear model is determined based on neighbouring chroma samples of the chroma block and down-sampled collocated luma samples derived based on variables representing neighbouring luma samples of a luma block corresponding to the chroma block,
wherein the rule further specifies that when a color format of the chroma block is 4:2:0, the down-sampled collocated luma samples is derived further based on at least one of a value of a first syntax element and a value of a first variable, wherein the first syntax element is included in the bitstream indicating whether chroma sample positions are vertically shifted relative to corresponding luma sample position, and the first variable indicates whether the chroma block locates at a boundary of a coding tree unit comprising the chroma block,
wherein the rule further specifies that when the color format of the chroma block is 4:2:2, the down-sampled collocated luma samples is derived without considering the value of the first syntax element,
wherein the rule further specifies that when the value of the first variable indicates that the chroma block locates at the boundary of the coding tree unit comprising the chroma block, the down-sampled collocated luma samples is derived using a same filter, regardless of the value of the first syntax element, for the chroma block having the color format of 4:2:0 and the chroma block having the color format of 4:2:2, and
wherein the rule further specifies that when the value of the first variable indicates that the chroma block does not locate at the boundary of the coding tree unit comprising the chroma block and the color format of the chroma block is 4:2:0, the down-sampled collocated luma samples are obtained using different filters in response to the first syntax element having different values.

2. The method of claim 1, wherein the rule further specifies that when the color format of the chroma block is 4:2:2, the down-sampled collocated luma samples are obtained using a fixed filter regardless of the value of the first syntax element, wherein the fixed filter is a 3-tap horizontal filter.

3. The method of claim 2, wherein when using the fixed filter, pSelDsY[i]=(pY[SubWidthC*x−1][−1]+2*pY[SubWidthC*x][−1]+pY[SubWidthC*x+1][−1]+2)>>2, where pSelDsY[i] denotes a down-sampled collocated luma sample with an index of i, and pY[m][n] denotes a neighbouring luma sample with a location of (m, n).

4. The method of claim 1, wherein the rule further specifies that when the value of the first variable indicates that the chroma block does not locate at the boundary of the coding tree unit comprising the chroma block and the color format of the chroma block is 4:2:0, pSelDsY[i] is equal to (pY[SubWidthC*x][−3]+pY[SubWidthC*x−1][−2]+4*pY[SubWidthC*x][−2]+pY[SubWidthC*x+1][−2]+pY[SubWidthC*x][−1]+4)>>3 in response to the first syntax element having a value of 1, where pSelDsY[i] denotes a down-sampled collocated luma sample with an index of i, and pY[m][n] denotes a neighbouring luma sample with a location of (m, n).

5. The method of claim 1, wherein the rule further specifies that when the value of the first variable indicates that the chroma block does not locate at the boundary of the coding tree unit comprising the chroma block and the color format of the chroma block is 4:2:0, pSelDsY[i] is equal to (pY[SubWidthC x−1][−1]+pY[SubWidthC*x−1][−2]+2*pY[SubWidthC*x][−1]+2*pY[SubWidthC*x][−2]+pY[SubWidthC*x+1][−1]+pY[SubWidthC*x+1][−2]+4)>>3 in response to the first syntax element having a value of 0, where pSelDsY[i] denotes a down-sampled collocated luma sample with an index of i, and pY[m][n] denotes a neighbouring luma sample with a location of (m, n).

6. The method of claim 1, wherein the variables representing neighbouring luma samples are derived based on at least one of the following: neighbouring above luma samples of the luma block, neighbouring left luma samples of the luma block, or samples in the luma block.

7. The method of claim 1, wherein the rule further specifies, in case that the first syntax element is not present, the value of the first syntax element is inferred to be equal to 1.

8. The method of claim 1, wherein the conversion includes encoding the video into the bitstream.

9. The method of claim 1, wherein the conversion includes decoding the video from the bitstream.

10. An apparatus for processing video data comprising a processor and a non-transitory memory with instructions thereon, wherein the instructions upon execution by the processor, cause the processor to:
determine, for a conversion between a chroma block of a video and a bitstream of the video, a parameter of a cross-component linear model for the chroma block according to a rule; and
perform the conversion based on the determining,
wherein the rule specifies that the parameter of the cross-component linear model is determined based on neighbouring chroma samples of the chroma block and down-sampled collocated luma samples derived based on variables representing neighbouring luma samples of a luma block corresponding to the chroma block,
wherein the rule further specifies that when a color format of the chroma block is 4:2:0, the down-sampled collocated luma samples is derived further based on at least one of a value of a first syntax element and a value of a first variable, wherein the first syntax element is included in the bitstream indicating whether chroma sample positions are vertically shifted relative to corresponding luma sample position, and the first variable indicates whether the chroma block locates at a boundary of a coding tree unit comprising the chroma block, wherein the rule further specifies that when the color format of the chroma block is 4:2:2, the down-sampled collocated luma samples is derived without considering the value of the first syntax element, wherein the rule further specifies that when the value of the first variable indicates that the chroma block locates at the boundary of the coding tree unit comprising the chroma block, the down-sampled collocated luma samples is derived using a same filter, regardless of the value of the first syntax element, for the chroma block having the color format of 4:2:0 and the chroma block having the color format of 4:2:2, and wherein the rule further specifies that when the value of the first variable indicates that the chroma block does not locate at the boundary of the coding tree unit comprising the chroma block and the color format of the chroma block is 4:2:0, the down-sampled collocated luma samples are obtained using different filters in response to the first syntax element having different values.

11. The apparatus of claim 10, wherein the rule further specifies that when the value of the first variable indicates that the chroma block does not locate at the boundary of the coding tree unit comprising the chroma block and the color format of the chroma block is 4:2:0, pSelDsY[i] is equal to (pY[SubWidthC*x][−3]+pY[SubWidthC*x−1][−2]+4*pY[SubWidthC*x][−2]+pY[SubWidthC*x+1][−2]+pY[SubWidthC*x][−1]+4)>>3 in response to the first syntax element having a value of 1, where pSelDsY[i] denotes a down-sampled collocated luma sample with an index of i, and pY[m][n] denotes a neighbouring luma sample with a location of (m, n), or wherein the rule further specifies that when the value of the first variable indicates that the chroma block does not locate at the boundary of the coding tree unit comprising the chroma block and the color format of the chroma block is 4:2:0, pSelDsY[i] is equal to (pY[SubWidthC x−1][−1]+pY[SubWidthC*x−1][−2]+2*pY[SubWidthC*x][−1]+2*pY[SubWidthC*x][−2]+pY[SubWidthC*x+1][−1]+pY[SubWidthC*x+1][−2]+4)>>3 in response to the first syntax element having a value of 0, where pSelDsY[i] denotes a down-sampled collocated luma sample with an index of i, and pY[m][n] denotes the neighbouring luma sample with a location of (m, n).

12. A non-transitory computer-readable storage medium storing instructions that cause a processor to:
  determine, for a conversion between a chroma block of a video and a bitstream of the video, a parameter of a cross-component linear model for the chroma block according to a rule; and
  perform the conversion based on the determining,
  wherein the rule specifies that the parameter of the cross-component linear model is determined based on neighbouring chroma samples of the chroma block and down-sampled collocated luma samples derived based on variables representing neighbouring luma samples of a luma block corresponding to the chroma block,
  wherein the rule further specifies that when a color format of the chroma block is 4:2:0, the down-sampled collocated luma samples is derived further based on at least one of a value of a first syntax element and a value of a first variable, wherein the first syntax element is included in the bitstream indicating whether chroma sample positions are vertically shifted relative to corresponding luma sample position, and the first variable indicates whether the chroma block locates at a boundary of a coding tree unit comprising the chroma block, wherein the rule further specifies that when the color format of the chroma block is 4:2:2, the down-sampled collocated luma samples is derived without considering the value of the first syntax element, wherein the rule further specifies that when the value of the first variable indicates that the chroma block locates at the boundary of the coding tree unit comprising the chroma block, the down-sampled collocated luma samples is derived using a same filter, regardless of the value of the first syntax element, for the chroma block having the color format of 4:2:0 and the chroma block having the color format of 4:2:2, and wherein the rule further specifies that when the value of the first variable indicates that the chroma block does not locate at the boundary of the coding tree unit comprising the chroma block and the color format of the chroma block is 4:2:0, the down-sampled collocated luma samples are obtained using different filters in response to the first syntax element having different values.

13. A non-transitory computer-readable recording medium storing a bitstream of a video which is generated by a method performed by a video processing apparatus, wherein the method comprises:
  determining a parameter of a cross-component linear model for a chroma block of the video according to a rule; and
  generating the bitstream based on the determining,
  wherein the rule specifies that the parameter of the cross-component linear model is determined based on neighbouring chroma samples of the chroma block and down-sampled collocated luma samples derived based on variables representing neighbouring luma samples of a luma block corresponding to the chroma block,
  wherein the rule further specifies that when a color format of the chroma block is 4:2:0, the down-sampled collocated luma samples is derived further based on at least one of a value of a first syntax element and a value of a first variable, wherein the first syntax element is included in the bitstream indicating whether chroma sample positions are vertically shifted relative to corresponding luma sample position, and the first variable indicates whether the chroma block locates at a boundary of a coding tree unit comprising the chroma block, wherein the rule further specifies that when the color format of the chroma block is 4:2:2, the down-sampled collocated luma samples is derived without considering the value of the first syntax element, wherein the rule further specifies that when the value of the first variable indicates that the chroma block locates at the boundary of the coding tree unit comprising the chroma block, the down-sampled collocated luma samples is derived using a same filter, regardless of the value of the first syntax element, for the chroma block having the color format of 4:2:0 and the chroma block having the color format of 4:2:2, and wherein the rule further specifies that when the value of the first variable indicates that the chroma block does not locate at the boundary of the coding tree unit comprising the chroma block and the color format of the chroma block is 4:2:0, the down-sampled collocated luma samples are obtained using different filters in response to the first syntax element having different values.

14. The non-transitory computer-readable storage medium of claim 12, wherein the rule further specifies that when the value of the first variable indicates that the chroma block does not locate at the boundary of the coding tree unit comprising the chroma block and the color format of the chroma block is 4:2:0, pSelDsY[i] is equal to (pY[SubWidthC*x][−3]+pY[SubWidthC*x−1][−2]+4*pY[SubWidthC*x][−2]+pY[SubWidthC*x+1][−2]+pY[SubWidthC*x][−1]+4)>>3 in response to the first syntax element having a value of 1, where pSelDsY[i] denotes a down-sampled collocated luma sample with an index of i, and pY[m][n] denotes a neighbouring luma sample with a location of (m, n), or wherein the rule further specifies that when the value of the first variable indicates that the chroma block does not locate at the boundary of the coding tree unit comprising the chroma block and the color format of the chroma block is 4:2:0, pSelDsY[i] is equal to (pY[SubWidthC x−1][−1]+pY[SubWidthC*x−1][−2]+2*pY[SubWidthC*x][−1]+2*pY[SubWidthC*x][−2]+pY[SubWidthC*x+1][−1]+pY[SubWidthC*x+1][−2]+4)>>3 in response to the first syntax element having a value of 0, where pSelDsY[i] denotes a down-sampled collocated luma sample with an index of i, and pY[m][n] denotes the neighbouring luma sample with a location of (m, n).

15. The non-transitory computer-readable recording medium of claim 13, wherein the rule further specifies that when the value of the first variable indicates that the chroma block does not locate at the boundary of the coding tree unit comprising the chroma block and the color format of the chroma block is 4:2:0, pSelDsY[i] is equal to (pY[SubWidthC*x][−3]+pY[SubWidthC*x−1][−2]+4*pY[SubWidthC*x][−2]+pY[SubWidthC*x+1][−2]+pY[SubWidthC*x][−1]+4)>>3 in response to the first syntax element having a value of 1, where pSelDsY[i] denotes a down-sampled collocated luma sample with an index of i, and pY[m][n] denotes a neighbouring luma sample with a location of (m, n), or wherein the rule further specifies that when the value of the first variable indicates that the chroma block does not locate at the boundary of the coding tree unit comprising the chroma block and the color format of the chroma block is 4:2:0, pSelDsY[i] is equal to (pY[SubWidthC x−1][−1]+pY[SubWidthC*x−1][−2]+2*pY[SubWidthC*x][−1]+2*pY[SubWidthC*x][−2]+pY[SubWidthC*x+1][−1]+pY[SubWidthC*x+1][−2]+4)>>3 in response to the first syntax element having a value of 0, where pSelDsY[i] denotes a down-sampled collocated luma sample with an index of i, and pY[m][n] denotes the neighbouring luma sample with a location of (m, n).

\* \* \* \* \*